United States Patent
Haney

(10) Patent No.: US 10,750,310 B2
(45) Date of Patent: Aug. 18, 2020

(54) TEMPORARY LOCATION SHARING GROUP WITH EVENT BASED TERMINATION

(71) Applicant: X One, Inc., Union City, CA (US)

(72) Inventor: Richard D. Haney, Union City, CA (US)

(73) Assignee: X One, Inc., Union City, CA (US)

( * ) Notice: Subject to any disclaimer, the term of this patent is extended or adjusted under 35 U.S.C. 154(b) by 0 days.

(21) Appl. No.: 16/698,837

(22) Filed: Nov. 27, 2019

(65) Prior Publication Data
US 2020/0100050 A1 Mar. 26, 2020

Related U.S. Application Data

(63) Continuation of application No. 16/392,488, filed on Apr. 23, 2019, which is a continuation of application
(Continued)

(51) Int. Cl.
*H04W 4/02* (2018.01)
*H04W 12/08* (2009.01)
(Continued)

(52) U.S. Cl.
CPC ............. *H04W 4/02* (2013.01); *G01C 21/20* (2013.01); *G01S 19/01* (2013.01); *G01S 19/03* (2013.01);
(Continued)

(58) Field of Classification Search
CPC ......... G05D 2201/0213; G05D 1/0274; G05D 1/0223; H04W 4/40; H04W 4/029;
(Continued)

(56) References Cited

U.S. PATENT DOCUMENTS

| 1,103,073 A | 7/1914 | O'Connell |
|---|---|---|
| 3,953,720 A | 4/1976 | Kelch |
| | (Continued) | |

FOREIGN PATENT DOCUMENTS

| AU | 2003901617 | 4/2003 |
|---|---|---|
| AU | 2003901795 | 4/2003 |
| | (Continued) | |

OTHER PUBLICATIONS

US 6,731,928 B1, 05/2004, Tanaka (withdrawn)
(Continued)

*Primary Examiner* — Kwasi Karikari
(74) *Attorney, Agent, or Firm* — Marc P. Schuyler

(57) ABSTRACT

A system for exchanging GPS or other position data between wireless devices for purposes of group activities, child location monitoring, work group coordination, dispatching of employees etc. Cell phones and other wireless devices with GPS receivers have loaded therein a Buddy Watch application and a TalkControl application. The Buddy Watch application communicates with the GPS receiver and other wireless devices operated by buddies registered in the users phone as part of buddy groups or individually. GPS position data and historical GPS position data can be exchanged between cell phones of buddies and instant buddies such as tow truck drivers via a buddy watch server. Emergency monitoring services can be set up with notifications to programmable individuals in case an individual does not respond. Positions and tracks can be displayed. TalkControl simplifies and automates the process of joining talk groups for walkie talkie services such as that provided by Nextel.

28 Claims, 51 Drawing Sheets

Related U.S. Application Data

No. 16/201,780, filed on Nov. 27, 2018, now Pat. No. 10,341,808, which is a continuation of application No. 15/428,981, filed on Feb. 9, 2017, now Pat. No. 10,200,811, which is a continuation of application No. 15/404,481, filed on Jan. 12, 2017, now Pat. No. 9,749,790, which is a continuation of application No. 14/139,695, filed on Dec. 23, 2013, now Pat. No. 9,584,960, which is a continuation of application No. 13/889,132, filed on May 7, 2013, now Pat. No. 8,798,593, which is a continuation of application No. 12/075,408, filed on Mar. 11, 2008, now Pat. No. 8,538,458, which is a continuation of application No. 11/099,362, filed on Apr. 4, 2005, now Pat. No. 7,353,034.

(51) Int. Cl.

| | |
|---|---|
| *H04W 4/21* | (2018.01) |
| *G01S 19/03* | (2010.01) |
| *H04M 3/42* | (2006.01) |
| *H04L 29/08* | (2006.01) |
| *H04W 12/00* | (2009.01) |
| *G01C 21/20* | (2006.01) |
| *H04W 4/021* | (2018.01) |
| *H04W 64/00* | (2009.01) |
| *H04W 68/12* | (2009.01) |
| *H04M 1/725* | (2006.01) |
| *H04W 4/08* | (2009.01) |
| *H04W 4/029* | (2018.01) |
| *H04W 4/90* | (2018.01) |
| *H04W 76/14* | (2018.01) |
| *H04W 4/50* | (2018.01) |
| *G01S 19/01* | (2010.01) |
| *H04M 1/02* | (2006.01) |
| *H04L 29/06* | (2006.01) |
| *H04W 4/14* | (2009.01) |
| *H04W 4/10* | (2009.01) |
| *H04W 72/12* | (2009.01) |
| *H04W 12/06* | (2009.01) |
| *G06F 16/29* | (2019.01) |
| *H04W 84/18* | (2009.01) |
| *G06Q 20/32* | (2012.01) |

(52) U.S. Cl.
CPC .......... *H04L 67/1046* (2013.01); *H04L 67/18* (2013.01); *H04L 67/22* (2013.01); *H04L 67/24* (2013.01); *H04L 67/42* (2013.01); *H04M 1/0202* (2013.01); *H04M 1/72519* (2013.01); *H04M 1/72525* (2013.01); *H04M 1/72536* (2013.01); *H04M 1/72572* (2013.01); *H04M 3/4228* (2013.01); *H04W 4/021* (2013.01); *H04W 4/022* (2013.01); *H04W 4/023* (2013.01); *H04W 4/025* (2013.01); *H04W 4/027* (2013.01); *H04W 4/029* (2018.02); *H04W 4/08* (2013.01); *H04W 4/10* (2013.01); *H04W 4/14* (2013.01); *H04W 4/21* (2018.02); *H04W 4/50* (2018.02); *H04W 4/90* (2018.02); *H04W 12/0013* (2019.01); *H04W 12/06* (2013.01); *H04W 12/08* (2013.01); *H04W 64/00* (2013.01); *H04W 64/003* (2013.01); *H04W 68/12* (2013.01); *H04W 72/121* (2013.01); *H04W 76/14* (2018.02); *G06F 16/29* (2019.01); *G06Q 20/322* (2013.01); *H04M 3/42093* (2013.01); *H04M 3/42348* (2013.01); *H04M 3/42365* (2013.01); *H04M 2201/38* (2013.01); *H04M 2203/2044* (2013.01); *H04M 2207/18* (2013.01); *H04M 2242/04* (2013.01); *H04M 2242/30* (2013.01); *H04M 2250/10* (2013.01); *H04W 12/00503* (2019.01); *H04W 84/18* (2013.01)

(58) Field of Classification Search
CPC ..... H04W 4/44; H04W 84/005; H04W 4/021; H04W 4/027; H04W 64/00; H04W 64/003; H04W 76/10; H04W 12/06; H04W 12/08; G08G 1/0112; G08G 1/166; G08G 1/0116; G08G 1/0955; G08G 1/162; G08G 1/13
See application file for complete search history.

(56) References Cited

U.S. PATENT DOCUMENTS

| | | |
|---|---|---|
| 3,996,554 A | 12/1976 | Ives et al. |
| 4,121,160 A | 10/1978 | Cataldo |
| 4,360,875 A | 11/1982 | Behnke |
| 4,445,118 A | 4/1984 | Taylor et al. |
| 4,494,119 A | 1/1985 | Wimbush |
| 4,606,073 A | 8/1986 | Moore |
| 4,644,351 A | 2/1987 | Zabarsky et al. |
| 4,651,156 A | 3/1987 | Martinez |
| 4,654,879 A | 3/1987 | Goldman et al. |
| 4,701,601 A | 10/1987 | Francini et al. |
| 4,706,275 A | 11/1987 | Kamil |
| 4,736,196 A | 4/1988 | McMahon et al. |
| 4,799,062 A | 1/1989 | Sanderford, Jr. et al. |
| 4,818,998 A | 4/1989 | Apsell et al. |
| 4,819,860 A | 4/1989 | Hargrove et al. |
| 4,868,376 A | 9/1989 | Lessin et al. |
| 4,884,132 A | 11/1989 | Morris et al. |
| 4,891,638 A | 1/1990 | Davis |
| 4,891,650 A | 1/1990 | Sheffer |
| 4,903,212 A | 2/1990 | Yokouchi et al. |
| 4,907,159 A | 3/1990 | Mauge et al. |
| 4,910,767 A | 3/1990 | Brugliera et al. |
| 4,939,662 A | 7/1990 | Nimura et al. |
| 4,952,928 A | 8/1990 | Carroll et al. |
| 4,972,484 A | 11/1990 | Theile et al. |
| 4,980,913 A | 12/1990 | Skret |
| 4,999,783 A | 3/1991 | Tenmoku et al. |
| 5,014,040 A | 5/1991 | Weaver et al. |
| 5,014,206 A | 5/1991 | Scribner et al. |
| 5,021,794 A | 6/1991 | Lawrence |
| 5,031,104 A | 7/1991 | Ikeda et al. |
| 5,039,980 A | 8/1991 | Aggers et al. |
| 5,043,736 A | 8/1991 | Darnell et al. |
| 5,045,839 A | 9/1991 | Ellis et al. |
| 5,046,011 A | 9/1991 | Kakihara et al. |
| 5,055,851 A | 10/1991 | Sheffer |
| 5,067,081 A | 11/1991 | Person |
| 5,068,656 A | 11/1991 | Sutherland |
| 5,068,891 A | 11/1991 | Marshall |
| 5,070,329 A | 12/1991 | Jasinaki |
| 5,081,667 A | 1/1992 | Drori et al. |
| 5,086,390 A | 2/1992 | Matthews |
| 5,086,394 A | 2/1992 | Shapira |
| 5,097,416 A | 3/1992 | Matthews |
| 5,119,104 A | 6/1992 | Heller |
| 5,119,396 A | 6/1992 | Snderford, Jr. |
| 5,121,126 A | 6/1992 | Clagett |
| 5,126,941 A | 6/1992 | Gurmu et al. |
| 5,128,752 A | 7/1992 | Von Kohorn |
| 5,144,283 A | 9/1992 | Arens et al. |
| 5,150,310 A | 9/1992 | Greenspun et al. |
| 5,153,584 A | 10/1992 | Engira |
| 5,161,180 A | 11/1992 | Chavous |
| 5,164,904 A | 11/1992 | Sumner |
| 5,166,972 A | 11/1992 | Smith |
| 5,168,451 A | 12/1992 | Bolger |
| 5,170,165 A | 12/1992 | Iihoshi et al. |
| 5,173,691 A | 12/1992 | Sumner |
| 5,177,478 A | 1/1993 | Wagai et al. |

(56) References Cited

U.S. PATENT DOCUMENTS

| | | |
|---|---|---|
| 5,177,479 A | 1/1993 | Cotton |
| 5,182,555 A | 1/1993 | Sumner |
| 5,187,810 A | 2/1993 | Yoneyama et al. |
| 5,193,215 A | 3/1993 | Olmer |
| 5,195,031 A | 3/1993 | Ordish |
| 5,197,092 A | 3/1993 | Bamburak |
| 5,208,756 A | 5/1993 | Song |
| 5,208,763 A | 5/1993 | Hong et al. |
| 5,214,789 A | 5/1993 | George |
| 5,218,367 A | 6/1993 | Sheffer et al. |
| 5,218,629 A | 6/1993 | Dumond, Jr. et al. |
| 5,223,844 A | 6/1993 | Mansell et al. |
| 5,225,842 A | 7/1993 | Brown et al. |
| 5,227,874 A | 7/1993 | Von Kohorn |
| 5,239,570 A | 8/1993 | Koster et al. |
| 5,243,529 A | 9/1993 | Kashiwazaki |
| 5,243,652 A | 9/1993 | Teare et al. |
| 5,245,314 A | 9/1993 | Kah, Jr. |
| 5,249,044 A | 9/1993 | Von Kohorn |
| 5,265,120 A | 11/1993 | Sanderford, Jr. |
| 5,266,944 A | 11/1993 | Carroll et al. |
| 5,274,560 A | 12/1993 | LaRue |
| 5,276,311 A | 1/1994 | Hennige |
| 5,276,905 A | 1/1994 | Hurst et al. |
| 5,283,570 A | 2/1994 | DeLuca et al. |
| 5,289,527 A | 2/1994 | Tiedemann, Jr. |
| 5,289,572 A | 2/1994 | Yano et al. |
| 5,293,642 A | 3/1994 | Lo |
| 5,295,064 A | 3/1994 | Malec et al. |
| 5,299,132 A | 3/1994 | Wortham |
| 5,301,354 A | 4/1994 | Schwendeman et al. |
| 5,303,297 A | 4/1994 | Hillis |
| 5,305,201 A | 4/1994 | Matthews |
| 5,307,278 A | 4/1994 | Hermans et al. |
| 5,311,516 A | 5/1994 | Kuznicki et al. |
| 5,317,311 A | 5/1994 | Martell et al. |
| 5,325,302 A | 6/1994 | Izidon et al. |
| 5,327,144 A | 7/1994 | Stilp et al. |
| 5,327,529 A | 7/1994 | Fults et al. |
| 5,334,974 A | 8/1994 | Simms et al. |
| 5,335,246 A | 8/1994 | Yokev et al. |
| 5,337,044 A | 8/1994 | Folger et al. |
| 5,339,391 A | 8/1994 | Wroblewski et al. |
| 5,343,493 A | 8/1994 | Karimullah |
| 5,347,568 A | 9/1994 | Moody et al. |
| 5,351,235 A | 9/1994 | Lahtinen |
| 5,361,212 A | 11/1994 | Class et al. |
| 5,363,425 A | 11/1994 | Mufti et al. |
| 5,365,451 A | 11/1994 | Wang et al. |
| 5,371,678 A | 12/1994 | Nomura |
| 5,374,933 A | 12/1994 | Kao |
| 5,374,936 A | 12/1994 | Feng |
| 5,379,057 A | 1/1995 | Clough et al. |
| 5,379,451 A | 1/1995 | Nakagoshi et al. |
| 5,381,338 A | 1/1995 | Wysocki et al. |
| 5,387,993 A | 2/1995 | Heller et al. |
| 5,388,147 A | 2/1995 | Grimes |
| 5,390,125 A | 2/1995 | Sennott et al. |
| 5,390,339 A | 2/1995 | Bruckert et al. |
| 5,394,158 A | 2/1995 | Chia |
| 5,396,227 A | 3/1995 | Carroll et al. |
| 5,398,190 A | 3/1995 | Wortham |
| 5,406,490 A | 4/1995 | Braegas |
| 5,406,614 A | 4/1995 | Hara |
| 5,408,217 A | 4/1995 | Sanderford, Jr. |
| 5,412,388 A | 5/1995 | Attwood |
| 5,414,432 A | 5/1995 | Penny, Jr. et al. |
| 5,416,712 A | 5/1995 | Geier et al. |
| 5,416,890 A | 5/1995 | Beretta |
| 5,418,537 A | 5/1995 | Bird |
| 5,422,813 A | 6/1995 | Schuchman et al. |
| 5,423,076 A | 6/1995 | Westergren et al. |
| 5,432,841 A | 7/1995 | Rimer |
| 5,434,789 A | 7/1995 | Fraker et al. |
| 5,438,321 A | 8/1995 | Bernard et al. |
| 5,442,557 A | 8/1995 | Kaneko |
| 5,442,805 A | 8/1995 | Sagers et al. |
| 5,444,444 A | 8/1995 | Ross |
| 5,444,450 A | 8/1995 | Olds et al. |
| 5,454,024 A | 9/1995 | Lebowitz |
| 5,457,689 A | 10/1995 | Marvit et al. |
| 5,457,713 A | 10/1995 | Sanderford, Jr. et al. |
| 5,461,365 A | 10/1995 | Schlager et al. |
| 5,461,390 A | 10/1995 | Hoshen |
| 5,469,362 A | 11/1995 | Hunt et al. |
| 5,470,233 A | 11/1995 | Fruchterman et al. |
| 5,479,408 A | 12/1995 | Will |
| 5,479,482 A | 12/1995 | Grimes |
| 5,479,600 A | 12/1995 | Wroblewski et al. |
| 5,485,161 A | 1/1996 | Vaughn |
| 5,485,163 A | 1/1996 | Singer et al. |
| 5,488,563 A | 1/1996 | Chazelle et al. |
| 5,493,692 A | 2/1996 | Theimer et al. |
| 5,497,149 A | 3/1996 | Fast |
| 5,502,757 A | 3/1996 | Bales et al. |
| 5,504,482 A | 4/1996 | Schreder |
| 5,506,886 A | 4/1996 | Maine et al. |
| 5,508,707 A | 4/1996 | LeBlanc et al. |
| 5,508,931 A | 4/1996 | Snider |
| 5,510,801 A | 4/1996 | Engelbrecht et al. |
| 5,512,879 A | 4/1996 | Stokes |
| 5,513,243 A | 4/1996 | Kage |
| 5,515,043 A | 5/1996 | Berard et al. |
| 5,515,287 A | 5/1996 | Hakoyama et al. |
| 5,515,419 A | 5/1996 | Sheffer |
| 5,517,199 A | 5/1996 | DiMattei |
| 5,519,403 A | 5/1996 | Bickley et al. |
| 5,519,760 A | 5/1996 | Borkowski et al. |
| 5,523,950 A | 6/1996 | Peterson |
| 5,530,655 A | 6/1996 | Lokhoff et al. |
| 5,530,914 A | 6/1996 | McPheters |
| 5,532,690 A | 7/1996 | Hertel |
| 5,535,434 A | 7/1996 | Siddoway et al. |
| 5,537,460 A | 7/1996 | Holliday, Jr. et al. |
| 5,539,395 A | 7/1996 | Buss et al. |
| 5,539,398 A | 7/1996 | Hall et al. |
| 5,539,647 A | 7/1996 | Shibata et al. |
| 5,539,829 A | 7/1996 | Lokhoff et al. |
| 5,539,924 A | 7/1996 | Grube et al. |
| 5,543,776 A | 8/1996 | L'Esperance et al. |
| 5,543,789 A | 8/1996 | Behr et al. |
| 5,546,445 A | 8/1996 | Dennison et al. |
| 5,548,726 A | 8/1996 | Pettus |
| 5,551,058 A | 8/1996 | Hutcheson et al. |
| 5,552,772 A | 9/1996 | Janky et al. |
| 5,552,989 A | 9/1996 | Bertrand |
| 5,555,286 A | 9/1996 | Tendler |
| 5,557,259 A | 9/1996 | Musa |
| 5,559,520 A | 9/1996 | Barzegar et al. |
| 5,559,707 A | 9/1996 | DeLorme et al. |
| 5,561,704 A | 10/1996 | Salimando |
| 5,561,799 A | 10/1996 | Khalidi et al. |
| 5,568,119 A | 10/1996 | Schipper et al. |
| 5,568,153 A | 10/1996 | Beliveau |
| 5,570,412 A | 10/1996 | LeBlanc |
| 5,574,648 A | 11/1996 | Pilley |
| 5,574,772 A | 11/1996 | Scalisi et al. |
| 5,579,372 A | 11/1996 | Astrom |
| 5,579,535 A | 11/1996 | Orlen et al. |
| 5,588,009 A | 12/1996 | Will |
| 5,590,396 A | 12/1996 | Henry |
| 5,592,382 A | 1/1997 | Colley |
| 5,592,535 A | 1/1997 | Klotz |
| 5,594,425 A | 1/1997 | Ladner et al. |
| 5,594,780 A | 1/1997 | Wiedeman et al. |
| 5,598,572 A | 1/1997 | Tanikoshi et al. |
| 5,604,486 A | 2/1997 | Lauro et al. |
| 5,606,313 A | 2/1997 | Allen et al. |
| 5,606,618 A | 2/1997 | Lokhoff et al. |
| 5,606,850 A | 3/1997 | Nakamura |
| 5,610,815 A | 3/1997 | Gudat et al. |
| 5,614,890 A | 3/1997 | Fox |
| 5,615,116 A | 3/1997 | Gudat et al. |
| 5,617,074 A | 4/1997 | White |

(56) References Cited

U.S. PATENT DOCUMENTS

| | | |
|---|---|---|
| 5,619,571 A | 4/1997 | Sandstrom et al. |
| 5,621,384 A | 4/1997 | Crimmins et al. |
| 5,621,793 A | 4/1997 | Bednarek et al. |
| 5,627,547 A | 5/1997 | Ramaswamy et al. |
| 5,627,548 A | 5/1997 | Woo et al. |
| 5,627,549 A | 5/1997 | Park |
| 5,628,050 A | 5/1997 | McGraw et al. |
| 5,628,051 A | 5/1997 | Salin |
| 5,629,678 A | 5/1997 | Gargano et al. |
| 5,629,693 A | 5/1997 | Janky |
| 5,630,206 A | 5/1997 | Urban et al. |
| 5,633,912 A | 5/1997 | Tsoi |
| 5,636,245 A | 6/1997 | Ernst et al. |
| 5,636,276 A | 6/1997 | Brugger |
| 5,642,303 A | 6/1997 | Small et al. |
| 5,646,853 A | 7/1997 | Takahashi et al. |
| 5,646,992 A | 7/1997 | Subler et al. |
| 5,650,770 A | 7/1997 | Schlager et al. |
| 5,652,570 A | 7/1997 | Lepkofker |
| 5,654,908 A | 8/1997 | Yokoyama |
| 5,655,013 A | 8/1997 | Gainsboro |
| 5,661,460 A | 8/1997 | Sallen et al. |
| 5,661,652 A | 8/1997 | Sprague et al. |
| 5,661,755 A | 8/1997 | Van De Kerkhof et al. |
| 5,663,732 A | 9/1997 | Stangeland et al. |
| 5,666,215 A | 9/1997 | Fredlund et al. |
| 5,675,362 A | 10/1997 | Clough et al. |
| 5,677,837 A | 10/1997 | Reynolds |
| 5,682,525 A | 10/1997 | Bouve et al. |
| 5,682,600 A | 10/1997 | Salin |
| 5,684,859 A | 11/1997 | Chanroo et al. |
| 5,689,245 A | 11/1997 | Noreen et al. |
| 5,689,252 A | 11/1997 | Ayanoglu et al. |
| 5,689,269 A | 11/1997 | Norris |
| 5,689,270 A | 11/1997 | Kelley et al. |
| 5,689,431 A | 11/1997 | Rudow et al. |
| 5,697,055 A | 12/1997 | Gilhousen et al. |
| 5,697,058 A | 12/1997 | Paavonen |
| 5,699,053 A | 12/1997 | Jonsson |
| 5,699,244 A | 12/1997 | Clark, Jr. et al. |
| 5,704,029 A | 12/1997 | Wright, Jr. |
| 5,705,980 A | 1/1998 | Shapiro |
| 5,708,478 A | 1/1998 | Tognazzini |
| 5,710,803 A | 1/1998 | Kowal et al. |
| 5,712,619 A | 1/1998 | Simkin |
| 5,712,679 A | 1/1998 | Coles |
| 5,712,899 A | 1/1998 | Pace, II |
| 5,717,392 A | 2/1998 | Eldridge |
| 5,721,781 A | 2/1998 | Deo et al. |
| 5,724,660 A | 3/1998 | Kauser et al. |
| 5,727,057 A | 3/1998 | Emery et al. |
| 5,731,757 A | 3/1998 | Layson, Jr. |
| 5,731,785 A | 3/1998 | Lemelson et al. |
| 5,732,074 A | 3/1998 | Spaur et al. |
| 5,732,354 A | 3/1998 | MacDonald |
| 5,736,962 A | 4/1998 | Tendler |
| 5,737,703 A | 4/1998 | Byrne |
| 5,739,774 A | 4/1998 | Olandesi |
| 5,740,534 A | 4/1998 | Ayerst et al. |
| 5,740,549 A | 4/1998 | Reilly et al. |
| 5,742,233 A | 4/1998 | Hoffman et al. |
| 5,742,509 A | 4/1998 | Goldberg et al. |
| 5,742,635 A | 4/1998 | Sanderford, Jr. |
| 5,742,666 A | 4/1998 | Alpert |
| 5,745,865 A | 4/1998 | Rostoker et al. |
| 5,748,109 A | 5/1998 | Kosaka et al. |
| 5,752,186 A | 5/1998 | Malackowski et al. |
| 5,754,430 A | 5/1998 | Sawada |
| 5,754,939 A | 5/1998 | Herz et al. |
| 5,758,049 A | 5/1998 | Johnson et al. |
| 5,758,257 A | 5/1998 | Herz et al. |
| 5,758,313 A | 5/1998 | Shah et al. |
| RE35,829 E | 6/1998 | Sanderford, Jr. |
| 5,760,742 A | 6/1998 | Branch et al. |
| 5,760,773 A | 6/1998 | Berman et al. |
| 5,760,917 A | 6/1998 | Sheridan |
| 5,761,618 A | 6/1998 | Lynch et al. |
| 5,764,686 A | 6/1998 | Sanderford et al. |
| 5,765,152 A | 6/1998 | Erickson |
| 5,767,788 A | 6/1998 | Ness |
| 5,767,795 A | 6/1998 | Schaphorst |
| 5,768,509 A | 6/1998 | Gunluk |
| 5,771,353 A | 6/1998 | Eggleston et al. |
| 5,774,170 A | 6/1998 | Hite et al. |
| 5,774,533 A | 6/1998 | Patel |
| 5,774,670 A | 6/1998 | Montulli |
| 5,774,824 A | 6/1998 | Streit et al. |
| 5,774,829 A | 6/1998 | Cisneros et al. |
| 5,777,580 A | 7/1998 | Janky et al. |
| 5,778,304 A | 7/1998 | Grube et al. |
| 5,787,357 A | 7/1998 | Salin |
| 5,787,429 A | 7/1998 | Nikolin, Jr. |
| 5,790,974 A | 8/1998 | Tognazzini |
| 5,793,630 A | 8/1998 | Theimer et al. |
| 5,794,142 A | 8/1998 | Vanttila et al. |
| 5,796,365 A | 8/1998 | Lewis |
| 5,796,613 A | 8/1998 | Kato et al. |
| 5,796,634 A | 8/1998 | Craport et al. |
| 5,797,094 A | 8/1998 | Houde et al. |
| 5,797,096 A | 8/1998 | Lupien et al. |
| 5,798,732 A | 8/1998 | Eshenbach |
| 5,802,492 A | 9/1998 | DeLorme et al. |
| 5,805,460 A | 9/1998 | Greene et al. |
| 5,806,000 A | 9/1998 | Vo et al. |
| 5,806,018 A | 9/1998 | Smith et al. |
| 5,808,564 A | 9/1998 | Simms et al. |
| 5,808,565 A | 9/1998 | Matta et al. |
| 5,809,415 A | 9/1998 | Rossmann |
| 5,812,086 A | 9/1998 | Bertiger et al. |
| 5,812,087 A | 9/1998 | Krasner |
| 5,815,538 A | 9/1998 | Grell et al. |
| 5,822,700 A | 10/1998 | Hult et al. |
| 5,825,306 A | 10/1998 | Hiyokawa et al. |
| 5,825,884 A | 10/1998 | Zdepski et al. |
| 5,826,195 A | 10/1998 | Westerlage et al. |
| 5,828,740 A | 10/1998 | Khuc et al. |
| 5,831,552 A | 11/1998 | Sogawa et al. |
| 5,835,061 A | 11/1998 | Stewart |
| 5,835,376 A | 11/1998 | Smith et al. |
| 5,835,907 A | 11/1998 | Newman |
| 5,839,086 A | 11/1998 | Hirano |
| 5,839,088 A | 11/1998 | Hancock et al. |
| 5,841,396 A | 11/1998 | Krasner |
| 5,845,227 A | 12/1998 | Peterson |
| 5,848,373 A | 12/1998 | DeLorme et al. |
| 5,852,775 A | 12/1998 | Hidary |
| 5,854,793 A | 12/1998 | Dinkins |
| 5,857,201 A | 1/1999 | Wright, Jr. et al. |
| 5,859,869 A | 1/1999 | Sanderford |
| 5,862,244 A | 1/1999 | Kleiner et al. |
| 5,864,667 A | 1/1999 | Barkan |
| 5,867,103 A | 2/1999 | Taylor, Jr. |
| 5,867,110 A | 2/1999 | Naito et al. |
| 5,870,686 A | 2/1999 | Monson |
| 5,872,526 A | 2/1999 | Tognazzini |
| 5,873,030 A | 2/1999 | Mechling et al. |
| 5,873,068 A | 2/1999 | Beaumont et al. |
| 5,874,914 A | 2/1999 | Krasner |
| 5,878,326 A | 3/1999 | Benz et al. |
| 5,883,580 A | 3/1999 | Briancon et al. |
| 5,884,322 A | 3/1999 | Sidhu et al. |
| 5,887,249 A | 3/1999 | Schmid |
| 5,887,269 A | 3/1999 | Brunts et al. |
| 5,889,474 A | 3/1999 | LaDue |
| 5,890,064 A | 3/1999 | Widergen et al. |
| 5,890,068 A | 3/1999 | Fattouche et al. |
| 5,892,454 A | 4/1999 | Schipper et al. |
| 5,893,898 A | 4/1999 | Tanimoto |
| 5,895,471 A | 4/1999 | King et al. |
| 5,896,369 A | 4/1999 | Warsta et al. |
| 5,898,680 A | 4/1999 | Johnstone et al. |
| 5,899,954 A | 5/1999 | Sato |
| 5,903,726 A | 5/1999 | Donovan et al. |
| 5,905,248 A | 5/1999 | Russell et al. |

(56) References Cited

U.S. PATENT DOCUMENTS

| | | |
|---|---|---|
| 5,905,451 A | 5/1999 | Sakashita |
| 5,905,460 A | 5/1999 | Odagiri et al. |
| 5,908,465 A | 6/1999 | Ito et al. |
| 5,910,799 A | 6/1999 | Carpenter et al. |
| 5,913,040 A | 6/1999 | Rakavy et al. |
| 5,913,170 A | 6/1999 | Wortham |
| 5,914,668 A | 6/1999 | Chavez, Jr. et al. |
| 5,914,675 A | 6/1999 | Tognazzini |
| 5,915,243 A | 6/1999 | Smolen |
| 5,917,913 A | 6/1999 | Wang |
| 5,918,180 A | 6/1999 | Dimino |
| 5,920,589 A | 7/1999 | Rouquette et al. |
| 5,920,821 A | 7/1999 | Seazholtz et al. |
| 5,922,074 A | 7/1999 | Richard et al. |
| 5,923,861 A | 7/1999 | Bertram et al. |
| 5,926,116 A | 7/1999 | Kitano et al. |
| 5,926,765 A | 7/1999 | Sasaki |
| 5,929,752 A | 7/1999 | Janky et al. |
| 5,930,250 A | 7/1999 | Klok et al. |
| 5,930,474 A | 7/1999 | Dunworth et al. |
| 5,930,699 A | 7/1999 | Bhatia |
| 5,930,701 A | 7/1999 | Skog |
| 5,933,080 A | 8/1999 | Nojima |
| 5,933,094 A | 8/1999 | Goss et al. |
| 5,933,100 A | 8/1999 | Golding |
| 5,933,811 A | 8/1999 | Angles et al. |
| 5,936,572 A | 8/1999 | Loomis et al. |
| 5,937,037 A | 8/1999 | Kamel et al. |
| 5,937,392 A | 8/1999 | Alberts |
| 5,938,721 A | 8/1999 | Dussell et al. |
| 5,940,004 A | 8/1999 | Fulton |
| 5,940,834 A | 8/1999 | Pinard et al. |
| 5,941,930 A | 8/1999 | Morimoto et al. |
| 5,941,934 A | 8/1999 | Sato |
| 5,943,399 A | 8/1999 | Bannister et al. |
| 5,945,944 A | 8/1999 | Krasner |
| 5,946,618 A | 8/1999 | Agre et al. |
| 5,946,626 A | 8/1999 | Foladare et al. |
| 5,946,629 A | 8/1999 | Sawyer et al. |
| 5,946,630 A | 8/1999 | Willars et al. |
| 5,946,646 A | 8/1999 | Schena et al. |
| 5,948,040 A | 9/1999 | DeLorme et al. |
| 5,948,041 A | 9/1999 | Abo et al. |
| 5,948,061 A | 9/1999 | Merriman et al. |
| 5,950,125 A | 9/1999 | Buhrmann et al. |
| 5,950,130 A | 9/1999 | Coursey |
| 5,950,137 A | 9/1999 | Kim |
| 5,953,398 A | 9/1999 | Hill |
| 5,953,706 A | 9/1999 | Patel |
| 5,955,973 A | 9/1999 | Anderson |
| 5,959,577 A | 9/1999 | Fan et al. |
| 5,959,580 A | 9/1999 | Maloney et al. |
| 5,959,623 A | 9/1999 | van Hoff et al. |
| 5,960,362 A | 9/1999 | Grob et al. |
| 5,961,569 A | 10/1999 | Craport et al. |
| 5,961,572 A | 10/1999 | Craport et al. |
| 5,963,130 A | 10/1999 | Schlager et al. |
| 5,963,913 A | 10/1999 | Henneuse et al. |
| 5,963,956 A | 10/1999 | Smartt |
| 5,964,821 A | 10/1999 | Brunts et al. |
| 5,966,696 A | 10/1999 | Giraud |
| 5,968,109 A | 10/1999 | Israni et al. |
| 5,969,678 A | 10/1999 | Stewart |
| 5,973,619 A | 10/1999 | Paredes |
| 5,974,054 A | 10/1999 | Couts et al. |
| 5,978,685 A | 11/1999 | Laiho |
| 5,978,747 A | 11/1999 | Craport et al. |
| 5,978,768 A | 11/1999 | McGovern et al. |
| 5,982,281 A | 11/1999 | Layson, Jr. |
| 5,982,298 A | 11/1999 | Lappenbusch et al. |
| 5,982,324 A | 11/1999 | Watters et al. |
| 5,983,099 A | 11/1999 | Yao et al. |
| 5,987,323 A | 11/1999 | Huotari |
| 5,987,381 A | 11/1999 | Oshizawa |
| 5,991,692 A | 11/1999 | Spencer, II et al. |
| 5,991,827 A | 11/1999 | Ellenby et al. |
| 5,995,015 A | 11/1999 | DeTemple et al. |
| 5,999,124 A | 12/1999 | Sheynblat |
| 5,999,126 A | 12/1999 | Ito |
| 5,999,561 A | 12/1999 | Naden et al. |
| 6,002,393 A | 12/1999 | Hite et al. |
| 6,002,932 A | 12/1999 | Kingdon et al. |
| 6,002,936 A | 12/1999 | Roel-Ng et al. |
| 6,002,982 A | 12/1999 | Fry |
| 6,004,061 A | 12/1999 | Manico et al. |
| 6,005,928 A | 12/1999 | Johnson |
| 6,006,159 A | 12/1999 | Schmier et al. |
| 6,006,260 A | 12/1999 | Barrick, Jr. et al. |
| 6,009,188 A | 12/1999 | Cohen et al. |
| 6,009,409 A | 12/1999 | Adler et al. |
| 6,009,410 A | 12/1999 | LeMole et al. |
| 6,012,012 A | 1/2000 | Fleck et al. |
| 6,014,080 A | 1/2000 | Layson |
| 6,014,090 A | 1/2000 | Rosen et al. |
| 6,014,602 A | 1/2000 | Kithil et al. |
| 6,014,607 A | 1/2000 | Yagyu et al. |
| 6,018,619 A | 1/2000 | Allard et al. |
| 6,018,718 A | 1/2000 | Walker et al. |
| 6,023,241 A | 2/2000 | Clapper |
| 6,023,523 A | 2/2000 | Cohen et al. |
| 6,023,653 A | 2/2000 | Ichimura et al. |
| 6,026,304 A | 2/2000 | Hilsenrath et al. |
| 6,026,370 A | 2/2000 | Jermyn |
| 6,026,375 A | 2/2000 | Hall et al. |
| 6,028,514 A | 2/2000 | Lemelson et al. |
| 6,028,537 A | 2/2000 | Suman et al. |
| 6,028,550 A | 2/2000 | Froeberg et al. |
| 6,028,955 A | 2/2000 | Cohen et al. |
| 6,029,069 A | 2/2000 | Takaki |
| 6,031,490 A | 2/2000 | Forssen et al. |
| 6,032,051 A | 2/2000 | Hall et al. |
| 6,035,025 A | 3/2000 | Hanson |
| 6,035,198 A | 3/2000 | Wiehe |
| 6,038,295 A | 3/2000 | Mattes |
| 6,038,446 A | 3/2000 | Courtney et al. |
| 6,041,280 A | 3/2000 | Kohli et al. |
| 6,044,403 A | 3/2000 | Gerszberg et al. |
| 6,047,051 A | 4/2000 | Ginzboorg et al. |
| 6,047,236 A | 4/2000 | Hancock et al. |
| 6,047,327 A | 4/2000 | Tso et al. |
| 6,049,710 A | 4/2000 | Nilsson |
| 6,049,711 A | 4/2000 | Ben-Yehezkel et al. |
| 6,049,778 A | 4/2000 | Walker et al. |
| 6,052,081 A | 4/2000 | Krasner |
| 6,052,122 A | 4/2000 | Sutcliffe et al. |
| 6,052,645 A | 4/2000 | Harada |
| 6,055,434 A | 4/2000 | Seraj |
| 6,057,759 A | 5/2000 | Marsh |
| 6,058,300 A | 5/2000 | Hanson |
| 6,058,338 A | 5/2000 | Agashe et al. |
| 6,058,350 A | 5/2000 | Ihara |
| 6,061,018 A | 5/2000 | Sheynblat |
| 6,061,346 A | 5/2000 | Nordman |
| 6,061,561 A | 5/2000 | Alanara et al. |
| 6,061,681 A | 5/2000 | Collins |
| 6,064,335 A | 5/2000 | Eschenbach |
| 6,064,336 A | 5/2000 | Krasner |
| 6,064,398 A | 5/2000 | Ellenby et al. |
| 6,064,875 A | 5/2000 | Morgan |
| 6,067,045 A | 5/2000 | Castelloe et al. |
| 6,067,502 A | 5/2000 | Hayashida et al. |
| 6,069,570 A | 5/2000 | Herring |
| 6,070,067 A | 5/2000 | Nguyen et al. |
| 6,070,083 A | 5/2000 | Watters et al. |
| 6,073,013 A | 6/2000 | Agre et al. |
| 6,073,062 A | 6/2000 | Hoshino et al. |
| 6,075,982 A | 6/2000 | Donovan et al. |
| 6,076,041 A | 6/2000 | Watanabe |
| 6,078,818 A | 6/2000 | Kingdon et al. |
| 6,080,063 A | 6/2000 | Khosla |
| 6,081,206 A | 6/2000 | Kielland |
| 6,081,229 A | 6/2000 | Soliman et al. |
| 6,081,508 A | 6/2000 | West et al. |
| 6,081,803 A | 6/2000 | Ashby et al. |

(56) References Cited

U.S. PATENT DOCUMENTS

| | | |
|---|---|---|
| 6,085,090 A | 7/2000 | Yee et al. |
| 6,085,148 A | 7/2000 | Jamison et al. |
| 6,085,320 A | 7/2000 | Kaliski, Jr. |
| 6,087,965 A | 7/2000 | Murphy |
| 6,088,040 A | 7/2000 | Oda et al. |
| 6,088,586 A | 7/2000 | Haverty |
| 6,088,594 A | 7/2000 | Kingdon et al. |
| 6,088,722 A | 7/2000 | Herz et al. |
| 6,091,956 A | 7/2000 | Hollenberg |
| 6,091,957 A | 7/2000 | Larkins et al. |
| 6,091,959 A | 7/2000 | Souissi et al. |
| 6,092,076 A | 7/2000 | McDonough et al. |
| 6,094,607 A | 7/2000 | Diesel |
| 6,097,958 A | 8/2000 | Bergen |
| 6,098,118 A | 8/2000 | Ellenby et al. |
| 6,100,806 A | 8/2000 | Gaukel |
| 6,101,378 A | 8/2000 | Barabash et al. |
| 6,101,443 A | 8/2000 | Kato et al. |
| 6,104,090 A | 8/2000 | Unger et al. |
| 6,104,931 A | 8/2000 | Havinis et al. |
| 6,108,533 A | 8/2000 | Brohoff |
| 6,108,555 A | 8/2000 | Maloney et al. |
| 6,108,709 A | 8/2000 | Shinomura et al. |
| 6,111,541 A | 8/2000 | Karmel |
| 6,111,911 A | 8/2000 | Sanderford, Jr. et al. |
| 6,112,186 A | 8/2000 | Bergh et al. |
| 6,113,649 A | 9/2000 | Govindaraj |
| 6,115,481 A | 9/2000 | Wiens |
| 6,115,611 A | 9/2000 | Kimoto et al. |
| 6,115,667 A | 9/2000 | Nakamura |
| 6,115,680 A | 9/2000 | Coffee et al. |
| 6,115,709 A | 9/2000 | Gilmour et al. |
| 6,115,754 A | 9/2000 | Landgren |
| 6,118,404 A | 9/2000 | Fernekes et al. |
| 6,119,014 A | 9/2000 | Alperovich et al. |
| 6,119,098 A | 9/2000 | Guyot et al. |
| 6,121,922 A | 9/2000 | Mohan |
| 6,122,263 A | 9/2000 | Dahlin et al. |
| 6,122,503 A | 9/2000 | Daly |
| 6,122,520 A | 9/2000 | Want et al. |
| 6,122,521 A | 9/2000 | Wilkinson et al. |
| 6,123,259 A | 9/2000 | Ogasawara |
| 6,124,810 A | 9/2000 | Segal et al. |
| 6,127,945 A | 10/2000 | Mura-Smith |
| 6,128,482 A | 10/2000 | Nixon et al. |
| 6,128,571 A | 10/2000 | Ito et al. |
| 6,128,599 A | 10/2000 | Walker et al. |
| 6,128,661 A | 10/2000 | Flanagin et al. |
| 6,131,028 A | 10/2000 | Whitington |
| 6,131,067 A | 10/2000 | Girerd et al. |
| 6,133,874 A | 10/2000 | Krasner |
| 6,133,876 A | 10/2000 | Fullerton et al. |
| 6,134,483 A | 10/2000 | Vayanos et al. |
| 6,134,548 A | 10/2000 | Gottsman et al. |
| 6,138,003 A | 10/2000 | Kingdon et al. |
| 6,138,010 A | 10/2000 | Rabe et al. |
| 6,138,142 A | 10/2000 | Linsk |
| 6,140,957 A | 10/2000 | Wilson et al. |
| 6,141,347 A | 10/2000 | Shaughnessy et al. |
| 6,141,609 A | 10/2000 | Herdeg et al. |
| 6,144,336 A | 11/2000 | Preston et al. |
| 6,148,090 A | 11/2000 | Narioka |
| 6,148,197 A | 11/2000 | Bridges et al. |
| 6,148,198 A | 11/2000 | Anderson et al. |
| 6,148,262 A | 11/2000 | Fry |
| 6,149,353 A | 11/2000 | Nilsson |
| 6,150,980 A | 11/2000 | Krasner |
| 6,151,309 A | 11/2000 | Busuioc et al. |
| 6,151,498 A | 11/2000 | Roel-Ng et al. |
| 6,154,152 A | 11/2000 | Ito |
| 6,154,172 A | 11/2000 | Piccionelli et al. |
| 6,154,658 A | 11/2000 | Caci |
| 6,157,381 A | 12/2000 | Bates et al. |
| 6,157,841 A | 12/2000 | Bolduc et al. |
| 6,157,935 A | 12/2000 | Tran et al. |
| 6,163,701 A | 12/2000 | Saleh et al. |
| 6,163,749 A | 12/2000 | McDonough et al. |
| 6,166,626 A | 12/2000 | Janky et al. |
| 6,166,627 A | 12/2000 | Reeley |
| 6,167,266 A | 12/2000 | Havinis et al. |
| 6,167,274 A | 12/2000 | Smith |
| 6,167,277 A | 12/2000 | Kawamoto |
| 6,169,497 B1 | 1/2001 | Robert |
| 6,169,515 B1 | 1/2001 | Mannings et al. |
| 6,169,552 B1 | 1/2001 | Endo et al. |
| 6,169,891 B1 | 1/2001 | Gorham et al. |
| 6,169,901 B1 | 1/2001 | Boucher |
| 6,169,902 B1 | 1/2001 | Kawamoto |
| 6,172,640 B1 | 1/2001 | Durst et al. |
| 6,173,181 B1 | 1/2001 | Losh |
| 6,175,740 B1 | 1/2001 | Souissi et al. |
| 6,175,922 B1 | 1/2001 | Wang |
| 6,177,905 B1 | 1/2001 | Welch |
| 6,177,938 B1 | 1/2001 | Gould |
| 6,178,505 B1 | 1/2001 | Schneider et al. |
| 6,178,506 B1 | 1/2001 | Quick, Jr. |
| 6,181,934 B1 | 1/2001 | Havinis et al. |
| 6,181,935 B1 | 1/2001 | Gossman et al. |
| 6,184,802 B1 | 2/2001 | Lamb |
| 6,184,829 B1 | 2/2001 | Stilp |
| 6,185,427 B1 | 2/2001 | Krasner et al. |
| 6,188,354 B1 | 2/2001 | Soliman et al. |
| 6,188,752 B1 | 2/2001 | Lesley |
| 6,188,909 B1 | 2/2001 | Alanara et al. |
| 6,188,959 B1 | 2/2001 | Schupfner |
| 6,189,098 B1 | 2/2001 | Kaliski, Jr. |
| 6,195,557 B1 | 2/2001 | Havinis et al. |
| 6,195,609 B1 | 2/2001 | Pilley et al. |
| 6,195,646 B1 | 2/2001 | Grosh et al. |
| 6,198,390 B1 | 3/2001 | Schlager et al. |
| 6,198,431 B1 | 3/2001 | Gibson |
| 6,198,927 B1 | 3/2001 | Wright et al. |
| 6,198,930 B1 | 3/2001 | Schipper |
| 6,199,010 B1 | 3/2001 | Richton |
| 6,199,014 B1 | 3/2001 | Walker et al. |
| 6,199,045 B1 | 3/2001 | Giniger et al. |
| 6,199,099 B1 | 3/2001 | Gershman et al. |
| 6,199,113 B1 | 3/2001 | Alegre et al. |
| 6,201,803 B1 | 3/2001 | Munday et al. |
| 6,202,008 B1 | 3/2001 | Beckert et al. |
| 6,202,023 B1 | 3/2001 | Hancock et al. |
| 6,202,058 B1 | 3/2001 | Rose et al. |
| 6,204,772 B1 | 3/2001 | DeMay et al. |
| 6,204,812 B1 | 3/2001 | Fattouche |
| 6,204,844 B1 | 3/2001 | Fumarolo et al. |
| 6,205,330 B1 | 3/2001 | Winbladh |
| 6,208,290 B1 | 3/2001 | Krasner |
| 6,208,297 B1 | 3/2001 | Fattouche et al. |
| 6,208,854 B1 | 3/2001 | Roberts et al. |
| 6,208,857 B1 | 3/2001 | Agre et al. |
| 6,208,866 B1 | 3/2001 | Rouhollahzadeh et al. |
| 6,208,870 B1 | 3/2001 | Lorello et al. |
| 6,208,934 B1 | 3/2001 | Bechtolsheim et al. |
| 6,211,818 B1 | 4/2001 | Zach, Sr. |
| 6,212,392 B1 | 4/2001 | Fitch et al. |
| 6,212,473 B1 | 4/2001 | Stefan et al. |
| 6,215,441 B1 | 4/2001 | Moeglein et al. |
| 6,216,086 B1 | 4/2001 | Seymour et al. |
| 6,219,557 B1 | 4/2001 | Havinis |
| 6,219,696 B1 | 4/2001 | Wynblatt et al. |
| 6,222,483 B1 | 4/2001 | Twitchell et al. |
| 6,222,607 B1 | 4/2001 | Szajewski et al. |
| 6,222,937 B1 | 4/2001 | Cohen et al. |
| 6,222,939 B1 | 4/2001 | Wiskott et al. |
| 6,223,042 B1 | 4/2001 | Raffel |
| 6,223,046 B1 | 4/2001 | Hamill-Keays et al. |
| 6,223,122 B1 | 4/2001 | Hancock et al. |
| 6,226,529 B1 | 5/2001 | Bruno et al. |
| 6,230,009 B1 | 5/2001 | Holmes et al. |
| 6,232,915 B1 | 5/2001 | Dean et al. |
| 6,233,430 B1 | 5/2001 | Helferich |
| 6,233,518 B1 | 5/2001 | Lee |
| 6,236,357 B1 | 5/2001 | Corwith |
| 6,236,358 B1 | 5/2001 | Durst et al. |

(56) References Cited

U.S. PATENT DOCUMENTS

| | | |
|---|---|---|
| 6,236,359 B1 | 5/2001 | Watters et al. |
| 6,236,365 B1 | 5/2001 | LeBlanc et al. |
| 6,236,933 B1 | 5/2001 | Lang |
| 6,239,700 B1 | 5/2001 | Hoffman et al. |
| 6,239,742 B1 | 5/2001 | Krasner |
| 6,240,069 B1 | 5/2001 | Alperovich et al. |
| 6,240,360 B1 | 5/2001 | Phelan |
| 6,240,365 B1 | 5/2001 | Bunn |
| 6,240,425 B1 | 5/2001 | Naughton |
| 6,243,039 B1 | 6/2001 | Elliot |
| 6,243,588 B1 | 6/2001 | Koorapaty et al. |
| 6,243,657 B1 | 6/2001 | Tuck et al. |
| 6,246,376 B1 | 6/2001 | Bork et al. |
| 6,246,861 B1 | 6/2001 | Messier et al. |
| 6,246,882 B1 | 6/2001 | Lachance |
| 6,246,948 B1 | 6/2001 | Thakker |
| 6,247,135 B1 | 6/2001 | Feague |
| 6,249,252 B1 | 6/2001 | Dupray |
| 6,249,282 B1 | 6/2001 | Sutcliffe et al. |
| 6,249,680 B1 | 6/2001 | Wax et al. |
| 6,249,742 B1 | 6/2001 | Friederich et al. |
| 6,249,744 B1 | 6/2001 | Morita |
| 6,249,772 B1 | 6/2001 | Walker et al. |
| 6,249,783 B1 | 6/2001 | Crone et al. |
| 6,249,873 B1 | 6/2001 | Richard et al. |
| 6,252,543 B1 | 6/2001 | Camp |
| 6,252,544 B1 | 6/2001 | Hoffberg |
| 6,253,091 B1 | 6/2001 | Naddell et al. |
| 6,253,203 B1 | 6/2001 | O'Flaherty et al. |
| 6,256,498 B1 | 7/2001 | Ludwig |
| 6,259,405 B1 | 7/2001 | Stewart et al. |
| 6,259,923 B1 | 7/2001 | Lim et al. |
| 6,260,147 B1 | 7/2001 | Quick, Jr. |
| 6,263,280 B1 | 7/2001 | Stingone, Jr. |
| 6,266,014 B1 | 7/2001 | Fattouche et al. |
| 6,266,432 B1 | 7/2001 | Wiens |
| 6,266,612 B1 | 7/2001 | Dussell et al. |
| 6,266,614 B1 | 7/2001 | Alumbaugh |
| 6,266,615 B1 | 7/2001 | Jin |
| 6,269,343 B1 | 7/2001 | Pallakoff |
| 6,269,369 B1 | 7/2001 | Robertson |
| 6,272,231 B1 | 8/2001 | Maurer et al. |
| 6,272,342 B1 | 8/2001 | Havinis et al. |
| 6,272,467 B1 | 8/2001 | Durand et al. |
| 6,275,692 B1 | 8/2001 | Skog |
| 6,275,771 B1 | 8/2001 | Berstis et al. |
| 6,275,849 B1 | 8/2001 | Ludwig |
| 6,278,701 B1 | 8/2001 | Ayyagari et al. |
| 6,278,884 B1 | 8/2001 | Kim |
| 6,281,807 B1 | 8/2001 | Kynast et al. |
| 6,282,491 B1 | 8/2001 | Bochmann et al. |
| 6,282,496 B1 | 8/2001 | Chowdhary |
| 6,286,005 B1 | 9/2001 | Cannon |
| 6,287,200 B1 | 9/2001 | Sharma |
| 6,288,716 B1 | 9/2001 | Humpleman et al. |
| 6,289,212 B1 | 9/2001 | Stein et al. |
| 6,289,373 B1 | 9/2001 | Dezonno |
| 6,292,657 B1 | 9/2001 | Laursen et al. |
| 6,292,671 B1 | 9/2001 | Mansour |
| 6,292,799 B1 | 9/2001 | Peek et al. |
| 6,295,454 B1 | 9/2001 | Havinis et al. |
| 6,295,502 B1 | 9/2001 | Hancock et al. |
| 6,297,768 B1 | 10/2001 | Allen, Jr. |
| 6,298,306 B1 | 10/2001 | Suarez et al. |
| 6,300,903 B1 | 10/2001 | Richards et al. |
| 6,301,370 B1 | 10/2001 | Steffens et al. |
| 6,304,758 B1 | 10/2001 | Iierbig et al. |
| 6,307,504 B1 | 10/2001 | Sheynblat |
| 6,308,269 B2 | 10/2001 | Proidl |
| 6,311,060 B1 | 10/2001 | Evans et al. |
| 6,313,761 B1 | 11/2001 | Shinada |
| 6,313,786 B1 | 11/2001 | Sheynblat et al. |
| 6,314,365 B1 | 11/2001 | Smith |
| 6,314,369 B1 | 11/2001 | Ito et al. |
| 6,314,406 B1 | 11/2001 | O'Hagan et al. |
| 6,317,029 B1 | 11/2001 | Fleeter |
| 6,317,594 B1 | 11/2001 | Gossman et al. |
| 6,317,604 B1 | 11/2001 | Kovach, Jr. et al. |
| 6,317,684 B1 | 11/2001 | Roeseler et al. |
| 6,317,718 B1 | 11/2001 | Fano |
| 6,321,091 B1 | 11/2001 | Holland |
| 6,321,092 B1 | 11/2001 | Fitch et al. |
| 6,321,158 B1 | 11/2001 | DeLorme et al. |
| 6,321,250 B1 | 11/2001 | Knape et al. |
| 6,321,257 B1 | 11/2001 | Kotola et al. |
| 6,323,846 B1 | 11/2001 | Westerman et al. |
| 6,323,885 B1 | 11/2001 | Wiese |
| 6,324,393 B1 | 11/2001 | Doshay |
| 6,324,476 B1 | 11/2001 | Trovato |
| 6,324,542 B1 | 11/2001 | Wright, Jr. et al. |
| 6,324,692 B1 | 11/2001 | Fiske |
| 6,326,918 B1 | 12/2001 | Stewart |
| 6,326,965 B1 | 12/2001 | Castelli et al. |
| 6,327,473 B1 | 12/2001 | Soliman et al. |
| 6,327,479 B1 | 12/2001 | Mikkola |
| 6,327,573 B1 | 12/2001 | Walker et al. |
| 6,327,580 B1 | 12/2001 | Pierce et al. |
| 6,330,244 B1 | 12/2001 | Swartz et al. |
| 6,330,452 B1 | 12/2001 | Fattouche et al. |
| 6,330,454 B1 | 12/2001 | Verdonk |
| 6,332,127 B1 | 12/2001 | Bandera et al. |
| 6,333,919 B2 | 12/2001 | Gaffney |
| 6,335,678 B1 | 1/2002 | Heutschi |
| 6,339,437 B1 | 1/2002 | Nielsen |
| 6,339,745 B1 | 1/2002 | Novik |
| 6,340,928 B1 | 1/2002 | McCurdy |
| 6,341,255 B1 | 1/2002 | Lapidot |
| 6,343,317 B1 | 1/2002 | Glorikian |
| 6,345,288 B1 | 2/2002 | Reed et al. |
| 6,347,230 B2 | 2/2002 | Koshima et al. |
| 6,347,398 B1 | 2/2002 | Parthasarathy et al. |
| 6,349,203 B1 | 2/2002 | Asaoka et al. |
| 6,351,235 B1 | 2/2002 | Stilp |
| 6,353,398 B1 | 3/2002 | Amin et al. |
| 6,353,743 B1 | 3/2002 | Karmel |
| 6,353,837 B1 | 3/2002 | Blumenau |
| 6,356,192 B1 | 3/2002 | Menard et al. |
| 6,356,543 B2 | 3/2002 | Hall et al. |
| 6,356,659 B1 | 3/2002 | Wiskott et al. |
| 6,356,761 B1 | 3/2002 | Huttunen et al. |
| 6,356,763 B1 | 3/2002 | Kangas et al. |
| 6,356,834 B2 | 3/2002 | Hancock et al. |
| 6,356,836 B1 | 3/2002 | Adolph |
| 6,356,838 B1 | 3/2002 | Paul |
| 6,356,905 B1 | 3/2002 | Gershman et al. |
| 6,359,557 B2 | 3/2002 | Bilder |
| 6,360,093 B1 | 3/2002 | Ross et al. |
| 6,360,101 B1 | 3/2002 | Irvin |
| 6,360,102 B1 | 3/2002 | Havinis et al. |
| 6,360,164 B1 | 3/2002 | Murayama |
| 6,360,167 B1 | 3/2002 | Millington et al. |
| 6,362,778 B2 | 3/2002 | Neher |
| 6,363,254 B1 | 3/2002 | Jones et al. |
| 6,363,255 B1 | 3/2002 | Kuwahara |
| 6,363,323 B1 | 3/2002 | Jones |
| 6,366,568 B1 | 4/2002 | Bolgiano et al. |
| 6,367,019 B1 | 4/2002 | Ansell et al. |
| 6,367,037 B1 | 4/2002 | Remer et al. |
| 6,370,389 B1 | 4/2002 | Isomursu et al. |
| 6,370,475 B1 | 4/2002 | Breed et al. |
| 6,370,523 B1 | 4/2002 | Anderson |
| 6,370,566 B2 | 4/2002 | Discolo et al. |
| 6,370,629 B1 | 4/2002 | Hastings et al. |
| 6,373,430 B1 | 4/2002 | Beason et al. |
| 6,374,176 B1 | 4/2002 | Schmier et al. |
| 6,377,179 B1 | 4/2002 | Fulton |
| 6,377,209 B1 | 4/2002 | Krasner |
| 6,377,210 B1 | 4/2002 | Moore |
| 6,377,793 B1 | 4/2002 | Jenkins |
| 6,377,810 B1 | 4/2002 | Geiger et al. |
| 6,377,886 B1 | 4/2002 | Gotou et al. |
| 6,381,465 B1 | 4/2002 | Chern et al. |
| 6,381,535 B1 | 4/2002 | Durocher et al. |
| 6,381,539 B1 | 4/2002 | Shimazu |

(56) References Cited

U.S. PATENT DOCUMENTS

| | | |
|---|---|---|
| 6,381,603 B1 | 4/2002 | Chan et al. |
| 6,385,458 B1 | 5/2002 | Papadimitriou et al. |
| 6,385,465 B1 | 5/2002 | Yoshioka |
| 6,385,535 B2 | 5/2002 | Ohishi et al. |
| 6,385,541 B1 | 5/2002 | Blumberg et al. |
| 6,385,622 B2 | 5/2002 | Bouve et al. |
| 6,388,612 B1 | 5/2002 | Neher |
| 6,389,288 B1 | 5/2002 | Kuwahara et al. |
| 6,392,565 B1 | 5/2002 | Brown |
| 6,393,292 B1 | 5/2002 | Lin |
| 6,396,819 B1 | 5/2002 | Fleeter et al. |
| 6,397,040 B1 | 5/2002 | Titmuss et al. |
| 6,397,057 B1 | 5/2002 | Malackowski et al. |
| 6,397,208 B1 | 5/2002 | Lee |
| 6,397,219 B2 | 5/2002 | Mills |
| 6,400,270 B1 | 6/2002 | Person |
| 6,400,314 B1 | 6/2002 | Krasner |
| 6,400,320 B1 | 6/2002 | Stilp et al. |
| 6,400,374 B2 | 6/2002 | Lanier |
| 6,400,956 B1 | 6/2002 | Richton |
| 6,400,958 B1 | 6/2002 | Isomursu et al. |
| 6,401,032 B1 | 6/2002 | Jamison et al. |
| 6,401,034 B1 | 6/2002 | Kaplan et al. |
| 6,401,085 B1 | 6/2002 | Gershman et al. |
| 6,404,388 B1 | 6/2002 | Sollenberger et al. |
| 6,404,408 B1 | 6/2002 | Emerson, III |
| 6,405,034 B1 | 6/2002 | Tijerino |
| 6,405,037 B1 | 6/2002 | Rossmann |
| 6,405,123 B1 | 6/2002 | Rennard et al. |
| 6,405,132 B1 | 6/2002 | Breed et al. |
| 6,407,698 B1 | 6/2002 | Ayed |
| 6,408,186 B1 | 6/2002 | Park et al. |
| 6,408,307 B1 | 6/2002 | Semple et al. |
| 6,408,309 B1 | 6/2002 | Agarwal |
| 6,411,254 B1 | 6/2002 | Moeglein et al. |
| 6,411,899 B2 | 6/2002 | Dussell et al. |
| 6,414,629 B1 | 7/2002 | Curcio |
| 6,414,635 B1 | 7/2002 | Stewart et al. |
| 6,415,207 B1 | 7/2002 | Jones |
| 6,415,220 B1 | 7/2002 | Kovacs |
| 6,415,227 B1 | 7/2002 | Lin |
| 6,415,291 B2 | 7/2002 | Bouve et al. |
| 6,421,001 B1 | 7/2002 | Durst et al. |
| 6,421,002 B2 | 7/2002 | Krasner |
| 6,421,669 B1 | 7/2002 | Gilmour et al. |
| 6,424,840 B1 | 7/2002 | Fitch et al. |
| 6,424,910 B1 | 7/2002 | Ohler et al. |
| 6,427,001 B1 | 7/2002 | Contractor et al. |
| 6,427,115 B1 | 7/2002 | Sekiyama |
| 6,427,120 B1 | 7/2002 | Garin et al. |
| 6,430,395 B2 | 8/2002 | Arazi et al. |
| 6,430,409 B1 | 8/2002 | Rossmann |
| 6,430,411 B1 | 8/2002 | Lempio et al. |
| 6,430,496 B1 | 8/2002 | Smith et al. |
| 6,433,734 B1 | 8/2002 | Krasner |
| 6,434,381 B1 | 8/2002 | Moore et al. |
| 6,434,403 B1 | 8/2002 | Ausems et al. |
| 6,434,530 B1 | 8/2002 | Sloane et al. |
| 6,438,376 B1 | 8/2002 | Elliott et al. |
| 6,438,381 B1 | 8/2002 | Alberth, Jr. et al. |
| 6,438,490 B2 | 8/2002 | Ohta |
| 6,441,778 B1 | 8/2002 | Durst et al. |
| 6,442,241 B1 | 8/2002 | Tsumpes |
| 6,442,391 B1 | 8/2002 | Johansson et al. |
| 6,442,392 B2 | 8/2002 | Ruutu et al. |
| 6,442,526 B1 | 8/2002 | Vance et al. |
| 6,442,573 B1 | 8/2002 | Schiller et al. |
| 6,446,004 B1 | 9/2002 | Cao et al. |
| 6,449,473 B1 | 9/2002 | Raivisto |
| 6,449,476 B1 | 9/2002 | Hutchison, IV et al. |
| 6,449,485 B1 | 9/2002 | Anzil |
| 6,449,486 B1 | 9/2002 | Rao |
| 6,452,498 B2 | 9/2002 | Stewart |
| 6,453,161 B1 | 9/2002 | Touati et al. |
| 6,456,207 B1 | 9/2002 | Yen |
| 6,456,234 B1 | 9/2002 | Johnson |
| 6,456,852 B2 | 9/2002 | Bar et al. |
| 6,456,854 B1 | 9/2002 | Chern et al. |
| 6,456,956 B1 | 9/2002 | Xiong |
| 6,459,782 B1 | 10/2002 | Bedrosian et al. |
| 6,459,913 B2 | 10/2002 | Cloutier |
| 6,462,654 B1 | 10/2002 | Sandelman et al. |
| 6,462,674 B2 | 10/2002 | Ohmura et al. |
| 6,462,675 B1 | 10/2002 | Humphrey et al. |
| 6,463,142 B1 | 10/2002 | Kilp |
| 6,463,272 B1 | 10/2002 | Wallace et al. |
| 6,463,289 B1 | 10/2002 | Havinis et al. |
| 6,466,695 B1 | 10/2002 | Potzsch et al. |
| 6,466,788 B1 | 10/2002 | Carlsson |
| 6,466,938 B1 | 10/2002 | Goldberg |
| 6,469,664 B1 | 10/2002 | Michaelson et al. |
| 6,470,287 B1 | 10/2002 | Smartt |
| 6,473,031 B1 | 10/2002 | Harris |
| 6,473,790 B1 | 10/2002 | Tagi |
| 6,477,150 B1 | 11/2002 | Maggenti et al. |
| 6,477,363 B1 | 11/2002 | Ayoub et al. |
| 6,477,581 B1 | 11/2002 | Carpenter et al. |
| 6,480,147 B2 | 11/2002 | Durst et al. |
| 6,480,713 B2 | 11/2002 | Jenkins |
| 6,480,788 B2 | 11/2002 | Kilfeather et al. |
| 6,484,033 B2 | 11/2002 | Murray |
| 6,484,035 B2 | 11/2002 | Allen, Jr. |
| 6,484,148 B1 | 11/2002 | Boyd |
| 6,486,801 B1 | 11/2002 | Jones |
| 6,487,305 B2 | 11/2002 | Kambe et al. |
| 6,487,495 B1 | 11/2002 | Gale et al. |
| 6,487,497 B2 | 11/2002 | Khavakh et al. |
| 6,487,538 B1 | 11/2002 | Gupta et al. |
| 6,490,454 B1 | 12/2002 | Kangas et al. |
| 6,490,519 B1 | 12/2002 | Lapidot et al. |
| 6,490,698 B1 | 12/2002 | Horvitz et al. |
| 6,496,775 B2 | 12/2002 | McDonald, Jr. et al. |
| 6,496,776 B1 | 12/2002 | Blumberg et al. |
| 6,496,777 B2 | 12/2002 | Tennison et al. |
| 6,501,393 B1 | 12/2002 | Richards et al. |
| 6,501,421 B1 | 12/2002 | Dutta et al. |
| 6,504,491 B1 | 1/2003 | Christians |
| 6,504,503 B1 | 1/2003 | Saint-Hilaire et al. |
| 6,505,046 B1 | 1/2003 | Baker |
| 6,505,048 B1 | 1/2003 | Moles et al. |
| 6,505,049 B1 | 1/2003 | Dorenbosch |
| 6,505,123 B1 | 1/2003 | Root et al. |
| 6,507,802 B1 | 1/2003 | Payton et al. |
| 6,509,830 B1 | 1/2003 | Elliott |
| 6,510,387 B2 | 1/2003 | Fuchs et al. |
| 6,512,455 B2 | 1/2003 | Finn et al. |
| 6,512,922 B1 | 1/2003 | Burg et al. |
| 6,512,930 B2 | 1/2003 | Sandegren |
| 6,515,575 B1 | 2/2003 | Kataoka |
| 6,515,623 B2 | 2/2003 | Johnson |
| 6,516,197 B2 | 2/2003 | Havinis et al. |
| 6,518,889 B2 | 2/2003 | Schlager et al. |
| 6,518,919 B1 | 2/2003 | Durst et al. |
| 6,519,241 B1 | 2/2003 | Theimer |
| 6,519,463 B2 | 2/2003 | Tendler |
| 6,519,466 B2 | 2/2003 | Pande et al. |
| 6,519,771 B1 | 2/2003 | Zenith |
| 6,522,266 B1 | 2/2003 | Soehren et al. |
| 6,522,682 B1 | 2/2003 | Kohli et al. |
| 6,526,026 B1 | 2/2003 | Menon |
| 6,526,335 B1 | 2/2003 | Treyz et al. |
| 6,526,352 B1 | 2/2003 | Breed et al. |
| 6,529,136 B2 | 3/2003 | Cao et al. |
| 6,529,143 B2 | 3/2003 | Mikkola et al. |
| 6,529,490 B1 | 3/2003 | Oh et al. |
| 6,529,500 B1 | 3/2003 | Pandharipande |
| 6,529,722 B1 | 3/2003 | Heinrich et al. |
| 6,529,829 B2 | 3/2003 | Turetzky et al. |
| 6,531,982 B1 | 3/2003 | White et al. |
| 6,532,360 B1 | 3/2003 | Shaffer |
| 6,535,140 B1 | 3/2003 | Goss et al. |
| 6,535,746 B1 | 3/2003 | Yu et al. |
| 6,538,757 B1 | 3/2003 | Sansone |
| 6,539,200 B1 | 3/2003 | Schiff |

(56) References Cited

U.S. PATENT DOCUMENTS

| | | |
|---|---|---|
| 6,539,232 B2 | 3/2003 | Hendrey et al. |
| 6,539,304 B1 | 3/2003 | Chansarkar |
| 6,539,424 B1 | 3/2003 | Dutta |
| 6,542,464 B1 | 4/2003 | Takeda et al. |
| 6,542,734 B1 | 4/2003 | Abrol et al. |
| 6,542,743 B1 | 4/2003 | Soliman |
| 6,542,748 B2 | 4/2003 | Hendrey et al. |
| 6,542,749 B2 | 4/2003 | Tanaka et al. |
| 6,542,750 B2 | 4/2003 | Hendrey et al. |
| 6,542,812 B1 | 4/2003 | Obradovich et al. |
| 6,542,813 B1 | 4/2003 | Kovacs |
| 6,542,814 B2 | 4/2003 | Polidi et al. |
| 6,542,819 B1 | 4/2003 | Kovacs et al. |
| 6,545,638 B2 | 4/2003 | Sladen |
| 6,546,002 B1 | 4/2003 | Kim |
| 6,546,360 B1 | 4/2003 | Gilbert et al. |
| 6,549,522 B1 | 4/2003 | Flynn |
| 6,549,625 B1 | 4/2003 | Rautila et al. |
| 6,549,768 B1 | 4/2003 | Fraccaroli |
| 6,549,776 B1 | 4/2003 | Joong |
| 6,549,844 B1 | 4/2003 | Egberts |
| 6,552,682 B1 | 4/2003 | Fan |
| 6,553,236 B1 | 4/2003 | Dunko et al. |
| 6,553,310 B1 | 4/2003 | Lopke |
| 6,556,832 B1 | 4/2003 | Soliman |
| 6,560,323 B2 | 5/2003 | Gainsboro |
| 6,560,456 B1 | 5/2003 | Lohtia et al. |
| 6,560,461 B1 | 5/2003 | Fomukong et al. |
| 6,560,534 B2 | 5/2003 | Abraham et al. |
| 6,560,588 B1 | 5/2003 | Minter |
| 6,563,430 B1 | 5/2003 | Kemink et al. |
| 6,563,459 B2 | 5/2003 | Takenaga |
| 6,563,460 B2 | 5/2003 | Stilp et al. |
| 6,563,950 B1 | 5/2003 | Wiskott et al. |
| 6,564,047 B1 | 5/2003 | Steele et al. |
| 6,564,064 B1 | 5/2003 | Ciganer et al. |
| 6,564,143 B1 | 5/2003 | Alewine et al. |
| 6,564,261 B1 | 5/2003 | Gudjonsson et al. |
| 6,567,068 B2 | 5/2003 | Rekimoto |
| 6,570,530 B2 | 5/2003 | Gaal et al. |
| 6,570,557 B1 | 5/2003 | Westerman et al. |
| 6,571,095 B1 | 5/2003 | Koodli |
| 6,571,279 B1 | 5/2003 | Herz et al. |
| 6,574,484 B1 | 6/2003 | Carley |
| 6,574,558 B2 | 6/2003 | Kohli |
| 6,577,946 B2 | 6/2003 | Myr |
| 6,578,079 B1 | 6/2003 | Gittins |
| 6,580,390 B1 | 6/2003 | Hay |
| 6,580,811 B2 | 6/2003 | Maurer et al. |
| 6,580,914 B1 | 6/2003 | Smith |
| 6,581,072 B1 | 6/2003 | Mathur et al. |
| 6,584,307 B1 | 6/2003 | Antonucci et al. |
| 6,584,401 B2 | 6/2003 | Kirshenbaum et al. |
| 6,584,403 B2 | 6/2003 | Bunn |
| 6,584,552 B1 | 6/2003 | Kuno et al. |
| 6,587,688 B1 | 7/2003 | Chambers et al. |
| 6,587,691 B1 | 7/2003 | Granstam et al. |
| 6,587,782 B1 | 7/2003 | Nocek et al. |
| 6,587,835 B1 | 7/2003 | Treyz et al. |
| 6,590,533 B2 | 7/2003 | Sollenberger et al. |
| 6,591,103 B1 | 7/2003 | Dunn et al. |
| 6,591,190 B2 | 7/2003 | Nishida et al. |
| 6,594,480 B1 | 7/2003 | Montalvo et al. |
| 6,594,483 B2 | 7/2003 | Nykanen et al. |
| 6,594,498 B1 | 7/2003 | McKenna et al. |
| 6,594,500 B2 | 7/2003 | Bender et al. |
| 6,594,576 B2 | 7/2003 | Fan et al. |
| 6,594,691 B1 | 7/2003 | McCollum et al. |
| 6,597,305 B2 | 7/2003 | Szeto et al. |
| 6,597,311 B2 | 7/2003 | Sheynblat et al. |
| 6,597,983 B2 | 7/2003 | Hancock |
| 6,600,812 B1 | 7/2003 | Gentillin et al. |
| 6,600,919 B2 | 7/2003 | Kawase |
| 6,600,927 B2 | 7/2003 | Hamilton et al. |
| 6,601,046 B1 | 7/2003 | Epstein |
| 6,601,060 B1 | 7/2003 | Tomaru |
| 6,603,428 B2 | 8/2003 | Stilp |
| 6,603,968 B2 | 8/2003 | Anvekar et al. |
| 6,603,973 B1 | 8/2003 | Foladare et al. |
| 6,603,977 B1 | 8/2003 | Walsh et al. |
| 6,606,495 B1 | 8/2003 | Korpi et al. |
| 6,606,554 B2 | 8/2003 | Edge |
| 6,606,556 B2 | 8/2003 | Curatolo et al. |
| 6,608,556 B2 | 8/2003 | De Moerloose et al. |
| 6,609,004 B1 | 8/2003 | Morse et al. |
| 6,609,062 B2 | 8/2003 | Hancock |
| 6,611,273 B2 | 8/2003 | Stokes et al. |
| 6,611,498 B1 | 8/2003 | Baker et al. |
| 6,611,687 B1 | 8/2003 | Clark et al. |
| 6,611,751 B2 | 8/2003 | Warren |
| 6,611,757 B2 | 8/2003 | Brodie |
| 6,611,788 B1 | 8/2003 | Hussa |
| 6,615,131 B1 | 9/2003 | Rennard et al. |
| 6,615,134 B2 | 9/2003 | Ando |
| 6,615,213 B1 | 9/2003 | Johnson |
| 6,617,969 B2 | 9/2003 | Tu et al. |
| 6,618,593 B1 | 9/2003 | Drutman et al. |
| 6,618,670 B1 | 9/2003 | Chansarkar |
| 6,618,671 B2 | 9/2003 | Dooley et al. |
| 6,618,822 B1 | 9/2003 | Loaiza et al. |
| 6,621,452 B2 | 9/2003 | Knockeart et al. |
| 6,621,810 B1 | 9/2003 | Leung |
| 6,624,754 B1 | 9/2003 | Hoffman et al. |
| 6,625,447 B1 | 9/2003 | Rossmann |
| 6,625,457 B1 | 9/2003 | Raith |
| 6,628,233 B2 | 9/2003 | Knockeart et al. |
| 6,628,938 B1 | 9/2003 | Rachabathuni et al. |
| 6,629,104 B1 | 9/2003 | Parulski et al. |
| 6,629,136 B1 | 9/2003 | Naidoo |
| 6,633,255 B2 | 10/2003 | Krasner |
| 6,633,763 B2 | 10/2003 | Yoshioka |
| 6,636,145 B1 | 10/2003 | Murakami et al. |
| 6,636,732 B1 | 10/2003 | Boling et al. |
| 6,636,803 B1 | 10/2003 | Hartz, Jr. et al. |
| 6,639,516 B1 | 10/2003 | Copley |
| 6,639,939 B1 | 10/2003 | Naden et al. |
| 6,640,184 B1 | 10/2003 | Rabe |
| 6,643,355 B1 | 11/2003 | Tsumpes |
| 6,646,549 B2 | 11/2003 | Dawson |
| 6,647,257 B2 | 11/2003 | Owensby |
| 6,647,269 B2 | 11/2003 | Hendrey et al. |
| 6,650,284 B1 | 11/2003 | Mannings et al. |
| 6,650,288 B1 | 11/2003 | Pitt et al. |
| 6,650,901 B1 | 11/2003 | Schuster et al. |
| 6,650,902 B1 | 11/2003 | Richton |
| 6,650,997 B2 | 11/2003 | Funk |
| 6,650,998 B1 | 11/2003 | Rutledge et al. |
| 6,654,786 B1 | 11/2003 | Fox et al. |
| 6,654,800 B1 | 11/2003 | Rieger, III |
| 6,657,661 B1 | 12/2003 | Cazier |
| 6,658,260 B2 | 12/2003 | Knotts |
| 6,661,340 B1 | 12/2003 | Saylor et al. |
| 6,661,372 B1 | 12/2003 | Girerd et al. |
| 6,661,409 B2 | 12/2003 | Demartines et al. |
| 6,662,015 B2 | 12/2003 | Furlong |
| 6,662,016 B1 | 12/2003 | Buckham et al. |
| 6,662,023 B1 | 12/2003 | Helle |
| 6,665,539 B2 | 12/2003 | Sih et al. |
| 6,665,541 B1 | 12/2003 | Krasner et al. |
| 6,665,613 B2 | 12/2003 | Duvall |
| 6,665,715 B1 | 12/2003 | Houri |
| 6,667,963 B1 | 12/2003 | Rantalainen et al. |
| 6,671,377 B1 | 12/2003 | Havinis et al. |
| 6,671,620 B1 | 12/2003 | Garin et al. |
| 6,671,695 B2 | 12/2003 | McFadden |
| 6,671,698 B2 | 12/2003 | Pickett et al. |
| 6,674,849 B1 | 1/2004 | Froeberg |
| 6,675,012 B2 | 1/2004 | Gray |
| 6,675,014 B1 | 1/2004 | Sundquist |
| 6,675,150 B1 | 1/2004 | Camer |
| 6,677,894 B2 | 1/2004 | Sheynblat et al. |
| 6,677,968 B1 | 1/2004 | Appelman |
| 6,678,357 B2 | 1/2004 | Stumer et al. |
| 6,678,514 B2 | 1/2004 | Wheeler et al. |

(56) References Cited

U.S. PATENT DOCUMENTS

| | | |
|---|---|---|
| 6,678,516 B2 | 1/2004 | Nordman et al. |
| 6,678,613 B2 | 1/2004 | Andrews et al. |
| 6,680,694 B1 | 1/2004 | Knockeart et al. |
| 6,680,695 B2 | 1/2004 | Turetzky et al. |
| 6,681,107 B2 | 1/2004 | Jenkins et al. |
| 6,681,114 B2 | 1/2004 | Chang et al. |
| 6,681,120 B1 | 1/2004 | Kim |
| 6,683,538 B1 | 1/2004 | Wilkes, Jr. |
| 6,684,068 B1 | 1/2004 | Tikka et al. |
| 6,684,087 B1 | 1/2004 | Yu et al. |
| 6,684,155 B1 | 1/2004 | Chen et al. |
| 6,684,250 B2 | 1/2004 | Anderson et al. |
| 6,684,269 B2 | 1/2004 | Wagner |
| 6,687,360 B2 | 2/2004 | Kung et al. |
| 6,687,504 B1 | 2/2004 | Raith |
| 6,687,608 B2 | 2/2004 | Sugimoto et al. |
| 6,687,734 B1 | 2/2004 | Sellink et al. |
| 6,690,268 B2 | 2/2004 | Schofield et al. |
| 6,690,322 B2 | 2/2004 | Shamoto et al. |
| 6,691,029 B2 | 2/2004 | Hughes et al. |
| 6,691,114 B1 | 2/2004 | Nakamura |
| 6,691,155 B2 | 2/2004 | Gottfried |
| 6,693,586 B1 | 2/2004 | Walters et al. |
| 6,694,258 B2 | 2/2004 | Johnson et al. |
| 6,694,352 B1 | 2/2004 | Omoigui |
| 6,694,387 B2 | 2/2004 | Wagner |
| 6,696,956 B1 | 2/2004 | Uchida et al. |
| 6,697,018 B2 | 2/2004 | Stewart |
| 6,697,629 B1 | 2/2004 | Grilli et al. |
| 6,697,730 B2 | 2/2004 | Dickerson |
| 6,697,731 B2 | 2/2004 | Takayama et al. |
| 6,697,734 B1 | 2/2004 | Suomela |
| 6,698,020 B1 | 2/2004 | Zigmond et al. |
| 6,700,504 B1 | 3/2004 | Aslandogan et al. |
| 6,700,534 B2 | 3/2004 | Harris |
| 6,701,143 B1 | 3/2004 | Dukach et al. |
| 6,701,144 B2 | 3/2004 | Kirbas et al. |
| 6,701,307 B2 | 3/2004 | Himmelstein et al. |
| 6,703,971 B2 | 3/2004 | Pande et al. |
| 6,703,972 B2 | 3/2004 | van Diggelen |
| 6,704,651 B2 | 3/2004 | van Diggelen |
| 6,707,421 B1 | 3/2004 | Drury et al. |
| 6,707,581 B1 | 3/2004 | Browning |
| 6,711,408 B1 | 3/2004 | Raith |
| 6,711,474 B1 | 3/2004 | Treyz et al. |
| 6,711,535 B2 | 3/2004 | Ford et al. |
| 6,714,661 B2 | 3/2004 | Buddenmeier et al. |
| 6,714,791 B2 | 3/2004 | Friedman |
| 6,714,793 B1 | 3/2004 | Carey et al. |
| 6,714,797 B1 | 3/2004 | Rautila |
| 6,714,916 B1 | 3/2004 | Robertson et al. |
| 6,716,101 B1 | 4/2004 | Meadows et al. |
| 6,718,174 B2 | 4/2004 | Vayanos |
| 6,718,344 B2 | 4/2004 | Hirono |
| 6,718,503 B1 | 4/2004 | Lerner et al. |
| 6,720,915 B2 | 4/2004 | Sheynblat |
| 6,720,920 B2 | 4/2004 | Breed et al. |
| 6,721,572 B1 | 4/2004 | Smith et al. |
| 6,721,578 B2 | 4/2004 | Minear et al. |
| 6,721,871 B2 | 4/2004 | Piispanen et al. |
| 6,724,342 B2 | 4/2004 | Bloebaum et al. |
| 6,724,382 B2 | 4/2004 | Kenyon et al. |
| 6,725,159 B2 | 4/2004 | Krasner |
| 6,728,701 B1 | 4/2004 | Stoica |
| 6,731,236 B1 | 5/2004 | Hager et al. |
| 6,731,238 B2 | 5/2004 | Johnson |
| 6,731,612 B1 | 5/2004 | Koss |
| 6,731,940 B1 | 5/2004 | Nagendran |
| 6,732,080 B1 | 5/2004 | Blants |
| 6,732,120 B1 | 5/2004 | Du |
| 6,734,821 B2 | 5/2004 | van Diggelen |
| 6,735,568 B1 | 5/2004 | Buckwalter et al. |
| 6,735,585 B1 | 5/2004 | Black et al. |
| 6,735,630 B1 | 5/2004 | Gelvin et al. |
| 6,737,989 B2 | 5/2004 | Flick |
| 6,738,013 B2 | 5/2004 | Orler et al. |
| 6,738,635 B1 | 5/2004 | Lewis et al. |
| 6,738,800 B1 | 5/2004 | Aquilon et al. |
| 6,738,808 B1 | 5/2004 | Zellner et al. |
| 6,741,188 B1 | 5/2004 | Miller et al. |
| 6,741,842 B2 | 5/2004 | Goldberg et al. |
| 6,741,926 B1 | 5/2004 | Zhao et al. |
| 6,744,856 B2 | 6/2004 | Karnik et al. |
| 6,744,858 B1 | 6/2004 | Ryan et al. |
| 6,745,038 B2 | 6/2004 | Callaway, Jr. et al. |
| 6,747,556 B2 | 6/2004 | Medema et al. |
| 6,747,596 B2 | 6/2004 | Orler et al. |
| 6,748,195 B1 | 6/2004 | Phillips |
| 6,748,225 B1 | 6/2004 | Kepler |
| 6,748,226 B1 | 6/2004 | Wortham |
| 6,748,318 B1 | 6/2004 | Jones |
| 6,750,813 B2 | 6/2004 | Vargas-Hurlston et al. |
| 6,750,883 B1 | 6/2004 | Parupudi et al. |
| 6,751,464 B1 | 6/2004 | Burg et al. |
| 6,751,626 B2 | 6/2004 | Brown et al. |
| 6,754,582 B1 | 6/2004 | Smith et al. |
| 6,754,634 B1 | 6/2004 | Ho |
| 6,754,636 B1 | 6/2004 | Walker et al. |
| 6,754,904 B1 | 6/2004 | Cooper et al. |
| 6,756,887 B2 | 6/2004 | Evans |
| 6,756,913 B1 | 6/2004 | Ayed |
| 6,756,938 B2 | 6/2004 | Zhao et al. |
| 6,757,156 B2 | 6/2004 | Adams et al. |
| 6,757,517 B2 | 6/2004 | Chang |
| 6,757,544 B2 | 6/2004 | Rangarajan et al. |
| 6,757,545 B2 | 6/2004 | Nowak et al. |
| 6,758,812 B2 | 7/2004 | Lang |
| 6,759,956 B2 | 7/2004 | Menard et al. |
| 6,759,960 B2 | 7/2004 | Stewart |
| 6,762,772 B1 | 7/2004 | Imamura et al. |
| 6,765,492 B2 | 7/2004 | Harris |
| 6,765,528 B2 | 7/2004 | Tranchina et al. |
| 6,765,998 B2 | 7/2004 | Bruce et al. |
| 6,766,174 B1 | 7/2004 | Kenyon |
| 6,766,245 B2 | 7/2004 | Padmanabhan |
| 6,768,944 B2 | 7/2004 | Breed et al. |
| 6,769,002 B2 | 7/2004 | Ayan |
| 6,771,742 B2 | 8/2004 | McCalmont et al. |
| 6,771,970 B1 | 8/2004 | Dan |
| 6,771,971 B2 | 8/2004 | Smith |
| 6,772,213 B2 | 8/2004 | Glorikian |
| 6,772,340 B1 | 8/2004 | Peinado et al. |
| 6,774,797 B2 | 8/2004 | Freathy et al. |
| 6,774,840 B1 | 8/2004 | Adamczyk et al. |
| 6,775,255 B1 | 8/2004 | Roy |
| 6,775,267 B1 | 8/2004 | Kung et al. |
| 6,775,534 B2 | 8/2004 | Lindgren et al. |
| 6,775,613 B2 | 8/2004 | Burt et al. |
| 6,775,655 B1 | 8/2004 | Peinado et al. |
| 6,775,802 B2 | 8/2004 | Gaal |
| 6,778,136 B2 | 8/2004 | Gronemeyer |
| 6,778,524 B1 | 8/2004 | Augart |
| 6,778,837 B2 | 8/2004 | Bade et al. |
| 6,778,885 B2 | 8/2004 | Agashe et al. |
| 6,781,963 B2 | 8/2004 | Crockett et al. |
| 6,782,264 B2 | 8/2004 | Anderson |
| 6,782,265 B2 | 8/2004 | Dressler et al. |
| 6,782,278 B2 | 8/2004 | Chen et al. |
| 6,785,538 B2 | 8/2004 | Nihei |
| 6,788,199 B2 | 9/2004 | Crabtree et al. |
| 6,788,200 B1 | 9/2004 | Jamel et al. |
| 6,788,249 B1 | 9/2004 | Farmer et al. |
| 6,788,288 B2 | 9/2004 | Ano |
| 6,788,946 B2 | 9/2004 | Winchell et al. |
| 6,789,012 B1 | 9/2004 | Childs et al. |
| 6,789,102 B2 | 9/2004 | Gotou et al. |
| 6,795,444 B1 | 9/2004 | Vo et al. |
| 6,795,686 B2 | 9/2004 | Master et al. |
| 6,795,699 B1 | 9/2004 | McCraw et al. |
| 6,795,700 B2 | 9/2004 | Karaoguz et al. |
| 6,795,710 B1 | 9/2004 | Creemer |
| 6,795,770 B1 | 9/2004 | Hanshew et al. |
| 6,798,358 B2 | 9/2004 | Joyce et al. |
| 6,798,379 B2 | 9/2004 | Tucker et al. |

(56) References Cited

U.S. PATENT DOCUMENTS

| | | |
|---|---|---|
| 6,799,032 B2 | 9/2004 | McDonnell et al. |
| 6,799,049 B1 | 9/2004 | Zellner et al. |
| 6,799,050 B1 | 9/2004 | Krasner |
| 6,799,094 B1 | 9/2004 | Vaida et al. |
| 6,801,159 B2 | 10/2004 | Swope et al. |
| 6,801,763 B2 | 10/2004 | Elsey et al. |
| 6,801,778 B2 | 10/2004 | Koorapaty et al. |
| 6,801,850 B1 | 10/2004 | Wolfson |
| 6,801,855 B1 | 10/2004 | Walters et al. |
| 6,804,524 B1 | 10/2004 | Vandermeijden |
| 6,804,657 B1 | 10/2004 | Sultan |
| 6,804,726 B1 | 10/2004 | Ellenby et al. |
| 6,806,813 B1 | 10/2004 | Cheng et al. |
| 6,806,830 B2 | 10/2004 | Panasik et al. |
| 6,807,479 B2 | 10/2004 | Watanabe et al. |
| 6,807,483 B1 | 10/2004 | Chao et al. |
| 6,807,534 B1 | 10/2004 | Erickson |
| 6,807,564 B1 | 10/2004 | Zellner et al. |
| 6,810,323 B1 | 10/2004 | Bullock et al. |
| 6,813,395 B1 | 10/2004 | Kinjo |
| 6,812,851 B1 | 11/2004 | Dukach et al. |
| 6,812,888 B2 | 11/2004 | Drury et al. |
| 6,813,264 B2 | 11/2004 | Vassilovski |
| 6,813,346 B2 | 11/2004 | Gruchala et al. |
| 6,813,499 B2 | 11/2004 | McDonnell et al. |
| 6,813,501 B2 | 11/2004 | Kinnunen et al. |
| 6,813,503 B1 | 11/2004 | Zillikens et al. |
| 6,813,560 B2 | 11/2004 | van Diggelen et al. |
| 6,816,111 B2 | 11/2004 | Krasner |
| 6,816,580 B2 | 11/2004 | Timmins |
| 6,816,710 B2 | 11/2004 | Krasner |
| 6,816,719 B1 | 11/2004 | Heinonen et al. |
| 6,816,734 B2 | 11/2004 | Wong et al. |
| 6,816,735 B1 | 11/2004 | Raybum et al. |
| 6,816,782 B1 | 11/2004 | Walters et al. |
| 6,816,784 B1 | 11/2004 | Khan et al. |
| 6,816,850 B2 | 11/2004 | Culliss |
| 6,819,267 B1 | 11/2004 | Edmark et al. |
| 6,819,301 B2 | 11/2004 | Nagamatsu et al. |
| 6,819,919 B1 | 11/2004 | Tanaka |
| 6,820,269 B2 | 11/2004 | Baucke et al. |
| 6,823,188 B1 | 11/2004 | Stern |
| 6,823,189 B2 | 11/2004 | Akhteruzzaman et al. |
| 6,823,257 B2 | 11/2004 | Clapper |
| 6,825,767 B2 | 11/2004 | Humbard |
| 6,826,398 B1 | 11/2004 | Lagerstrom et al. |
| 6,826,473 B1 | 11/2004 | Burch et al. |
| 6,826,598 B1 | 11/2004 | Titmuss et al. |
| 6,826,607 B1 | 11/2004 | Gelvin et al. |
| 6,828,908 B2 | 12/2004 | Clark |
| 6,829,475 B1 | 12/2004 | Lee et al. |
| 6,829,532 B2 | 12/2004 | Obradovich et al. |
| 6,832,251 B1 | 12/2004 | Gelvin et al. |
| 6,832,373 B2 | 12/2004 | O'Neill |
| 6,833,811 B2 | 12/2004 | Zeitfuss et al. |
| 6,834,115 B2 | 12/2004 | Maurer et al. |
| 6,834,195 B2 | 12/2004 | Brandenberg et al. |
| 6,836,667 B1 | 12/2004 | Smith, Jr. |
| 6,839,020 B2 | 1/2005 | Geier et al. |
| 6,839,021 B2 | 1/2005 | Sheynblat et al. |
| 6,839,417 B2 | 1/2005 | Weisman et al. |
| 6,839,561 B2 | 1/2005 | Kato |
| 6,839,628 B1 | 1/2005 | Tu |
| 6,842,620 B2 | 1/2005 | Smith et al. |
| 6,842,715 B1 | 1/2005 | Gaal |
| 6,842,774 B1 | 1/2005 | Piccioni |
| 6,845,318 B1 | 1/2005 | Moore et al. |
| 6,845,322 B1 | 1/2005 | Chao et al. |
| 6,845,400 B2 | 1/2005 | Macpherson et al. |
| 6,847,376 B2 | 1/2005 | Engeldrum et al. |
| 6,847,618 B2 | 1/2005 | Laursen et al. |
| 6,847,822 B1 | 1/2005 | Dennison et al. |
| 6,847,891 B2 | 1/2005 | Pietras et al. |
| 6,847,892 B2 | 1/2005 | Zhou et al. |
| 6,847,969 B1 | 1/2005 | Mathai et al. |
| 6,848,542 B2 | 2/2005 | Gailey et al. |
| 6,850,163 B1 | 2/2005 | Adamczyk et al. |
| 6,850,188 B1 | 2/2005 | Lee et al. |
| 6,850,209 B2 | 2/2005 | Mankins et al. |
| 6,850,837 B2 | 2/2005 | Paulauskas et al. |
| 6,853,332 B1 | 2/2005 | Brookes |
| 6,853,911 B1 | 2/2005 | Sakarya |
| 6,853,916 B2 | 2/2005 | Fuchs et al. |
| 6,853,917 B2 | 2/2005 | Miwa |
| 6,853,955 B1 | 2/2005 | Burrell et al. |
| 6,856,282 B2 | 2/2005 | Mauro et al. |
| 6,857,016 B1 | 2/2005 | Motoyama et al. |
| 6,859,009 B2 | 2/2005 | Jablin |
| 6,859,149 B1 | 2/2005 | Ohta et al. |
| 6,859,721 B1 | 2/2005 | Runquist et al. |
| 6,859,831 B1 | 2/2005 | Gelvin et al. |
| 6,861,980 B1 | 3/2005 | Rowitch et al. |
| 6,865,171 B1 | 3/2005 | Nilsson |
| 6,865,394 B2 | 3/2005 | Ogino et al. |
| 6,865,395 B2 | 3/2005 | Riley |
| 6,865,483 B1 | 3/2005 | Cook, III et al. |
| 6,867,733 B2 | 3/2005 | Sandhu et al. |
| 6,867,734 B2 | 3/2005 | Voor et al. |
| 6,868,074 B1 | 3/2005 | Hanson |
| 6,868,333 B2 | 3/2005 | Melen |
| 6,868,335 B2 | 3/2005 | Obradovich et al. |
| 6,868,337 B2 | 3/2005 | Muramatsu |
| 6,868,396 B2 | 3/2005 | Smith et al. |
| 6,870,822 B2 | 3/2005 | Balogh |
| 6,871,144 B1 | 3/2005 | Lee |
| 6,873,290 B2 | 3/2005 | Anderson et al. |
| 6,873,850 B2 | 3/2005 | Dowling et al. |
| 6,873,851 B2 | 3/2005 | Brown et al. |
| 6,873,854 B2 | 3/2005 | Crockett et al. |
| 6,876,734 B1 | 4/2005 | Summers et al. |
| 6,879,244 B1 | 4/2005 | Scalisi |
| 6,879,574 B2 | 4/2005 | Naghian et al. |
| 6,879,835 B2 | 4/2005 | Greene et al. |
| 6,879,836 B2 | 4/2005 | Nakamoto et al. |
| 6,879,838 B2 | 4/2005 | Rankin et al. |
| 6,882,290 B2 | 4/2005 | French et al. |
| 6,882,313 B1 | 4/2005 | Fan et al. |
| 6,882,348 B2 | 4/2005 | Hirono |
| 6,882,837 B2 | 4/2005 | Fernandez et al. |
| 6,882,850 B2 | 4/2005 | McConnell et al. |
| 6,882,856 B1 | 4/2005 | Alterman et al. |
| 6,885,874 B2 | 4/2005 | Grube et al. |
| 6,885,940 B2 | 4/2005 | Brodie et al. |
| 6,886,750 B2 | 5/2005 | Rathus et al. |
| 6,888,497 B2 | 5/2005 | King et al. |
| 6,888,536 B2 | 5/2005 | Westerman et al. |
| 6,888,932 B2 | 5/2005 | Snip et al. |
| 6,889,054 B2 | 5/2005 | Himmel et al. |
| 6,891,500 B2 | 5/2005 | Hall et al. |
| 6,892,131 B2 | 5/2005 | Coffee et al. |
| 6,895,238 B2 | 5/2005 | Newell et al. |
| 6,895,240 B2 | 5/2005 | Laursen et al. |
| 6,895,249 B2 | 5/2005 | Gaal |
| 6,898,416 B2 | 5/2005 | Saarinen et al. |
| 6,898,436 B2 | 5/2005 | Crockett et al. |
| 6,898,516 B2 | 5/2005 | Pechatnikov et al. |
| 6,898,518 B2 | 5/2005 | Padmanabhan |
| 6,898,526 B2 | 5/2005 | Doyle et al. |
| 6,898,569 B1 | 5/2005 | Bansal et al. |
| 6,900,758 B1 | 5/2005 | Mann et al. |
| 6,901,260 B1 | 5/2005 | Xin |
| 6,901,264 B1 | 5/2005 | Myr |
| 6,901,304 B2 | 5/2005 | Swan et al. |
| 6,901,444 B1 | 5/2005 | Brelin |
| 6,903,684 B1 | 6/2005 | Simic et al. |
| 6,903,685 B1 | 6/2005 | Arndt et al. |
| 6,904,029 B2 | 6/2005 | Fors et al. |
| 6,904,360 B2 | 6/2005 | Pechatnikov et al. |
| 6,904,364 B2 | 6/2005 | Randazzo et al. |
| 6,907,224 B2 | 6/2005 | Younis |
| 6,907,238 B2 | 6/2005 | Leung |
| 6,909,902 B1 | 6/2005 | Sawada et al. |
| 6,912,230 B1 | 6/2005 | Salkini et al. |
| 6,912,395 B2 | 6/2005 | Benes et al. |

(56) References Cited

U.S. PATENT DOCUMENTS

| | | |
|---|---|---|
| 6,912,398 B1 | 6/2005 | Domnitz |
| 6,912,545 B1 | 6/2005 | Lundy et al. |
| 6,914,626 B2 | 7/2005 | Squibbs |
| 6,915,208 B2 | 7/2005 | Garin et al. |
| 6,917,331 B2 | 7/2005 | Gronemeyer |
| 6,917,703 B1 | 7/2005 | Steffens et al. |
| 6,917,878 B2 | 7/2005 | Pechatnikov et al. |
| 6,917,968 B2 | 7/2005 | Nakamura |
| 6,920,319 B2 | 7/2005 | Knutsson et al. |
| 6,920,328 B2 | 7/2005 | Wollrab |
| 6,920,391 B2 | 7/2005 | Daubert et al. |
| 6,920,430 B1 | 7/2005 | Berton et al. |
| 6,920,464 B2 | 7/2005 | Fox |
| 6,922,566 B2 | 7/2005 | Puranik et al. |
| 6,922,634 B2 | 7/2005 | Odakura et al. |
| 6,925,378 B2 | 8/2005 | Tzamaloukas |
| 6,925,381 B2 | 8/2005 | Adamczyk |
| 6,928,279 B2 | 8/2005 | Seligmann et al. |
| 6,928,294 B2 | 8/2005 | Maggenti et al. |
| 6,930,634 B2 | 8/2005 | Peng et al. |
| 6,932,698 B2 | 8/2005 | Sprogis |
| 6,933,841 B2 | 8/2005 | Muramatsu et al. |
| 6,934,634 B1 | 8/2005 | Ge |
| 6,937,187 B2 | 8/2005 | van Diggelen et al. |
| 6,937,569 B1 | 8/2005 | Sarkar et al. |
| 6,937,597 B1 | 8/2005 | Rosenberg et al. |
| 6,937,872 B2 | 8/2005 | Krasner |
| 6,938,076 B2 | 8/2005 | Meyer et al. |
| 6,940,454 B2 | 9/2005 | Paetzold et al. |
| 6,940,826 B1 | 9/2005 | Simard et al. |
| 6,940,950 B2 | 9/2005 | Dickinson et al. |
| 6,941,144 B2 | 9/2005 | Stein |
| 6,943,671 B2 | 9/2005 | McGee et al. |
| 6,944,443 B2 | 9/2005 | Bates et al. |
| 6,944,447 B2 | 9/2005 | Portman et al. |
| 6,944,540 B2 | 9/2005 | King et al. |
| 6,944,704 B2 | 9/2005 | Brelin |
| 6,944,760 B2 | 9/2005 | Wills |
| 6,947,772 B2 | 9/2005 | Minear et al. |
| 6,947,880 B2 | 9/2005 | Johnson et al. |
| 6,948,656 B2 | 9/2005 | Williams |
| 6,950,058 B1 | 9/2005 | Davis et al. |
| 6,950,326 B2 | 9/2005 | Suzuki |
| 6,950,535 B2 | 9/2005 | Sibayama et al. |
| 6,952,181 B2 | 10/2005 | Karr et al. |
| 6,952,574 B2 | 10/2005 | Tealdi et al. |
| 6,954,442 B2 | 10/2005 | Tsirtsis et al. |
| 6,954,641 B2 | 10/2005 | McKenna et al. |
| 6,954,735 B1 | 10/2005 | Djupsjobacka et al. |
| 6,954,790 B2 | 10/2005 | Forslöw |
| 6,956,564 B1 | 10/2005 | Williams |
| 6,956,573 B1 | 10/2005 | Bergen et al. |
| 6,957,068 B2 | 10/2005 | Hutchison, IV et al. |
| 6,957,072 B2 | 10/2005 | Kangras et al. |
| 6,957,073 B2 | 10/2005 | Bye |
| 6,957,076 B2 | 10/2005 | Hunzinger |
| 6,957,080 B2 | 10/2005 | Guetre et al. |
| 6,957,393 B2 | 10/2005 | Fano et al. |
| 6,958,707 B1 | 10/2005 | Siegel |
| 6,961,019 B1 | 11/2005 | McConnell et al. |
| 6,961,312 B2 | 11/2005 | Kubler et al. |
| 6,961,562 B2 | 11/2005 | Ross |
| 6,963,283 B1 | 11/2005 | Gonzalez |
| 6,963,557 B2 | 11/2005 | Knox |
| 6,963,748 B2 | 11/2005 | Chithambaram et al. |
| 6,963,900 B2 | 11/2005 | Boyd |
| 6,965,754 B2 | 11/2005 | King |
| 6,965,767 B2 | 11/2005 | Maggenti et al. |
| 6,965,816 B2 | 11/2005 | Walker |
| 6,965,868 B1 | 11/2005 | Bednarek |
| 6,968,044 B2 | 11/2005 | Beason et al. |
| 6,968,179 B1 | 11/2005 | De Vries |
| 6,968,195 B2 | 11/2005 | Nowak |
| 6,970,130 B1 | 11/2005 | Walters et al. |
| 6,970,131 B2 | 11/2005 | Percy et al. |
| 6,970,837 B1 | 11/2005 | Walker et al. |
| 6,970,917 B1 | 11/2005 | Kushwaha et al. |
| 6,970,922 B1 | 11/2005 | Spector |
| 6,972,684 B2 | 12/2005 | Copley |
| 6,973,166 B1 | 12/2005 | Tsumpes |
| 6,973,320 B2 | 12/2005 | Brown et al. |
| 6,973,384 B2 | 12/2005 | Zhao et al. |
| 6,975,266 B2 | 12/2005 | Abraham et al. |
| 6,975,619 B1 | 12/2005 | Byers et al. |
| 6,975,873 B1 | 12/2005 | Banks et al. |
| 6,975,874 B1 | 12/2005 | Bates et al. |
| 6,975,941 B1 | 12/2005 | Lau et al. |
| 6,975,959 B2 | 12/2005 | Dietrich et al. |
| 6,975,998 B1 | 12/2005 | Jones |
| 6,978,258 B2 | 12/2005 | Chithambaram |
| 6,978,453 B2 | 12/2005 | Rao et al. |
| 6,980,813 B2 | 12/2005 | Mohi et al. |
| 6,980,816 B2 | 12/2005 | Rohles et al. |
| 6,980,909 B2 | 12/2005 | Root et al. |
| 6,981,029 B1 | 12/2005 | Menditto et al. |
| 6,982,639 B2 | 1/2006 | Brackett et al. |
| 6,982,656 B1 | 1/2006 | Coppinger et al. |
| 6,982,669 B2 | 1/2006 | Coatantiec et al. |
| 6,983,313 B1 | 1/2006 | Korkea-Aho |
| 6,985,747 B2 | 1/2006 | Chithambaram |
| 6,985,839 B1 | 1/2006 | Motamedi et al. |
| 6,985,879 B2 | 1/2006 | Walker et al. |
| 6,987,976 B2 | 1/2006 | Kohar et al. |
| 6,989,765 B2 | 1/2006 | Gueziec |
| 6,990,409 B2 | 1/2006 | Khan et al. |
| 6,990,462 B1 | 1/2006 | Wilcox et al. |
| 6,990,472 B2 | 1/2006 | Rosenhaft et al. |
| 6,990,495 B1 | 1/2006 | Grason et al. |
| 6,993,325 B1 | 1/2006 | Waesterlid |
| 6,993,327 B2 | 1/2006 | Mathis |
| 6,993,355 B1 | 1/2006 | Pershan |
| 6,993,490 B2 | 1/2006 | Chen et al. |
| 6,993,718 B2 | 1/2006 | Fujihara |
| 6,996,087 B2 | 2/2006 | Ejzak |
| 6,996,251 B2 | 2/2006 | Malone et al. |
| 6,996,387 B2 | 2/2006 | Chan |
| 6,996,720 B1 | 2/2006 | DeMello et al. |
| 6,999,777 B1 | 2/2006 | Ganesh |
| 6,999,779 B1 | 2/2006 | Hashimoto |
| 6,999,782 B2 | 2/2006 | Shaughnessy et al. |
| 6,999,783 B2 | 2/2006 | Toyryla et al. |
| 7,003,289 B1 | 2/2006 | Kolls |
| 7,003,571 B1 | 2/2006 | Zombek et al. |
| 7,003,604 B2 | 2/2006 | Brelin |
| 7,006,829 B2 | 2/2006 | Zhao et al. |
| 7,007,010 B2 | 2/2006 | Cooper |
| 7,007,228 B1 | 2/2006 | Carro |
| 7,009,556 B2 | 3/2006 | Stewart |
| 7,010,144 B1 | 3/2006 | Davis et al. |
| 7,010,308 B2 | 3/2006 | Hendrey |
| 7,012,901 B2 | 3/2006 | Jagadeesan et al. |
| 7,013,148 B1 | 3/2006 | Ganesh |
| 7,013,149 B2 | 3/2006 | Vetro et al. |
| 7,013,216 B2 | 3/2006 | Walters et al. |
| 7,013,365 B2 | 3/2006 | Amouse |
| 7,013,391 B2 | 3/2006 | Herle et al. |
| 7,015,817 B2 | 3/2006 | Copley et al. |
| 7,016,717 B2 | 3/2006 | Demos et al. |
| 7,016,855 B2 | 3/2006 | Eaton et al. |
| 7,020,460 B1 | 3/2006 | Sherman et al. |
| 7,020,494 B2 | 3/2006 | Spriestersbach et al. |
| 7,020,701 B2 | 3/2006 | Gelvin et al. |
| 7,023,383 B2 | 4/2006 | Stilp et al. |
| 7,023,465 B2 | 4/2006 | Stephens, Jr. |
| 7,023,980 B2 | 4/2006 | Lenard |
| 7,024,200 B2 | 4/2006 | McKenna et al. |
| 7,024,205 B2 | 4/2006 | Hose |
| 7,024,207 B2 | 4/2006 | Gorday et al. |
| 7,024,214 B2 | 4/2006 | Loveland |
| 7,024,278 B2 | 4/2006 | Chiappetta et al. |
| 7,024,321 B1 | 4/2006 | Deninger et al. |
| 7,024,393 B1 | 4/2006 | Peinado et al. |
| 7,026,926 B1 | 4/2006 | Walker, III |
| 7,026,928 B1 | 4/2006 | Lane |

(56) References Cited

U.S. PATENT DOCUMENTS

| | | |
|---|---|---|
| 7,027,564 B2 | 4/2006 | James |
| 7,027,819 B2 | 4/2006 | Ozturk et al. |
| 7,030,765 B2 | 4/2006 | Giraldin et al. |
| 7,031,724 B2 | 4/2006 | Ross et al. |
| 7,031,725 B2 | 4/2006 | Rorabaugh |
| 7,031,728 B2 | 4/2006 | Beyer, Jr. |
| 7,031,875 B2 | 4/2006 | Ellenby et al. |
| 7,032,030 B1 | 4/2006 | Codignotto |
| 7,034,678 B2 | 4/2006 | Burkley et al. |
| 7,034,681 B2 | 4/2006 | Yamamoto et al. |
| 7,035,618 B2 | 4/2006 | Schnurr |
| 7,035,647 B2 | 4/2006 | de Verteuil |
| 7,035,731 B2 | 4/2006 | Smith |
| 7,035,869 B2 | 4/2006 | Smartt |
| 7,038,590 B2 | 5/2006 | Hoffman et al. |
| 7,039,596 B1 | 5/2006 | Lu |
| 7,039,599 B2 | 5/2006 | Merriman et al. |
| 7,039,603 B2 | 5/2006 | Walker et al. |
| 7,042,338 B1 | 5/2006 | Weber |
| 7,042,361 B2 | 5/2006 | Kazdin et al. |
| 7,042,391 B2 | 5/2006 | Meunier et al. |
| 7,043,256 B2 | 5/2006 | Ozugur et al. |
| 7,043,362 B2 | 5/2006 | Krull et al. |
| 7,044,372 B2 | 5/2006 | Okuda et al. |
| 7,047,030 B2 | 5/2006 | Forsyth |
| 7,047,203 B2 | 5/2006 | Johnson |
| 7,047,411 B1 | 5/2006 | DeMello et al. |
| 7,047,549 B2 | 5/2006 | Schein et al. |
| 7,050,624 B2 | 5/2006 | Dialameh et al. |
| 7,050,655 B2 | 5/2006 | Ho et al. |
| 7,050,797 B2 | 5/2006 | Jung |
| 7,050,818 B2 | 5/2006 | Tendler |
| 7,053,780 B1 | 5/2006 | Straub et al. |
| 7,053,822 B2 | 5/2006 | Rickerson, Jr. |
| 7,054,741 B2 | 5/2006 | Harrison et al. |
| 7,057,556 B2 | 6/2006 | Hall et al. |
| 7,057,591 B1 | 6/2006 | Hautanen et al. |
| 7,058,208 B2 | 6/2006 | Chang et al. |
| 7,058,594 B2 | 6/2006 | Stewart |
| 7,062,269 B2 | 6/2006 | Albertsson et al. |
| 7,062,279 B2 | 6/2006 | Cedervall et al. |
| 7,062,376 B2 | 6/2006 | Oesterling |
| 7,062,491 B2 | 6/2006 | McNulty et al. |
| 7,062,510 B1 | 6/2006 | Eldering |
| 7,062,530 B2 | 6/2006 | Scheinkman |
| 7,064,681 B2 | 6/2006 | Horstemeyer |
| 7,065,348 B1 | 6/2006 | Aoki |
| 7,065,351 B2 | 6/2006 | Carter et al. |
| 7,065,507 B2 | 6/2006 | Mohammed et al. |
| 7,065,548 B2 | 6/2006 | van Oldenborgh et al. |
| 7,068,189 B2 | 6/2006 | Brescia |
| 7,068,309 B2 | 6/2006 | Toyama et al. |
| 7,069,016 B2 | 6/2006 | Crisler et al. |
| 7,069,023 B2 | 6/2006 | Maanoja et al. |
| 7,069,026 B2 | 6/2006 | McClure |
| 7,069,308 B2 | 6/2006 | Abrams |
| 7,069,319 B2 | 6/2006 | Zellner et al. |
| 7,071,821 B2 | 7/2006 | Adamczyk et al. |
| 7,071,842 B1 | 7/2006 | Brady, Jr. |
| 7,072,454 B1 | 7/2006 | Ward |
| 7,072,645 B2 | 7/2006 | Schwinke et al. |
| 7,072,665 B1 | 7/2006 | Blumberg et al. |
| 7,072,667 B2 | 7/2006 | Olrik et al. |
| 7,072,672 B1 | 7/2006 | Vanska et al. |
| 7,072,956 B2 | 7/2006 | Parupudi et al. |
| 7,072,963 B2 | 7/2006 | Anderson et al. |
| 7,075,900 B2 | 7/2006 | Peters |
| 7,076,235 B2 | 7/2006 | Esque et al. |
| 7,076,255 B2 | 7/2006 | Parupudi et al. |
| 7,076,257 B2 | 7/2006 | Kall |
| 7,076,737 B2 | 7/2006 | Abbott et al. |
| 7,079,857 B2 | 7/2006 | Maggenti et al. |
| 7,079,947 B2 | 7/2006 | Runquist et al. |
| 7,080,019 B1 | 7/2006 | Hurzeler |
| 7,080,124 B1 | 7/2006 | Shankar |
| 7,082,365 B2 | 7/2006 | Sheha et al. |
| 7,082,400 B2 | 7/2006 | Jones et al. |
| 7,084,758 B1 | 8/2006 | Cole |
| 7,084,771 B2 | 8/2006 | Gonzalez |
| 7,085,365 B2 | 8/2006 | Kauppinen |
| 7,085,555 B2 | 8/2006 | Zellner et al. |
| 7,085,578 B2 | 8/2006 | Barclay et al. |
| 7,085,637 B2 | 8/2006 | Breed et al. |
| 7,085,678 B1 | 8/2006 | Burrell et al. |
| 7,085,818 B2 | 8/2006 | Brown et al. |
| 7,089,110 B2 | 8/2006 | Pechatnikov et al. |
| 7,089,214 B2 | 8/2006 | Wang |
| 7,089,264 B1 | 8/2006 | Guido et al. |
| 7,091,851 B2 | 8/2006 | Mason et al. |
| 7,091,852 B2 | 8/2006 | Mason et al. |
| 7,092,385 B2 | 8/2006 | Gallant et al. |
| 7,092,573 B2 | 8/2006 | Luo et al. |
| 7,092,702 B2 | 8/2006 | Cronin et al. |
| 7,095,871 B2 | 8/2006 | Jones et al. |
| 7,096,029 B1 | 8/2006 | Parupudi et al. |
| 7,096,030 B2 | 8/2006 | Huomo |
| 7,096,033 B1 | 8/2006 | Bell |
| 7,096,233 B2 | 8/2006 | Mori et al. |
| 7,099,770 B2 | 8/2006 | Naden et al. |
| 7,102,510 B2 | 9/2006 | Boling et al. |
| 7,103,018 B1 | 9/2006 | Hansen et al. |
| 7,103,368 B2 | 9/2006 | Teshima |
| 7,103,370 B1 | 9/2006 | Creemer |
| 7,103,470 B2 | 9/2006 | Mintz |
| 7,103,471 B2 | 9/2006 | Levi et al. |
| 7,103,476 B2 | 9/2006 | Smith et al. |
| 7,103,574 B1 | 9/2006 | Peinado et al. |
| 7,103,806 B1 | 9/2006 | Horvitz |
| 7,106,717 B2 | 9/2006 | Rousseau et al. |
| 7,106,843 B1 | 9/2006 | Gainsboro et al. |
| 7,107,038 B2 | 9/2006 | Fitch et al. |
| 7,107,065 B2 | 9/2006 | Overy et al. |
| 7,107,228 B1 | 9/2006 | Walker et al. |
| 7,107,285 B2 | 9/2006 | von Kaenel et al. |
| 7,110,749 B2 | 9/2006 | Zellner et al. |
| 7,110,753 B2 | 9/2006 | Campen |
| 7,110,773 B1 | 9/2006 | Wallace et al. |
| 7,110,880 B2 | 9/2006 | Breed et al. |
| 7,113,110 B2 | 9/2006 | Horstemeyer |
| 7,113,797 B2 | 9/2006 | Kelley et al. |
| 7,113,806 B2 | 9/2006 | Gray |
| 7,114,153 B2 | 9/2006 | Nijdam |
| 7,124,174 B2 | 9/2006 | Wyke et al. |
| 7,114,647 B2 | 10/2006 | Giraldin et al. |
| 7,116,977 B1 | 10/2006 | Moton, Jr. et al. |
| 7,116,985 B2 | 10/2006 | Wilson et al. |
| 7,117,015 B2 | 10/2006 | Scheinert et al. |
| 7,117,088 B1 | 10/2006 | Hanshew et al. |
| 7,119,675 B2 | 10/2006 | Khandelwal et al. |
| 7,119,716 B2 | 10/2006 | Horstemeyer |
| 7,120,444 B2 | 10/2006 | Silvester |
| 7,120,450 B2 | 10/2006 | Hines et al. |
| 7,120,459 B2 | 10/2006 | Sawada et al. |
| 7,120,469 B1 | 10/2006 | Urakawa |
| 7,123,141 B2 | 10/2006 | Contestabile |
| 7,123,189 B2 | 10/2006 | Lalik et al. |
| 7,123,693 B2 | 10/2006 | Nelson et al. |
| 7,123,926 B2 | 10/2006 | Himmelstein |
| 7,124,370 B2 | 10/2006 | Fish |
| 7,127,257 B2 | 10/2006 | Riley et al. |
| 7,127,261 B2 | 10/2006 | Van Erlach |
| 7,128,274 B2 | 10/2006 | Kelley et al. |
| 7,130,385 B1 | 10/2006 | Moon |
| 7,130,406 B2 | 10/2006 | Pines et al. |
| 7,130,630 B1 | 10/2006 | Enzmann et al. |
| 7,130,646 B2 | 10/2006 | Wang |
| 7,133,365 B2 | 11/2006 | Klinker et al. |
| 7,133,909 B2 | 11/2006 | Bahl |
| 7,135,992 B2 | 11/2006 | Karlsson et al. |
| 7,136,466 B1 | 11/2006 | Gao |
| 7,136,663 B2 | 11/2006 | Metais et al. |
| 7,136,747 B2 | 11/2006 | Raney |
| 7,136,838 B1 | 11/2006 | Peinado et al. |
| 7,136,915 B2 | 11/2006 | Rieger, III |

(56) References Cited

U.S. PATENT DOCUMENTS

| | | |
|---|---|---|
| 7,138,913 B2 | 11/2006 | Mackenzie et al. |
| 7,139,252 B2 | 11/2006 | Babu et al. |
| 7,139,553 B2 | 11/2006 | Alston |
| 7,139,565 B2 | 11/2006 | Fiatal et al. |
| 7,139,664 B2 | 11/2006 | Kelly et al. |
| 7,139,722 B2 | 11/2006 | Perrella et al. |
| 7,142,858 B2 | 11/2006 | Aoki et al. |
| 7,142,900 B1 | 11/2006 | Straub |
| 7,143,130 B2 | 11/2006 | Lin |
| 7,143,138 B2 | 11/2006 | Imanishi |
| 7,145,900 B2 | 12/2006 | Nix et al. |
| 7,146,129 B2 | 12/2006 | Bostrom et al. |
| 7,147,149 B2 | 12/2006 | Giraldin et al. |
| 7,149,503 B2 | 12/2006 | Aarnio et al. |
| 7,149,533 B2 | 12/2006 | Laird et al. |
| 7,149,534 B2 | 12/2006 | Bloebaum et al. |
| 7,149,625 B2 | 12/2006 | Mathews et al. |
| 7,150,030 B1 | 12/2006 | Eldering et al. |
| 7,151,921 B2 | 12/2006 | Otsuka |
| 7,151,946 B2 | 12/2006 | Maggenti et al. |
| 7,155,238 B2 | 12/2006 | Katz |
| 7,155,339 B2 | 12/2006 | Tu |
| 7,155,521 B2 | 12/2006 | Lahti et al. |
| 7,158,798 B2 | 1/2007 | Lee et al. |
| 7,158,878 B2 | 1/2007 | Rasmussen et al. |
| 7,158,883 B2 | 1/2007 | Fuchs et al. |
| 7,158,980 B2 | 1/2007 | Shen |
| 7,162,221 B2 | 1/2007 | Spitz et al. |
| 7,162,256 B2 | 1/2007 | Seligmann et al. |
| 7,162,454 B1 | 1/2007 | Donner et al. |
| 7,164,117 B2 | 1/2007 | Breed et al. |
| 7,164,883 B2 | 1/2007 | Rappaport et al. |
| 7,164,921 B2 | 1/2007 | Owens et al. |
| 7,164,986 B2 | 1/2007 | Humphries et al. |
| 7,165,725 B2 | 1/2007 | Casey |
| 7,167,711 B1 | 1/2007 | Dennis |
| 7,167,713 B2 | 1/2007 | Anderson |
| 7,170,863 B1 | 1/2007 | Denman et al. |
| 7,171,187 B2 | 1/2007 | Haave et al. |
| 7,171,190 B2 | 1/2007 | Ye et al. |
| 7,171,198 B2 | 1/2007 | Paila et al. |
| 7,174,153 B2 | 2/2007 | Ehlers |
| 7,174,277 B2 | 2/2007 | Vock et al. |
| 7,177,397 B2 | 2/2007 | McCalmont et al. |
| 7,177,398 B2 | 2/2007 | Meer et al. |
| 7,177,399 B2 | 2/2007 | Dawson et al. |
| 7,177,623 B2 | 2/2007 | Baldwin |
| 7,177,651 B1 | 2/2007 | Almassy |
| 7,177,904 B1 | 2/2007 | Mathur et al. |
| 7,181,189 B2 | 2/2007 | Hotta et al. |
| 7,181,200 B2 | 2/2007 | Malackowski et al. |
| 7,181,227 B2 | 2/2007 | Wilson et al. |
| 7,181,228 B2 | 2/2007 | Boesch |
| 7,181,230 B2 | 2/2007 | Nonoyama et al. |
| 7,184,750 B2 | 2/2007 | Tervo et al. |
| 7,184,790 B2 | 2/2007 | Dorenbosch et al. |
| 7,185,352 B2 | 2/2007 | Hallford et al. |
| 7,187,997 B2 | 3/2007 | Johnson |
| 7,190,948 B2 | 3/2007 | Donley et al. |
| 7,190,960 B2 | 3/2007 | Wilson et al. |
| 7,194,273 B2 | 3/2007 | Vaudreuil |
| 7,194,275 B2 | 3/2007 | Bolin et al. |
| 7,194,419 B2 | 3/2007 | Robertson et al. |
| 7,196,639 B2 | 3/2007 | Joyce et al. |
| 7,197,321 B2 | 3/2007 | Erskine et al. |
| 7,199,754 B2 | 4/2007 | Krumm et al. |
| 7,199,815 B2 | 4/2007 | Aoyama |
| 7,200,380 B2 | 4/2007 | Havlark et al. |
| 7,200,394 B2 | 4/2007 | Aoki et al. |
| 7,200,409 B1 | 4/2007 | Ichikawa et al. |
| 7,200,566 B1 | 4/2007 | Moore et al. |
| 7,202,776 B2 | 4/2007 | Breed |
| 7,202,814 B2 | 4/2007 | Caspi et al. |
| 7,203,111 B2 | 4/2007 | Martin et al. |
| 7,203,502 B2 | 4/2007 | Wilson et al. |
| 7,203,674 B2 | 4/2007 | Cohen |
| 7,203,752 B2 | 4/2007 | Rice et al. |
| 7,206,388 B2 | 4/2007 | Diacakis |
| 7,206,568 B2 | 4/2007 | Sudit |
| 7,206,828 B1 | 4/2007 | Bourke-Dunphy et al. |
| 7,209,571 B2 | 4/2007 | Davis et al. |
| 7,209,731 B2 | 4/2007 | Choi et al. |
| 7,209,753 B2 | 4/2007 | Raith |
| 7,209,755 B2 | 4/2007 | Gorday et al. |
| 7,209,757 B2 | 4/2007 | Naghian et al. |
| 7,209,758 B1 | 4/2007 | Moll et al. |
| 7,209,950 B2 | 4/2007 | Bennett et al. |
| 7,209,969 B2 | 4/2007 | Lahti et al. |
| 7,212,111 B2 | 4/2007 | Tupler et al. |
| 7,212,806 B2 | 5/2007 | Karaoguz |
| 7,212,918 B2 | 5/2007 | Werback |
| 7,213,048 B1 | 5/2007 | Parupudi et al. |
| 7,215,967 B1 | 5/2007 | Kransmo et al. |
| 7,216,109 B1 | 5/2007 | Donner |
| 7,218,242 B2 | 5/2007 | Scalisi et al. |
| 7,218,940 B2 | 5/2007 | Niemenmaa et al. |
| 7,218,941 B1 | 5/2007 | Kubo et al. |
| 7,219,303 B2 | 5/2007 | Fish |
| 7,221,267 B2 | 5/2007 | Chalker et al. |
| 7,221,937 B2 | 5/2007 | Lau et al. |
| 7,221,948 B2 | 5/2007 | Tokkonen |
| 7,221,959 B2 | 5/2007 | Lindqvist et al. |
| 7,222,018 B2 | 5/2007 | Uyeki et al. |
| 7,224,963 B2 | 5/2007 | Anderson et al. |
| 7,224,966 B2 | 5/2007 | Caspi et al. |
| 7,224,978 B2 | 5/2007 | Zellner et al. |
| 7,224,987 B1 | 5/2007 | Bhela et al. |
| 7,224,995 B2 | 5/2007 | Rhoads |
| 7,225,207 B1 | 5/2007 | Ohazama et al. |
| 7,228,136 B2 | 6/2007 | Myllymaki et al. |
| 7,231,218 B2 | 6/2007 | Diacakis et al. |
| 7,231,219 B2 | 6/2007 | Curtis et al. |
| 7,231,423 B1 | 6/2007 | Horstmann et al. |
| 7,233,786 B1 | 6/2007 | Harris et al. |
| 7,233,933 B2 | 6/2007 | Horvitz et al. |
| 7,234,117 B2 | 6/2007 | Zaner et al. |
| 7,234,942 B2 | 6/2007 | Hu et al. |
| 7,236,742 B2 | 6/2007 | Hall et al. |
| 7,236,799 B2 | 6/2007 | Wilson et al. |
| 7,236,973 B2 | 6/2007 | Kalthoff et al. |
| 7,237,019 B2 | 6/2007 | Sogabe et al. |
| 7,237,201 B2 | 6/2007 | Fish |
| 7,239,759 B2 | 7/2007 | Nam et al. |
| 7,239,943 B2 | 7/2007 | Peltz |
| 7,240,036 B1 | 7/2007 | Mamdani et al. |
| 7,242,303 B2 | 7/2007 | Patel et al. |
| 7,242,950 B2 | 7/2007 | Suryanarayana et al. |
| 7,243,355 B2 | 7/2007 | Espino |
| 7,245,214 B2 | 7/2007 | Smith |
| 7,245,216 B2 | 7/2007 | Burkley et al. |
| 7,245,704 B2 | 7/2007 | Binning |
| 7,246,371 B2 | 7/2007 | Diacakis et al. |
| 7,248,159 B2 | 7/2007 | Smith |
| 7,248,677 B2 | 7/2007 | Randall et al. |
| 7,248,872 B2 | 7/2007 | Bassett et al. |
| 7,248,884 B2 | 7/2007 | Miyamoto |
| 7,248,965 B2 | 7/2007 | Tanizaki et al. |
| 7,250,907 B2 | 7/2007 | Krumm et al. |
| 7,251,312 B2 | 7/2007 | D'Evelyn et al. |
| 7,251,561 B2 | 7/2007 | Dotan et al. |
| 7,251,696 B1 | 7/2007 | Horvitz |
| 7,254,388 B2 | 8/2007 | Nam et al. |
| 7,254,406 B2 | 8/2007 | Beros et al. |
| 7,254,481 B2 | 8/2007 | Yamada et al. |
| 7,256,711 B2 | 8/2007 | Sheha et al. |
| 7,256,737 B2 | 8/2007 | Hall et al. |
| 7,257,392 B2 | 8/2007 | Tang et al. |
| 7,257,416 B2 | 8/2007 | Lee et al. |
| 7,259,694 B2 | 8/2007 | Myllymaki et al. |
| 7,260,186 B2 | 8/2007 | Zhu et al. |
| 7,260,378 B2 | 8/2007 | Holland et al. |
| 7,260,384 B2 | 8/2007 | Bales et al. |
| 7,263,437 B2 | 8/2007 | Hirose et al. |
| 7,266,376 B2 | 9/2007 | Nakagawa |

(56) References Cited

U.S. PATENT DOCUMENTS

| | | |
|---|---|---|
| 7,266,378 B2 | 9/2007 | Norta et al. |
| 7,266,379 B2 | 9/2007 | Blight et al. |
| 7,266,836 B2 | 9/2007 | Anttila et al. |
| 7,269,425 B2 | 9/2007 | Valko et al. |
| 7,269,590 B2 | 9/2007 | Hull et al. |
| 7,269,601 B2 | 9/2007 | Kinno et al. |
| 7,269,636 B2 | 9/2007 | McCollum et al. |
| 7,269,821 B2 | 9/2007 | Sahinoja et al. |
| 7,271,742 B2 | 9/2007 | Sheha et al. |
| 7,271,765 B2 | 9/2007 | Stilp et al. |
| 7,273,172 B2 | 9/2007 | Olsen, III et al. |
| 7,274,299 B2 | 9/2007 | Osman |
| 7,274,332 B1 | 9/2007 | Dupray |
| 7,274,924 B2 | 9/2007 | Yoshioka |
| 7,274,939 B2 | 9/2007 | Ruutu et al. |
| 7,277,912 B2 | 10/2007 | Corboy et al. |
| 7,277,923 B2 | 10/2007 | Rensin et al. |
| 7,280,822 B2 | 10/2007 | Fraccaroli |
| 7,280,975 B1 | 10/2007 | Donner |
| 7,283,846 B2 | 10/2007 | Spriestersbach et al. |
| 7,284,033 B2 | 10/2007 | Jhanji |
| 7,284,064 B1 | 10/2007 | Connelly |
| 7,289,617 B2 | 10/2007 | Barnes et al. |
| 7,289,813 B2 | 10/2007 | Karaoguz |
| 7,289,814 B2 | 10/2007 | Amir et al. |
| 7,289,904 B2 | 10/2007 | Uyeki |
| 7,292,142 B2 | 11/2007 | Simon et al. |
| 7,292,685 B2 | 11/2007 | Gray |
| 7,292,935 B2 | 11/2007 | Yoon |
| 7,295,556 B2 | 11/2007 | Roese et al. |
| 7,298,327 B2 | 11/2007 | Dupray et al. |
| 7,299,008 B2 | 11/2007 | Gluck |
| 7,299,256 B2 | 11/2007 | Pradhan et al. |
| 7,301,469 B1 | 11/2007 | Hoffman et al. |
| 7,301,536 B2 | 11/2007 | Ellenby et al. |
| 7,302,254 B2 | 11/2007 | Valloppillil |
| 7,302,634 B2 | 11/2007 | Lucovsky et al. |
| 7,304,966 B2 | 12/2007 | Phan-Anh et al. |
| 7,305,365 B1 | 12/2007 | Bhela et al. |
| 7,305,442 B1 | 12/2007 | Lundy |
| 7,305,700 B2 | 12/2007 | Boynton et al. |
| 7,307,636 B2 | 12/2007 | Matraszek et al. |
| 7,308,356 B2 | 12/2007 | Melaku et al. |
| 7,310,534 B2 | 12/2007 | Northcutt |
| 7,310,676 B2 | 12/2007 | Bourne |
| 7,313,405 B2 | 12/2007 | Tanabe |
| 7,315,746 B2 | 1/2008 | Caspi et al. |
| 7,315,780 B2 | 1/2008 | Sugahara et al. |
| 7,317,705 B2 | 1/2008 | Hanson |
| 7,317,927 B2 | 1/2008 | Staton et al. |
| 7,318,041 B2 | 1/2008 | Walker et al. |
| 7,319,414 B2 | 1/2008 | Horstemeyer |
| 7,319,931 B2 | 1/2008 | Uyeki et al. |
| 7,321,773 B2 | 1/2008 | Hines et al. |
| 7,324,823 B1 | 1/2008 | Rosen et al. |
| 7,324,987 B2 | 1/2008 | Hsieh et al. |
| 7,327,245 B2 | 2/2008 | Krumm et al. |
| 7,327,312 B1 | 2/2008 | Harris |
| 7,328,029 B1 | 2/2008 | Adamczyk et al. |
| 7,328,242 B1 | 2/2008 | McCarthy et al. |
| 7,328,455 B2 | 2/2008 | Jutzi et al. |
| 7,330,112 B1 | 2/2008 | Emigh et al. |
| 7,330,895 B1 | 2/2008 | Horvitz |
| 7,330,899 B2 | 2/2008 | Wong |
| 7,333,480 B1 | 2/2008 | Clarke et al. |
| 7,333,819 B2 | 2/2008 | Caspi et al. |
| 7,333,820 B2 | 2/2008 | Sheha et al. |
| 7,333,956 B2 | 2/2008 | Malcolm |
| 7,334,728 B2 | 2/2008 | Williams |
| 7,336,819 B2 | 2/2008 | Gallagher et al. |
| 7,336,928 B2 | 2/2008 | Paalasmaa et al. |
| 7,336,949 B2 | 2/2008 | Nasielski |
| 7,337,061 B2 | 2/2008 | Naden et al. |
| 7,337,210 B2 | 2/2008 | Barsness |
| 7,337,465 B2 | 2/2008 | Kiyoto et al. |
| 7,339,496 B2 | 3/2008 | Endo et al. |
| 7,340,057 B2 | 3/2008 | Martin, Jr. et al. |
| 7,340,240 B2 | 3/2008 | McDonald |
| 7,340,260 B2 | 3/2008 | McAlexander |
| 7,340,389 B2 | 3/2008 | Vargas |
| 7,340,691 B2 | 3/2008 | Bassett et al. |
| 7,343,141 B2 | 3/2008 | Ellis et al. |
| 7,343,165 B2 | 3/2008 | Obradovich |
| 7,343,222 B2 | 3/2008 | Solomon |
| 7,343,317 B2 | 3/2008 | Jokinen et al. |
| 7,343,408 B2 | 3/2008 | Kushwaha et al. |
| 7,349,706 B2 | 3/2008 | Kim et al. |
| 7,350,158 B2 | 3/2008 | Yamaguchi et al. |
| 7,350,236 B1 | 3/2008 | Silverbrook et al. |
| 7,350,237 B2 | 3/2008 | Vogel et al. |
| 7,353,016 B2 | 4/2008 | Roundtree et al. |
| 7,353,034 B2 | 4/2008 | Haney |
| 7,353,139 B1 | 4/2008 | Burrell et al. |
| 7,353,181 B2 | 4/2008 | Nel |
| 7,355,528 B2 | 4/2008 | Yamane et al. |
| 7,359,706 B2 | 4/2008 | Zhao |
| 7,359,713 B1 | 4/2008 | Tiwari |
| 7,359,716 B2 | 4/2008 | Rowitch et al. |
| 7,359,724 B2 | 4/2008 | Torvinen |
| 7,359,894 B1 | 4/2008 | Liebman et al. |
| 7,362,662 B2 | 4/2008 | Lang |
| 7,363,024 B2 | 4/2008 | Jenkins |
| 7,363,027 B2 | 4/2008 | Hon et al. |
| 7,366,522 B2 | 4/2008 | Thomas |
| 7,366,523 B2 | 4/2008 | Viikari et al. |
| 7,366,606 B2 | 4/2008 | Uyeki |
| 7,366,779 B1 | 4/2008 | Crawford |
| 7,366,892 B2 | 4/2008 | Spaur et al. |
| 7,369,508 B2 | 5/2008 | Parantainen et al. |
| 7,369,530 B2 | 5/2008 | Keagy |
| 7,370,283 B2 | 5/2008 | Othmer |
| 7,373,820 B1 | 5/2008 | James |
| 7,376,433 B1 | 5/2008 | Hose |
| 7,376,591 B2 | 5/2008 | Owens |
| 7,376,640 B1 | 5/2008 | Anderson et al. |
| 7,379,889 B2 | 5/2008 | Ratzlaff et al. |
| 7,382,770 B2 | 6/2008 | Bergman et al. |
| 7,382,773 B2 | 6/2008 | Schoeneberger et al. |
| 7,383,316 B2 | 6/2008 | Koch et al. |
| 7,385,499 B2 | 6/2008 | Horton et al. |
| 7,386,000 B2 | 6/2008 | Lopponen et al. |
| 7,386,392 B1 | 6/2008 | Kabel et al. |
| 7,386,464 B2 | 6/2008 | Robertson et al. |
| 7,386,477 B2 | 6/2008 | Fano |
| 7,388,519 B1 | 6/2008 | Kreft |
| 7,389,179 B2 | 6/2008 | Jin et al. |
| 7,389,275 B2 | 6/2008 | Kemper et al. |
| 7,389,351 B2 | 6/2008 | Horvitz |
| 7,394,386 B2 | 7/2008 | Nowlan |
| 7,394,896 B2 | 7/2008 | Norton |
| 7,395,031 B1 | 7/2008 | Ritter |
| 7,395,045 B2 | 7/2008 | Jijina et al. |
| 7,395,259 B2 | 7/2008 | Bailey et al. |
| 7,397,379 B2 | 7/2008 | Richards et al. |
| 7,398,151 B1 | 7/2008 | Burrell et al. |
| 7,400,909 B2 | 7/2008 | Konishi et al. |
| 7,401,057 B2 | 7/2008 | Eder |
| 7,403,221 B2 | 7/2008 | Yamazaki et al. |
| 7,403,786 B2 | 7/2008 | Caspi et al. |
| 7,403,908 B1 | 7/2008 | Jaramillo |
| 7,403,942 B1 | 7/2008 | Bayliss |
| 7,403,972 B1 | 7/2008 | Lau et al. |
| 7,406,507 B2 | 7/2008 | Piccioni |
| 7,406,665 B2 | 7/2008 | Yokota |
| 7,409,384 B2 | 8/2008 | Szeto et al. |
| 7,409,428 B1 | 8/2008 | Brabec et al. |
| 7,409,429 B2 | 8/2008 | Kaufman et al. |
| 7,412,042 B2 | 8/2008 | Henry |
| 7,412,260 B2 | 8/2008 | Gailey et al. |
| 7,412,313 B2 | 8/2008 | Isaac |
| 7,413,513 B2 | 8/2008 | Nguyen et al. |
| 7,414,637 B2 | 8/2008 | Fogel et al. |
| 7,418,265 B2 | 8/2008 | Hardy et al. |
| 7,418,402 B2 | 8/2008 | McCrossin et al. |

(56) References Cited

U.S. PATENT DOCUMENTS

| | | |
|---|---|---|
| 7,421,154 B2 | 9/2008 | Kinjo |
| 7,421,422 B1 | 9/2008 | Dempster et al. |
| 7,421,486 B1 | 9/2008 | Parupudi et al. |
| 7,421,577 B2 | 9/2008 | Ichikawa et al. |
| 7,423,538 B2 | 9/2008 | Gonzalez |
| 7,424,293 B2 | 9/2008 | Zhu |
| 7,424,363 B2 | 9/2008 | Cheng et al. |
| 7,426,380 B2 | 9/2008 | Hines et al. |
| 7,426,403 B2 | 9/2008 | Sundararajan et al. |
| 7,428,417 B2 | 9/2008 | Caspi et al. |
| 7,428,510 B2 | 9/2008 | Titus et al. |
| 7,428,571 B2 | 9/2008 | Ichimura |
| 7,433,672 B2 | 9/2008 | Wood |
| 7,433,694 B2 | 10/2008 | Morgan et al. |
| 7,436,785 B1 | 10/2008 | McMullen et al. |
| 7,437,413 B2 | 10/2008 | Okuyama et al. |
| 7,437,444 B2 | 10/2008 | Houri |
| 7,439,847 B2 | 10/2008 | Pederson |
| 7,440,442 B2 | 10/2008 | Grabelsky et al. |
| 7,440,573 B2 | 10/2008 | Lor et al. |
| 7,440,842 B1 | 10/2008 | Vorona |
| 7,441,203 B2 | 10/2008 | Othmer et al. |
| 7,441,706 B1 | 10/2008 | Schuessler et al. |
| 7,443,314 B2 | 10/2008 | Konishi et al. |
| 7,447,508 B1 | 11/2008 | Tendler |
| 7,450,934 B2 | 11/2008 | Caspi et al. |
| 7,453,219 B2 | 11/2008 | Mor et al. |
| 7,455,586 B2 | 11/2008 | Nguyen et al. |
| 7,457,628 B2 | 11/2008 | Blumberg et al. |
| 7,457,634 B2 | 11/2008 | Morinaga et al. |
| 7,458,080 B2 | 11/2008 | Parker et al. |
| 7,460,863 B2 | 12/2008 | Steelberg et al. |
| 7,461,528 B2 | 12/2008 | Taniguchi et al. |
| 7,463,151 B1 | 12/2008 | Schulte-Kellinghaus |
| 7,463,972 B2 | 12/2008 | Yamada et al. |
| 7,464,050 B1 | 12/2008 | Deaton et al. |
| 7,466,811 B2 | 12/2008 | Elliott |
| 7,469,298 B2 | 12/2008 | Kitada et al. |
| 7,472,172 B2 | 12/2008 | Anderson et al. |
| 7,472,202 B2 | 12/2008 | Parupudi et al. |
| 7,472,338 B2 | 12/2008 | Carro |
| 7,472,396 B2 | 12/2008 | Jacobs et al. |
| 7,474,741 B2 | 1/2009 | Brunson et al. |
| 7,474,896 B2 | 1/2009 | Mohi et al. |
| 7,474,959 B2 | 1/2009 | Singh |
| 7,475,057 B1 | 1/2009 | Obradovich |
| 7,475,059 B2 | 1/2009 | Irle et al. |
| 7,477,694 B2 | 1/2009 | Sanderford, Jr. et al. |
| 7,477,873 B2 | 1/2009 | Tanaka et al. |
| 7,477,903 B2 | 1/2009 | Wilcock et al. |
| 7,477,904 B2 | 1/2009 | Evans et al. |
| 7,477,906 B2 | 1/2009 | Radic et al. |
| 7,478,055 B2 | 1/2009 | Goino |
| 7,478,078 B2 | 1/2009 | Lunt et al. |
| 7,479,899 B2 | 1/2009 | Horstemeyer |
| 7,479,983 B2 | 1/2009 | Fisher et al. |
| 7,480,566 B2 | 1/2009 | Laverty |
| 7,480,567 B2 | 1/2009 | Suomela et al. |
| 7,483,944 B2 | 1/2009 | Parupudi et al. |
| 7,483,946 B2 | 1/2009 | Boyd |
| 7,484,176 B2 | 1/2009 | Blattner et al. |
| 7,486,958 B2 | 2/2009 | Sheha et al. |
| 7,487,112 B2 | 2/2009 | Barnes, Jr. |
| 7,487,148 B2 | 2/2009 | James |
| 7,489,938 B2 | 2/2009 | Flynn et al. |
| 7,490,056 B2 | 2/2009 | Nash |
| 7,490,144 B2 | 2/2009 | Carlson et al. |
| 7,493,276 B2 | 2/2009 | Adams et al. |
| 7,493,363 B2 | 2/2009 | Huitema et al. |
| 7,496,082 B2 | 2/2009 | Lee |
| 7,496,347 B2 | 2/2009 | Puranik |
| 7,496,633 B2 | 2/2009 | Szeto et al. |
| 7,496,648 B2 | 2/2009 | Manion et al. |
| 7,499,714 B2 | 3/2009 | Ki |
| 7,502,133 B2 | 3/2009 | Fukunaga et al. |
| 7,502,610 B2 | 3/2009 | Maher |
| 7,503,074 B2 | 3/2009 | Dublish et al. |
| 7,505,757 B2 | 3/2009 | Rowitch et al. |
| 7,509,422 B2 | 3/2009 | Jaffray et al. |
| 7,512,407 B2 | 3/2009 | Wu et al. |
| 7,512,544 B2 | 3/2009 | Carter et al. |
| 7,519,372 B2 | 4/2009 | MacDonald et al. |
| 7,519,548 B2 | 4/2009 | Hanechak et al. |
| 7,519,703 B1 | 4/2009 | Stuart et al. |
| 7,522,627 B2 | 4/2009 | Lam et al. |
| 7,522,911 B2 | 4/2009 | Ung et al. |
| 7,522,995 B2 | 4/2009 | Nortrup |
| 7,523,191 B1 | 4/2009 | Thomas et al. |
| 7,525,484 B2 | 4/2009 | Dupray et al. |
| 7,525,955 B2 | 4/2009 | Velez-Rivera et al. |
| 7,526,306 B2 | 4/2009 | Brems et al. |
| 7,529,556 B2 | 5/2009 | Dunko et al. |
| 7,529,557 B2 | 5/2009 | Farrill |
| 7,529,617 B2 | 5/2009 | Ono et al. |
| 7,529,723 B2 | 5/2009 | Howard et al. |
| 7,532,809 B2 | 5/2009 | Boston et al. |
| 7,532,878 B2 | 5/2009 | Hagebarth |
| 7,532,899 B2 | 5/2009 | Wilson et al. |
| 7,536,256 B2 | 5/2009 | Kelley et al. |
| 7,536,437 B2 | 5/2009 | Zmolek |
| 7,538,745 B2 | 5/2009 | Borovoy et al. |
| 7,541,977 B2 | 6/2009 | Ali et al. |
| 7,545,784 B2 | 6/2009 | Mgrdechian et al. |
| 7,545,916 B2 | 6/2009 | Schwartz |
| 7,546,127 B2 | 6/2009 | Caspi et al. |
| 7,546,465 B2 | 6/2009 | Kent et al. |
| 7,551,733 B2 | 6/2009 | Denny et al. |
| 7,558,578 B1 | 7/2009 | De Beer |
| 7,558,584 B2 | 7/2009 | Yamamoto et al. |
| 7,558,696 B2 | 7/2009 | Vilppula et al. |
| 7,561,028 B2 | 7/2009 | Harvey |
| 7,561,069 B2 | 7/2009 | Horstemeyer |
| 7,564,348 B2 | 7/2009 | Staton et al. |
| 7,565,131 B2 | 7/2009 | Rollender |
| 7,565,153 B2 | 7/2009 | Alcock et al. |
| 7,565,155 B2 | 7/2009 | Sheha et al. |
| 7,568,025 B2 | 7/2009 | Vasudeva |
| 7,568,203 B2 | 7/2009 | Dotan et al. |
| 7,570,668 B2 | 8/2009 | Mettala et al. |
| 7,570,958 B2 | 8/2009 | Krasner et al. |
| 7,571,207 B2 | 8/2009 | Yoshizawa et al. |
| 7,573,825 B2 | 8/2009 | Iffland |
| 7,573,843 B2 | 8/2009 | Koss |
| 7,573,904 B2 | 8/2009 | Pichna et al. |
| 7,573,982 B2 | 8/2009 | Breen et al. |
| 7,574,222 B2 | 8/2009 | Sawada et al. |
| 7,577,131 B2 | 8/2009 | Joseph et al. |
| 7,577,448 B2 | 8/2009 | Pande et al. |
| 7,577,747 B2 | 8/2009 | Banet et al. |
| 7,580,384 B2 | 8/2009 | Kubler et al. |
| 7,580,405 B2 | 8/2009 | Laliberte |
| 7,584,114 B2 | 9/2009 | Estrada et al. |
| 7,586,861 B2 | 9/2009 | Kubler et al. |
| 7,587,345 B2 | 9/2009 | Mann et al. |
| 7,590,589 B2 | 9/2009 | Hoffberg |
| 7,593,605 B2 | 9/2009 | King et al. |
| 7,593,718 B2 | 9/2009 | Gorday et al. |
| 7,596,102 B2 | 9/2009 | Forbes et al. |
| 7,596,625 B2 | 9/2009 | Manion et al. |
| 7,599,580 B2 | 10/2009 | King et al. |
| 7,599,790 B2 | 10/2009 | Rasmussen et al. |
| 7,599,983 B2 | 10/2009 | Harper et al. |
| 7,603,112 B2 | 10/2009 | Huomo et al. |
| 7,603,229 B2 | 10/2009 | Goldberg et al. |
| 7,606,416 B2 | 10/2009 | Han et al. |
| 7,606,555 B2 | 10/2009 | Walsh et al. |
| 7,606,577 B2 | 10/2009 | Caspi et al. |
| 7,606,663 B2 | 10/2009 | Neef et al. |
| 7,606,687 B2 | 10/2009 | Galbreath et al. |
| 7,606,741 B2 | 10/2009 | King et al. |
| 7,610,145 B2 | 10/2009 | Kantarjiev et al. |
| 7,613,634 B2 | 11/2009 | Siegel et al. |
| 7,613,812 B2 | 11/2009 | Manion et al. |
| 7,617,128 B2 | 11/2009 | Greak |

(56) References Cited

U.S. PATENT DOCUMENTS

| | | |
|---|---|---|
| 7,617,176 B2 | 11/2009 | Zeng et al. |
| 7,617,287 B2 | 11/2009 | Vella et al. |
| 7,620,404 B2 | 11/2009 | Chesnais et al. |
| 7,620,621 B2 | 11/2009 | Fuselier et al. |
| 7,623,848 B2 | 11/2009 | Rosenfelt et al. |
| 7,623,860 B2 | 11/2009 | Hurst |
| 7,623,871 B2 | 11/2009 | Sheynblat |
| 7,623,966 B2 | 11/2009 | Butler, Jr. |
| 7,627,422 B2 | 12/2009 | Adamczyk et al. |
| 7,627,425 B2 | 12/2009 | Salmre et al. |
| 7,627,498 B1 | 12/2009 | Walker et al. |
| 7,630,986 B1 | 12/2009 | Herz et al. |
| 7,636,755 B2 | 12/2009 | Blattner et al. |
| 7,640,009 B2 | 12/2009 | Belkin et al. |
| 7,640,300 B2 | 12/2009 | Wohlgemuth et al. |
| 7,643,834 B2 | 1/2010 | Ioppe et al. |
| 7,644,144 B1 | 1/2010 | Horvitz et al. |
| 7,644,166 B2 | 1/2010 | Appelman et al. |
| 7,649,872 B2 | 1/2010 | Naghian et al. |
| 7,650,142 B2 | 1/2010 | Longman et al. |
| 7,653,574 B2 | 1/2010 | Harper et al. |
| 7,657,079 B2 | 2/2010 | Lake et al. |
| 7,663,502 B2 | 2/2010 | Breed |
| 7,664,233 B1 | 2/2010 | Kirchmeier et al. |
| 7,664,509 B2 | 2/2010 | Zellner et al. |
| 7,668,649 B2 | 2/2010 | Onishi |
| 7,668,765 B2 | 2/2010 | Tanaka et al. |
| 7,668,832 B2 | 2/2010 | Yeh et al. |
| 7,668,864 B2 | 2/2010 | Benson et al. |
| 7,670,263 B2 | 3/2010 | Ellis et al. |
| 7,672,439 B2 | 3/2010 | Appelman et al. |
| 7,672,440 B2 | 3/2010 | Chen et al. |
| 7,672,639 B2 | 3/2010 | Vaddiparty et al. |
| 7,672,677 B2 | 3/2010 | Howard et al. |
| 7,675,889 B2 | 3/2010 | Nakao et al. |
| 7,676,534 B2 | 3/2010 | Murakami et al. |
| 7,680,340 B2 | 3/2010 | Luo et al. |
| 7,680,796 B2 | 3/2010 | Yeh et al. |
| 7,680,942 B2 | 3/2010 | Tu et al. |
| 7,685,279 B2 | 3/2010 | Miltonberger et al. |
| 7,688,211 B2 | 3/2010 | Borovoy et al. |
| 7,688,260 B2 | 3/2010 | Pomerantz et al. |
| 7,688,811 B2 | 3/2010 | Kubler et al. |
| 7,689,448 B2 | 3/2010 | Fu et al. |
| 7,693,752 B2 | 4/2010 | Jaramillo |
| 7,693,944 B2 | 4/2010 | Appelman et al. |
| 7,696,905 B2 | 4/2010 | Ellenby et al. |
| 7,698,228 B2 | 4/2010 | Gailey et al. |
| 7,702,728 B2 | 4/2010 | Zaner et al. |
| 7,702,739 B1 | 4/2010 | Cheng et al. |
| 7,706,516 B2 | 4/2010 | Seligmann |
| 7,706,970 B2 | 4/2010 | Inoue |
| 7,706,977 B2 | 4/2010 | Soehren |
| 7,707,109 B2 | 4/2010 | Odijk et al. |
| 7,707,122 B2 | 4/2010 | Hull et al. |
| 7,707,262 B1 | 4/2010 | Bill |
| 7,711,002 B2 | 5/2010 | Mukherjee et al. |
| 7,711,604 B1 | 5/2010 | Walker et al. |
| 7,714,712 B2 | 5/2010 | Emigh et al. |
| 7,714,778 B2 | 5/2010 | Dupray |
| 7,716,287 B2 | 5/2010 | Appelman et al. |
| 7,716,585 B2 | 5/2010 | Glass |
| 7,717,866 B2 | 5/2010 | Damen |
| 7,721,084 B2 | 5/2010 | Salminen et al. |
| 7,724,743 B2 | 5/2010 | Razdan et al. |
| 7,725,550 B2 | 5/2010 | Choi |
| 7,730,129 B2 | 5/2010 | Wang et al. |
| 7,728,724 B1 | 6/2010 | Scalisi et al. |
| 7,729,691 B2 | 6/2010 | Newville |
| 7,730,012 B2 | 6/2010 | Arrouye et al. |
| 7,730,014 B2 | 6/2010 | Hartenstein et al. |
| 7,730,063 B2 | 6/2010 | Eder |
| 7,730,389 B2 | 6/2010 | Rasmussen et al. |
| 7,738,896 B2 | 6/2010 | Patel et al. |
| 7,743,074 B1 | 6/2010 | Parupudi et al. |
| 7,747,258 B2 | 6/2010 | Farmer |
| 7,747,719 B1 | 6/2010 | Horvitz et al. |
| 7,756,253 B2 | 7/2010 | Breen et al. |
| 7,756,537 B2 | 7/2010 | Laurila et al. |
| 7,756,639 B2 | 7/2010 | Colley et al. |
| 7,761,309 B2 | 7/2010 | Sacco et al. |
| 7,764,231 B1 | 7/2010 | Karr et al. |
| 7,764,944 B2 | 7/2010 | Rollender |
| 7,764,950 B2 | 7/2010 | Patel et al. |
| 7,764,961 B2 | 7/2010 | Zhu et al. |
| 7,765,206 B2 | 7/2010 | Hillis et al. |
| 7,769,409 B2 | 8/2010 | Harris et al. |
| 7,769,975 B2 | 8/2010 | Ripberger |
| 7,774,158 B2 | 8/2010 | Domingues Goncalves et al. |
| 7,774,418 B2 | 8/2010 | Tang et al. |
| 7,774,453 B2 | 8/2010 | Babu et al. |
| 7,783,297 B2 | 8/2010 | Ishii |
| 7,784,684 B2 | 8/2010 | Labrou et al. |
| 7,787,896 B2 | 8/2010 | Kundu et al. |
| 7,788,260 B2 | 8/2010 | Lunt et al. |
| 7,792,273 B2 | 9/2010 | Fano et al. |
| 7,793,316 B2 | 9/2010 | Mears et al. |
| 7,797,204 B2 | 9/2010 | Balent |
| 7,797,367 B1 | 9/2010 | Gelvin et al. |
| 7,801,953 B1 | 9/2010 | Denman et al. |
| 7,802,724 B1 | 9/2010 | Nohr |
| RE41,899 E | 10/2010 | Rose et al. |
| 7,812,766 B2 | 10/2010 | Leblanc et al. |
| 7,813,722 B2 | 10/2010 | Patel et al. |
| 7,813,741 B2 | 10/2010 | Hendrey et al. |
| 7,813,873 B2 | 10/2010 | Smartt et al. |
| 7,814,502 B2 | 10/2010 | Blomqvist et al. |
| 7,818,317 B1 | 10/2010 | Emigh et al. |
| 7,822,425 B2 | 10/2010 | Shim et al. |
| 7,822,426 B1 | 10/2010 | Wuersch |
| 7,827,176 B2 | 11/2010 | Korte et al. |
| 7,827,279 B2 | 11/2010 | Xu et al. |
| 7,828,655 B2 | 11/2010 | Uhlir et al. |
| 7,831,668 B2 | 11/2010 | Deeds |
| 7,840,224 B2 | 11/2010 | Vengroff et al. |
| 7,840,681 B2 | 11/2010 | Acharya et al. |
| 7,840,699 B2 | 11/2010 | Fujita et al. |
| 7,844,055 B2 | 11/2010 | Mukherjee et al. |
| 7,844,132 B2 | 11/2010 | Boese et al. |
| 7,844,254 B2 | 11/2010 | Arnold et al. |
| 7,844,687 B1 | 11/2010 | Gelvin et al. |
| 7,848,760 B2 | 12/2010 | Caspi et al. |
| 7,848,761 B2 | 12/2010 | Caspi et al. |
| 7,848,948 B2 | 12/2010 | Perkowski et al. |
| 7,853,268 B2 | 12/2010 | Karaoguz et al. |
| 7,853,272 B2 | 12/2010 | Tipnis et al. |
| 7,856,311 B2 | 12/2010 | Matsuura et al. |
| 7,860,519 B2 | 12/2010 | Portman et al. |
| 7,869,816 B2 | 1/2011 | Merheb et al. |
| 7,870,240 B1 | 1/2011 | Horvitz |
| 7,873,639 B2 | 1/2011 | Shipman |
| 7,877,275 B2 | 1/2011 | Ball |
| 7,885,898 B2 | 2/2011 | Narayanaswami et al. |
| 7,893,826 B2 | 2/2011 | Stenlund |
| 7,895,263 B1 | 2/2011 | Kirchmeier et al. |
| 7,899,473 B2 | 3/2011 | Pohutsky et al. |
| 7,899,682 B2 | 3/2011 | Sacco et al. |
| 7,900,039 B2 | 3/2011 | Shim et al. |
| 7,904,244 B2 | 3/2011 | Sugla |
| 7,904,511 B2 | 3/2011 | Ryan et al. |
| 7,908,629 B2 | 3/2011 | Lewis |
| 7,917,153 B2 | 3/2011 | Orwant et al. |
| 7,917,157 B2 | 3/2011 | Muhonen |
| 7,917,414 B2 | 3/2011 | Nathanson |
| 7,920,871 B2 | 4/2011 | Okuda |
| 7,929,010 B2 | 4/2011 | Narasimhan |
| 7,930,342 B2 | 4/2011 | Mattila et al. |
| 7,937,066 B2 | 5/2011 | Kaltsukis |
| 7,940,746 B2 | 5/2011 | Livingood |
| 7,941,161 B2 | 5/2011 | Ioppe et al. |
| 7,941,162 B2 | 5/2011 | Ioppe et al. |
| 7,944,909 B2 | 5/2011 | James |
| 7,945,276 B2 | 5/2011 | Pedersen |
| 7,945,494 B2 | 5/2011 | Williams |

(56) References Cited

U.S. PATENT DOCUMENTS

| | | |
|---|---|---|
| 7,958,457 B1 | 6/2011 | Brandenberg et al. |
| 7,962,363 B2 | 6/2011 | Patel et al. |
| 7,967,678 B2 | 6/2011 | Dougherty et al. |
| 7,969,306 B2 | 6/2011 | Ebert et al. |
| 7,970,749 B2 | 6/2011 | Uhlir et al. |
| 7,974,388 B2 | 7/2011 | Sadot |
| 7,974,868 B2 | 7/2011 | Tseng et al. |
| 7,983,226 B2 | 7/2011 | Oommen et al. |
| 7,983,398 B2 | 7/2011 | Spiridellis |
| 7,983,419 B2 | 7/2011 | Fan et al. |
| 7,983,947 B2 | 7/2011 | Kaiwa et al. |
| 7,995,998 B2 | 8/2011 | Wright et al. |
| 7,996,025 B2 | 8/2011 | Lee |
| 7,996,465 B2 | 8/2011 | Cromp et al. |
| 8,000,724 B1 | 8/2011 | Rayburn et al. |
| 8,010,100 B2 | 8/2011 | Kushwaha et al. |
| RE42,738 E | 9/2011 | Williams |
| 8,019,355 B2 | 9/2011 | Shim |
| 8,019,630 B2 | 9/2011 | Dale |
| 8,023,958 B2 | 9/2011 | Wang et al. |
| 8,027,333 B2 | 9/2011 | Grabelsky et al. |
| 8,027,691 B2 | 9/2011 | Bemas et al. |
| 8,032,108 B2 | 10/2011 | Kuz et al. |
| 8,032,149 B2 | 10/2011 | Kennedy et al. |
| 8,043,159 B2 | 10/2011 | Bae et al. |
| 8,046,000 B2 | 10/2011 | Sylvain |
| RE42,927 E | 11/2011 | Want et al. |
| 8,065,235 B2 | 11/2011 | Narayanaswami et al. |
| 8,073,895 B2 | 12/2011 | Hamzeh et al. |
| 8,078,189 B2 | 12/2011 | Chang et al. |
| 8,126,889 B2 | 2/2012 | Pitt |
| 8,140,658 B1 | 3/2012 | Gelvin et al. |
| 8,150,617 B2 | 4/2012 | Manber et al. |
| 8,150,925 B2 | 4/2012 | Zimmers et al. |
| 8,171,516 B2 | 5/2012 | Tischer |
| 8,280,624 B2 | 10/2012 | Riise et al. |
| 8,312,083 B2 | 11/2012 | Ahn et al. |
| 8,316,234 B2 | 11/2012 | Huberman et al. |
| 8,370,054 B2 | 2/2013 | Crady et al. |
| 8,375,334 B2 | 2/2013 | Nakano et al. |
| 8,417,763 B2 | 4/2013 | Stewart |
| 8,706,542 B2 | 4/2014 | O'Meara et al. |
| 8,971,913 B2 | 3/2015 | Moeglein et al. |
| 9,026,454 B2 | 5/2015 | Hinrichs et al. |
| 9,137,771 B2 | 9/2015 | Wrappe |
| 9,198,153 B2 | 11/2015 | Kraufvelin et al. |
| 9,360,990 B1 | 6/2016 | Emigh et al. |
| 2001/0011247 A1 | 8/2001 | O'Flaherty et al. |
| 2001/0026221 A1 | 10/2001 | Toyota |
| 2001/0029465 A1 | 10/2001 | Strisower |
| 2001/0033286 A1 | 10/2001 | Stokes et al. |
| 2001/0040886 A1 | 11/2001 | Jimenez et al. |
| 2001/0041021 A1 | 11/2001 | Boyle et al. |
| 2001/0044310 A1 | 11/2001 | Lincke |
| 2001/0044321 A1 | 11/2001 | Ausems et al. |
| 2001/0048364 A1 | 12/2001 | Kalthoff et al. |
| 2001/0049274 A1 | 12/2001 | Degraeve |
| 2001/0049671 A1 | 12/2001 | Joerg |
| 2001/0055976 A1 | 12/2001 | Crouch et al. |
| 2001/0056363 A1 | 12/2001 | Gantz et al. |
| 2002/0000930 A1 | 1/2002 | Crowson et al. |
| 2002/0002504 A1 | 1/2002 | Engel et al. |
| 2002/0002899 A1 | 1/2002 | Gjerdingen et al. |
| 2002/0003470 A1 | 1/2002 | Auerbach |
| 2002/0016197 A1 | 2/2002 | Candelaria |
| 2002/0019829 A1 | 2/2002 | Shapiro |
| 2002/0022993 A1 | 2/2002 | Miller et al. |
| 2002/0026289 A1 | 2/2002 | Kuzunuki et al. |
| 2002/0030665 A1 | 3/2002 | Ano |
| 2002/0034292 A1 | 3/2002 | Tuoriniemi et al. |
| 2002/0035493 A1 | 3/2002 | Mozayeny et al. |
| 2002/0035609 A1 | 3/2002 | Lessard et al. |
| 2002/0036122 A1 | 3/2002 | Fayette et al. |
| 2002/0037735 A1 | 3/2002 | Maggenti et al. |
| 2002/0042266 A1 | 4/2002 | Heyward et al. |
| 2002/0046069 A1 | 4/2002 | Mozayeny et al. |
| 2002/0046077 A1 | 4/2002 | Mozayeny et al. |
| 2002/0046084 A1 | 4/2002 | Steele et al. |
| 2002/0046232 A1 | 4/2002 | Adams et al. |
| 2002/0052214 A1 | 5/2002 | Maggenti et al. |
| 2002/0052751 A1 | 5/2002 | Ebata |
| 2002/0052786 A1 | 5/2002 | Kim et al. |
| 2002/0054174 A1 | 5/2002 | Abbott et al. |
| 2002/0055373 A1 | 5/2002 | King et al. |
| 2002/0055924 A1 | 5/2002 | Liming |
| 2002/0055926 A1 | 5/2002 | Dan et al. |
| 2002/0055992 A1 | 5/2002 | King et al. |
| 2002/0059246 A1 | 5/2002 | Rowe |
| 2002/0061760 A1 | 5/2002 | Maggenti et al. |
| 2002/0068587 A1 | 6/2002 | Chapman |
| 2002/0077119 A1 | 6/2002 | Fitch et al. |
| 2002/0077144 A1 | 6/2002 | Keller et al. |
| 2002/0077871 A1 | 6/2002 | Udelhoven et al. |
| 2002/0077897 A1 | 6/2002 | Zellner et al. |
| 2002/0077905 A1 | 6/2002 | Arndt et al. |
| 2002/0080025 A1 | 6/2002 | Beattie |
| 2002/0091568 A1 | 7/2002 | Kraft et al. |
| 2002/0091991 A1 | 7/2002 | Castro |
| 2002/0094787 A1 | 7/2002 | Avnet et al. |
| 2002/0095326 A1 | 7/2002 | Katz |
| 2002/0098832 A1 | 7/2002 | Fleischer et al. |
| 2002/0099769 A1 | 7/2002 | Yasui et al. |
| 2002/0102989 A1 | 8/2002 | Calvert et al. |
| 2002/0103792 A1 | 8/2002 | Blank et al. |
| 2002/0103936 A1 | 8/2002 | Jano et al. |
| 2002/0111154 A1 | 8/2002 | Eldering et al. |
| 2002/0111172 A1 | 8/2002 | DeWolf et al. |
| 2002/0112047 A1 | 8/2002 | Kushwaha et al. |
| 2002/0112237 A1 | 8/2002 | Kelts |
| 2002/0115453 A1 | 8/2002 | Poulin et al. |
| 2002/0116336 A1 | 8/2002 | Diacakis et al. |
| 2002/0123327 A1 | 9/2002 | Vataja |
| 2002/0126146 A1 | 9/2002 | Burns et al. |
| 2002/0126656 A1 | 9/2002 | Park |
| 2002/0127530 A1 | 9/2002 | Weakly |
| 2002/0128773 A1 | 9/2002 | Chowanic et al. |
| 2002/0140560 A1 | 10/2002 | Altman et al. |
| 2002/0141560 A1 | 10/2002 | Khayatan et al. |
| 2002/0154213 A1 | 10/2002 | Sibyama et al. |
| 2002/0160815 A1 | 10/2002 | Patel et al. |
| 2002/0161633 A1 | 10/2002 | Jacob et al. |
| 2002/0164993 A1 | 11/2002 | Elliot |
| 2002/0164996 A1 | 11/2002 | Dorenbosch |
| 2002/0164998 A1 | 11/2002 | Younis |
| 2002/0165771 A1 | 11/2002 | Walker et al. |
| 2002/0165773 A1 | 11/2002 | Natsuno et al. |
| 2002/0167442 A1 | 11/2002 | Taylor |
| 2002/0169539 A1 | 11/2002 | Menard et al. |
| 2002/0173905 A1 | 11/2002 | Jin et al. |
| 2002/0173978 A1 | 11/2002 | Boies et al. |
| 2002/0177449 A1 | 11/2002 | McDonnell et al. |
| 2002/0178088 A1 | 11/2002 | Lurie et al. |
| 2002/0183059 A1 | 12/2002 | Noreen et al. |
| 2002/0183072 A1 | 12/2002 | Steinbach et al. |
| 2002/0184653 A1 | 12/2002 | Pierce et al. |
| 2002/0186164 A1 | 12/2002 | Hsu et al. |
| 2002/0191595 A1 | 12/2002 | Mar et al. |
| 2002/0193091 A1 | 12/2002 | Zmarthie |
| 2003/0003933 A1 | 1/2003 | Deshpande et al. |
| 2003/0004743 A1 | 1/2003 | Callegari |
| 2003/0008665 A1 | 1/2003 | Abraham |
| 2003/0012344 A1 | 1/2003 | Agarwal et al. |
| 2003/0013449 A1 | 1/2003 | Hose et al. |
| 2003/0013461 A1 | 1/2003 | Mizune et al. |
| 2003/0018521 A1 | 1/2003 | Kraft et al. |
| 2003/0022675 A1 | 1/2003 | Mergler |
| 2003/0023586 A1 | 1/2003 | Knorr |
| 2003/0032404 A1 | 2/2003 | Wager et al. |
| 2003/0033582 A1 | 2/2003 | Klein et al. |
| 2003/0035567 A1 | 2/2003 | Chang et al. |
| 2003/0037110 A1 | 2/2003 | Yamamoto |
| 2003/0040272 A1 | 2/2003 | Lelievre et al. |
| 2003/0040944 A1 | 2/2003 | Hileman |
| 2003/0054830 A1 | 3/2003 | Williams et al. |

(56) References Cited

U.S. PATENT DOCUMENTS

| | | |
|---|---|---|
| 2003/0055560 A1 | 3/2003 | Phillips |
| 2003/0055665 A1 | 3/2003 | Fleming |
| 2003/0055983 A1 | 3/2003 | Callegari |
| 2003/0056218 A1 | 3/2003 | Wingard et al. |
| 2003/0060213 A1 | 3/2003 | Heinonen et al. |
| 2003/0060215 A1 | 3/2003 | Graham |
| 2003/0060976 A1 | 3/2003 | Sato et al. |
| 2003/0061206 A1 | 3/2003 | Qian |
| 2003/0061211 A1 | 3/2003 | Shultz et al. |
| 2003/0064705 A1 | 4/2003 | Desiderio |
| 2003/0065556 A1 | 4/2003 | Takanashi et al. |
| 2003/0065788 A1 | 4/2003 | Salomaki |
| 2003/0065934 A1 | 4/2003 | Angelo et al. |
| 2003/0069683 A1 | 4/2003 | Lapidot et al. |
| 2003/0069692 A1 | 4/2003 | Krasner et al. |
| 2003/0074136 A1 | 4/2003 | Hancock et al. |
| 2003/0078064 A1 | 4/2003 | Chan |
| 2003/0078886 A1 | 4/2003 | Minear et al. |
| 2003/0087647 A1 | 5/2003 | Hurst |
| 2003/0087648 A1 | 5/2003 | Mezhvinsky et al. |
| 2003/0096621 A1 | 5/2003 | Jana et al. |
| 2003/0096625 A1 | 5/2003 | Lee et al. |
| 2003/0096628 A1 | 5/2003 | Bar-On et al. |
| 2003/0097468 A1 | 5/2003 | Hamadi |
| 2003/0100316 A1 | 5/2003 | Odamura |
| 2003/0100320 A1 | 5/2003 | Ranjan |
| 2003/0100326 A1* | 5/2003 | Grube .................. H04W 84/08 455/515 |
| 2003/0100334 A1 | 5/2003 | Mazzara, Jr. |
| 2003/0101225 A1 | 5/2003 | Han et al. |
| 2003/0101341 A1 | 5/2003 | Kettler, III et al. |
| 2003/0101450 A1 | 5/2003 | Davidsson et al. |
| 2003/0104782 A1 | 6/2003 | Wong et al. |
| 2003/0109245 A1 | 6/2003 | McCalmont et al. |
| 2003/0109988 A1 | 6/2003 | Geissler et al. |
| 2003/0117316 A1 | 6/2003 | Tischer et al. |
| 2003/0119528 A1 | 6/2003 | Pew et al. |
| 2003/0120526 A1 | 6/2003 | Rajkamikar et al. |
| 2003/0125963 A1 | 7/2003 | Haken |
| 2003/0126150 A1 | 7/2003 | Chan |
| 2003/0134648 A1 | 7/2003 | Reed |
| 2003/0137435 A1 | 7/2003 | Haddad et al. |
| 2003/0144009 A1 | 7/2003 | Nowlin |
| 2003/0148774 A1 | 8/2003 | Naghian et al. |
| 2003/0149527 A1 | 8/2003 | Sikila |
| 2003/0153340 A1 | 8/2003 | Crockett et al. |
| 2003/0153341 A1 | 8/2003 | Crockett et al. |
| 2003/0153343 A1 | 8/2003 | Crockett et al. |
| 2003/0154126 A1 | 8/2003 | Gehlot et al. |
| 2003/0163287 A1 | 8/2003 | Vock et al. |
| 2003/0177058 A1 | 9/2003 | Needham |
| 2003/0185357 A1 | 10/2003 | Kaghazian |
| 2003/0191682 A1 | 10/2003 | Shepard et al. |
| 2003/0196105 A1 | 10/2003 | Fineberg |
| 2003/0200128 A1 | 10/2003 | Doherty |
| 2003/0200192 A1 | 10/2003 | Bell et al. |
| 2003/0210265 A1 | 11/2003 | Haimberg |
| 2003/0216960 A1 | 11/2003 | Postrel |
| 2003/0217150 A1 | 11/2003 | Roese et al. |
| 2003/0218539 A1 | 11/2003 | Hight |
| 2003/0220835 A1 | 11/2003 | Barnes, Jr. |
| 2003/0223381 A1 | 12/2003 | Schroderus |
| 2004/0002359 A1 | 1/2004 | Deas et al. |
| 2004/0010358 A1 | 1/2004 | Oesterling et al. |
| 2004/0010489 A1 | 1/2004 | Rio |
| 2004/0019584 A1 | 1/2004 | Greening et al. |
| 2004/0021567 A1 | 2/2004 | Dunn |
| 2004/0036649 A1 | 2/2004 | Taylor |
| 2004/0039527 A1 | 2/2004 | McDonald, Jr. et al. |
| 2004/0044574 A1 | 3/2004 | Cochran et al. |
| 2004/0044623 A1 | 3/2004 | Wake et al. |
| 2004/0044674 A1 | 3/2004 | Mohammadioun et al. |
| 2004/0049424 A1 | 3/2004 | Murray et al. |
| 2004/0068439 A1 | 4/2004 | Elgrably |
| 2004/0068724 A1 | 4/2004 | Gardner, III et al. |
| 2004/0072583 A1 | 4/2004 | Weng |
| 2004/0073361 A1 | 4/2004 | Tzamaloukas et al. |
| 2004/0083050 A1 | 4/2004 | Biyani |
| 2004/0215516 A1 | 4/2004 | Morgan et al. |
| 2004/0093280 A1 | 5/2004 | Yamaguchi |
| 2004/0102201 A1 | 5/2004 | Levin |
| 2004/0103182 A1 | 5/2004 | Krabel et al. |
| 2004/0106415 A1 | 6/2004 | Maeda et al. |
| 2004/0112959 A1 | 6/2004 | Jun |
| 2004/0121756 A1 | 6/2004 | Griffin et al. |
| 2004/0127231 A1 | 7/2004 | Dor et al. |
| 2004/0139049 A1 | 7/2004 | Hancock et al. |
| 2004/0139470 A1 | 7/2004 | Treharne |
| 2004/0158483 A1 | 8/2004 | Lecouturier |
| 2004/0158584 A1 | 8/2004 | Necsoiu et al. |
| 2004/0162068 A1 | 8/2004 | Lamb et al. |
| 2004/0162844 A1 | 8/2004 | Thome et al. |
| 2004/0172403 A1 | 9/2004 | Steele et al. |
| 2004/0176907 A1 | 9/2004 | Nesbitt |
| 2004/0177109 A1 | 9/2004 | Lee |
| 2004/0181807 A1 | 9/2004 | Theiste et al. |
| 2004/0186854 A1 | 9/2004 | Choi |
| 2004/0192349 A1 | 9/2004 | Reilly |
| 2004/0192351 A1 | 9/2004 | Duncan |
| 2004/0198315 A1 | 10/2004 | Vellotti |
| 2004/0198332 A1 | 10/2004 | Lundsgaard |
| 2004/0198374 A1 | 10/2004 | Bajikar |
| 2004/0198379 A1 | 10/2004 | Magee et al. |
| 2004/0198386 A1 | 10/2004 | Dupray |
| 2004/0198397 A1 | 10/2004 | Weiss |
| 2004/0203630 A1 | 10/2004 | Wang |
| 2004/0203746 A1 | 10/2004 | Knauerhase et al. |
| 2004/0203845 A1 | 10/2004 | Lal |
| 2004/0203847 A1 | 10/2004 | Knauerhase et al. |
| 2004/0203854 A1 | 10/2004 | Nowak |
| 2004/0203890 A1 | 10/2004 | Karaoguz et al. |
| 2004/0203909 A1 | 10/2004 | Koster |
| 2004/0203923 A1 | 10/2004 | Mullen |
| 2004/0204842 A1 | 10/2004 | Shinozaki |
| 2004/0205151 A1 | 10/2004 | Sprigg et al. |
| 2004/0219933 A1 | 11/2004 | Faith |
| 2004/0225544 A1 | 11/2004 | Camer |
| 2004/0235493 A1 | 11/2004 | Ekerborn |
| 2004/0236501 A1* | 11/2004 | Hirose .................. G08G 1/202 701/422 |
| 2004/0236504 A1 | 11/2004 | Bickford et al. |
| 2004/0242149 A1 | 12/2004 | Luneau |
| 2004/0243307 A1 | 12/2004 | Geelen |
| 2004/0248586 A1 | 12/2004 | Patel et al. |
| 2004/0250212 A1 | 12/2004 | Fish |
| 2004/0253964 A1 | 12/2004 | Zhu et al. |
| 2004/0254811 A1 | 12/2004 | Horstemeyer |
| 2004/0259641 A1 | 12/2004 | Ho |
| 2004/0260470 A1 | 12/2004 | Rast |
| 2004/0267445 A1 | 12/2004 | De Luca et al. |
| 2005/0002419 A1 | 1/2005 | Doviak et al. |
| 2005/0009536 A1 | 1/2005 | Ito et al. |
| 2005/0015197 A1 | 1/2005 | Ohtsuji et al. |
| 2005/0027666 A1 | 2/2005 | Beck, Jr. et al. |
| 2005/0028034 A1 | 2/2005 | Gantman et al. |
| 2005/0032527 A1 | 2/2005 | Sheha et al. |
| 2005/0038696 A1 | 2/2005 | Kalevik et al. |
| 2005/0039140 A1 | 2/2005 | Chen |
| 2005/0039178 A1 | 2/2005 | Marolia et al. |
| 2005/0041578 A1 | 2/2005 | Huotari et al. |
| 2005/0043036 A1 | 2/2005 | Ioppe et al. |
| 2005/0043042 A1 | 2/2005 | Eisner et al. |
| 2005/0048948 A1 | 3/2005 | Holland et al. |
| 2005/0048961 A1 | 3/2005 | Ribaudo et al. |
| 2005/0049789 A1 | 3/2005 | Kelly et al. |
| 2005/0054352 A1 | 3/2005 | Karaizman |
| 2005/0054361 A1 | 3/2005 | Turcanu et al. |
| 2005/0055374 A1 | 3/2005 | Sato |
| 2005/0060162 A1 | 3/2005 | Mohit et al. |
| 2005/0063563 A1 | 3/2005 | Soliman |
| 2005/0065959 A1 | 3/2005 | Smith et al. |
| 2005/0071702 A1 | 3/2005 | Morisawa |
| 2005/0073407 A1 | 4/2005 | Giraldin et al. |
| 2005/0086261 A1 | 4/2005 | Mammone |

(56) References Cited

U.S. PATENT DOCUMENTS

| | | |
|---|---|---|
| 2005/0086467 A1 | 4/2005 | Asokan et al. |
| 2005/0096042 A1 | 5/2005 | Habeman et al. |
| 2005/0096840 A1 | 5/2005 | Simske |
| 2005/0096978 A1 | 5/2005 | Black |
| 2005/0101314 A1 | 5/2005 | Levi |
| 2005/0102098 A1 | 5/2005 | Montealegre et al. |
| 2005/0104976 A1 | 5/2005 | Currans |
| 2005/0108643 A1 | 5/2005 | Schybergson et al. |
| 2005/0112030 A1 | 5/2005 | Gaus |
| 2005/0114014 A1 | 5/2005 | Isaac |
| 2005/0114527 A1 | 5/2005 | Hankey et al. |
| 2005/0116027 A1 | 6/2005 | Algiene et al. |
| 2005/0119927 A1 | 6/2005 | Patel |
| 2005/0120084 A1 | 6/2005 | Hu et al. |
| 2005/0124318 A1 | 6/2005 | Jeon |
| 2005/0125343 A1 | 6/2005 | Mendelovich |
| 2005/0130634 A1 | 6/2005 | Godfrey |
| 2005/0131639 A1 | 6/2005 | Broussard et al. |
| 2005/0131716 A1 | 6/2005 | Vest |
| 2005/0134504 A1 | 6/2005 | Harwood et al. |
| 2005/0134578 A1 | 6/2005 | Chambers et al. |
| 2005/0143094 A1 | 6/2005 | Reed et al. |
| 2005/0144333 A1 | 6/2005 | Kotzin |
| 2005/0149443 A1 | 7/2005 | Torvinen |
| 2005/0153724 A1 | 7/2005 | Vij et al. |
| 2005/0154793 A1 | 7/2005 | Khartabil et al. |
| 2005/0169248 A1 | 8/2005 | Truesdale et al. |
| 2005/0171954 A1 | 8/2005 | Hull et al. |
| 2005/0174242 A1 | 8/2005 | Cohen |
| 2005/0176411 A1 | 8/2005 | Taya et al. |
| 2005/0181803 A1 | 8/2005 | Weaver et al. |
| 2005/0185060 A1 | 8/2005 | Neven et al. |
| 2005/0186954 A1 | 8/2005 | Kenney |
| 2005/0190053 A1 | 9/2005 | Dione |
| 2005/0192851 A1 | 9/2005 | Rangnekar |
| 2005/0192999 A1 | 9/2005 | Cook et al. |
| 2005/0198305 A1 | 9/2005 | Pezaris et al. |
| 2005/0202830 A1 | 9/2005 | Sudit |
| 2005/0202831 A1 | 9/2005 | Sudit |
| 2005/0202832 A1 | 9/2005 | Sudit |
| 2005/0202834 A1 | 9/2005 | Sudit |
| 2005/0203698 A1 | 9/2005 | Lee |
| 2005/0209815 A1 | 9/2005 | Russon et al. |
| 2005/0209995 A1 | 9/2005 | Aksu et al. |
| 2005/0210104 A1 | 9/2005 | Torvinen |
| 2005/0216457 A1 | 9/2005 | Walther et al. |
| 2005/0221843 A1 | 10/2005 | Friedman et al. |
| 2005/0222756 A1 | 10/2005 | Davis et al. |
| 2005/0222905 A1 | 10/2005 | Wills |
| 2005/0222961 A1 | 10/2005 | Staib et al. |
| 2005/0227620 A1 | 10/2005 | Morimoto |
| 2005/0227704 A1 | 10/2005 | Ferra et al. |
| 2005/0227705 A1 | 10/2005 | Rousu et al. |
| 2005/0227712 A1 | 10/2005 | Estevez et al. |
| 2005/0228719 A1 | 10/2005 | Roberts et al. |
| 2005/0228853 A1 | 10/2005 | Yamamura et al. |
| 2005/0228860 A1 | 10/2005 | Hamynen et al. |
| 2005/0232252 A1 | 10/2005 | Hoover |
| 2005/0233776 A1 | 10/2005 | Allen et al. |
| 2005/0234891 A1 | 10/2005 | Walther et al. |
| 2005/0245232 A1 | 11/2005 | Jakober et al. |
| 2005/0250440 A1 | 11/2005 | Zhou et al. |
| 2005/0250516 A1 | 11/2005 | Shim |
| 2005/0255857 A1 | 11/2005 | Kim et al. |
| 2005/0256866 A1 | 11/2005 | Lu |
| 2005/0256867 A1 | 11/2005 | Walther et al. |
| 2005/0259675 A1 | 11/2005 | Tuohino et al. |
| 2005/0261829 A1 | 11/2005 | Furukawa |
| 2005/0262081 A1 | 11/2005 | Newman |
| 2005/0265318 A1 | 12/2005 | Khartabil et al. |
| 2005/0278749 A1 | 12/2005 | Ewert et al. |
| 2005/0282518 A1 | 12/2005 | D'Evelyn et al. |
| 2005/0286421 A1 | 12/2005 | Janacek |
| 2005/0288036 A1 | 12/2005 | Brewer et al. |
| 2005/0289097 A1 | 12/2005 | Trossen et al. |
| 2006/0003804 A1 | 1/2006 | Liu |
| 2006/0004834 A1 | 1/2006 | Pyhalammi et al. |
| 2006/0009238 A1 | 1/2006 | Stanco et al. |
| 2006/0021009 A1 | 1/2006 | Lunt |
| 2006/0023747 A1 | 2/2006 | Koren et al. |
| 2006/0025071 A1 | 2/2006 | Yamazaki et al. |
| 2006/0030339 A1 | 2/2006 | Zhovnirovsky et al. |
| 2006/0030347 A1 | 2/2006 | Biswaas |
| 2006/0035647 A1 | 2/2006 | Eisner et al. |
| 2006/0036680 A1 | 2/2006 | Shim |
| 2006/0040676 A1 | 2/2006 | Chen |
| 2006/0040710 A1 | 2/2006 | Ruetschi et al. |
| 2006/0046761 A1 | 3/2006 | Bishop et al. |
| 2006/0047419 A1 | 3/2006 | Diendorf et al. |
| 2006/0047825 A1 | 3/2006 | Steenstra et al. |
| 2006/0052057 A1 | 3/2006 | Persson et al. |
| 2006/0053048 A1 | 3/2006 | Tandetnik |
| 2006/0053225 A1 | 3/2006 | Poikselka et al. |
| 2006/0058042 A1 | 3/2006 | Shim |
| 2006/0058955 A1 | 3/2006 | Mehren |
| 2006/0059023 A1 | 3/2006 | Mashinsky |
| 2006/0061488 A1 | 3/2006 | Dunton |
| 2006/0064346 A1 | 3/2006 | Steenstra et al. |
| 2006/0068753 A1 | 3/2006 | Karpen et al. |
| 2006/0079249 A1 | 4/2006 | Shim |
| 2006/0080286 A1 | 4/2006 | Svendsen |
| 2006/0085392 A1 | 4/2006 | Wang et al. |
| 2006/0085477 A1 | 4/2006 | Phillips et al. |
| 2006/0094353 A1 | 5/2006 | Nielsen et al. |
| 2006/0111092 A1 | 5/2006 | Harris et al. |
| 2006/0111835 A1 | 5/2006 | Baker et al. |
| 2006/0111944 A1 | 5/2006 | Sirmans, Jr. et al. |
| 2006/0116818 A1 | 6/2006 | Chao et al. |
| 2006/0128411 A1 | 6/2006 | Turcanu |
| 2006/0129438 A1 | 6/2006 | Robinson |
| 2006/0129451 A1 | 6/2006 | Kohanim et al. |
| 2006/0148490 A1 | 7/2006 | Bates et al. |
| 2006/0149606 A1 | 7/2006 | Goan, Jr. et al. |
| 2006/0150119 A1 | 7/2006 | Chesnais et al. |
| 2006/0170956 A1 | 8/2006 | Jung et al. |
| 2006/0174203 A1 | 8/2006 | Jung et al. |
| 2006/0174329 A1 | 8/2006 | Dublish |
| 2006/0179160 A1 | 8/2006 | Uehara et al. |
| 2006/0187227 A1 | 8/2006 | Jung et al. |
| 2006/0187228 A1 | 8/2006 | Jung et al. |
| 2006/0187230 A1 | 8/2006 | Jung et al. |
| 2006/0189337 A1 | 8/2006 | Farrill et al. |
| 2006/0190812 A1 | 8/2006 | Ellenby et al. |
| 2006/0211453 A1 | 9/2006 | Schick |
| 2006/0212558 A1 | 9/2006 | Sahinoja et al. |
| 2006/0212562 A1 | 9/2006 | Kushwaha et al. |
| 2006/0217127 A1 | 9/2006 | Drane et al. |
| 2006/0218175 A1 | 9/2006 | Stuhec |
| 2006/0218181 A1 | 9/2006 | Jeon |
| 2006/0221197 A1 | 10/2006 | Jung et al. |
| 2006/0224662 A1 | 10/2006 | Richardson et al. |
| 2007/0019614 A1 | 1/2007 | Hoffmann |
| 2007/0022011 A1 | 1/2007 | Altberg et al. |
| 2007/0041513 A1 | 2/2007 | Gende |
| 2007/0049288 A1 | 3/2007 | Lamprecht et al. |
| 2007/0121601 A1 | 5/2007 | Kikinis et al. |
| 2007/0202844 A1 | 8/2007 | Wilson et al. |
| 2007/0263560 A1 | 11/2007 | Saarisalo et al. |
| 2007/0276591 A1 | 11/2007 | Lea et al. |
| 2008/0046516 A1 | 2/2008 | Hyoung et al. |
| 2008/0086240 A1 | 4/2008 | Breed |
| 2008/0129528 A1 | 6/2008 | Guthrie |
| 2008/0287116 A1 | 11/2008 | Drane et al. |
| 2009/0019532 A1 | 1/2009 | Jacobsen et al. |
| 2009/0030605 A1 | 1/2009 | Breed |
| 2009/0047973 A1 | 2/2009 | MacNaughtan et al. |
| 2009/0197612 A1 | 8/2009 | Kiiskinen |
| 2009/0215465 A1 | 8/2009 | MacNaughtan et al. |
| 2010/0125498 A1 | 5/2010 | Jaramillo |

(56) References Cited

U.S. PATENT DOCUMENTS

| | | | |
|---|---|---|---|
| 2011/0205054 A1 | 8/2011 | Ioppe et al. | |
| 2014/0018102 A1 | 1/2014 | Brewer et al. | |

FOREIGN PATENT DOCUMENTS

| | | |
|---|---|---|
| AU | 2003903789 | 8/2003 |
| AU | 2004905077 | 9/2004 |
| AU | 2005901352 | 3/2005 |
| AU | 2005901353 | 3/2005 |
| BR | 9904979 A | 12/2000 |
| CA | 2163215 | 11/1994 |
| CA | 2189515 A1 | 7/1997 |
| CA | 2287596 A1 | 4/2000 |
| CA | 2398582 | 7/2002 |
| CA | 2432239 A1 | 12/2004 |
| DE | 3621456 A1 | 1/1988 |
| DE | 4437360 A1 | 4/1996 |
| DE | 19506890 A1 | 8/1996 |
| DE | 19914257 A1 | 1/2000 |
| DE | 10141695 A1 | 3/2003 |
| EP | 288068 B1 | 7/1992 |
| EP | 0745867 A1 | 12/1996 |
| EP | 0763749 A1 | 3/1997 |
| EP | 0785535 A1 | 7/1997 |
| EP | 0786646 A2 | 7/1997 |
| EP | 0809117 A2 | 11/1997 |
| EP | 0813072 B1 | 12/1997 |
| EP | 699330 B1 | 4/1998 |
| EP | 0908835 A2 | 4/1999 |
| EP | 0997808 A2 | 5/2000 |
| EP | 1083764 B1 | 3/2001 |
| EP | 1300652 A2 | 4/2003 |
| EP | 1457928 A1 | 9/2004 |
| EP | 1465041 A2 | 10/2004 |
| EP | 1469287 A2 | 10/2004 |
| EP | 1496338 A2 | 1/2005 |
| EP | 1659817 A2 | 5/2006 |
| FR | 2730083 A1 | 8/1996 |
| FR | 2754093 A1 | 4/1998 |
| FR | 2810183 A1 | 12/2001 |
| GB | 2278196 A | 11/1994 |
| GB | 2322248 A | 8/1998 |
| GB | 2339641 | 2/2000 |
| GB | 2359888 A | 9/2001 |
| GB | 2367979 A | 4/2002 |
| GB | 0324800.2 | 10/2003 |
| GB | 2392331 | 2/2004 |
| GB | 2407230 A | 4/2005 |
| JP | 62142215 A | 6/1987 |
| JP | 05-071974 | 3/1993 |
| JP | 08-005394 | 1/1996 |
| JP | 08005394 | 1/1996 |
| JP | 08-069436 | 3/1996 |
| JP | 08-069436 A | 3/1996 |
| JP | 08-510578 | 11/1996 |
| JP | 09-054895 | 2/1997 |
| JP | 09-054895 A | 2/1997 |
| JP | 09-062993 A | 3/1997 |
| JP | 11051678 | 2/1999 |
| JP | 2001-188996 | 10/2001 |
| JP | 2002010321 A | 1/2002 |
| JP | 2002109691 A | 4/2002 |
| JP | 2002199433 A | 7/2002 |
| JP | 2002352388 A | 12/2002 |
| JP | 2002354518 A | 12/2002 |
| JP | 2003168190 A | 6/2003 |
| JP | 2003287426 A | 10/2003 |
| JP | 2003-317191 | 11/2003 |
| JP | 2004325459 A | 11/2004 |
| JP | 04-354149 | 12/2004 |
| JP | 2005-006081 | 1/2005 |
| JP | 2006229397 | 8/2006 |
| JP | 2006-260338 | 9/2006 |
| KR | 20000014750 | 3/2000 |
| KR | 20010061325 | 7/2001 |
| KR | 20040022314 | 3/2004 |
| KR | 10-2004-0036490 | 5/2004 |
| KR | 2004-102440 A | 12/2004 |
| KR | 10-2005-14287 | 2/2005 |
| KR | 2005-096746 A | 10/2005 |
| KR | 10-2004-112991 | 7/2006 |
| KR | 10-2004-115411 | 7/2006 |
| KR | 2005-1675 | 7/2006 |
| KR | 10-2004-0064538 | 9/2006 |
| KR | 10-2005-0024544 | 9/2006 |
| KR | 20060102683 | 9/2006 |
| TW | 2004-26387 | 12/2004 |
| TW | 2006-27985 A | 6/2006 |
| TW | 93135920 | 6/2006 |
| TW | 94102945 | 6/2006 |
| TW | 93141508 | 7/2006 |
| WO | 93/20546 | 10/1993 |
| WO | 1993020546 A1 | 10/1993 |
| WO | 94/08250 | 4/1994 |
| WO | 97/07467 | 2/1997 |
| WO | 1997007467 A1 | 2/1997 |
| WO | 1998054682 A1 | 12/1998 |
| WO | 1999016036 A1 | 4/1999 |
| WO | 42562 | 7/2000 |
| WO | 01/31966 A1 | 5/2001 |
| WO | 01/37597 A1 | 5/2001 |
| WO | 148440 | 7/2001 |
| WO | 148505 | 7/2001 |
| WO | 2002008863 A2 | 1/2002 |
| WO | 02/054813 A1 | 7/2002 |
| WO | 2003005747 A1 | 1/2003 |
| WO | 2003009605 A2 | 1/2003 |
| WO | 03/023593 A1 | 3/2003 |
| WO | 3081391 | 10/2003 |
| WO | 03/096055 A2 | 11/2003 |
| WO | 2004/008792 A1 | 1/2004 |
| WO | 2004/021730 A1 | 3/2004 |
| WO | 2004/061576 A2 | 7/2004 |
| WO | 2004073217 A1 | 8/2004 |
| WO | 2004/076977 A1 | 9/2004 |
| WO | 2004093348 A1 | 10/2004 |
| WO | 2004113841 | 12/2004 |
| WO | 2005/006258 A1 | 1/2005 |
| WO | 2005038400 A1 | 4/2005 |
| WO | 2005052802 A1 | 6/2005 |
| WO | 2005/084052 A1 | 9/2005 |
| WO | 2006001412 A1 | 1/2006 |
| WO | 2006010977 A1 | 2/2006 |
| WO | 2006014439 A2 | 2/2006 |
| WO | 2006054340 A1 | 5/2006 |
| WO | 2006/065856 A1 | 6/2006 |
| WO | 2006108071 A2 | 10/2006 |
| WO | 2006108071 A3 | 10/2006 |
| WO | 2008065245 | 6/2008 |

OTHER PUBLICATIONS

Davies; et al., "'Caches in the Air': Disseminating Tourist Information in the Guide System," Second IEEE Workshop on Mobile Computer Systems and Applications, Feb. 25-26, 1999, 9 pages.

Drane and Rizos, "Role of Positioning Systems in ITS," Positioning Systems in Intelligent Transportation Systems, Dec. 1997, pp. 312, 346-349.

Fischer; et al., "System Performance Evaluation of Mobile Positioning Methods," IEEE, Aug. 2002, pp. 1962-1966.

Flinn and Satyanarayanan, "PowerScope: A Tool for Profiling the Energy Usage of Mobile Applications," Proc. WMCSA '99 Second IEEE Workshop on Mobile Computing Systems and Applications, Feb. 25-26, 1999, 9 pages.

French and Driscoll, "Location Technologies for ITS Emergency Notification and E911," Proc. 1996 National Technical Meeting of the Institute of Navigation, Jan. 22-24, 1996, pp. 355-359.

Friday; et al., "Developing Adaptive Applications: The MOST Experience," J. Integrated Computer-Aided Engineering, 1999, 35 pages.

Gunnarsson; et al., "Location Trial System for Mobile Phones," IEEE, 1998, pp. 2211-2216.

(56) References Cited

OTHER PUBLICATIONS

Kovacs; et al., "Adaptive Mobile Access to Context-aware Services," Proc. ASAMA '99 Proc. First International Symposium on Agent Systems and Applications Third International Symposium on Mobile Agents, IEEE Computer Society Washington, DC, 1999, 12pages.
Kugler and Lechner, "Combined Use of GPS and LORAN-C in Integrated Navigation Systems," Fifth International Conference on Satellite Systems for Mobile Communications and Navigation, London, UK, May 13-15, 1996, pp. 199-207.
Kyriazakos; et al., "Optimization of the Handover Algorithm based on the Position of the Mobile Terminals," Communications and Vehicular Technology, Oct. 2000, pp. 155-159.
Bennett; et al., "Location-based services", Mar. 1, 2002, Downloaded: Feb. 24, 2013, http://www.ibm.com/developerworks/ibm/library/i-lbs/, 7 pages.
Persson; et al., "GeoNotes: a real-use study of a public location-aware community system (2002)", Dec. 2002, 10 pages.
Munson; et al., "Location-based notification as a general-purpose service", Proceedings of the 2nd international workshop, WMC'02, Sep. 28, 2002, 5 pages.
Stroud, "Minority Report Has Ad-ded Value", [online] Retrieved from the Internet on Mar. 3, 2013: URL: http://www.wired.com/entertainment/music/news/2002/06/53555, Jun. 29, 2002, 1 page.
Barwise; et al., "Permission-Based Mobile Advertising", Journal of Interactive Marketing, vol. 16 / No. 1 / Winter 2002, pp. 14-24.
Aalto; et al., "Bluetooth and WAP Push Based Location-Aware Mobile Advertising System", MobiSYS'04, Jun. 6-9, 2004, 10 pages.
Kölmel; et al., "Location Based Advertising", The First International Conference on Mobile Business, M-Business Conference 2002, 7 pages.
Bulander; et al., "Enabling Personalized and Context Sensitive Mobile Advertising While Guaranteeing Data Protection", Proceedings of the EURO-mGOV 2005, Brighton, UK Mobile Government International LLC, pp. 445-454.
Rao; et al., "Evolution of Mobile Location-based Services", Communications of the ACM Dec. 2003/ vol. 46, No. 12, pp. 61-65.
Ko; et al., "Geocasting in Mobile Ad Hoc Networks: Location-Based Multicast Algorithms", International Conference on Mobile Computing and Networking, MobiCom'98 , 1998, 10 pages.
Varshney, "Location Management for Mobile Commerce Applications in Wireless Internet Environment", ACM Transactions on Internet Technology, vol. 3, No. 3, Aug. 2003, pp. 236-255.
Ko; et al., "Location-Aided Routing (LAR) in mobile ad hoc networks", Wireless Networks 6 (2000), pp. 307-321.
Gratton, "M-commerce: The Notion of Consumer Consent in Receiving Location-Based Advertising", Canadian Journal of Law & Technology, vol. 1 No. 3, Nov. 2002, pp. 59-77.
Corson; et al., "Mobile Ad hoc Networking (MANET): Routing Protocol Performance Issues and Evaluation Considerations", Request for Comments: 2501, The Internet Society, Jan. 1999, 12 pages.
Perkins; et al., "Ad hoc On-Demand Distance Vector (AODV) Routing", Request for Comments: 3561, The Internet Society, Jul. 2003, 37 pages.
Clausen; et al., "Optimized Link State Routing Protocol (OLSR)", Request for Comments: 3626, The Internet Society, Oct. 2003, 75 pages.
Ogier; et al., "Topology Dissemination Based on Reverse-Path Forwarding (TBRPF)", Request for Comments: 3684, The Internet Society, Feb. 2004, 46 pages.
Kaasinen, "User needs for location-aware mobile services", Pers Ubiquit Comput (2003), 7: pp. 70-79.
Dimpfel; et al., "Integration and Content", ELBA (European Location Based Advertising), IST-2001-36530, 2002, 22 pages.
"Location Based Advertising—Overview", ELBA (European Location Based Advertising), IST-2001-36530, Jun. 30, 2002, 17 pages.
Kölmel, "ELBA Location Based Advertising—Status", ELBA (European Location Based Advertising), IST-2001-36530, Sep. 2003, 21 pages.
Porak, "ELBA Real Life scenarios of LBA"; M-Business 2003, Vienna 2003, 22 pages.
Dimpfel, "Overview Technical Integration and Advertising Content Management", ELBA (European Location Based Advertising), IST-2001-36530, 2003, 8 pages.
"ELBA—Project Summary", ELBA (European Location Based Advertising), 2002, 2 pages.
U.S. Appl. No. 09/206,627, filed Dec. 7, 1998. First named inventor: Alvin C. Allen Jr. Entitled, "Apparatus and Method for Triggerable Location Reporting.".
U.S. Appl. No. 10/865,114, filed Jun. 9, 2004. First named inventor: Ricardo D. Craft. Entitled, "Aggregated Perceived Presence.".
U.S. Appl. No. 10/916,960, filed Aug. 11, 2004. First named inventor: Othmer; Konstantin. Entitled, "Systems and methods for populating a ticker with location-based content.".
U.S. Appl. No. 10/917,200, filed Aug. 11, 2004. First named inventor: Othmer. Entitled, "Bandwidth usage optimization and enhanced performance for wireless networks.".
U.S. Appl. No. 11/019,526, filed Dec. 23, 2004. First named inventor: Bill. Entitled, "Predicting an event at a location.".
U.S. Appl. No. 11/030,904, filed Jan. 10, 2005. First named inventor: Kurt Nosack. Entitled, "System and method for determining a nearest network resource using GPS coordinates.".
U.S. Appl. No. 11/063,096, filed Feb. 22, 2005. First named inventor: Ellenby; et al. Entitled, "Pointing systems for addressing objects".
"U.S. Appl. No. 11/099,362, Non-Final Office Action dated Aug. 28, 2006", 13 pgs.
"U.S. Appl. No. 11/099,362, Notice of Allowance dated Jun. 6, 2007", 7 pgs.
"U.S. Appl. No. 11/099,362, Response Filed Jan. 29, 2007 to Non-Final Office Action dated Aug. 28, 2006", 24 pgs.
U.S. Appl. No. 09/365,748, filed Aug. 3, 1999. First named inventor: Michael David Bednarek. Entitled, "System and Method for Supporting Participant Specific Incentives and Promotions.".
U.S. Appl. No. 09/540,214, filed Mar. 31, 2000. First named inventor: Jay S. Walker. Entitled, "Method and apparatus for conducting a transaction based on brand indifference.".
U.S. Appl. No. 09/589,684, filed Jun. 7, 2000. First named inventor: Neeraj Jhanji. Entitled, "Improved Systems for Communicating Future Activity Information Among Mobile Internet Users and Methods Therefor.".
U.S. Appl. No. 09/589,685, filed Jun. 7, 2000. First named inventor: Neeraj Jhanji. Entitled, "Improved Systems for Communicating Future Activity Information Among Mobile Internet Users and Methods Therefor.".
U.S. Appl. No. 60/654,951, filed Feb. 23, 2005. First named inventor: Harper; Gregory W . Entitled, "Systems and Methods for Storing Digital Content on Portable Devices.".
U.S. Appl. No. 60/656,642, filed Feb. 25, 2005. First named inventor: Tony F. Rodriguez. Entitled, "Digital asset management, targeted searching and desktop searching using digital watermarks.".
U.S. Appl. No. 60/657,222, filed Feb. 28, 2005. First named inventor: Ian Rogers. Entitled, "A System and Method for Delivering Media over a Network.".
U.S. Appl. No. 60/658,086, filed Mar. 3, 2005. First named inventor: Michael Keith Dery. Entitled, "Cellular Telephone Tracking System Employing a GPS Receiver.".
U.S. Appl. No. 60/658,312, filed Mar. 3, 2005. First named inventor: Andre Gueziec. Entitled, "7-Day traffic forecasts and trip advice."
U.S. Appl. No. 60/658,328, filed Mar. 2, 2005. First named inventor: Robertson; et al. Entitled, "System and method for managing user interaction data in a networked environment."
U.S. Appl. No. 60/659,643, filed Mar. 5, 2005. First named inventor: Sheha; Michael A.; et al. Entitled, "Method and System for Identifying and Defining Geofences."
U.S. Appl. No. 60/660,111, filed Mar. 8, 2005. First named inventor: Ching-Fang Lin. Entitled, "Interruption free navigator."
U.S. Appl. No. 60/661,056, filed Mar. 13, 2005. First named inventor: Kevin McKenzie. Entitled, "Method and System for Providing Security During Data Transmission over Wireless and Wired Network Connections."

(56) References Cited

OTHER PUBLICATIONS

U.S. Appl. No. 60/666,424, filed Mar. 30, 2005. First named inventor: Krishnakant Patel. Entitled, "Technique for Implementing Advanced Voice Services Using an Unstructured Supplementary Service Data (USSD) Interface."
U.S. Appl. No. 60/667,491, filed Apr. 1, 2005. First named inventor Ching-Fang Lin. Entitled, "Interruption free navigator."
U.S. Appl. No. 60/475,322, filed Jun. 3, 2003. First named inventor: Ron Bishop. Entitled, "Vehicle location tracking system."
Takashi Yoshino. et al. "NAMBA: Location-Aware Collaboration System for Shopping and Meeting." IEEE Transactions on Consumer Electronics, vol. 48, No. 3, Aug. 2002. pp. 470-477.
Benefon ESC! Owner's Manual. Publication No. YZ2400-4*, Benefon Oyj, Copyright 2002, 163 pages.
NavTalk Cellular Phone/GPS Receiver Owner's Manual and Reference Guide. Publication No. 190-00147-00 Rev. B, GARMIN International Inc, Jan. 2000, 128 pages.
NavTalk Cellular GSM Phone/GPS Receiver Owner's Manual and Reference Guide. Publication No. 190-00218-00 Rev. C, GARMIN International Inc, Nov. 2002, 130 pages.
Raman B, Mao ZM et al (2002) "The sahara model for service composition across multiple providers." First International Conference, Pervasive 2002 Zurich, Switzerland, Aug. 26-28, 2002 Proceedings pp. 1-14.
Dunn; et al., "Wireless Emergency Call System", IBM TDB, Sep. 1994.
Ebine, "Dual Frequency resonant base station antennas for PDC systems in Japan", IEEE, pp. 564-567, 1999.
Evans, "In-Vehicle Man-Machine Interaction the Socrates Approach", Vehicle Navigation & Information System Conference Proceedings, Aug. 31-Sep. 2, 1994, pp. 473-477.
Helal; et al., "Drishti: An Integrated Navigation System for Visually Impaired and Disabled", Fifth International Symposium on Wearable Computers (ISWC'01), IEEE, 2001, pp. 149-156.
Hohman; et al., "GPS Roadside Integrated Precision Positioning System", Position Location and Navigation Symposium (IEEE 2000), pp. 221-230.
Jain, R., "Potential Networking Applications of Global Positioning Systems (GPS)", [online] [retrieved on Nov. 18, 2008] [retrieved from http://arxiv.org/ftp/cs/papers/9809/9809079.pdf] OSU Technical Report TR-24, Apr. 1996, pp. 1-40.
Jirawimut; et al., "A Method for Dead Reckoning Parameter Correction in Pedestrian Navigation System", IEEE Transactions on Instrumentation and Measurement, vol. 52, No. 1, Feb. 2003, pp. 209-215.
Lloyd; et al., "Cellular phone base stations installation violate the Electromagnetic Compatibility regulations", IEEE, 2004.
Miller; et al., "Synchronization of Mobile XML Databases by Utilizing Deferred Views", IEEE 2004.
Nardi; et al., "Integrating Communication and Information through Contact Map", Communications of the ACM, vol. 45, No. 4, Apr. 2002.
Northard, "Docking Station Communication Link", IBM TDB, Feb. 1994.
Oh; et al., "Spatial Applications Using 4S Technology for Mobile Environment", IEEE 2002.
Paksoy; et al., "The Global Position System—Navigation Tool of the Future", Journal of Electrical & Electronics, 2002, vol. 2, No. 1, pp. 467-476.
Parikh, "Tele Locate", IBM Technical Disclosure Bulletin, [online] [Retrieved Nov. 7, 2008] Retrieved from the Internet, URL: https://www.delphion.com/tdbs/tdb?order=92A+62775; Sep. 1992; 1 page.
RD 409052, Research Disclosure Alerting Abstract, "Location dependent information for satellite based vehicle communication-required application of Global Position System (GPS) to automatically extract relevant portions of data package as vehiclechanges position," May 10, 1998, 1 page.
Rogers; et al., "Adaptive User Interfaces for Automotive Environments", IEEE Intelligent Vehicles Symposium 2000, Oct. 3-5, 2000, pp. 662-667.

Samadani; et al., "PathMaker: Systems for Capturing Trips", IEEE (2004) International Conference on Multimedia and Expo., Publication Date: Jun. 27-30, 2004, vol. 3, pp. 2123-2126, 2004.
Spohrer. "New Paradigms for Using Computers", 1997; retrieved from the Internet, URL: <http://almaden.ibm.com/npuc97/1997/spohrer.htm>.
Yang; et al. "Global Snapshots for Distributed Debugging", IEEE, pp. 436-440, 1992.
Yanyan; et al., "The model of optimum route selection in vehicle automatic navigation system based on unblocked reliability analyses", IEEE 2003.
Civilis; et al., "Efficient Tracking of Moving Objects with Precision Guarantees", IEEE, Proceedings of the First Annual International Conference on Mobile and Ubiquitous Systems: Networking and Services, 2004, 10 pages.
Budka; et al., "A Bayesian method to Improve Mobile Geolocation Accuracy", IEEE, 2002, pp. 1021-1025.
Yamamoto; et al., "Position Location Technologies Using Signal Strength in Cellular Systems", IEEE, 2001, pp. 2570-2575.
Drane; et al., "The accurate location of mobile telephones", Third Annual World Congress on Intelligent Transport Systems, Orlando, Florida, Oct. 1996.
Wang; et al., "A Unified Vehicle Supervising and Traffic Information System", IEEE, 1996, pp. 968-972.
U.S. Pat. No. 6,731,928, May 4, 2004, Tanaka (withdrawn).
Challe, "CARMINAT—An Integrated information and guidance system," Vehicle Navigation and Information Systems Conference, Oct. 20-23, 1991, Renault—Direction de la Recherche, Rueil-Malmaison, France.
Pungel, "Traffic control—beat the jam electronically," Funkschau, 1988, 18:43-45.
Rillings and Betsold, "Advanced driver information systems," Vehicular Technology, IEEE Vehicular Technology Society, 1991, 40:31-40.
Tsuzawa and Okamoto, "Advanced Mobile Traffic Information and Communication System," First Vehicle Navigation and Information Systems Conference, Sep. 11-13, 1989, Toronto, Canada, Abstract only.
Wong, "GPS: making roads safer and solving traffic tangles," Asia Engineer, 1995, 23(9):31-32.
Ayatsuka; et al., "UbiquitousLinks: Hypermedia Links Embedded in the Real World, Technical Report of Information Processing Society, 96-HI-67," Information Processing Society of Japan, Jul. 11, 1996, 96(62):23-30.
Nagao; et al., Walk Navi: A Location-Aware Interactive Navigation/Guideline System and Software III, First edition, pp. 9-48, published by Kindai-Kagaku-Sya Co. Ltd., Dec. 10, 1995.
Freundschuh, "Does 'Anybody' Really Want (or Need) Vehicle Navigation Aids?" First Vehicle Navigation and Information System Conference, Sep. 11-13, 1989, Toronto, Canada, 5 pages.
Gould, "The Provision of Usable Navigation Assistance: Considering Individual Cognitive Ability," First Vehicle Navigation and Information System Conference, Sep. 11-13, 1989, Toronto, Canada, 7 pages.
Mark, "A Conceptual Model for Vehicle Navigation Systems," First Vehicle Navigation and Information System Conference, Sep. 11-13, 1989, Toronto, Canada, 11 pages.
Burnett, "Usable Vehicle Navigation Systems: Are We There Yet?" Vehicle Electronic Systems 2000, Jun. 29-30, 2000, 3.1.1-3.1.12.
"New Handsets Strut Their Stuff at Wireless '99," Internet: URL: http://findarticles.com/p/articles/mi.sub.-m0BMD/is.sub.-1999.sub.-Feb- .sub.--11/ai.sub.--n27547656/ downloaded from Internet on Feb. 11, 1999, 3 pages.
Green; et al., "Suggested Human Factors Design Guidelines for Driver Information Systems," Technical Report UMTRI-93-21, Nov. 1993, 119 pages.
Tijerina; et al., "Driver Workload Assessment of Route Guidance System Destination Entry While Driving: A Test Track Study," Proceedings of the 5th ITS World Congress, Oct. 12-16, 1998, Seoul, Korea, 9 pages.
Muraskin, "Two-Minute Warnings for School Bus Riders," [retrieved on Feb. 27, 2013] Internet: URL: http://www.embedded.com/

(56) References Cited

OTHER PUBLICATIONS electronics-news/4129835/TWO-MINUTE-WARNINGS-FOR-SCHOOL-BUS-RIDERS# Jul. 1, 1999, 2 pages.
Kreller; et al., "A Mobile-Aware City Guide Application," ACTS Mobile Communication Summit, 1998, Rhodes, Greece, 7 pages.
Pascoe; et al., "Developing Personal Technology for the Field," Personal Technologies, 1998, 2:28-36.
Tebbutt, "Dial your way out of the woods," The Australian, Feb. 2000, 1 page.
Tso; et al., "Always on, Always Connected Mobile Computing," Mobile Communications Operation—Mobile Handheld Products Group, 1996, pp. 918-924.
Abowd; et al., "Context-awareness in wearable and ubiquitous computing," 1st International Symposium on Wearable Computers, Oct. 13-14, 1997, Cambridge, MA, 9 pages.
Cheverst; et al., "The Support of Mobile-Awareness in Collaborative Groupware," Personal Technologies, 1999, 3:33-42.
Cheverst; et al., "Exploiting Context to Support Social Awareness and Social Navigation," SIGGROUP Bulleting Dec. 2000, 21(3):43-48.
Cheverst; et al., "Services to Support Consistency in Mobile Collaborative Applications," Proc. 3rd International Workshop on Services in Distributed Networked Environments, 1996, 8 pages.
Costa; et al., "Experiments with Reflective Middleware," Proceedings of the ECOOP'98 Workshop on Reflective Object-Oriented Programming and Systems, ECOOP'98 Workshop Reader, 1998, 13 pages.
Paper No. 41. Inter Partes Review Case IPR2017-01255 U.S. Pat. No. 8,798,593 B2 "Final Written Decision" before Jameson Lee, Stacey G. White, and Sheila F. McShane, Administrative Patent Judges. dated Oct. 12, 2018, 36 pages.
Paper No. 48. Inter Partes Review Case IPR2017-01264 U.S. Pat. No. 8,798,647 B1 "Final Written Decision" before Jameson Lee, Stacey G. White, and Sheila F. McShane, Administrative Patent Judges. dated Oct. 12, 2018, 39 pages.
U.S. Appl. No. 60/115,755, filed Jan. 13, 1999. First named inventor: Martin K. Jones. Entitled, "Apparatus and Method for Monitoring Travel of a Mobile Vehicle."
U.S. Appl. No. 60/122,482, filed Mar. 1, 1999. First named inventor: Martin K. Jones. Entitled, "Base Station Apparatus and Method for Monitoring Travel of a Mobile Vehicle."
U.S. Appl. No. 60/579,594, filed Jun. 14, 2004. First named inventor: Richard Hersh. Entitled, "System and method for managing logistics and reverse logistics for the transportation of freight."
U.S. Appl. No. 60/628,438, filed Nov. 15, 2004. First named inventor: Raymond Burkley. Entitled, "First responder communications system."
U.S. Appl. No. 60/650,845, filed Feb. 7, 2005. First named inventor: Paul Thomas McGrath. Entitled, "System and method to facilitate carpooling as well as encouraging and monitoring all forms of alternative commuting at a worksite using a computer network."
No. 2019-1164, Appellant Uber Technologies Inc.'s Principal Brief, Appeal From the United States Patent and Trademark Office, Patent Trial and Appeal Board in Inter Partes Review No. IPR2017-01255 (decision in favor of respondent XONE), 188 pages, dated Feb. 15, 2019.
No. 2019-1165, Appellant Uber Technologies, Inc.'s Principal Brief, Appeal From the United States Patent and Trademark Office, Patent Trial and Appeal Board in Inter Partes Review No. IPR2017-01264 (decision in favor of respondent XONE), 206 pages, dated Feb. 15, 2019.
Defendant Uber Technologies, Inc's Amended Invalidity Contentions and Document Production Pursuant to Patent Local Rules 3-3 and 3-4, Jun. 18, 2019, 31 pages.
Exhibit A21 to Uber Technologies, Inc's, Amended invalidity contentions, Jun. 18, 2019, 43 pages.
Exhibit B26 to Uber Technologies, Inc's, Amended invalidity contentions, Jun. 18, 2019, 72 pages.
Case No. 5:16-CV-06050-LHK, Defendant Uber Technologies, Inc.'s Notice of Motion and Motion for Leave to Amend Its Invalidity Contentions, 29 pages, May 6, 2019.
Case No. 5:16-CV-06050-LHK, X One's Opposition to Uber's Motion for Leave to Amend Its Invalidity Contentions, 33 pages, May 20, 2019.
Case No. 5:16-CV-06050-LHK, Amended Order Granting in Part and Denying in Part Defendant's Motion for Summary Judgment and Denying Plaintiff's Motion for Summary Judgment, 40 pages, Feb. 12, 2020.
Appeal from the United States Patent and Trademark Office, Patent Trial and Appeal Board in No. IPR2017-01264, 16 pages, Mar. 3, 2020.
"Report on Location Service feature (LCS) 25.923 v1.0.0," TSG-RAN Working Group 2 (Radio layer 2 and Radio layer 3), Berlin, May 25-28, 1999, 45 pages.
Wang et al., "Location Aware Information Agent over WAP," Tamkang Journal of Science and Engineering, 2000, 3(2):107-115.
Tarumi et al., "Public Applications of SpaceTag and Their Impacts," Digital Cities, LNCS 1765, 2000, 14 pages.
O'Grady et al., "A Tourist-Centric Mechanism for Interacting with the Environment," Proceedings of the First International Workshop on Managing Interactions in Smart Environments (MANSE '99), Dublin, Ireland, Dec. 1999, 12 pages.
McCarthy et al., "ACTIVEMAP: A Visualization Tool for Location Awareness to Support Informal Interactions," HUC 99, LNCS 1707, 1999, 13 pages.
Hodes et al., "Composable Ad hoc Location-based Services for Heterogeneous Mobile Clients," University of California, Berkeley, May 5, 1998, 16 pages.
Dey et al., "CyberDesk: a framework for providing self-integrating context-aware services," ACM, Inc, 1998, 8 pages.
Brown, "Triggering Information by Context," [online] Retrieved from the Internet on May 25, 2012: URL: http://kar.kent.ac.uk/21602/2/pdf.pdf, The University of Kent at Canterbury, 1998, 10 pages.
Brown, "The stick-e document: a framework for creating context-aware applications," Electronic Publishing, 1995, 8:259-272.
Clarke et al., "Development of Human Factors Guidelines for Advanced Traveler Information Systems (ATIS) and Commercial Vehicle Operations (CVO): Comparable Systems Analysis," U.S. Department of Transportation Federal Highway Administration, Publication No. FHWA-RD-95-197, Dec. 1996, 212 pages.
"LaBarge in joint venture on bus system," [online] Retrieved from the Internet on May 25, 2012: URL: http://www.bizjournals.com/stlouis/stories/1998/08/10/focus2.html, Aug. 9, 1998, 1 page.
Shekhar et al., "Genesis and Advanced Traveler Information Systems (ATIS): Killer Applications for Mobile Computing?" NSF Mobidata Workshop on Mobile and Wireless Information Systems, Nov. 1994, 20 pages.
Serafin et al., "Functions and Features of Future Driver Information Systems," Technical Report UMTRI-91-16, May 1991, 104 pages.
Ni et al., "On-Board Advanced Traveler Information Systems," Earlier Faculty Research, University of California Transportation Center, UC Berkeley, Dec. 1, 2002, 11 pages.
"School Buses to Carry Noticom's First Application," [online] Retrieved from the Internet on May 25, 2012: URL: http://findarticles.com/p/articles/mi_m0BMD/is_1999_Feb_17/ai_n27547754/?tag=content;col1, Communications Today, Feb. 17, 1999, 2 pages.
Mahmassani et al., "Providing Advanced and Real-Time Travel/Traffic Information to Tourists," Center for Transportation Research, Bureau of Engineering Research, The University of Texas at Austin, Oct. 1998, 15 pages.
Yim et al., "Travinfo Field Operational Test: Work Plan for the Target, Network, and Value Added Reseller (VAR) Customer Studies," Working Papers, California Partners for Advanced Transit and Highways (PATH), Institute of Transportation Studies, UC Berkeley, Apr. 1, 1997, 48 pages.
Khattak et al., "Bay Area ATIS Testbed Plan," Research Reports, California Partners for Advanced Transit and Highways (PATH), Institute of Transportation Studies, UC Berkeley, Aug. 1992, 83 pages.

(56) References Cited

OTHER PUBLICATIONS

Burnett, "Usable Vehicle Navigation Systems: Are We There Yet?" Vehicle Electronic Systems 2000, Jun. 29-30, 2000, pp. 3.1.1-3.1.12.
Noonan et al., "Advanced Traveler Information Systems," Intelligent Transportation Systems Field Operational Test Cross-Cutting Study, Sep. 1998, 27 pages.
Bonsignore, "A Comparative Evaluation of the Benefits of Advanced Traveler Information System (ATIS) Operational Tests," MIT Masters Thesis, Feb. 1994, 140 pages.
Hoogenraad, "Location Dependent Services," 3rd AGILE Conference on Geographic Information Science, Helsinki/Espoo, Finland, May 25-27, 2000, pp. 74-77.
Miller et al., "Integrating Hierarchical Navigation and Querying: A User Customizable Solution," ACM Multimedia Workshop on Effective Abstractions in Multimedia Layout, Presentation, and Interaction, San Francisco, CA, Nov. 1995, 8 pages.
Wheeler et al., "Development of Human Factors Guidelines for Advanced Traveler Information Systems and Commercial Vehicle Operations: Task Analysis of ATIS/CVO Functions," US Dept. Transportation Federal Highway Administration Research and Development, Publication No. FHWA-RD-95-176, Nov. 1996, 124 pages.
Benefon ESCI GSM+GPS Personal Navigation Phone, benefon.com, Copyright 2001, 4 pages.
Dey, "Context-Aware Computing: The CyberDesk Project," [online] Retrieved from the Internet on May 25, 2012: URL: http://www.cc.gatech.edu/fce/cyberdesk/pubs/AAAI98/AAAI98.html; AAAI '98 Spring Symposium, Stanford University, Mar. 23-25, 1998, 8 pages.
Ygnace et al., "Travel Time Estimation on the San Francisco Bay Area Network Using Cellular Phones as Probes", Working Paper, Institute of Transportation Studies, University of California, Berkeley, 2000, 56 pages.
Civilis et al., "Efficient Tracking of Moving Objects with Precision Guarantees", A DB Technical Report TR-5, Feb. 21, 2004, 23 pages.
Clarke et al., "An Architecture for Dynamically Extensible Operating Systems," Distributed Multimedia Research Group, Department of Computing, Lancaster University, 1998, 20 pages.
Veltman, "Frontiers in Electronic Media", Interactions Journal of the ACM, New York, Jul.-Aug. 1997, pp. 32-64.
Goran M. Djuknie, Robert E. Richton, "Geolocation and Assisted GPS," Computer, vol. 34, No. 2, pp. 123-125, Feb. 2001.
Rozier et al., "Hear & There: An Augmented Reality System of Linked Audio", Proceedings of the International Conference on Auditory Display, Atlanta, GA, Apr. 2000, 6 pages.
Rekimoto et al., "Augment-able Reality: Situated Communication through Physical and Digital Spaces", iswc, Second International Symposium on Wearable computers (ISWC'98), 1998, 8 pages.
Nardi et al., "Integrating Communication and Information through Contact Map", Communications of the ACM, vol. 45, No. 4, Apr. 2002, 9 pages.
Meier et al., "Location-Aware Event-Base Middleware: A Paradigm for Collaborative Mobile Applications?", Department of Computer Science, Trinity College Dublin, Ireland, Sep. 2003, 5 pages.
"Map Reading and Land Navigation Field Manual No. 3-25.26", Headquarters Department of the Army, Washington, DC, [online] Retrieved from the Internet on May 25, 2012: URL: http://155.217.58.58/cgi-bin/atdl.dll/fm/3-25.26/toc.htm, Jul. 20, 2001, pp. 1-7 and J-1 to J-3.
Dibdin, "Where are mobile location based services?", CM316 Multimedia Systems Paper, Dec. 14, 2001, 8 pages.
Charny, "AT&T puts 411 to the text", [online] Retrieved from the Internet on May 25, 2012: URL: http://news.cnet.com/2100-1039_3-1000669.html; May 8, 2003; 5 pages.
Bederson, "Audio Augmented Reality: A Prototype Automated Tour Guide", [online] Retrieved from the Internet on May 25, 2012: URL: http://www.cs.umd.edu/"bederson/papers/chi-95-aar/, ACM Human Computer in Computing Systems conference (CHI'95) 1995, 4 pages.
Feddema; et al., "Cooperative Sentry Vehicles and Differential GPS Leapfrog," 2000, United States Department of Energy, pp. 1-12.
Maxwell; et al., "Alfred: The Robot Waiter Who Remembers You," AAAI Technical Report WS-99-15, 1999, 12 pages.
Shibata; et al., "Development and Integration of Generic Components for a Teachable Vision-Based Mobile Robot," IEEE/ASME Transactions on Mechatronics, 1996, 1(3):230-236.
"27 Countries in your pocket"; [online] [Retrieved on Sep. 29, 2005] Retrieved from the Internet URL: http://www.mio-tech.be/en/printview/press-releases-2005-09-29.htm; 1 page.
"Mio 269+ Users Manula"; 2005; 44 pages.
Balliet, "Transportation Information Distribution System", IBM Technical Disclosure Bulletin, [online] [Retrieved Nov. 7, 2008] Retrieved from the Internet, URL: https://www.delphion.com/tdbs/tdb?order=86A+61395; Jun. 1986; 2 pages.
Beard; et al., "Estimating Positions and Paths of Moving Objects", IEEE 2000, pp. 1-8.
Berman; et al., "The Role of Dead Reckoning and Inertial Sensors in Future General Aviation Navigation", IEEE, 1998, pp. 510-517.
Boonsrimuang; et al., "Mobile Internet Navigation System", IEEE, 2002, pp. 325-328.
Camp; et al., "A computer-based method for predicting transit time systems", Decsision Sciences, vol. 5, pp. 339-346, 1974.
Christie; et al., "Development and Deployment of GPS wireless devices for E911 and Location based services", IEEE 2002.
U.S. Appl. No. 60/266,559, filed Feb. 5, 2001. First named inventor: Athanassios Diacakis. Entitled, "Presence and availability management system."
U.S. Appl. No. 60/268,473, filed Feb. 12, 2001. First named inventor: Woody Denman. Entitled, "SIP-Based Push-to-Talk (PTT) Service."
U.S. Appl. No. 60/269,506, filed Feb. 16, 2001. First named inventor: Kevin Buckham. Entitled, "Monitoring and controlling access to wireless location information for group based and other applications."
U.S. Appl. No. 60/274,453, filed Mar. 9, 2001. First named inventor: Heikki Huomo. Entitled, "System, mobile station and method for managing context-related information."
U.S. Appl. No. 60/277,347, filed Mar. 19, 2001. First named inventor: Fano, Andrew E.; et al. Entitled, "Mobile valet."
U.S. Appl. No. 60/279,401, filed Mar. 28, 2001. First named inventor: Raymond J. Menard. Entitled, "Variable Distance RF Tag Disclosure."
U.S. Appl. No. 60/279,513, filed Mar. 28, 2001. First named inventor: Raymond J. Menard. Entitled, "Range and Bearing Indicator for Wireless Device."
U.S. Appl. No. 60/279,671, filed Mar. 30, 2001. First named inventor: H. Britton Sanderford Jr . . . Entitled, "Enhanced wireless packet data communication system, method and apparatus applicable to both wide area networks and local area networks."
U.S. Appl. No. 60/281,038, filed Apr. 2, 2001. First named inventor: Fano, Andrew E.; et al. Entitled, "Mobile valet."
U.S. Appl. No. 60/282,205, filed Apr. 6, 2001. First named inventor: Kevin C. Jones. Entitled, "Digital asset management and linking media signals with related data using watermarks."
U.S. Appl. No. 60/283,929, filed Apr. 17, 2001. First named inventor: Steinbach, Galia ; et al. Entitled, "BeyondguideTM method and system."
U.S. Appl. No. 60/285,032, filed Apr. 19, 2001. First named inventor: Curtis A. Vock. Entitled, "Event Monitoring Systems and Methods."
U.S. Appl. No. 60/286,916, filed Apr. 27, 2001. First named inventor: Eric A. Portman. Entitled, "Location Based Services."
U.S. Appl. No. 60/289,586, filed May 9, 2001. First named inventor: Philip Klein. Entitled, "Preprocessing an Undirected Planar Network to Enable Fast Approximate Distance Queries."
U.S. Appl. No. 60/301,567, filed Jun. 28, 2001. First named inventor: Woody Denman. Entitled, "SIP-Based Push-to-Talk (PTT) Service."
U.S. Appl. No. 60/303,019, filed Jul. 5, 2001. First named inventor: Priya Viswanath. Entitled, "Passively tracking mobile subscribers by monitoring wireless network messages."
U.S. Appl. No. 60/303,615, filed Jul. 6, 2001. First named inventor: Randolph A. Jaramillo. Entitled, "Systems for Solving Challenges in Telecom Sales and Marketing."

(56) References Cited

OTHER PUBLICATIONS

U.S. Appl. No. 60/305,580, filed Jul. 16, 2001. First named inventor: Scott Hotes. Entitled, "Dynamic Polling Optimization Server."
U.S. Appl. No. 60/305,975, filed Jul. 17, 2001. First named inventor: Sheha; et al. Entitled, "Position determination system."
U.S. Appl. No. 60/313,010, filed Aug. 20, 2001. First named inventor: Sheha; et al. Entitled, "Point of interest spatial rating search method and system."
U.S. Appl. No. 60/318,738, filed Sep. 12, 2001. First named inventor: Daubert; et al. Entitled, "High resolution tracking of mobile assets."
U.S. Appl. No. 60/319,162, filed Apr. 2, 2002. First named inventor: Randazzo. Entitled, "NAV-Cell Pier to Pier GPS."
U.S. Appl. No. 60/319,769, filed Dec. 11, 2002. First named inventor: Randazzo. Entitled, "Marine GPScell."
U.S. Appl. No. 60/323,601, filed Sep. 20, 2001. First named inventor: Curtis A. Vock. Entitled, "Event Monitoring Systems and Methods."
U.S. Appl. No. 60/327,327, filed Oct. 4, 2001. First named inventor: Stephen Michael Palik. Entitled, "Machine for providing a dynamic database of geographic location information for a plurality of wireless communications device and process for making same.".
U.S. Appl. No. 60/335,203, filed Oct. 23, 2001. First named inventor: Mark J. Reed. Entitled, "Machine for providing a directional assistance network and process for same."
U.S. Appl. No. 60/337,945, filed Nov. 9, 2001. First named inventor: McCarthy; et al. Entitled, "Network text messaging organized by threads."
U.S. Appl. No. 60/349,251, filed Jan. 18, 2002. First named inventor: Larry Lu. Entitled, "Calendar Overlays."
U.S. Appl. No. 60/351,935, filed Jan. 24, 2002. First named inventor: Ryan Steelberg. Entitled, "RF Delivery."
U.S. Appl. No. 60/352,761, filed Jan. 29, 2002. First named inventor: Mark Jefferson Reed. Entitled, "Mchine for providing a wireless communications device location tracking system and process for making same."
U.S. Appl. No. 60/354,284, filed Feb. 1, 2002. First named inventor: Spriestersbach; et al. Entitled, "Integrating context information into enterprise applications for mobile applications."
U.S. Appl. No. 60/357,240, filed Feb. 14, 2002. First named inventor: Andrew Charles Zmolek. Entitled, "Presence Tracking and Namespace Interconnection Techniques."
U.S. Appl. No. 60/359,792, filed Feb. 26, 2002.First named inventor: Scott Hotes. Entitled, "Minimizing Mobile Location Lookups via Intelligent Scheduling."
U.S. Appl. No. 60/359,793, filed Feb. 26, 2002. First named inventor: Scott Hotes. Entitled, "Computing Location Updates for Applications Requiring Location-Based Triggering"
U.S. Appl. No. 60/360,527, filed Feb. 28, 2002. First named inventor: Phillip Klein. Entitled, "System for Multi-User Location Based Alerts."
U.S. Appl. No. 60/360,737, filed Mar. 1, 2002. First named inventor: Michael A. Sheha. Entitled, "Method and Apparatus for Sending, Retrieving, and Planning Location Relevant Information."
U.S. Appl. No. 60/361,380, filed Mar. 1, 2002. First named inventor: Richard W Graham. Entitled, "A System and Method to Provide Security in a Network Based on Device Location Information."
U.S. Appl. No. 60/361,419, filed Mar. 1, 2002. First named inventor: John J. Roese. Entitled, "A System for Network Definition Based on Device Location."
U.S. Appl. No. 60/361,420, filed Mar. 1, 2002. First named inventor: Richard W. Graham. Entitled, "Systems and Methods to Define Location of a Network Device or a Netowrked Device."
U.S. Appl. No. 60/361,421, filed Mar. 1, 2002. First named inventor: John J. Roese. Entitled, "a System to Regulate Access as a Function of Device Location."
U.S. Appl. No. 60/362,155, filed Mar. 5, 2002. First named inventor: Andre Gueziec. Entitled, "Personalized road traffic information dissemination."
U.S. Appl. No. 60/365,104, filed Mar. 18, 2002. First named inventor: Christopher J. Hall. Entitled, "An Alternative Solution to the Problem of the Geolocating a Portable Radio Transmitter."
U.S. Appl. No. 60/365,244, filed Mar. 18, 2002. First named inventor: Athanassios Diacakis. Entitled, "System and method for providing voice-activated presence information."
U.S. Appl. No. 60/367,527, filed Mar. 22, 2002. First named inventor: William J. Sacco. Entitled, "Method and System of Mass Casualty Triage Prioritization."
U.S. Appl. No. 60/367,708, filed Mar. 28, 2002. First named inventor: Gordon John Hines. Entitled, "Location Derived Presence Information."
U.S. Appl. No. 60/367,967, filed Mar. 25, 2002. First named inventor: Jeffrey D. Mullen. Entitled, "Systems and methods for locating cellular phones."
U.S. Appl. No. 60/370,862, filed Apr. 8, 2002. First named inventor: Douglas G. Dempster. Entitled, "Method for graphical interaction with geographic databases for broadcast 3resentation.".
U.S. Appl. No. 60/371,941, filed Apr. 10, 2002. First named inventor: Michael A. Sheha. Entitled, "Methods and System for Dynamic Estimation and Predictive Route Generation."
U.S. Appl. No. 60/375,998, filed Apr. 24, 2002. First named inventor: Lau; et al. Entitled, "System, method and apparatus for acquiring, presenting, managing and using position information."
U.S. Appl. No. 60/377,019, filed Apr. 30, 2002. First named inventor: Michael Pechatnikov. Entitled, "Real-time distribution of dynamic maps."
U.S. Appl. No. 60/046,020, filed May 9, 1997. First named inventor: Clayton R. Karmel. Entitled, "Positioning system using packet radio to provide differential global positioning satellite corrections and information relative to a position."
U.S. Appl. No. 60/046,021, filed May 9, 1997. First named inventor: Clayton R. Karmel. Entitled, "Positioning system using packet radio to determine position and to obtain information relative to a position."
U.S. Appl. No. 60/046,400, filed May 13, 1997. First named inventor: Scott R. Jamison. Entitled, "Automated touring information systems and methods."
U.S. Appl. No. 60/058,623, filed Sep. 11, 1997. First named inventor: Harold L. Peterson. Entitled, "Software Vending, Delivery, and Maintenance System."
U.S. Appl. No. 60/066,653, filed Nov. 19, 1997. First named inventor: Steven Baker. Entitled, "Method and apparatus for distributing location-based messages in a wireless communication network."
U.S. Appl. No. 60/068,775, filed Dec. 24, 1997. First named inventor: Wendell Alumbaugh. Entitled, "Travel guide."
U.S. Appl. No. 60/072,090, filed Jan. 21, 1998. First named inventor: Craig A. Owensby. Entitled, "Method of Subscriber-Targeted Advertising for Mobile Personal Communications Services ."
U.S. Appl. No. 60/072,757, filed Jan. 27, 1998. First named inventor: Steven M. Hoffberg. Entitled, "Mobile communication device."
U.S. Appl. No. 60/097,932, filed Aug. 25, 1998. First named inventor: Matthew G. Pallakoff. Entitled, "System designed to facilitate team buying."
U.S. Appl. No. 60/097,933, filed Aug. 25, 1998. First named inventor: Matt Pallakoff. Entitled, "Network system designed to facilitate offering, sellingand purchasing goods and services."
U.S. Appl. No. 60/105,493, filed Oct. 23, 1998. First named inventor: Raymond J. Menard. Entitled, "Low Power Two-Way Long Range Security System."
U.S. Appl. No. 60/106,816, filed Nov. 3, 1998. First named inventor: James Fitch. Entitled, "Data Fusion for Wireless Location-Based Applications."
U.S. Appl. No. 60/113,167, filed Dec. 21, 1998. First named inventor: Charles C. Cheng. Entitled, "Method for Location Based Asset Management"
U.S. Appl. No. 60/115,074, filed Jan. 7, 1999. First named inventor: Harry E. Emerson, III. Entitled, "Enhanced Radio Graphic Data System."
U.S. Appl. No. 60/123,821, filed Mar. 11, 1999. First named inventor: John D. Codignotto. Entitled, "Message publishing system and method."

(56) References Cited

OTHER PUBLICATIONS

U.S. Appl. No. 60/123,882, filed Mar. 11, 1999. First named inventor: David S. Breed. Entitled, "Methods and Apparatus for Preventing Vehicle Accidents."
U.S. Appl. No. 60/130,882, filed Apr. 23, 1999. First named inventor: Donald L. Fuchs. Entitled, "Method and Apparatus for Locating Mobile Receivers."
U.S. Appl. No. 60/135,862, filed May 25, 1999. First named inventor: Raymond J. Menard. Entitled, "Bidirectional Wireless Detection System."
U.S. Appl. No. 60/158,255, filed Oct. 5, 1999. First named inventor: Dave Michaelson, . Entitled, "Ocean Bottom Proximity Warning Sensor."
U.S. Appl. No. 60/160,326, filed Oct. 19, 1999. First named inventor: Michael L. Obradovich. Entitled, "Technique for Effective Navigation Based on User Preferences."
U.S. Appl. No. 60/162,333, filed Oct. 29, 1999. First named inventor: Hirohisa Tanaka. Entitled, "Method for Providing Matching and Introduction Services to Proximate Mobile Users and Service Providers."
U.S. Appl. No. 60/165,435, filed Nov. 15, 1999. First named inventor: Jay S. Walker. Entitled, "Uniseller Internet pricing."
U.S. Appl. No. 60/170,844, filed Dec. 14, 1999. First named inventor: Jhan. Entitled, "Improved Systems for Communication among Mobile Internet Users."
U.S. Appl. No. 60/184,248, filed Feb. 23, 2000. First named inventor: Robert M. Kalthoff. Entitled, "Locator system."
U.S. Appl. No. 60/184,799, filed Feb. 24, 2000. First named inventor: Jay S. Walker. Entitled, "Redemption feedback loop for priceline for gas."
U.S. Appl. No. 60/185,480, filed Feb. 28, 2000. First named inventor: C. Douglass Thomas. Entitled, "Method and System for Location Tracking."
U.S. Appl. No. 60/185,902, filed Feb. 29, 2000. First named inventor: John E. Boyd. Entitled, "A Computer-Based Networking Service and Method and Systems for Performing the Same."
U.S. Appl. No. 60/186,155, filed Feb. 29, 2000. First named inventor: Blumberg; et al. Entitled, "Global positioning-based real estate database access device and method."
U.S. Appl. No. 60/187,137, filed Mar. 6, 2000. First named inventor: Fisher; et al. Entitled, "ImageHub."
U.S. Appl. No. 60/191,779, filed Mar. 24, 2000. First named inventor: Robert L. Piccioni. Entitled, "System and Method for Automated Distribution of Law Enforcement Intormation."
U.S. Appl. No. 60/194,761, filed Apr. 3, 2000. First named inventor: Christopher Herringshaw. Entitled, "Method and Apparatus for Estimating Geographic Location of a Networked Entity."
U.S. Appl. No. 60/196,575, filed Apr. 11, 2000. First named inventor: Michael Obradovich. Entitled, "GPS Publication Application Server."
U.S. Appl. No. 60/199,528, filed Apr. 25, 2000. First named inventor: Todd Newville. Entitled, "Information Data Portal."
U.S. Appl. No. 60/199,551, filed Apr. 25, 2000. First named inventor: Cooper. Entitled, "System and method for proximity searching position information using a proximity parameter."
U.S. Appl. No. 60/202,147, filed May 5, 2000. First named inventor: Masoud Motamedi. Entitled, "Performance analysis tool for location systems."
U.S. Appl. No. 60/205,938, filed May 18, 2000. First named inventor: Mathur; et al. Entitled, "System and method for creating content and preferences in a collaborative fashion with privacy."
U.S. Appl. No. 60/210,682, filed Jun. 10, 2000. First named inventor: Hirohisa Tanaka. Entitled, "Method and System for Selectively Connecting Proximate Mobile Telecommunication Users Having Compatible Attributes."
U.S. Appl. No. 60/210,691, filed Jun. 10, 2000. First named inventor: Geoffrey R. Hendrey. Entitled, "Method and System for Selectively Connecting Proximate Mobile Telecommunication Users."
U.S. Appl. No. 60/212,155, filed Jun. 16, 2000. First named inventor: Tendler. Entitled, "Pager Activated GPS-Equipped Wireless Phone."
U.S. Appl. No. 60/214,197, filed Jun. 26, 2000. First named inventor: Philip J. Koopman Jr. Entitled, "Mehod and Apparatus for Automatically Initiating Telecommunication Connections to Nearby Transceivers."
U.S. Appl. No. 60/216,721, filed Jul. 7, 2000. First named inventor: Geoffrey R. Hendrey. Entitled, "Method and Apparatus for Facilitating Meetings Among Proximate Indirectly Related People."
U.S. Appl. No. 60/218,454, filed Jul. 14, 2000. First named inventor: Norman Mohi. Entitled, "Locating system and method."
U.S. Appl. No. 60/223,614, filed Aug. 7, 2000. First named inventor: Philip J. Koopman Jr. Entitled, "Method and System for Tracking Effectiveness of Mobile Telecommunication Advertisements."
U.S. Appl. No. 60/225,076, filed Aug. 14, 2000. First named inventor: Ashutosh Pande. Entitled, "Multi-mode global positioning system for use with wireless networks."
U.S. Appl. No. 60/228,102, filed Aug. 26, 2000. First named inventor: Thomas Black. Entitled, "Method and apparatus for restricting the assignment of VLANS."
U.S. Appl. No. 60/241,776, filed Oct. 18, 2000. First named inventor: Brad Doctor. Entitled, "Method and System to Determine a Geographical Location Associated with a Network Address."
U.S. Appl. No. 60/256,069, filed Dec. 15, 2000. First named inventor: Curtis A. Vock. Entitled, "Ubiquitous Movement Monitor Device."
U.S. Appl. No. 60/257,386, filed Dec. 22, 2000. First named inventor: Curtis A. Vock. Entitled, "Movement Monitoring Systems and Methods."
U.S. Appl. No. 60/259,271, filed Dec. 29, 2000. First named inventor: Curtis A. Vock. Entitled, "Movement Monitoring Systems and Methods."
U.S. Appl. No. 60/264,164, filed Jan. 24, 2001. First named inventor: Yi-chung Chao. Entitled, "Methods and Implementation for Improving Mobile User Position Accuracy and Information Input/Output Formats."
U.S. Appl. No. 60/574,988, filed May 26, 2004. First named inventor: Randolph A. Jaramillo. Entitled "Hot-Merchant Network (Mobile-Commerce or M-Merchant Network)."
U.S. Appl. No. 60/576,092, filed Jun. 2, 2004. First named inventor: Krishnakant Patel. Entitled, "Pre-Provisioning for P2T Over the Air Activation."
U.S. Appl. No. 60/576,094, filed Jun. 2, 2004. First named inventor: F. Craig Farrill. Entitled, "Technique for Zero Delay Call Set-Up in Press to Talk (P2T) Systems."
U.S. Appl. No. 60/577,971, filed Jun. 8, 2004. First named inventor: Dan Illowsky. Entitled, "Architecture, Apparatus and Methods Thereof for an Efficient Low Cost Seamless Device Interoperability Software Platform."
U.S. Appl. No. 60/579,309, filed Jun. 14, 2004. First named inventor: Ravi Ayyasamy. Entitled, "Client Specification and Architecture for Supporting Press to Talk and Other Premium Voice Services in Wireless Networks."
U.S. Appl. No. 60/579,322, filed Jun. 15, 2004. First named inventor: Ahmad, Ahmad M. Entitled, "Method and system for Modeling People Traveling Behavior."
U.S. Appl. No. 60/581,466, filed Jun. 21, 2004. First named inventor: Arianna Bassoli. Entitled, "Synchronized media streaming between distributed peers."
U.S. Appl. No. 60/581,954, filed Jun. 22, 2004. First named inventor: F. Craig Farrill. Entitled, "Press-to-Connect (PTC) for Wireless Communications Systems."
U.S. Appl. No. 60/582,280, filed Jun. 22, 2004. First named inventor: Tony F. Rodriguez. Entitled, "Digital asset management and targeted searching using digital watermarks."
U.S. Appl. No. 60/582,313, filed Jun. 23, 2004. First named inventor: Julian Bourne. Entitled, "Method and System for Identifying, Locating and Contacting Like-Minded People."
U.S. Appl. No. 60/588,464—filed Jul. 16, 2004. First named inventor: Deepankar Biswaas; and Title: "Virtual Push to Talk (PTT) and Push to Share (PTS)".

(56) References Cited

OTHER PUBLICATIONS

U.S. Appl. No. 60/590,152, filed Jul. 21, 2004. First named inventor: Brian Roundtree. Entitled, "Mobile Device Assistance, Mobile Device Management, and Call Interceptor for Mobile Devices ."
U.S. Appl. No. 60/592,838, filed Jul. 30, 2004. First named inventor: David S. Breed. Entitled, "System for obtaining vehicular information."
U.S. Appl. No. 60/595,805, filed Aug. 4, 2004. First named inventor: Igor Zhovnirovksy. Entitled, "System for Implementing Serverless Applications Over the Public Wireless Network."
U.S. Appl. No. 60/602,642, filed Aug. 19, 2004. First named inventor: Harper; Gregory W. Entitled, "Digital Music Download."
U.S. Appl. No. 60/605,345, filed Aug. 27, 2004. First named inventor: Scott Shamp. Entitled, "Wireless communication of context sensitive content, systems methods and computer program product."
U.S. Appl. No. 60/605,498, filed Aug. 31, 2004. First named inventor: William Meadow. Entitled, "Video and data processing system."
U.S. Appl. No. 60/606,590, filed Sep. 2, 2004. First named inventor: Diendorf; John R.; et al. Entitled, "Telematic method and apparatus for managing shipping logistics."
U.S. Appl. No. 60/609,948, filed Sep. 15, 2004. First named inventor: Phil Stanhope. Entitled, "System and method for synchronizing data."
U.S. Appl. No. 60/609,989, filed Sep. 15, 2004. First named inventor: John Landry. Entitled, "System and method for sharing content."
U.S. Appl. No. 60/609,990, filed Sep. 15, 2004. First named inventor: John Landry. Entitled, "System and method for linking data."
U.S. Appl. No. 60/610,016, filed Sep. 15, 2004. First named inventor: Phil Stanhope. Entitled, "System and method for sharing content."
U.S. Appl. No. 60/610,079, filed Sep. 15, 2004. First named inventor: Phil Stanhope. Entitled, "System and method for auditing data."
U.S. Appl. No. 60/611,607, filed Sep. 21, 2004. First named inventor: Brian Roundtree. Entitled, "Secure Mobile Device Software Execution, Help-Support-Care Initiation for Mobile Devices, and Smart Network Configuration Selection for Mobile Devices."
U.S. Appl. No. 60/613,646, filed Sep. 27, 2004. First named inventor: Morris Lee. Entitled, "Methods and apparatus for using location information to manage spillover in an audience monitoring system."
U.S. Appl. No. 60/614,939, filed Sep. 29, 2004. First named inventor: Morris Lee. Entitled, "Methods and apparatus for using location information to manage spillover in an audience monitoring system."
U.S. Appl. No. 60/618,201, filed Oct. 12, 2004. First named inventor: Wendy Wan-Lin Yang. Entitled, "Systems and methods for managing and presenting entity information."
U.S. Appl. No. 60/618,748, filed Oct. 15, 2004. First named inventor: Blumberg; et al. Entitled, "Mobile location aware search engine and method of providing content for same."
U.S. Appl. No. 60/620,456, filed Oct. 19, 2004. First named inventor: Rosen; James S. Entitled, "System and method for location based social networking."
U.S. Appl. No. 60/622,797 filed Oct. 29, 2004. First named inventor: Bill. Entitled, "Dynamically Predicting an Event At a Location."
U.S. Appl. No. 60/623,108, filed Oct. 29, 2004. First named inventor: Edward James Morgan. Entitled, "Wireless data Scanning Network for Building Location Beacon Database."
U.S. Appl. No. 60/624,281, filed Jan. 29, 2005. First named inventor: Ching-Fang Lin. Entitled, "Interruption free navigator."
U.S. Appl. No. 60/625,467, filed Nov. 5, 2004. First named inventor: Houston Staton. Entitled, "Method and System for Remote Monitoring and Control of Movable Entities."
U.S. Appl. No. 60/626,573, filed Nov. 10, 2004. First named inventor: Chung, Wing Yeung ; et al. Entitled, "Locomotive wireless video recorder and recording system."
U.S. Appl. No. 60/626,977, filed Nov. 12, 2004. First named inventor: Lyn Seidler. Entitled, "System and method for automated friend-to-friend delivery item."
U.S. Appl. No. 60/627,785, filed Nov. 12, 2004. First named inventor: Gagan Puranik. Entitled, "Two-way messaging with encryption."
U.S. Appl. No. 60/629,721, filed Nov. 19, 2004. First named inventor: Wong; Raymond et al. Entitled, "Bid Write-Up."
U.S. Appl. No. 60/631,602, filed Nov. 30, 2004. First named inventor: Jeffrey Lynn MecKley. Entitled, "Phase persistent agile signal source."
U.S. Appl. No. 60/631,876, filed Dec. 1, 2004. First named inventor: Barry Appelman. Entitled, "Automatically Enabling the Forwarding of Instant Messages."
U.S. Appl. No. 60/634,951, filed Dec. 10, 2004. First named inventor: Andre Gueziec. Entitled, "Real-time and predictive traveler information for routing."
U.S. Appl. No. 60/635,856, filed Dec. 13, 2004. First named inventor: Dan Burkhart. Entitled, "Instant Messaging Method and Apparatus."
U.S. Appl. No. 60/636,953, filed Dec. 17, 2004. First named inventor: Coch; et al. Entitled, "Geo-Collaboration System."
U.S. Appl. No. 60/639,267, filed Dec. 27, 2004. First named inventor: Andrew Levi. Entitled, "Method and system for peer-to-peer advertising between mobile devices."
U.S. Appl. No. 60/643,721, filed Jan. 13, 2005. First named inventor: Baowei Ji. Entitled, "Medium access control (MAC) protocol for use in ad hoc wireless networks."
U.S. Appl. No. 60/647,897, filed Jan. 28, 2005. First named inventor: Baowei Ji. Entitled, "Asynchronous wireless collision detection with acknowledgment for use in ad hoc wireless networks."
U.S. Appl. No. 60/649,180, filed Feb. 3, 2005. First named inventor: Cyril Houri. Entitled, "System and Method for Geographically Locating Computing Devices in a Wireless Network."
U.S. Appl. No. 60/650,840, filed Feb. 7, 2005. First named inventor: Jens Eilstrup Rasmussen. Entitled, "Method and Apparatus for Generating Tiles in a Digital Mapping System."
U.S. Appl. No. 60/652,144, filed Feb. 11, 2005. First named inventor: Brian Roundtree. Entitled, "Call Intercept Methods, Such as for Customer Self-Support on a Mobile Device."
U.S. Appl. No. 60/654,271, filed Feb. 18, 2005. First named inventor: Krishnakant Patel. Entitled, "Enhanced Features on an Advanced Voice Services (AVS) Framework."
U.S. Appl. No. 60/654,811, filed Feb. 22, 2005. First named inventor: Edward James Morgan. Entitled, "Continuous Data Optimization in Positioning System."
U.S. Appl. No. 60/170,914, filed Dec. 15, 1999. First named inventor: Semyon Dukach. Entitled, "Apparatuses Methods and Computer Programs for Displaying Information on Signs."
U.S. Appl. No. 60/196,099, filed Apr. 11, 2000. First named inventor: Dara Ung. Entitled, "Wireless chat status tracking."
U.S. Appl. No. 60/196,104, filed Apr. 11, 2000. First named inventor: Erik Wallace. Entitled, "Mobile activity status tracker."
U.S. Appl. No. 60/382,909, filed May 22, 2002. First named inventor: Myra Hight. Entitled, "Child locator system."
U.S. Appl. No. 60/387,482, filed Jun. 10, 2002. First named inventor: Suman Beros. Entitled, "Method and apparatus for effecting a detection of mobile devices that are proximate and exhibit commonalities between specific data sets associated with each mobile device."
U.S. Appl. No. 60/400,603, filed Aug. 2, 2002. First named inventor: Alex Mashinsky. Entitled, "Method, system and apparatus for providing transportation service."
U.S. Appl. No. 60/473,738, filed May 28, 2003. First named inventor: Scott A. Horstemeyer. Entitled, "Advertisement business methods for notification systems."
U.S. Appl. No. 60/473,742, filed May 28, 2003. First named inventor: Scott A. Horstemeyer. Entitled, "Response systems and methods for notification systems for modifying future notifications."

(56) References Cited

OTHER PUBLICATIONS

U.S. Appl. No. 60/473,949, filed May 28, 2003. First named inventor Scott A. Horstemeyer. Entitled, "Response systems and methods for notification systems."
U.S. Appl. No. 60/486,768, filed Jul. 11, 2003. First named inventor: Scott A. Horstemeyer. Entitled, "Stop location determination systems and methods based upon user-defined timing criteria."
U.S. Appl. No. 60/498,084, filed Aug. 27, 2003. First named inventor: Charles S. Ribaudo. Entitled, "System and method for personal area matching."
U.S. Appl. No. 60/498,819, filed Aug. 29, 2003. First named inventor: Scott A. Horstemeyer. Entitled, "Notification systems and methods enabling a response to change particulars of a delivery or pickup."
U.S. Appl. No. 60/540,346, filed Feb. 2, 2004. First named inventor: Philip E. Cohen. Entitled, "Monitoring method and system."
U.S. Appl. No. 60/547,509, filed Feb. 25, 2004. First named inventor: Charles S. Ribaudo. Entitled, "Personal area matching."
U.S. Appl. No. 60/563,639, filed Apr. 20, 2004. First named inventor: Keith A. Kreft. Entitled, "Information mapping methods, systems and applications."
U.S. Appl. No. 60/611,801, filed Sep. 22, 2004. First named inventor: Jim Karpen. Entitled, "Emergency call handling system."
U.S. Appl. No. 60/621,345, filed Oct. 22, 2004. First named inventor: Purva R. Rajkotia. Entitled, "System and method for provisioning broadcast and multicast services in a wireless network."
U.S. Appl. No. 60/631,293, filed Nov. 24, 2004. First named inventor: Gregory J. Winter. Entitled, "Mobile resource management system."
U.S. Appl. No. 60/650,927, filed Feb. 8, 2005. First named inventor: Michael F. Gende. Entitled, "Procedures for provisioning and routing 9-1-1 voice over IP (VoIP) and/or wireless voice calls to the proper public safety answering point (PSAP)."
U.S. Appl. No. 60/655,230, filed Feb. 22, 2005. First named inventor: Kathy Pierce. Entitled, "Geographic redundancy or back up switch."
U.S. Appl. No. 60/657,560, filed Feb. 28, 2005. First named inventor: Thomas Breen. Entitled, "Methods and systems for foreign call back number compatibility for VoIP E 9-1-1 calls."
U.S. Appl. No. 60/658,223, filed Mar. 3, 2005. First named inventor: Robert F. Cromp. Entitled, "Incident command system."
U.S. Appl. No. 60/661,506, filed Mar. 15, 2005. First named inventor: Rakesh Kushwaha. Entitled, "System and method for monitoring and measuring end-to-end performance using wireless devices."
U.S. Appl. No. 60/661,507, filed Mar. 15, 2005. First named inventor: Rakesh Kushwaha. Entitled, "System and method for trap management and monitoring on wireless terminals."
U.S. Appl. No. 60/668,242, filed Apr. 4, 2005. First named inventor: Hermann Schulte-Kellinghaus. Entitled, "Home zone solution using radio frequency identification (RFID) technology."
U.S. Appl. No. 09/494,553, filed Jan. 31, 2000. First named inventor: James M. Zombek. Entitled, "Messaging method and apparatus for sending and receiving messages in a client server environment over multiple wireless networks."
U.S. Appl. No. 09/694,297, filed Oct. 24, 2000. First named inventor: James M. Zombek. Entitled, "Messaging method and apparatus for sending and receiving messages in a client server environment over multiple wireless and wireline networks."
Huff, "Macro Management: New Advancements in Wireless Technology Automate Driver Input and Turn Volumes of Vehicle and Driver Data Into Byte-Size Pieces That Help Drivers and Managers Alike," Commercial carrier journal for professional fleet managers. May 2003, vol. 169 No. 5, pp. 36-40.
U.S. Appl. No. 60/608,180, filed Sep. 9, 2004. First named inventor: Robert S. Block. Entitled, "Radio Interoperability."
U.S. Appl. No. 60/608,181, filed Sep. 9, 2004. First named inventor: Robert S. Block. Entitled, "Presence Detection."
U.S. Appl. No. 60/630,332, filed Nov. 24, 2004. First named inventor: Mark Greenstein. Entitled, "System and method for dispatching transportation to persons who want transportation."
U.S. Appl. No. 60/328,263, filed Oct. 10, 2001. First named inventor: Robert D. Summer. Entitled, "System and method for emergency notification content delivery."
U.S. Appl. No. 60/444,248, filed Jan. 31, 2003. First named inventor: Douglas Rowitch. Entitled, "Global positioning system (GPS) user plane mobile station mobile positioning center (MS-MPC)."
U.S. Appl. No. 60/445,815, filed Feb. 5, 2003. First named inventor: Douglas Rowitch. Entitled, "Global positioning system (GPS) user plane mobile station mobile positioning center (MS-MPC)."
U.S. Appl. No. 60/476,262, filed Jun. 3, 2003. First named inventor: Bart Stanco. Entitled, "Personal communication devices."
U.S. Appl. No. 60/590,667, filed Jul. 23, 2004. First named inventor: Richard Poppen. Entitled, "Automated prioritization of map objects."
Lamarca, Anthony et al. "Place Lab: Device Positioning Using Radio Beacons in the Wild." 2005. 18 pages.
Mulligan, Morris et al. "Framework for Location Computation Scenarios." Internet-Draft. Nov. 2001. pp. 1-11.
Priyantha, Nissanka B. "The Cricket Location-Support System" MIT Laboratory for Computer Science. The 6th ACM International Conference on Mobile Computing and Networking (ACM MOBICOM). Aug. 2000. 12 pages.
Reed, Jeffrey H. et al. "An Overview of the Challenges and Progress in Meeting the E-911 Requirement for Location Service." IEEE Communications Magazine. Apr. 1998. pp. 30-37.
Sen, Sumit. "Open Standards in Location Based Services." Applied Technology Group, Tata Infotech Limited. 2002. 6 pages.
Abowd et al., "Cyberguide: A mobile context-aware tour guide." Baltzer Journals. Sep. 23, 1996. pp. 1-21.
Kim H. Veltman "Frontiers in Electronic Media", Interactions Journal of the ACM, New York, Jul.-Aug. 1997, pp. 32-64.
Henning Maass "Location-aware mobile applications based on directory services." Mobile Networks and Applications 3 (1998) 157-173.
Sinclair "Integrating Hypermedia Techniques with Augmented Reality Environments" University of Southampton. Jun. 2004. pp. 1-155.
Eija Kaasinen "User needs for location-aware mobile services." Springer-Verlag London Limited. Aug. 2002. pp. 70-79.
Broadbent et al. "Location Aware Mobile Interactive Guides: usability issues." Proceedings of the Fourth International Conference on Hypermedia and Interactivity in Museums. (ICHIM97) (Paris, 1997). pp. 1-15.
"DaimlerCrysler Guide5 Usecases Overview Map." Oct. 2001. 1 page.
"GPS 12 Personal Navigator™ Owner's Manual & Reference." Garmin Corporation. 1999. 66 pages.
"Travel Time Data Collection Handbook—Chapter 5: ITS Probe Vehicle Techniques." FHWA-PL98-035 Report, Department of Transport, University of Texas. Mar. 1998. 70 pages.
Hoogenraad "Location Dependent Services." 3rd AGILE Conference on Geographic Information Science, Helsinki/Espoo, Finland, May 2000. pp. 74-77.
Balsiger et al., "MOGID: Mobile Geo-depended Information on Demand." Workshop on Position Dependent Information Services (W3C-WAP), 2000, 8 pages.
Efstratiou et al. "Reflection: A Solution for Highly Adaptive Mobile Systems," 2000 Workshop on Reflective Middleware, 2000, 2 pages.
Popescu-Zeletin et al., "Applying Location-Aware Computing for Electronic Commerce: Mobile Guide" Proc. 5th Conference on Computer Communications, AFRICOM-CCDC'98, Oct. 20-22, 1998, 14 pages.
Zhao, "Mobile Phone Location Determination and Its Impact on Intelligent Transportation Systems," IEEE Transactions on Intelligent Transportation Systems, Mar. 2000, 1(1):55-64.
Yokote, "The Apertos Reflective Operating System: The Concept and Its Implementation," SCSL TR 92 014, Jun. 26, 1992, 23 pages.

(56) References Cited

OTHER PUBLICATIONS

Long et al., "Rapid Prototyping of Mobile Context-Aware Applications: The Cyberguide Case Study," MobiCom '96, 1996, 11 pages.
Leonhardt et al., "Towards a general location service for mobile environments," Proc. Third International Workshop on Services in Distributed and Networked Environments, Jun. 3-4, 1996, 8 pages.
Leonhardt et al., "Multi-Sensor Location Tracking," MOBICOM 98, Dallas, TX, 12 pages.
Kreller et al., "UMTS: A Middleware Architecture and Mobile API/Approach," IAPRS, vol. XXXIII, Amsterdam, 2000, 7 pages.
Klinec and Volz, "Nexus-Positioning and Communication Environment for Spatially Aware Applications," IAPRS, vol. XXXIII, Amsterdam, 2000, 7 pages.
"Digital cellular telecommunications system (Phase 2+); Specification of the SIM Application Toolkit for the Subscriber Identity Module—Mobile Equipment (SIM—ME) interface (GSM 11.14)" Global System for Mobile Communications, Dec. 1996, 56 pages.
"Estonian operator to launch world's first Network-based location services," Ericsson Press Release, Oct. 11, 1999, 1 page.
Efstratiou et al., "Architectural Requirements for the Effective Support of Adaptive Mobile Applications," 2000, 12 pages.
Drane et al., "Positioning GSM Telephones," IEEE Communications Magazine, Apr. 1998, pp. 46-59.
Dix et al., "Exploiting Space and Location as a Design Framework for Interactive Mobile Systems," ACM Transactions on Computer-Human Interaction (TOCHI)—Special issue on human-computer interaction with mobile systems, 2000, 36 pages.
Davies et al., "L2imbo: A distributed systems platform for mobile computing," Mobile Networks and Applications, 1998, 21 pages.
Cheverst et al., "Supporting Collaboration in Mobile-aware Groupware," Workshop on Handheld CSCW, 1998, 6 pages.
Cheverst et al., "Sharing (Location) Context to Facilitate Collaboration Between City Visitors," 2000, 5 pages.
Cheverst et al., "Experiences of Developing and Deploying a Context-Aware Tourist Guide: The GUIDE Project," 2000, 12 pages.
Cheverst et al., "Developing Interfaces for Collaborative Mobile Systems," 1999, 15 pages.
Cheverst et al., "Design of an Object Model for a Context Sensitive Tourist Guide,", 1999, 4 pages.
Cheverst et al., "The Role of Connectivity in Supporting Context-Sensitive Applications," HUC'99, LNCS 1707, 1999, 15 pages.
Cheverst et al., "Architectural Ideas for the Support of Adaptive Context-Aware Applications," Proceedings of Workshop on Infrastructure for Smart Devices—How to Make Ubiquity an Actuality, HUC'00, Bristol, Sep. 2000, 3 pages.
Balsiger et al., "MOGID: Mobile Geo-depended Information on Demand," [online] Retrieved from the Internet on May 25, 2012: URL: http://www.w3.org/Mobile/posdep/wap-v2.htm, Workshop on Position Dependent Information Services (W3C-WAP), 2000, 9 pages.
Borsodi, "Super Resolution of Discrete Arrivals in a Cellular Geolocation System," University of Calgary Thesis, Apr. 2000, 164 pages.
Akerblom, "Tracking Mobile Phones in Urban Areas," Goteborg University Thesis, Sep. 2000, 67 pages.
Digital cellular telecommunications system (Phase 2+); Location Services (LCS); Service description, Stage 1 (GSM 02.71) ETSI, Apr. 1999, 22 pages.
"3rd Generation Partnership Project (3GPP); Technical Specification Group (TSG) RAN; Working Group 2 (WG2); Report on Location Services," TS RAN R2.03 V0.1.0, Apr. 21-23, 1999, 43 pages.
"Enabling UMTS / Third Generation Services and Applications," No. 11 Report from the UMTS Forum, Oct. 2000, 72 pages.
"3rd Generation Partnership Project; Technical Specification Group Radio Access Network; Stage 2 Functional Specification of Location Services in UTRAN," 3G TS 25.305 v.3.1.0, Mar. 2000, 47 pages.

"3rd Generation Partnership Project; Technical Specification Group Services and System Aspects; Functional stage 2 description of location services in UMTS," 3G TS 23.171 v.3.11.0, 1999, 55 pages.
"Buddy Locator." Jun. 11, 2003. http://www.halfbakery.com/idea/Buddy_20Locator.
"Hansel and Gretel and Other Stories" Author: Grimm, Jacob. Specifically, we would like to cite the "white pebbles" and "bread crumbs" used as a form of tracking in the folk tale. Publication Date: 1921 Publisher: New York, Doran. pp. 15-19.
"Mobile Phone Utility." Jan. 8, 2004. http://www.halfbakery.com/idea/mobile_20phone_20utility.
"Mobile Proximity Link." Sep. 30, 2001. http://www.halfbakery.com/idea/Mobile_20Proximity_20Link.
"Networks in Motion Named Semi-Finalist for Wireless LBS Challenge." Mar. 18, 2004. http://www.tmcnet.com/usubmit/2004/Mar/1025200.htm.
"Proposal for Free, Open Source Cell Phone Location Service." Mar. 6, 2004. http://george.hotelling.net/90percent/geekery/proposal_for_free_open_source_cell_phone_location_service.php.
"SignalSoft Corporation Has Been Awarded a Location-Based Services Patent." Apr. 27, 2001. http://www.cellular.co.za/news_2001/04282001-signalsoft-patent.htm.
"Star Trek Communicator" the prop utilized in the Star Trek television series (The Original Series—TOS). The first appearance was in "The Cage" episode airing in 1964. The Science Fiction series was created by Gene Roddenberry.
Want, Roy et al. "The Active Badge Location System." Olivetti Research Ltd., Cambridge, England. ACM Transactions on Information Systems (TOIS), vol. 10, Issue 1. Jan. 1992. 10 pages.
"The Tetra System." Ashcom Systems Ltd.—TETRA Communications Networks. Feb. 1, 2011. 2 pages.
(Editor) Saint-Andre, Peter; (Contributors) Adachi, Shin et al. "Liberty ID-SIS Presence Service Specification." Version 1.0-10. Liberty Alliance Project. Copyright 2005. 14 pages.
"Complete Coverage—Unrivalled Coverage with Lower Costs." Nokia TB3 TETRA Base Station—Data Sheet. Copyright Nokia 2004. 2 pages.
"Complete Nokia TETRA for Public Safety." Nokia Code: 11113. Copyright 2003 Nokia. 20 pages.
Cuervo, F. et al. "Megaco Protocol Version 1.0." Network Working Group; Request for Comments: 3015; Obsoletes: 2885, 2886; Category: Standards Track. Copyright the Internet Society. Nov. 2000. 179 pages.
Day, M. et al. "A Model for Presence and Instant Messaging." Network Working Group; Request for Comments: 2778; Category: Informational. Copyright the Internet Society. Feb. 2000. 17 pages.
Groves, C. et al. "H.24B / MEGACO Registration Procedures." Network Working Group; Request for Comments: 5615; BCP:151; Category: Best Current Practice. Copyright IETF Trust and the persons identified as the document authors. Aug. 2009. 14 pages.
"Improving TETRA Base Station Coverage with Revolutionary Radio Access Solution." White Paper. 0604 PMIR. Copyright Nokia 2004. 9 pages.
Klyne, G. et al. "Date and Time on the Internet: Timestamps." Network Working Group; Request for Comments: 3339; Category: Standards Track. Copyright the Internet Society. Jul. 2002. 18 pages.
Leighton, Paul "TETRA Security—2nd ETSI Security Workshop: Future Security." Jan. 16-17, 2007. Sophia-Antipolis, France. 31 pages.
"Location Architecture Overview Requirements." Historic Version 1.0. "Open Mobile Alliance." OMA-RD-LOC_ArchOverview-V1_0-20041118-H. Nov. 18, 2004. 49 pages.
Makelainen, Sami I. et al. "OMA IMPS (Previously Wireless Village)." A paper for instant messaging and presence-seminar, University of Helsinki. 2005. 12 pages.
"Network Wide TETRA Services." Press Backgrounder for Nokia. Sep. 2004. pp. 1-3.
"Nokia NetAct for TETRA—Ensuring a Reliable and Always Available Service." Copyright Nokia 2001. 2 pages.
"Operational Best Practices for Managing Trunked Land Mobile Radio Systems." PSWN—Public Safety Program Wireless Network. Final Version. May 2003. 77 pages.

(56) References Cited

OTHER PUBLICATIONS

Salinas, Arturo. "Advantages and Disadvantages of Using Presence Service." Helsinki University of Technology. May 4-5, 2006. 8 pages.
"TETRA is the Winner in Bahrain." Nokia TETRA is proving its worth in Bahrain, including the challenge of the first Middle Eastern Grand Prix. Copyright 2004. 2 pages.
"TETRA Touch." Nokia TETRA customer newsletter. www.nokia.com/tetra_touch. vol. 4. 2004. 28 pages.
"What is TETRA?" TETRA Quick Guide. Press Backgrounder. Sep. 2004. 9 pages.
Wireless Village—The Mobile IMPS Initiative. Client-Server Protocol Session and Transactions. Version 1.1. WV Internal Tracking No. WV-022. Copyright 2001-2002 Ericsson, Motorola and Nokia. Cover p. i-ii, pp. 1-92.
Wireless Village—The Mobile IMPS Initiative. Command Line Protocol. Version 1.1. WV Internal Tracking No. WV-031. Copyright 2001-2002. Ericsson, Motorola and Nokia. Cover p. i-iii, pp. 1-31.
Wireless Village—The Mobile IMPS Initiative. Presence Attributes. Version 1.1. WV Internal Tracking No. WV-029. Copyright 2001-2002. Ericsson, Motorola and Nokia. Cover p. i-ii, pp. 1-23.
Wireless Village—The Mobile IMPS Initiative. SSP—Server to Server Protocol Semantics Document. Version 1.1. WV Internal Tracking No. WV-032. Copyright 2001-2002 Ericsson, Motorola and Nokia. Cover p. i-ix, pp. 1-125.
Wireless Village—The Mobile IMPS Initiative. System Architecture Model. Version 1.1. WV Tracking No. WV-020. Copyright 2001-2002 Ericsson, Motorola and Nokia. Cover p. i-ii, pp. 1-10.
"Wireless Village Initiative Announces Intent to Join the Open Mobile Alliance." Business, Wire (Vancouver, Canada), Business & High-Tech Editors. Jun. 13, 2002. 3 pages.
"Location Baed Services." GSM Association, Permanent Reference Document: SE.23. Version 3.1.0. Jan. 2003. 75 pages.
"Location-Based Services System (LBSS)." 3GPP2 S.R0019 v 1.0.0. Stage 1 Description. 3rd Generation Partnership Project 2 "3GPP2." Sep. 22, 2000. 56 pages.
"Senior Projects Garner Awards at Spring 2001 Design Expo." Department of Computer Science, University of Colorado at Boulder. 2004. 1 page.
"The World in Your Hand." Newsweek. May 31, 1999. 1 page.
Bahl, Paramvir et al. "Radar: An In-Building RF-based User Location and Tracking System." IEEE INFOCOM. 2000. pp. 775-784.
Barkhuus, Louise. "Privacy in Location-Based Services, Concern vs. Coolness." Department of Design and Use of IT, The IT University of Copenhagen. Sep. 2004. 6 pages.
Beresford, Alastair R. et al. "Location Privacy in Pervasive Computing." Published by the IEEE CS and IEEE Communications Society. Jan.-Mar. 2003. pp. 46-55.
Bisdikian, C. et al. "Enabling Location-Based Services Through Passive Monitoring Techniques: Mobile Positioning with the HINTON Locator Probe." A White Paper from Telesoft Technologies, 1st Workshop on Mobile Commerce. 2001. pp. 1-20.
Burak, Assaf et al. "Usage Patterns of FriendZone—Mobile Location-Based Community Services." MUM '04 Proceedings of the 3rd International Conference on Mobile and Ubiquitous Multimedia. 2004. 8 pages.
Colbert, Martin. "A Diary Study of Rendezvousing: Implications for Position-Aware Computing and Communications for the General Public." Kingston University, Group '01. ACM Press. Sep. 30-Oct. 3, 2001. 10 pages.
Cuellar, J. et al. "Geopriv Requirements." Internet Draft. Jun. 2002. pp. 1-23.
Cuellar, J. et al. "Geopriv Requirements." Internet Draft. Nov. 2001. pp. 1-13.
Dobson, Jerome E. et al. "Geoslavery." IEEE Technology and Society Magazine, Spring 2003. pp. 47-52.
Gruteser, Marco et al. "Anonymous Usage of Location-Based Services Through Spatial and Temporal Cloaking." Department of Computer Science, University of Colorado at Boulder. Proc. MobiSys 2003, ACM Press. 12 pages.
Jose, Rui et al. "Scalable and Flexible Location-Based Services for Ubiquitous Information Access." First International Symposium on Handheld and Ubiquitous Computing, HUC'99, Karlsruhe, Germany. Sep. 27-29, 1999. Published by Springer, Lecture Notes in Computer Science. vol. 1707. pp. 1-15.
Kottman, Cliff. "Geospatial Sciences in support of Digital Government." Open GIS Consortium, Inc. Nov. 16, 2000. 36 pages.
U.S. Appl. No. 60/471,743, filed May 20, 2003. First named inventor: Edmund J. Fish. Entitled, "Presence and Geo-Location Information for Mobile Devices and Computing Devices."
U.S. Appl. No. 60/474,207, filed May 30, 2003. First named inventor: Stephen Vaughan Murphy. Entitled, "Spoken User Identifier."
U.S. Appl. No. 60/480,532, filed Jun. 23, 2003. First named inventor: Ho, David YC. Entitled, "Game to Fame—An Internet Game that helps players become famous."
U.S. Appl. No. 60/482,362, filed Jun. 25, 2003. First named inventor: Steve Kirchmeier. Entitled, "Telephony notification system."
U.S. Appl. No. 60/488,399, filed Jul. 21, 2003. First named inventor: Andrew Weaver Entitled, "Multiple Personalities."
U.S. Appl. No. 60/488,638, filed Jul. 18, 2003. First named inventor: F. Craig Farrill. Entitled, "Real-Time Exchange."
U.S. Appl. No. 60/488,784, filed Jul. 22, 2003. First named inventor: Kreft. Entitled, "Improved Information Mapping Program."
U.S. Appl. No. 60/492,650, filed Aug. 5, 2003. First named inventor: Bruce D. Lawler. Entitled, "CDMA Press-to-Talk (P2T) Proof-of-Concept Demonstration."
U.S. Appl. No. 60/493,704, filed Aug. 8, 2003. First named inventor: Michael A. Sheha. Entitled, "Method and System for Collecting, Synchronizing, and Reporting Telecommunication Call Events and Work Flow Related Information."
U.S. Appl. No. 60/494,644, filed Aug. 11, 2003. First named inventor: Konstantin Othmer. Entitled, "Bandwidth Usage Optimization and Enhanced Performance for Wireless Networks."
U.S. Appl. No. 60/503,260, filed Sep. 16, 2003. First named inventor: Steve Kirchmeier. Entitled, "Telephony notification system."
U.S. Appl. No. 60/503,530, filed Sep. 16, 2003. First named inventor: William J. Sacco. Entitled, "Method and System of Rule-Based Triage."
U.S. Appl. No. 60/507,110, filed Oct. 1, 2003. First named inventor: Robert Khedour. Entitled, "Portable internet-linked subscription-capable audio-visual player apparatus and system and method for distribution and use thereof."
U.S. Appl. No. 60/512,852, filed Oct. 22, 2003. First named inventor: Patrick Blattner. Entitled, "Providing Video, Sound, or Animated Content with Instant Messages."
U.S. Appl. No. 60/516,351, filed Oct. 31, 2003. First named inventor: Habeman, William E. ; et al. Entitled, "Instantaneous Wireless Communicative Display and Interface System."
U.S. Appl. No. 60/517,657, filed Nov. 5, 2003. First named inventor: Prabhakar R. Chitrapu. Entitled, "Mobile Wireless Presence and Situation Management System and Method."
U.S. Appl. No. 60/518,333, filed Nov. 10, 2003. First named inventor: Uri Levi. Entitled, "Wireless communication system."
U.S. Appl. No. 60/520,846, filed Nov. 18, 2003. First named inventor: Sugla. Entitled, "Method of Improving Location Accuracy, Achieving Seamless Tracking and Enabling Novel Applications Using Information From Multiple Location and Positioning Technologies."
U.S. Appl. No. 60/522,490, filed Oct. 6, 2004. First named inventor: Otman A. Basir. Entitled, "Spatial Calendar."
U.S. Appl. No. 60/524,343, filed Nov. 21, 2003. First named inventor: Poitras, Jean-Guy. Entitled, "Virtually Interlinked Collaborative Information System Based on Physical Locations of Tangible Real Property."

(56) References Cited

OTHER PUBLICATIONS

U.S. Appl. No. 60/525,420, filed Nov. 25, 2003. First named inventor: Lars Eilstrup Rasmussen. Entitled, "System for automatically integrating a digital map system with world wide web sites."

U.S. Appl. No. 60/528,055, filed Dec. 8, 2003. First named inventor: Doug Brams. Entitled, "Push to Talk User Interface."

U.S. Appl. No. 60/530,935, filed Dec. 19, 2003. First named inventor: Brian E. Smartt. Entitled, "Geocoding locations near a specified city."

U.S. Appl. No. 60/533,052, filed Dec. 30, 2003. First named inventor: Harper, et al. Entitled, "Universal Digital Music Licensing and Download System."

U.S. Appl. No. 60/540,505, filed Jan. 29, 2004. First named inventor: Mark Hull. Entitled, "System and Method for Social Networking."

U.S. Appl. No. 60/543,105, filed Feb. 9, 2004. First named inventor: Julian Bourne. Entitled, "Method and Computer System for Social Networking."

U.S. Appl. No. 60/544,209, filed Feb. 11, 2004. First named inventor: Richard Mgrdechian. Entitled, "Method and Apparatus for Wirelessly Communication and Messaging Between Previously Known and Unknown Parties."

U.S. Appl. No. 60/544,639, filed Feb. 13, 2004. First named inventor: Mark Hull. Entitled, "System and Method for Social Networking."

U.S. Appl. No. 60/546,687, filed Feb. 20, 2004. First named inventor: Brian Roundtree. Entitled, "Call Intercept Methods for Customer Self Support and Methods for Navigating Data Screens."

U.S. Appl. No. 60/549,484, filed Mar. 1, 2004. First named inventor: Richard Mgrdechian. Entitled, "Method and Apparatus for Wirelessly Communicating and Messaging Between Previously Known and Unknown Parties."

U.S. Appl. No. 60/549,937, filed Mar. 5, 2004. First named inventor: Barry Appelman. Entitled, "Passive Population of Buddy List form a Contact List."

U.S. Appl. No. 60/550,262, filed Mar. 3, 2004. First named inventor: Richard Mgrdechian. Entitled, "Method and Apparatus for Wirelessly Communicating and Messaging Between Previously Known and Unknown Parties."

U.S. Appl. No. 60/550,300, filed Mar. 4, 2004. First named inventor: Tom Miltonberger. Entitled, "Method and System to Facilitate Geo-Location and Geo-Compliance Utilizing a Client Agent."

U.S. Appl. No. 60/552,406, filed Mar. 10, 2004. First named inventor: Greg Tseng. Entitled, "Enhancing virally marketed facilities."

U.S. Appl. No. 60/552,718, filed Mar. 15, 2004. First named inventor: Jeremy Liew. Entitled, "Social Networks."

U.S. Appl. No. 60/553,240, filed Mar. 15, 2004. First named inventor: Isaias Sudit; and Title: "Telephone User Interface for Efficient Self-Location of Mobile Phone".

U.S. Appl. No. 60/553,241, filed Mar. 15, 2004. First named inventor: Isaias, Sudit; and Title: "Meet Function for Telephone Auto Location System Based on Geographic Location and User Profiles".

U.S. Appl. No. 60/555,501, filed Mar. 22, 2004. First named inventor: Jens Eilstrup Rasmussen. Entitled, "Sub-Pixel Bitmaps and Their Use in Generating, Storing and Displaying Maps."

U.S. Appl. No. 60/560,087, filed Apr. 6, 2004. First named inventor: Cesar Cabral. Entitled, "Method and system for traffic management between a vehicle and a remote location."

U.S. Appl. No. 60/560,468, filed Apr. 7, 2004. First named inventor: Brian Lawler. Entitled, "Trust-metric network methods and apparatus."

U.S. Appl. No. 60/562,785, filed Apr. 15, 2004. First named inventor: Brian Wilson. Entitled, "System for Providing Location-Based Services in a Wireless Network, Such as Locating Sets of Desired Locations."

U.S. Appl. No. 60/566,644, filed Apr. 29, 2004. First named inventor: John N. Gross. Entitled, "System & method of identifying and predicting innovation dissemination."

U.S. Appl. No. 60/567,598, filed May 3, 2004. First named inventor: Klassen, Gerhard D. Entitled, "System and method for interrupt control on a handheld device."

U.S. Appl. No. 60/567,946, filed May 3, 2004. First named inventor: Jens Eilstrup Rasmussen. Entitled, "An Image Tile-Based, Digital Mapping System for the World Wide Web."

U.S. Appl. No. 60/568,482, filed May 6, 2004. First named inventor: Nathan Norfleet Eagle. Entitled, "Combined Short Range Radio Network and Cellular Telephone Network for Interpersonal Communications."

U.S. Appl. No. 60/569,953, filed May 11, 2004. First named inventor: Ravi Ayyasamy. Entitled, "Press to Talk Client Application Programming Interface (PCAPI)."

U.S. Appl. No. 60/570,410, filed May 12, 2004. First named inventor: Dennis P. Crowley. Entitled, "Location-Based Social Software for Mobile Devices."

U.S. Appl. No. 60/571,075, filed May 14, 2004. First named inventor: Krishnakant Patel. Entitled, "Roaming Gateway for Support of Advanced Voice Services While Roaming."

U.S. Appl. No. 60/573,059, filed May 21, 2004. First named inventor: Krishnakant Patel. Entitled, "SMSC Bypass (SB) for Expedited Presence Messaging."

U.S. Appl. No. 60/573,780, filed May 24, 2004. First named inventor: Krishnakant Patel. "SIM Toolkit."

\* cited by examiner

OPENING SCREEN

MATRIX OF BUDDY LIST

TYPICAL SCREEN SHOWING A NAMED BUDDY LIST'S CONTENTS

TYPICAL SCREEN SHOWING A BUDDY'S LOCATION ETC.

MAPIT™ DISPLAY

MAPIT DISPLAY SHOWING POSITION HISTORY OF A BUDDY

TYPICAL SCREEN SHOWING POSITION AND STATUS
OF A MEMBER OF A GROUP

MAPIT DISPLAY WHEN THE POSITION OF A BUDDY IS REQUESTED

SCREEN SHOT SHOWING AN INSTANT BUDDIES LOCATION

INSTANT BUDDY SETUP SCREEN

INSTANT BUDDY SETUP SCREEN DISPLAYED ON PHONE OF INSTANT BUDDY

PRIOR ART CELL PHONE SYSTEM PEER TO PEER EMBODIMENT

BUDDY WATCH SERVER & CELL PHONE PROCESS TO EXCHANGE POSITION DATA

ALT. EMB. OF POSITION EXCHANGE PROCESS

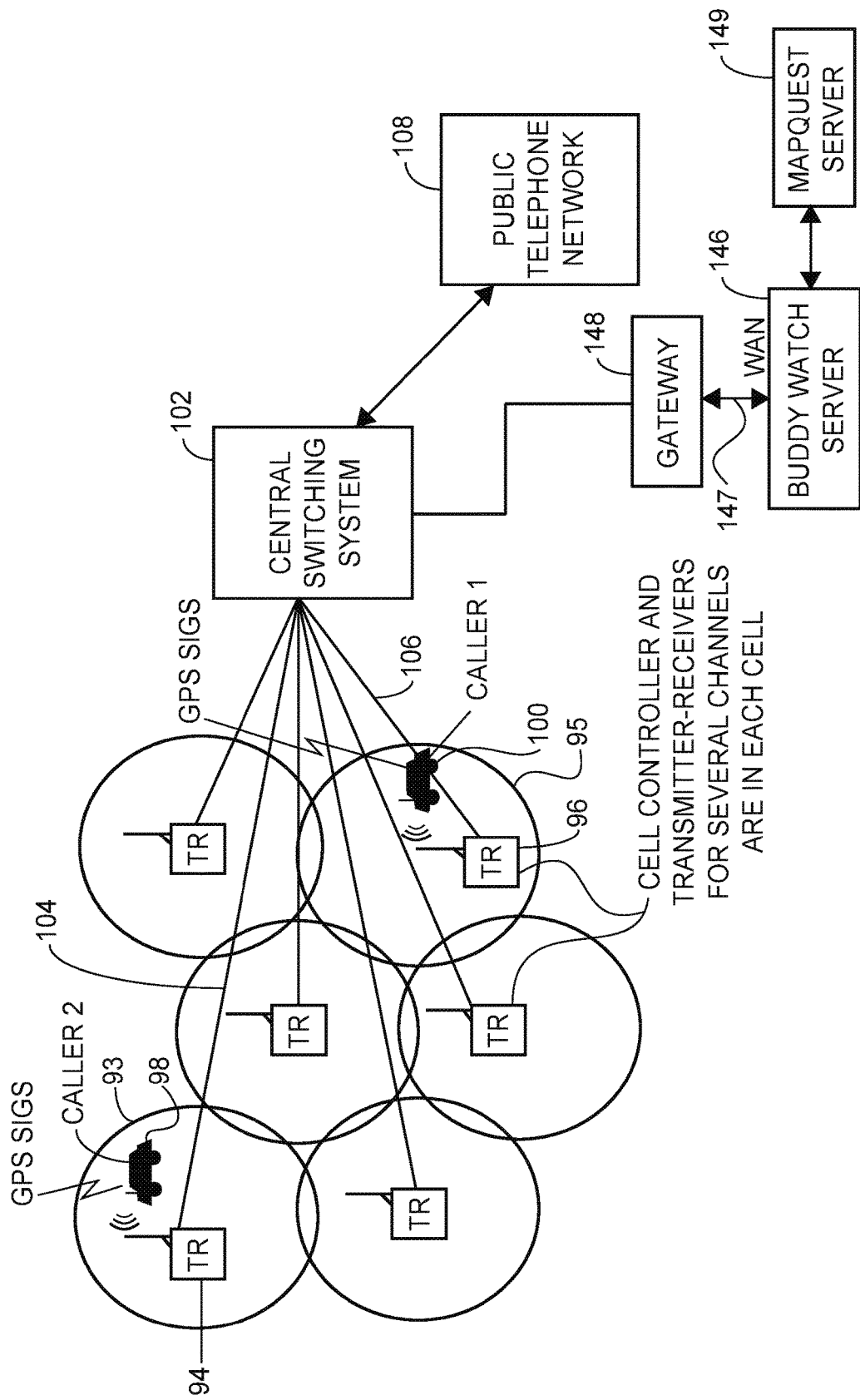
FIG. 16  SERVER-BASED BUDDY WATCH SYSTEM

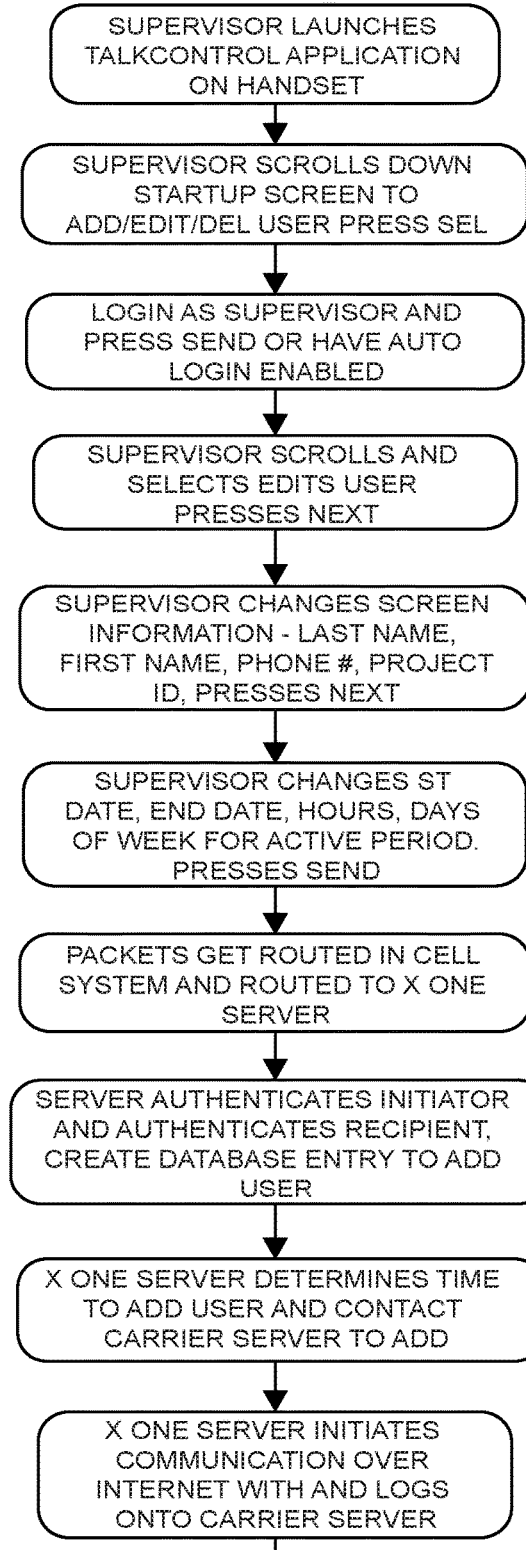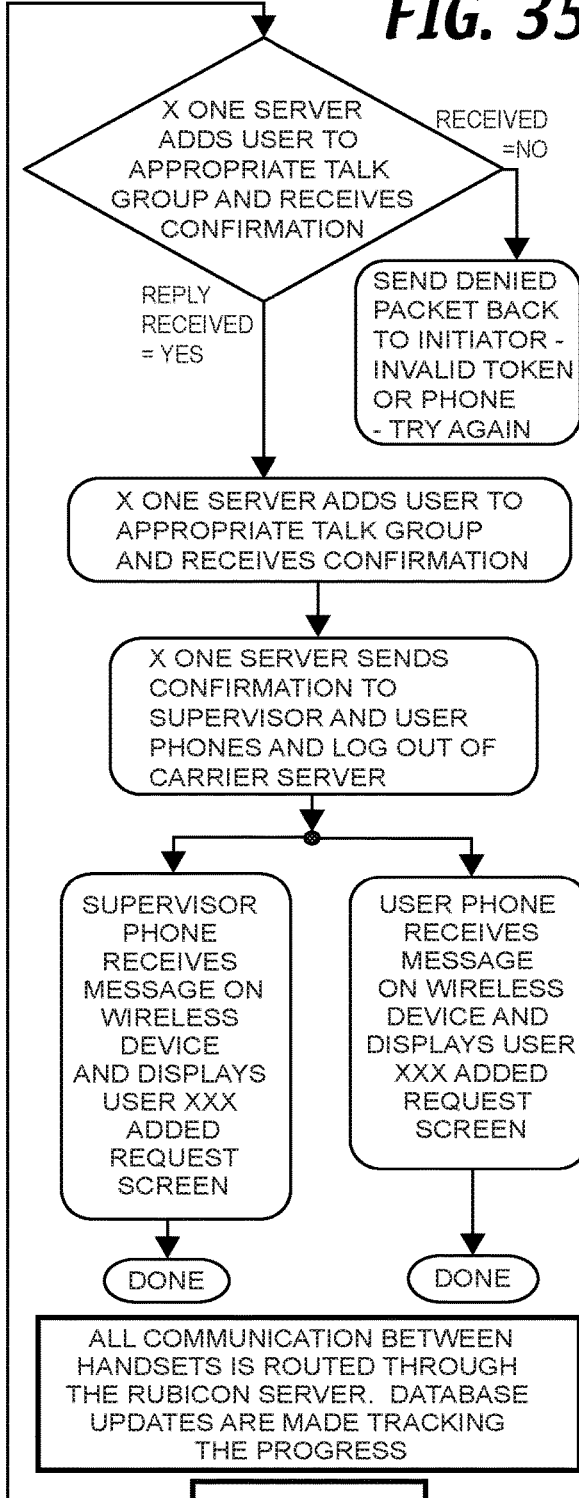
FIG. 35

TEMPORARY LOCATION SHARING GROUP WITH EVENT BASED TERMINATION

CLAIM OF PRIORITY

This application is a continuation of U.S. patent application Ser. No. 16/392,488, filed Apr. 23, 2019, which is a continuation of U.S. patent application Ser. No. 16/201,780, filed Nov. 27, 2018 (now issued as U.S. Pat. No. 10,341, 809), which is a continuation of U.S. patent application Ser. No. 15/428,981, filed Feb. 9, 2017 (now issued as U.S. Pat. No. 10,200,811), which is a continuation of U.S. patent application Ser. No. 15/404,481, filed Jan. 12, 2017 (now issued as U.S. Pat. No. 9,749,790), which is a continuation of U.S. patent application Ser. No. 14/139,695, filed Dec. 23, 2013 (now issued as U.S. Pat. No. 9,584,960), which is a continuation of U.S. patent application Ser. No. 13/889,132, filed Jun. 17, 2013 (now issued as U.S. Pat. No. 8,798,593), which is a continuation of U.S. patent application Ser. No. 12/075,408, filed Mar. 11, 2008 (now issued as U.S. Pat. No. 8,538,458), which is a continuation of U.S. patent application Ser. No. 11/099,362, filed Apr. 4, 2005 (now issued as U.S. Pat. No. 7,353,034. Priority is hereby claimed under 35 U.S.C. § 120 or 365(c) to each aforementioned application, and each such application is incorporated herein by reference.

FIELD OF USE AND BACKGROUND OF THE INVENTION

The cellular market in 2003 was around 150-160 million devices in the US and the number is growing at over 10% per year at least. Europe already has 320 million cell phone users, and the global market is over 1.4 billion devices.

Cell phone carriers are looking for opportunities to increase both revenue and profits by providing new services. For example, recently cell phones have been provided with browsers to allow surfing the internet from the phone. One of the needs businesses, families and individuals have is the need to know where their employees, children and friends are. No two way position information sharing technology currently exists as far as the applicant is aware.

The one way location sharing prior art includes On Star and the Mercedes Benz TeleAid services where, via GPS receivers and cellular phone capability built into a car, an aid center can track cars all over the world and speak with the occupants and sense when the cars airbags have deployed. Other commercial services allow parents to track the locations of their children in a one way location sharing manner. None of these services allow the occupants of the car to know where the aid center is or allows the children to know where their parents are.

Another need is for a system for use by motorists, hikers, pilots and boatmen to allow them to be able to contact rescuers and know the location of the rescuers as they come to the aid of the stranded person and to allow the rescuers to know the location of the victims they are trying to rescue. The need requires that cell phones have the capability to be reconfigured in the field to add an "instant buddy" to the list of people with whom location information is shared. The prior art kid tracking systems could not be reconfigured in the field to add new individuals with whom location information was to be shared.

Differences Over Kid Tracking Prior Art

In the prior art, one could buy phones that were set up at the manufacturer to enable parents to locate their children. One such service allows up to eight phones to be used and allows parents to monitor the locations of their kids. But these services do not allow the kids see the locations of their parents because the service is not set up to share location information between phones. In other words, it is a one way service with the kid's locations being sent to the parents phones for display but not vice versa. Further, there is no mechanism to add groups and members of groups, and there is no mechanism to set up "instant buddies" as that term is used below (temporary location sharing between phones on an ask and accept basis which automatically expires after a configurable interval terminates). The kid locator phones are set up at the factory and nothing can be changed in the field by the users and they are always on and cannot be disabled.

It is useful to be able to share locations among multiple cell phones which have GPS locator ability. Such an ability would be useful for people in groups who have made plans to meet at specific locations at specific times. When one person is late, the others in the group would be able to ascertain the tardy person's location. To alleviate privacy concerns, it would be useful to be able to turn off location sharing or to program location sharing so that it turns itself on automatically at some date and time and turns itself off at some other programmable date and time. It would also be useful to have a map display on cell phones which are picture enabled and to plot the locations on the map of persons in a group who have their location sharing capability turned on.

SUMMARY OF THE INVENTION

The invention contemplates 2.5 GHz and 3 GHz Java enabled, web enabled (or similar) cell phones and Personal Digital Assistants or other web enabled wireless products with global positioning system (GPS) receivers and sufficiently large liquid crystal displays for the preferred embodiment. The phones must be web enabled to be able to send and receive TCP/IP or other protocol packets over the internet to the Buddy Watch server.

In some embodiments where push-to-talk enablement is implemented, GPS receivers are not necessary in the cell phones but they must be web enabled to be able to send and receive TCP/IP or other packets over the internet to the Buddy Watch server.

These phones and other wireless devices are programmed with software (programmed at the factory or downloaded from the assignee of the present invention) to have the user interface and functionality described herein to allow mutual tracking and optional position mapping displays of members of groups and of instant buddies coming to the rescue of stranded motorists, hikers, pilots and boatmen. These phones work with a Buddy Watch™ server coupled to the internet. The server is not limited to any specific language or technology nor is it limited to any specific wired or wireless solution or any particular transmission physical layer or protocol.

The teachings of the invention do not require development of new cell phone or PDA technology nor do they require development of new cellular communication infrastructure. The functionality implemented by the software of the invention utilizes existing platforms and infrastructure. In the preferred embodiment, the software of the invention is developed to JAVA specifications.

In its primary mode, the process of the invention only allows exchanging and mapping of position data with persons on a Buddy List™ programmed into a Buddy Watch™ (synonym for Buddy Tracker™) device (defined as any of the devices mentioned anywhere in the specification when programmed to operate in Buddy Watch mode or coupled to another device operating in Buddy Watch mode). The user must allow others on his Buddy Lists to "see" his location (location sharing may be turned off), and the user must request to see the location of others on his Buddy Lists to be able to have their positions reported and/or mapped. Position information exchanged via radio transmission on the cellular infrastructure is encrypted so that outsiders cannot see or use location information that is transmitted. A simple menu structure allows easy setup and management of Buddy Watch application programs. The keypad of the phone or PDA is used to enter information into the Buddy Watch enabled device. Online help is available to setup and use the Buddy Tracker application program(s).

The teachings of the invention can also be integrated into other products and services such as autos with GPS based navigation systems. This would be done by expanding the navigation system to have a cellular transceiver capable of sending and receiving digital data including position data to the Buddy Tracker server. It could also be done by expanding the GPS navigation system product to have a USB or other interface port to couple the system to a cell phone or PDA of the type described above. This interface would allow the GPS navigation system to receive position data from the wireless digital data transceiver and map the position data on the GPS navigation system display of the auto. Handheld GPS navigation devices can also be expanded by integrating a cell phone therein or providing a port to interface to a cell phone to exchange position information with the Buddy Tracker server.

In a system employing the teachings of the invention, the users can change things on the fly in the field such as: adding groups and members; adding instant buddies, changing the size of the area in which their buddies can be tracked, enabling or disabling the location information sharing function without disabling the phone, etc.

Some of the benefits of the Buddy Tracker technology are that it allows businesses to easily identify which service persons are closest to the next job and to let personnel in the field know the positions of their co-workers and to share their location with their co-workers. Parents can keep track of where their kids are. Friends can keep track of where their buddies are and share their position with their buddies. Location information will be shared only so long as the phone is on and in an area where the device can receive a GPS signal and send the phone's coordinates out on the cellular network (and the location sharing capability is enabled).

Further, the cellular carriers do not have to invest in engineering or infrastructure to offer the Buddy Watch functionality. The software that implements the Buddy Watch functionality can be downloaded from the web or installed at the point of sale of a cell phone or PDA. Use and sale of an application that makes use of the on-board GPS capability of cell phones and PDAs built to comply with the E911 requirement allows the carriers to recoup some of the costs imposed upon them by the E911 requirement.

Enhancements to cellular phones in recent years such as the addition of cameras and web browsers have lost track of one of the basic reasons for cell phones in the first place— people want to communicate with and know where other people are. This is applicable to parental monitoring and increasing the efficiency of business and increasing the effectiveness of law enforcement. The Buddy Watch system also functions to decrease the load on the 911 system since not every situation requires the help of 911 authorities.

BRIEF DESCRIPTION OF THE DRAWINGS

FIG. 16 is a block diagram of a typical cellular system coupled by a gateway and a Wide Area Network such as the internet to a Buddy Watch server to provide the infrastructure of the invention.

FIG. 35 is a flowchart of the process for a supervisor to edit a user in a talk group.

DETAILED DESCRIPTION OF THE PREFERRED AND ALTERNATIVE EMBODIMENTS

Figure 1:
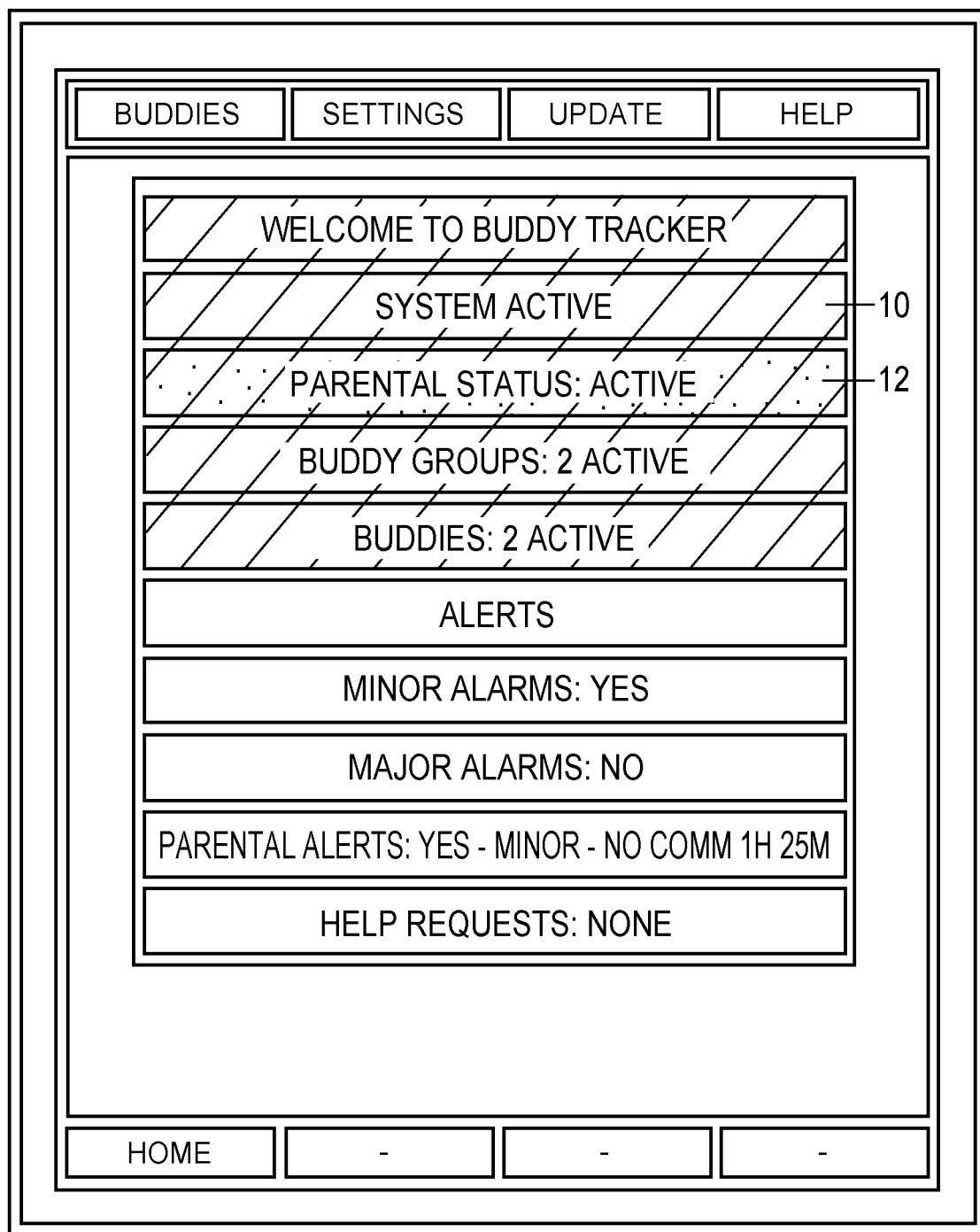
FIG. 1 is a screen shot of a typical opening screen which would be displayed on a cellphone with the BuddyTracker™ software enabled.
Figure 2A:
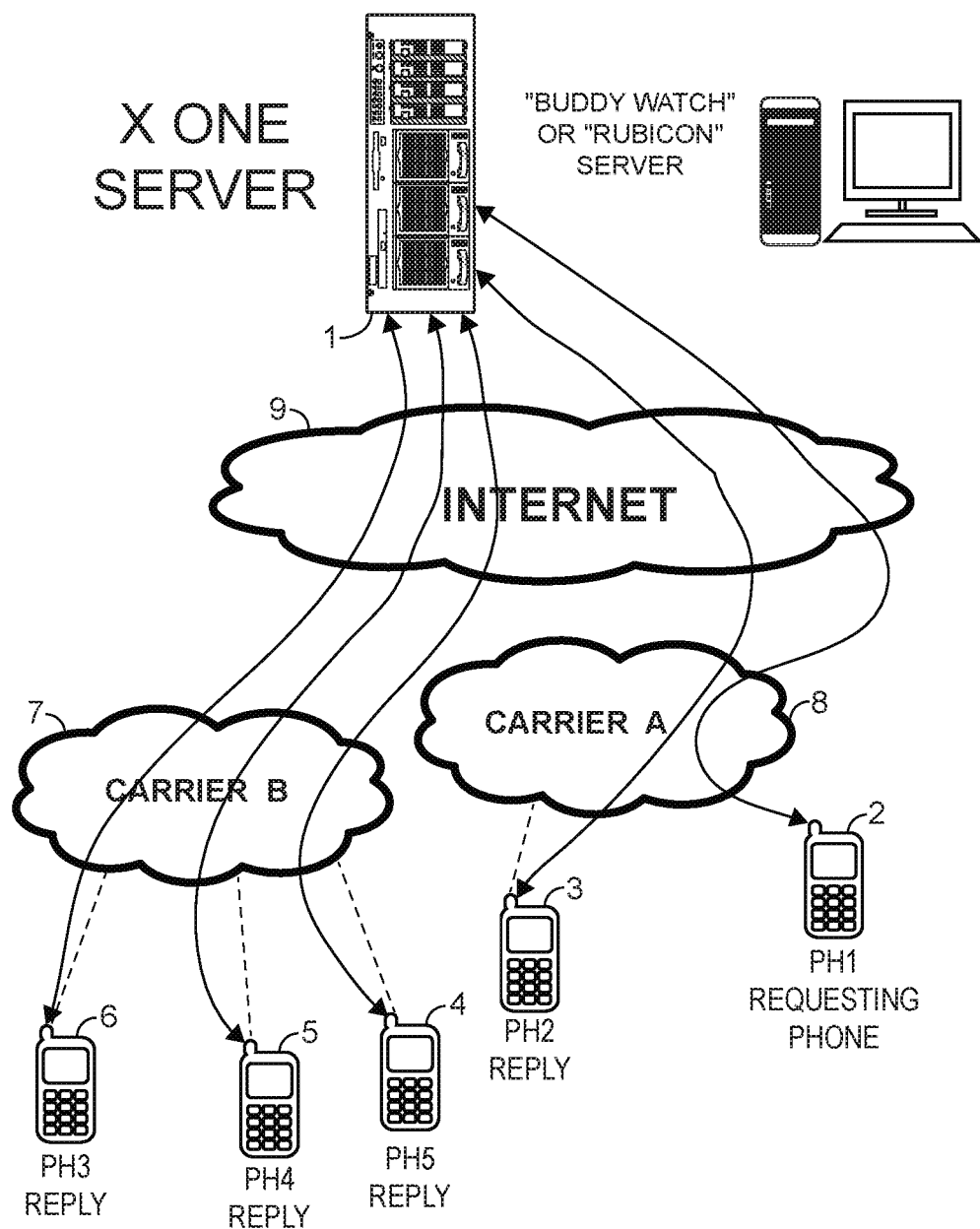
FIG. 2A shows a block diagram of the Buddy Watch system.

FIG. 1 is a screen shot of a typical opening screen which would be displayed on a cellphone with the Buddy Tracker™ software enabled on the phone. FIG. 2A is a block diagram of the Buddy Watch system. A Buddy Watch or Rubicon server communicates with wireless devices 2 through 6 via the internet 9 and wireless carrier systems 7 and 8. In the claims, the Buddy Tracker software is called the GPS position data sharing software application and it is resident on each of wireless devices 2 through 6. Generally, communication between the handsets and the Rubicon (Buddy Watch) server occurs as follows. Each handset communicates data packets through its local cellular carrier network via TCP/IP compliant data packets encapsulated in cell system packets. The carrier network tower receives the packets and strips off the cellular encapsulation and forwards the TCP/IP packet to an appropriate gateway connected to the internet 9. Routers in the internet route the packet to its destination, generally the Buddy Watch server 1. The receiving server validates the content of the IP packet to authenticate the sender as a registered Rubicon user and to verify that the sending phone EIN matches the phone EIN stored in the server. Once authenticated, the packet content is processed by the server. A response to the request in the packet is prepared using information from a database maintained by the Rubicon server and any associated map needed for the response is requested from a map server. The complete response is compiled, including any data needed to render a map on the recipient wireless device display and packetized into a TCP/IP packet and sent back to the originator of the request via internet routers and carrier gateways that couple the wireless carrier systems to the internet. The gateway of the carrier identifies the correct tower for the cell in which the recipient's phone is currently resident and the packet is encapsulated in a cell system packet and forwarded to the appropriate tower where it is transmitted wirelessly to the cell phone or other wireless device of the recipient. The wireless device then recovers the data in the TCP/IP packet and the port address in the TCP/IP packet header causes the packet to be routed to the Buddy Watch software where it is processed.

Figure 2B:
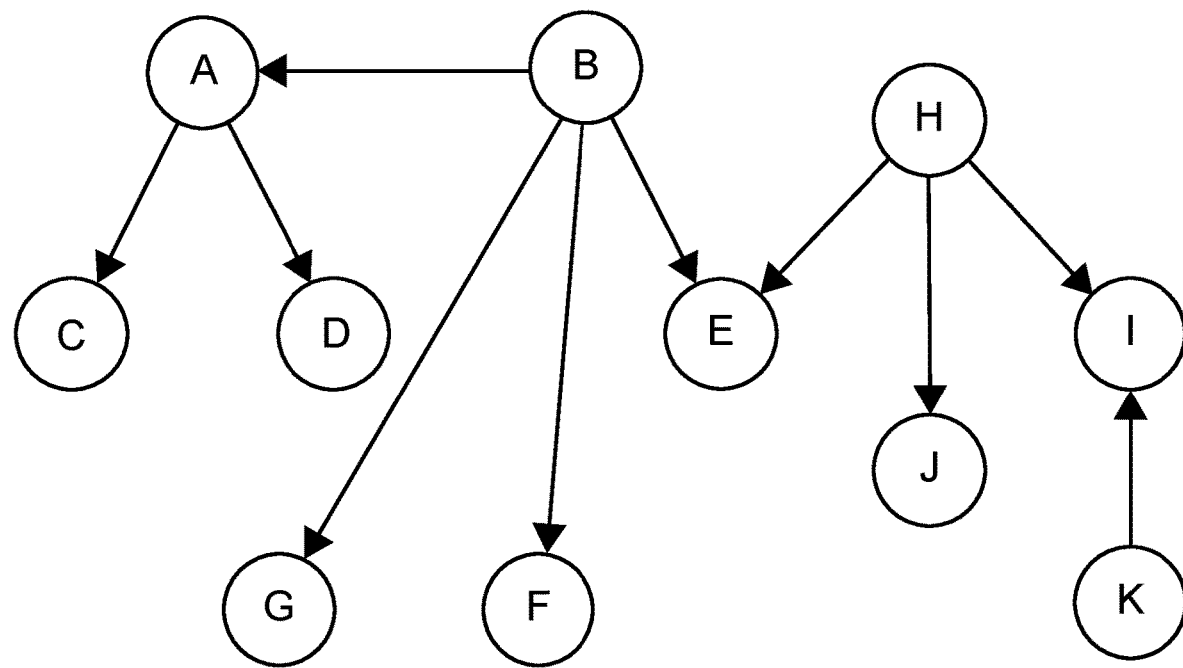
FIG. 2B illustrates a matrix or web of supervisorial relationships and Buddy Lists.
Figure 2C:
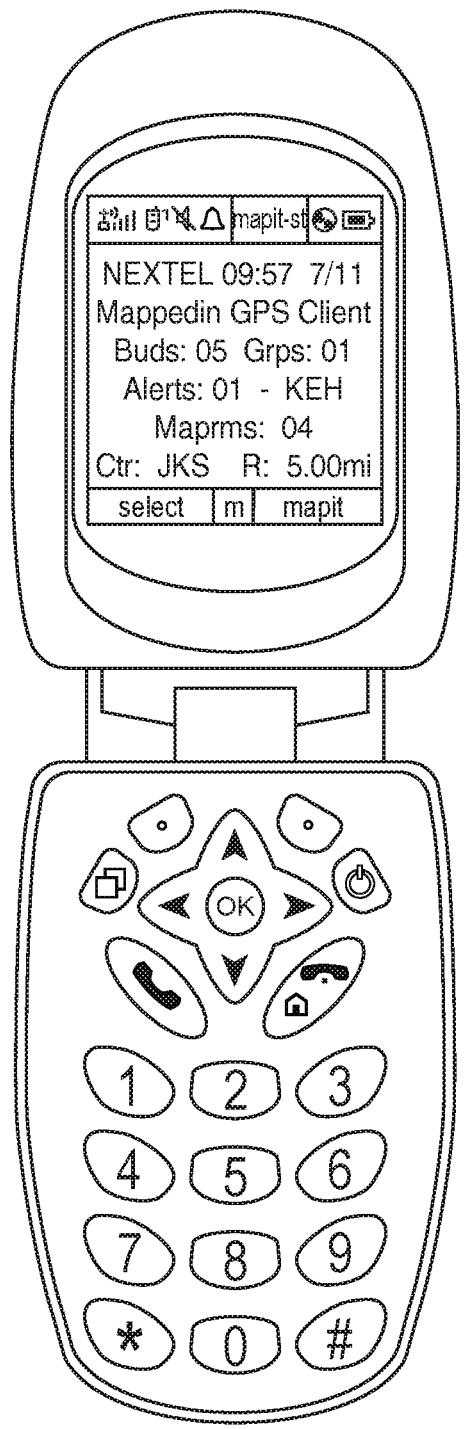
FIG. 2C is a diagram of the start-up screen.
Figure 2D:
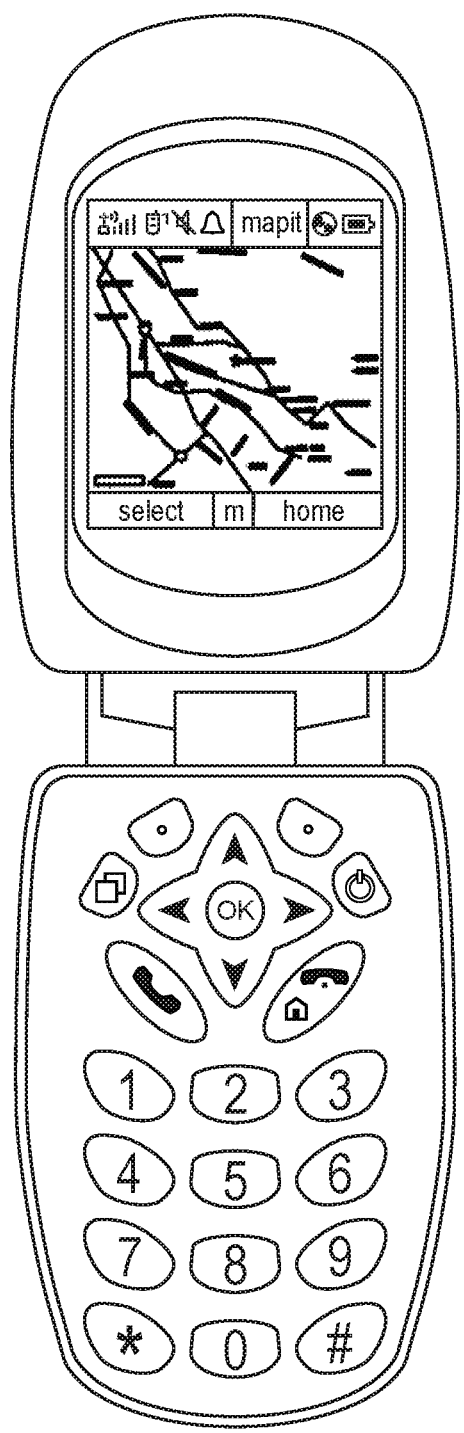
FIG. 2D shows the Mapit page.
Figure 2E:
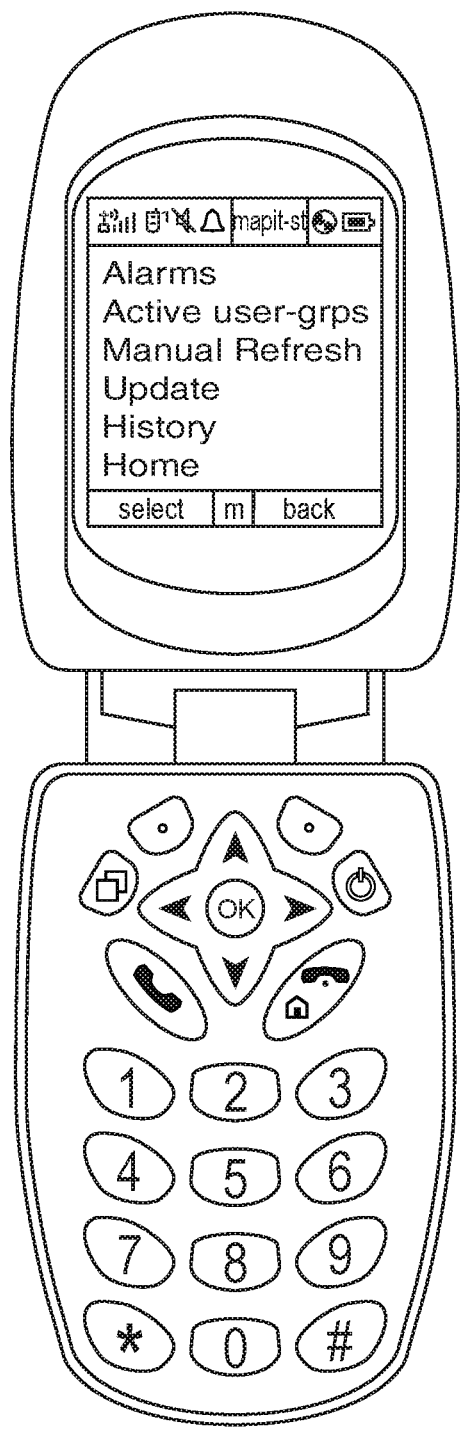
FIG. 2E shows additions options for manual refresh, etc. which can be reached by scrolling down the Mapit page below the list of active users.
Figure 2F:
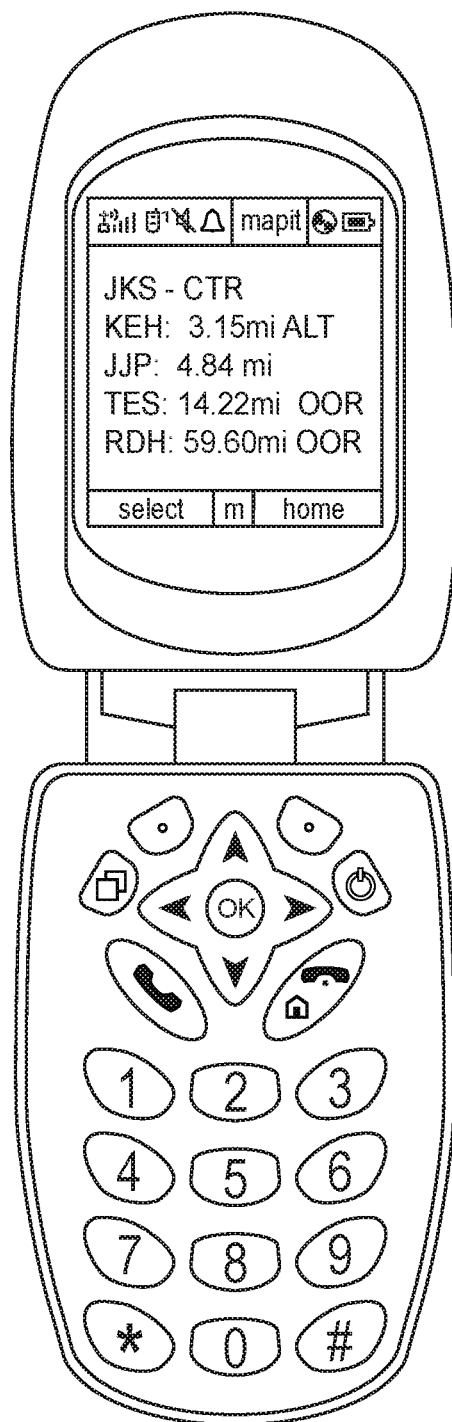
FIG. 2F is a screen of active users.

FIG. 2C is a diagram of the start-up screen. On startup, each handset starts its GPS sampler and the Buddy Watch application program. If Main is pressed, the user is taken to the Nextel default page (or whatever other carrier is being used). If Mapit is selected, the user is taken to the Mapit page shown in FIG. 2D. FIG. 2D shows the Mapit page where the positions of active users within the radius set up in the preferences of the center point XXX within radius YYY is shown. Scrolling down the Mapit page below the map is the list of active users including those outside the radius. FIG. 2E shows additional options for manual refresh, etc. which can be reached by scrolling down the Mapit page below the list of active users. FIG. 2F is a screen of active users. Color is used to highlight items. Scrolling to a user and pressing OK gives two options: re-centering the map on the user and displaying details of that user.

Figure 24:
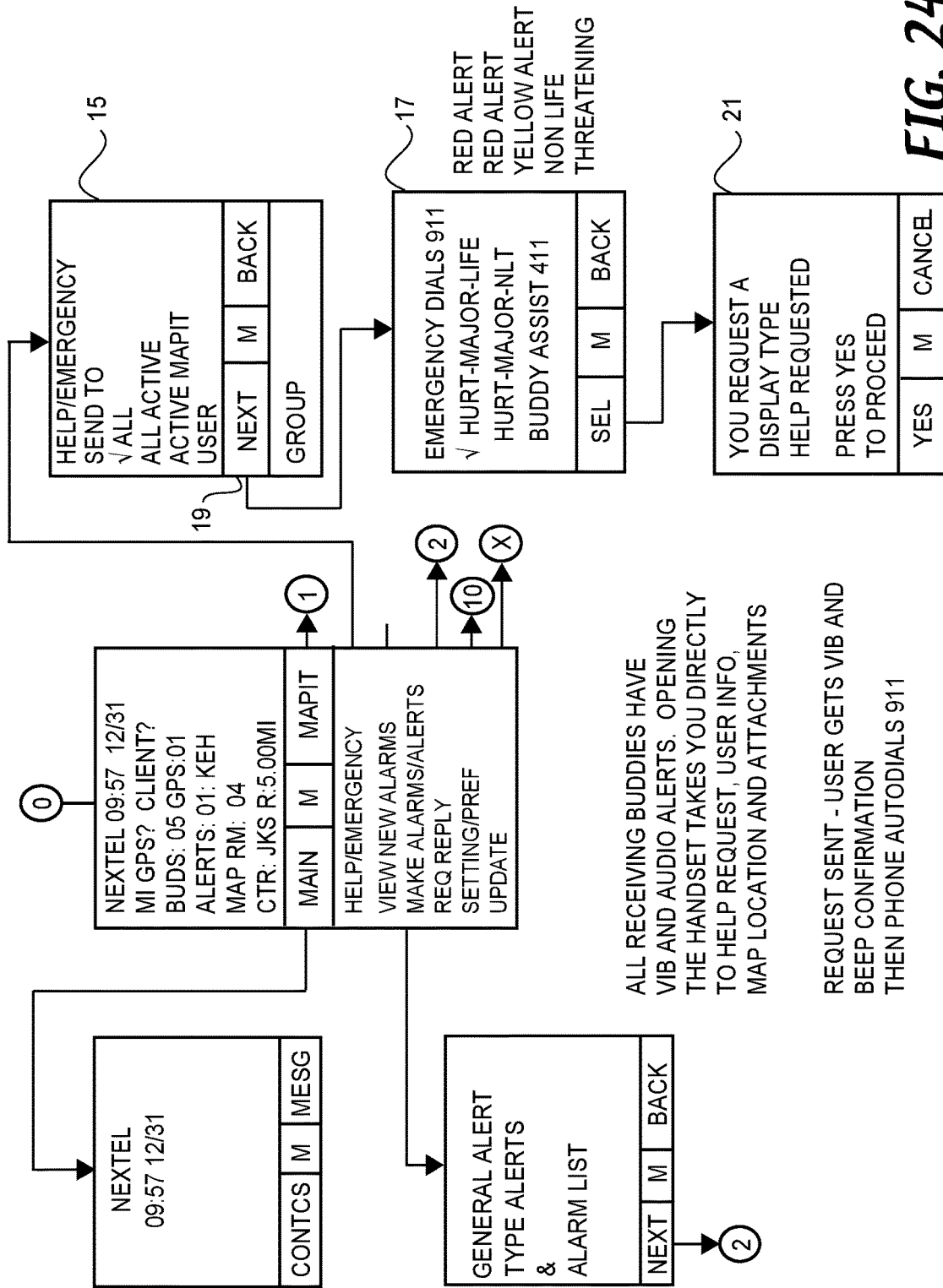
FIG. 24 is a diagram of the default start screen and some of the other user interface screens that the user can navigate to from the start screen.
Figure 25:
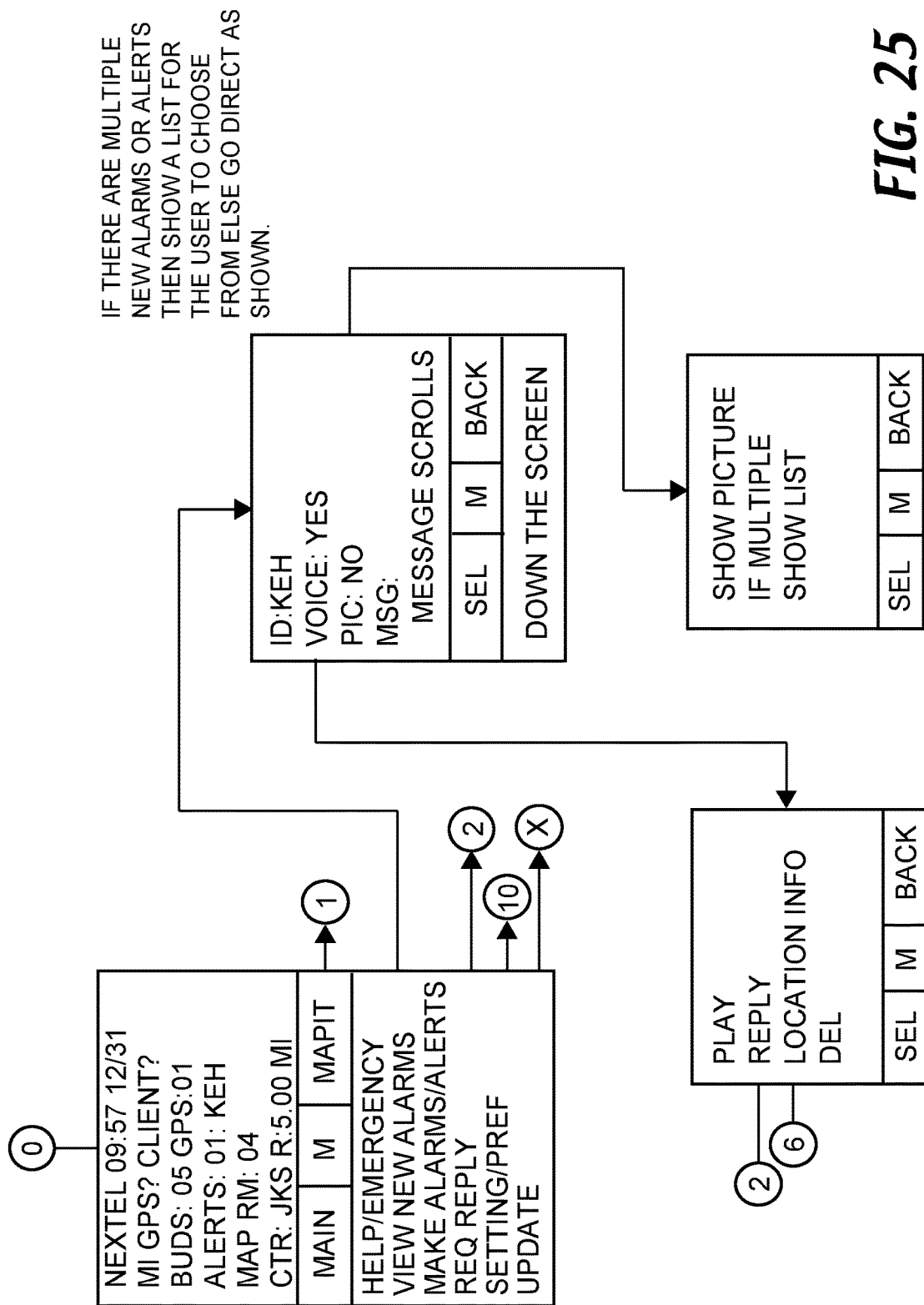
FIG. 25 is a help screen showing how navigation to a view new alarms screen can be accomplished.
Figure 26:
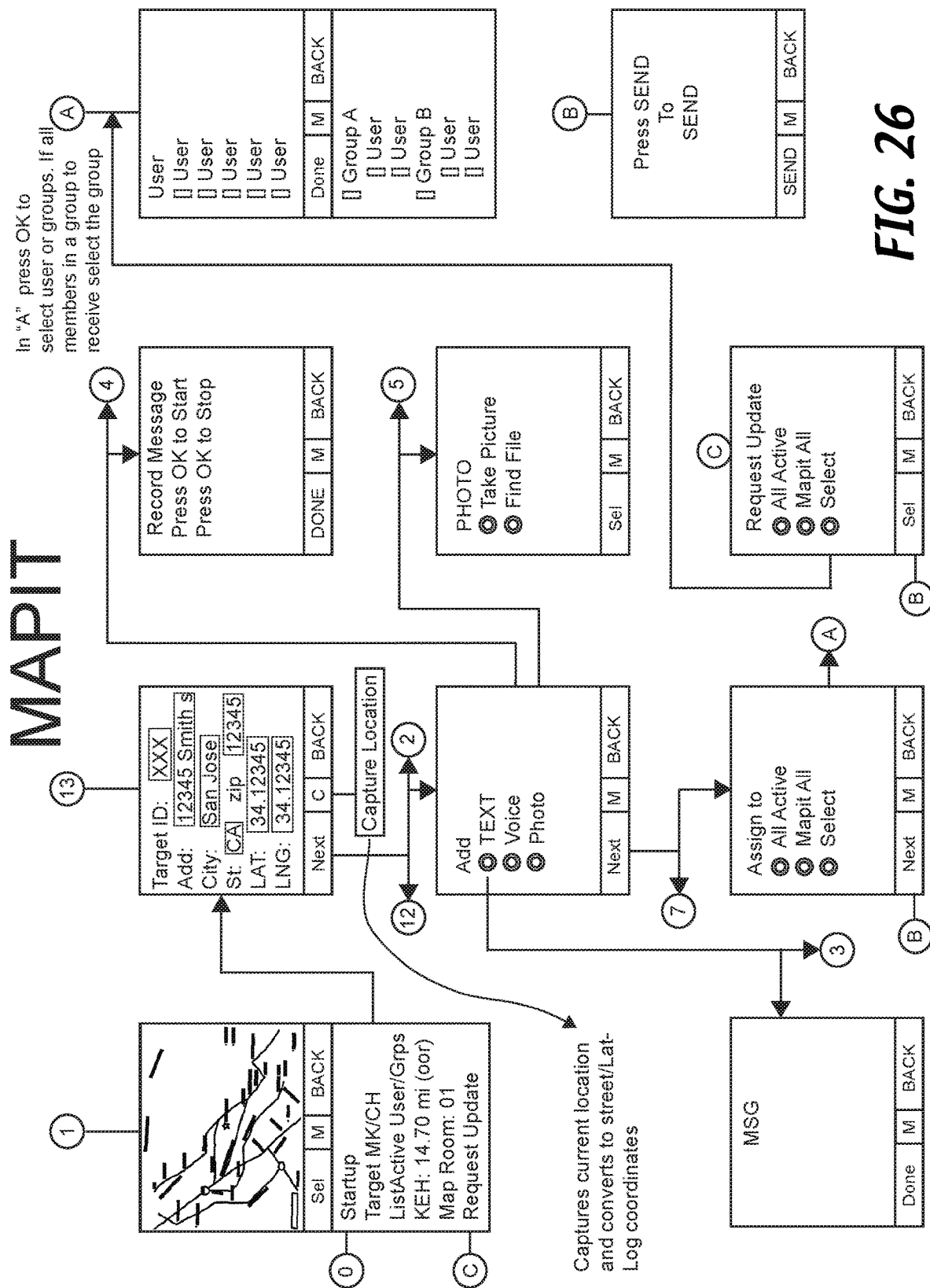
FIG. 26 shows the tree structure of a plurality of other screens which can be used to add target locations, annotate the target locations with text, voice or photo notes, add a text message, give commands to take a picture or find a picture file, record a voice message to be appended to the target, request position updates for all active buddies, map the positions of all active buddies or select particular buddies for mapping or requesting a position update.
Figure 27:
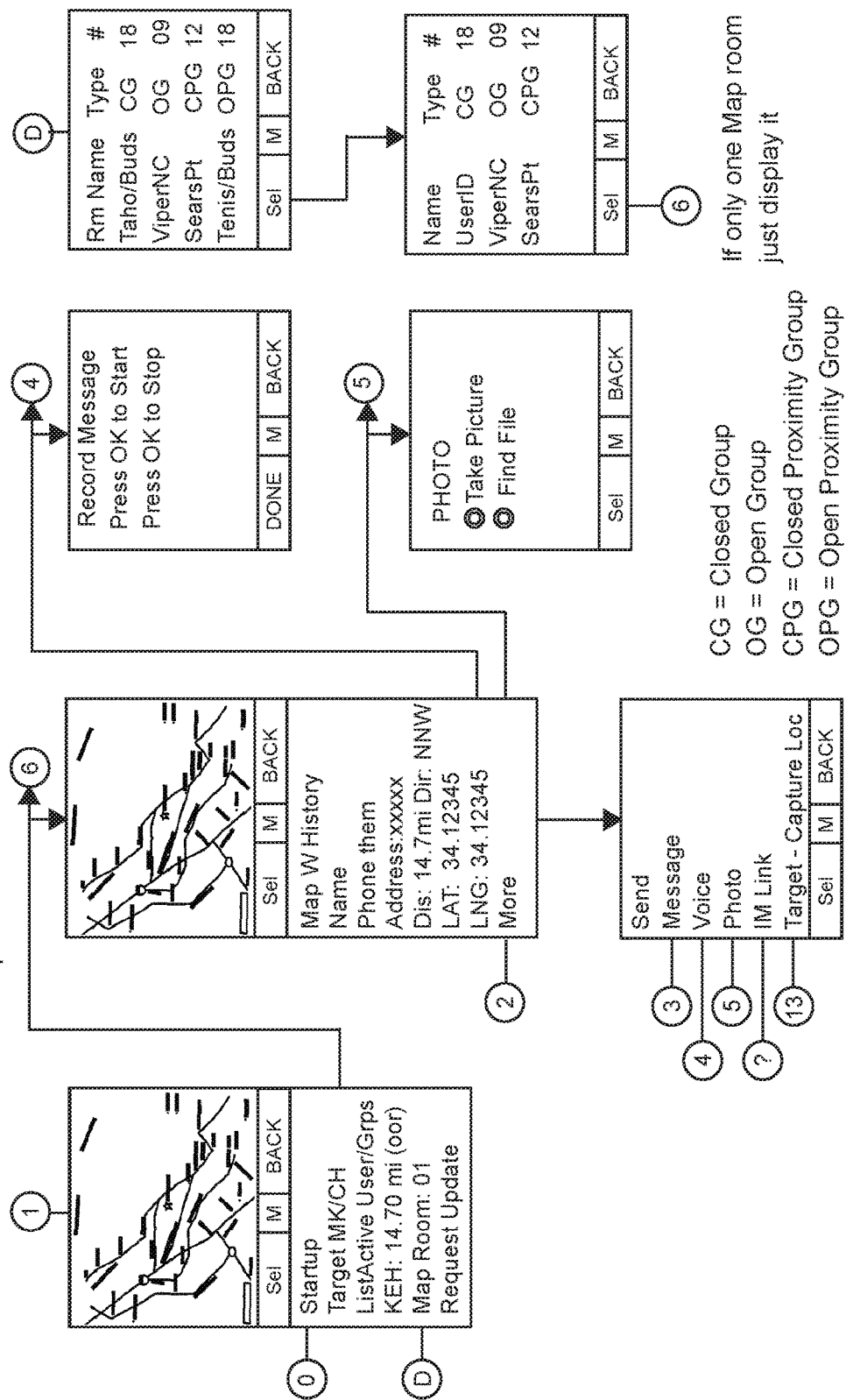
FIG. 27 shows a number of screens which can be displayed to map the position of a selected user with history and give information about the user as well as send short text messages, record and send voice messages, photos, Instant Messenger links, target positions, etc.
Figure 28A:
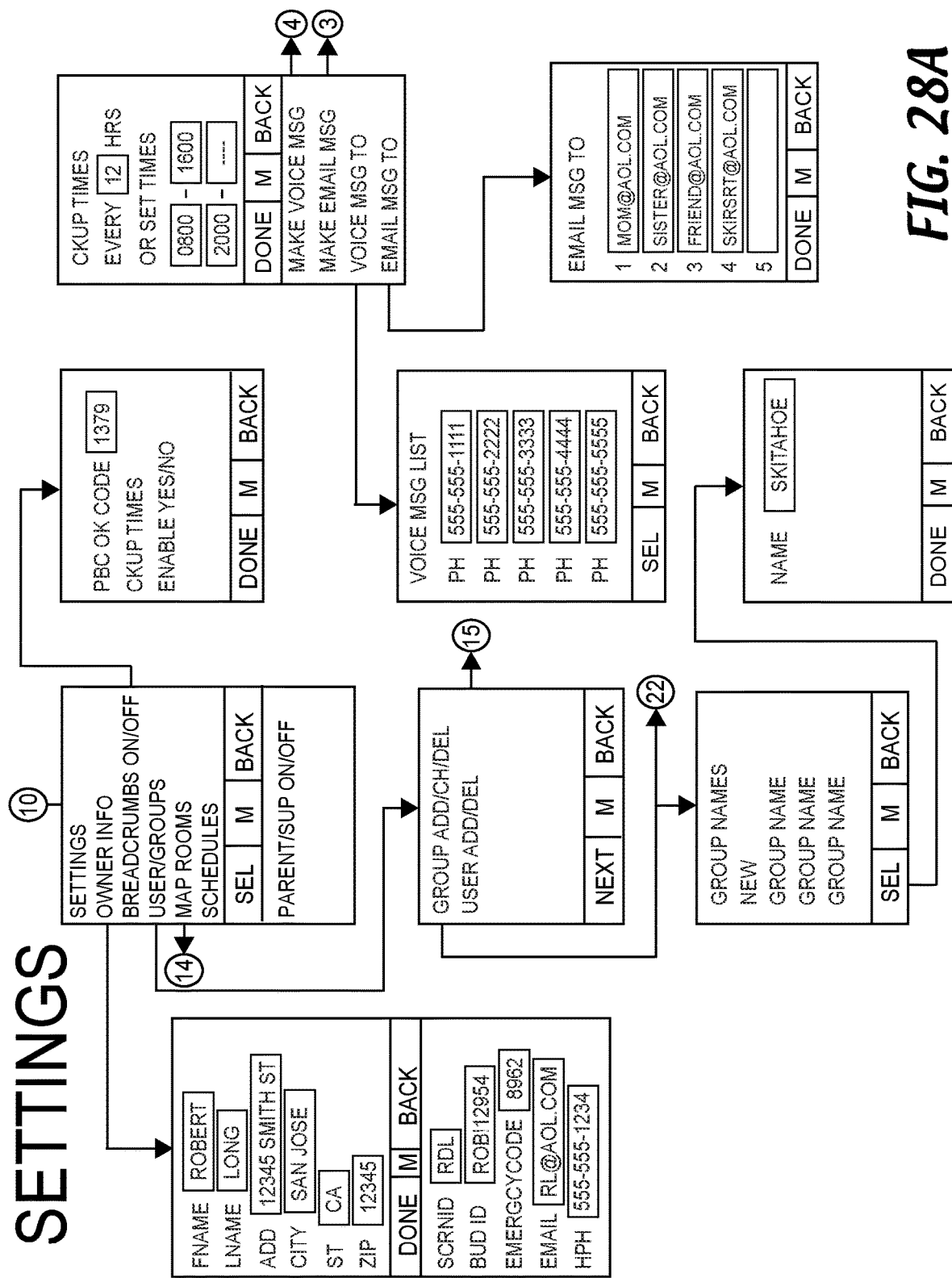
FIGS. 28A and 28B show user interface screens created by Buddy Tracker software to create settings such as bread crumbs on or off, security codes for personal bread crumbs tracking and verification that a user is OK, set checkup timeout intervals, establish phone numbers and email addresses of other users to call in case of emergency in personal bread crumbs mode, add, change or delete group names, set the Mapit screen radius, refresh rate and update setting, refresh time, delta position change for refresh.
Figure 28B:
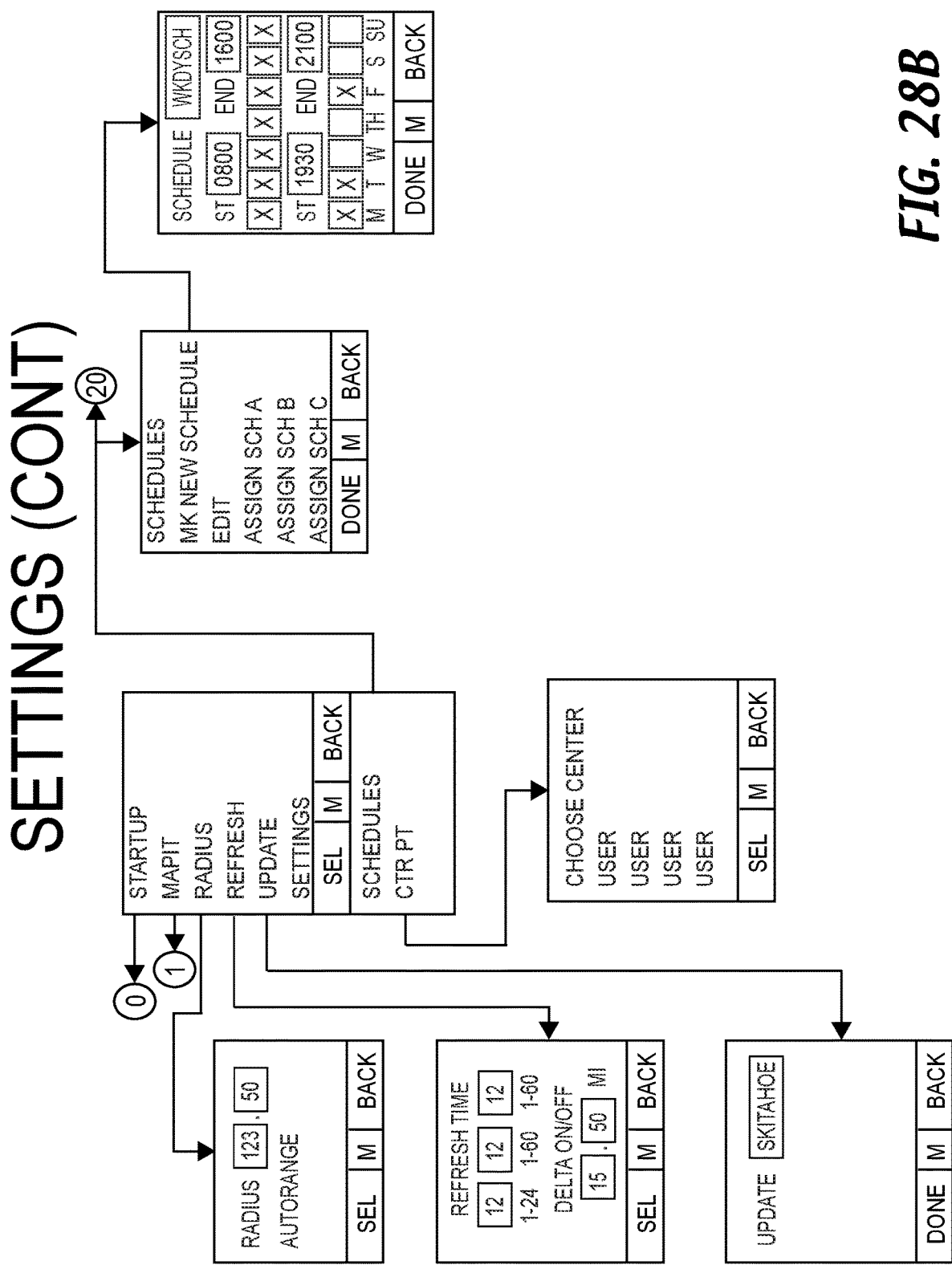
Figure 29:
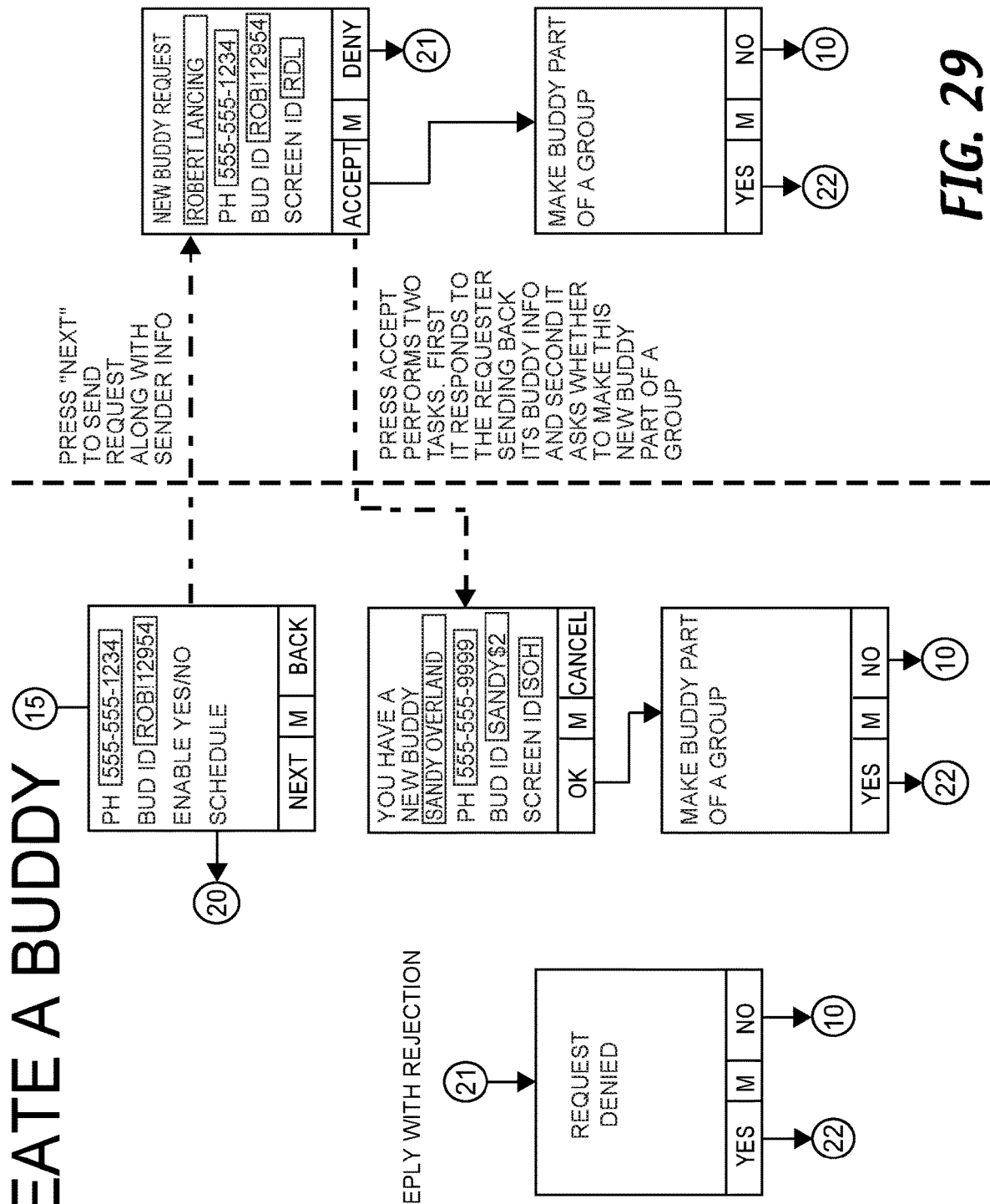
FIG. 29 shows the user interface screens to create a new buddy and showing the communication paths and accept protocol to do this.
Figure 30:
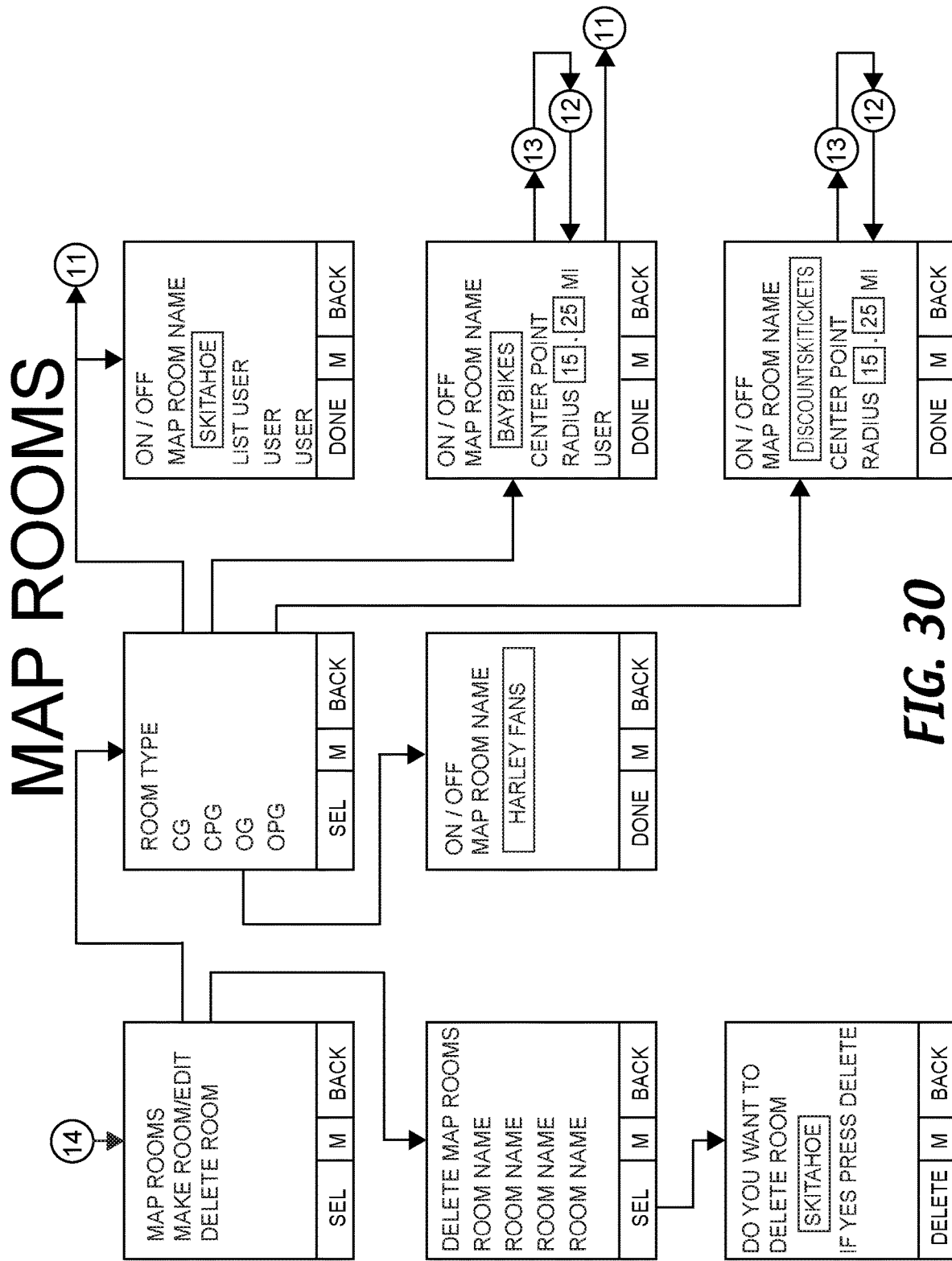
FIG. 30 is a diagram of the user interface screens for defining, deleting and using map rooms for closed proximity groups, open proximity groups, etc. For closed proximity group map rooms, listed users can set their preferences to automatically enter or be alerted that they are in the Zone and manually decide to enter.

The Buddy Tracker software creates the displays such as that shown in FIG. 1 and other user interface displayed discussed elsewhere herein. FIG. 24 is a diagram of the default start screen and some of the other user interface screens that the user can navigate to from the start screen. This is a help/emergency screen 15 which has a next command 19 which can be selected to take the user to the 911 screen 17 which can be used to take the user to a screen 21 wherein the user can select the type of help requested. FIG. 25 is the help screen and shows how navigation to view a new alarms screen can be accomplished. FIG. 26 shows the tree structure of a plurality of other screens which can be used to add target locations, annotate the target locations with text, voice or photo notes, add a text message, give commands to take a picture or find a picture file, record a voice message to be appended to the target, request position updates for all active buddies, map the positions of all active buddies or select particular buddies for mapping or requesting a position update. FIG. 27 shows a number of screens which can be displayed to map the position of a selected user with history and give information about the user as well as send short text messages, record and send voice messages, photos, Instant Messenger links, target positions, etc. FIGS. 28A and 28B show user interface screens created by Buddy Tracker software to create settings such as turning bread crumbs on or off, security codes for personal bread crumbs tracking and verification that a user is OK, set checkup timeout intervals, establish phone numbers and email addresses of other users to call in case of emergency in personal bread crumbs mode, add, change or delete group names, set the Mapit screen radius, refresh rate and update setting, refresh time, delta position change for refresh. FIG. 29 shows the user interface screens to create a new buddy and shows the communication paths and accept protocol to do this. FIG. 29, is discussed more below, and is a representation of the screens and protocols to initiate and accept an instant buddy relationship. FIG. 30 is a diagram of the user interface screens for defining, deleting and using map rooms for closed proximity groups, open proximity groups, etc. For closed proximity group map rooms, listed users can set their preferences to automatically enter or be alerted that they are in the Zone and manually decide to enter. For Open Proximity Group Map Rooms, anyone can join by opting in from their phone or from a sponsor's website. Upon entry, they can view and be viewed by all other members in the map room. Proximity rooms are useful to find and be found by friends attending an event.

In FIG. 1, area 10 discloses that the Buddy Tracker location sharing application software is active and is sharing the location of the phone with other members of a designated group. Area 12 indicates that parental status is active which means that the employer of the employee carrying the phone or the parent of the kid carrying the phone can see the location of the employee or kid if the phone is on. When parental status is active, the supervisory function cannot be turned off or evaded. This supervisory location sharing can be hierarchical such that an employer can see the location of all its employees, and each of the employees can be set up as supervisor of their children such that the employees can see the locations of their children, but the employer of each employee cannot see the locations of the children of each employee. The supervisorial relationships can be set up to define a matrix or web of Buddy List and supervisorial relationships, such as is illustrated in FIG. 2B.

In FIG. 2B, phone A has phones C and D on its Buddy List and is set up as the supervisor of those two phones. Phone B has phones A, G, F and E on its Buddy List and is set up as the supervisor of those phones. Phone H has phones E, J and I on its Buddy List and is set up to supervise those. Phone K has phone I on its Buddy List and is set up to supervise phone I.

Figure 12:
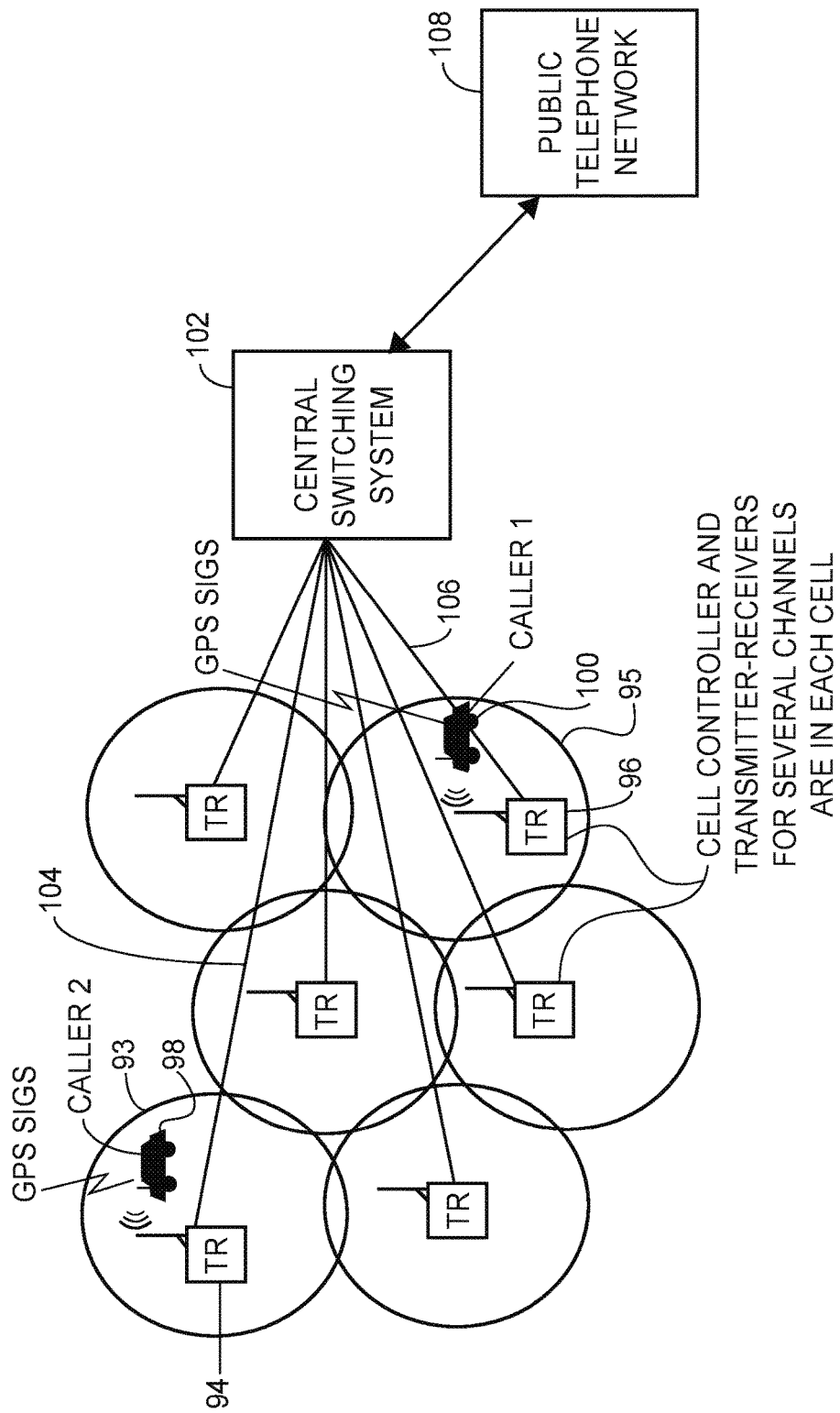
FIG. 12 is a block diagram of a typical prior art cellular system infrastructure in which the method and apparatus of the invention work in a peer-to-peer embodiment.

Each of the phones in FIGS. 2A and B is coupled to the cellular carrier infrastructure in a conventional manner and can send phone calls or short text messages or email messages to any other phone including the cell phones represented by lettered circles in FIG. 2B. FIG. 12 is a block diagram of a typical prior art cellular system infrastructure in which the teachings of the invention in a peer-to-peer embodiment can be practiced. An area of the country is divided into several cells represented by circles such as 93 and 95. Inside each cell is a transceiver tower, represented by blocks 94 and 96 which carries out time division multiple access or code division multiple access digital radio communications with cell phones in its cell. The cell phones or PDAs are represented by autos 98 and 100. Data recovered from the cell phone transmissions is transmitted to a central switching system 102 by data paths such as 104 and 106. The central switching system 102 is coupled to a public service telephone network 108.

Transmissions from one cell phone to another take place via the towers such as 94 and 96 and the central switching system 102. For example, suppose cell phone 98 wants to send its GPS location data to cell phone 100 and cell phone 100 wants to send its GPS location data to cell phone 98. The system of the invention uses some communication protocol such as XML, modified short text messages or other methods to send GPS location information to all cell phones on a Watch list. XML is a slimmed down version of SGML and enables Web authors to create their own tags so that they can more accurately capture the structure of their data. Because this structure can be read by SML-compliant browsers, the information encoded in these tags can be made available to programs such as Java applets or it can be displayed by formatting the XML tags with a style sheet.

Figure 13A:
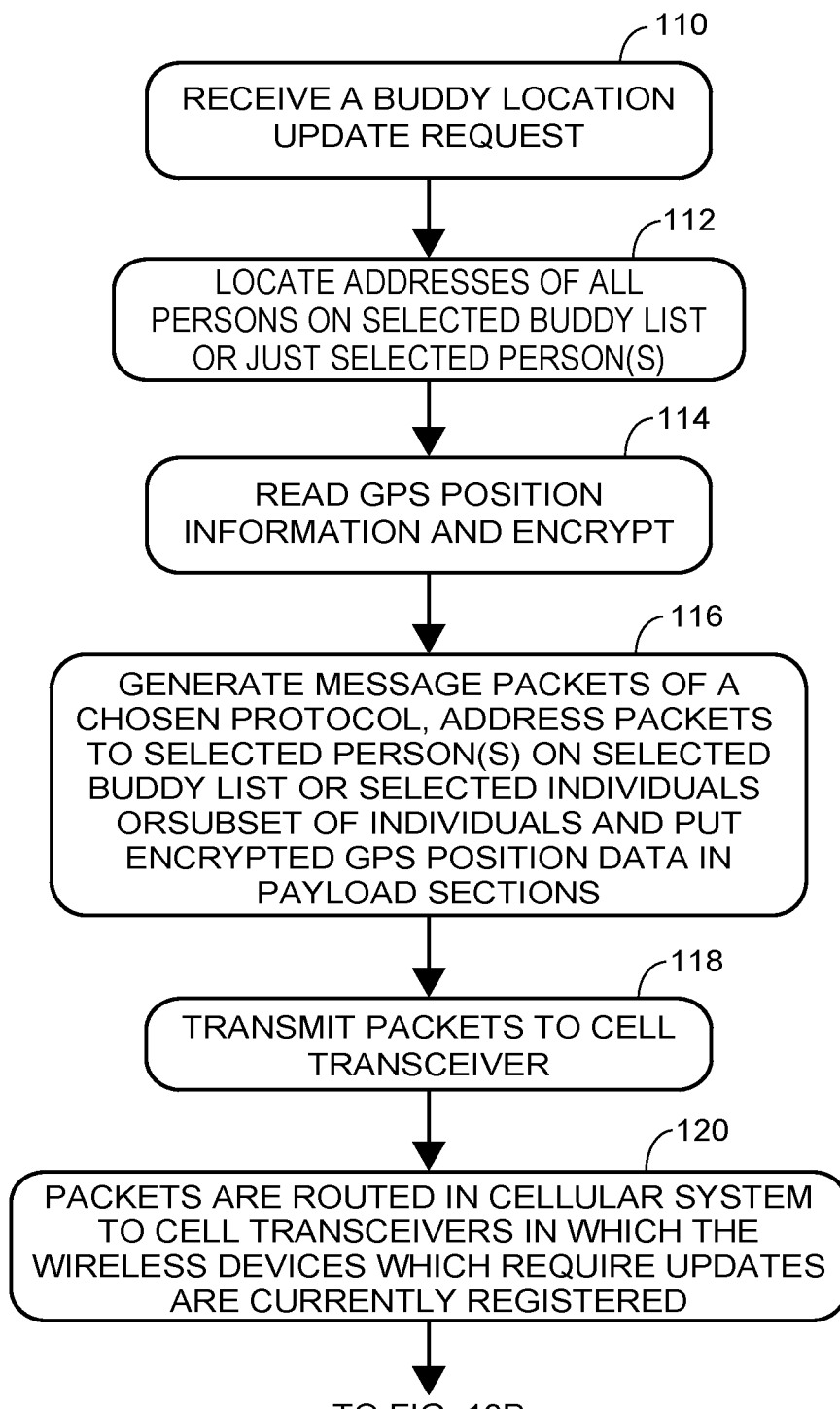
FIGS. 13A and 13B are collectively a flowchart of the method of exchanging GPS position data among cell phones of a watch list.
Figure 13B:
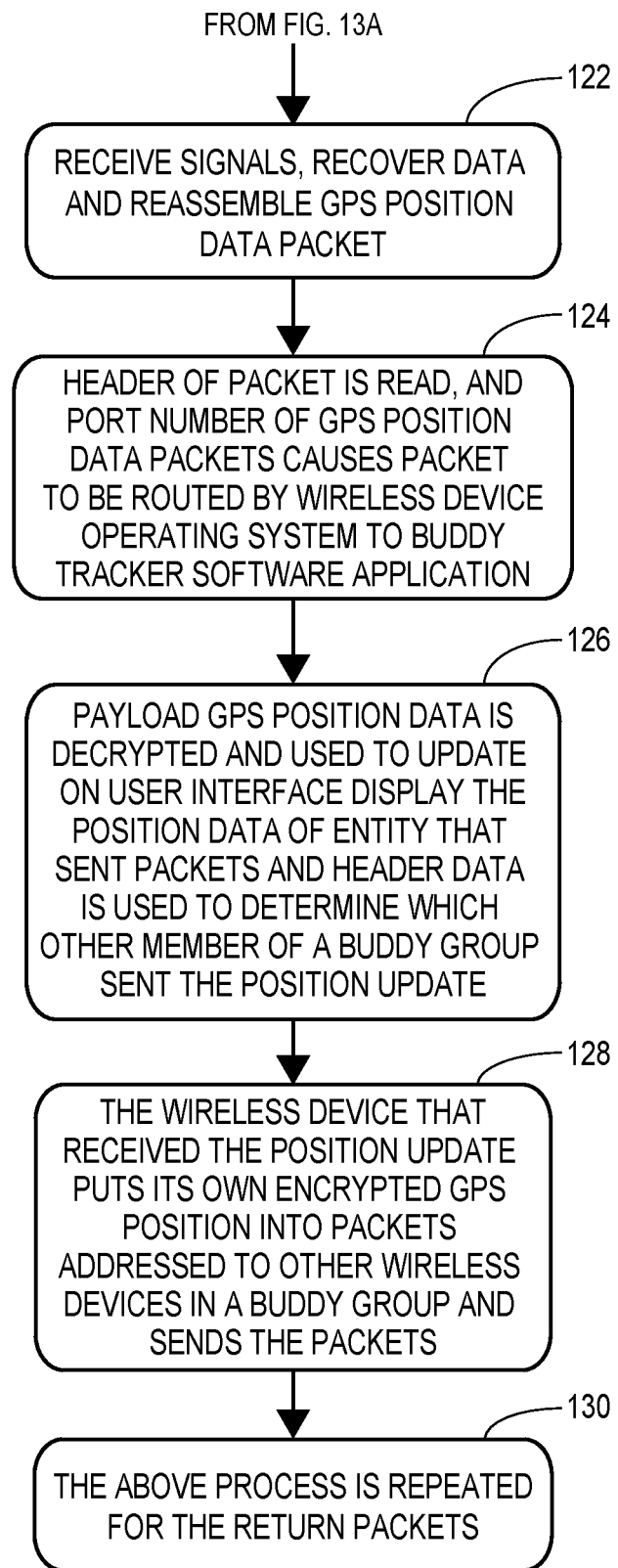
Figure 23:
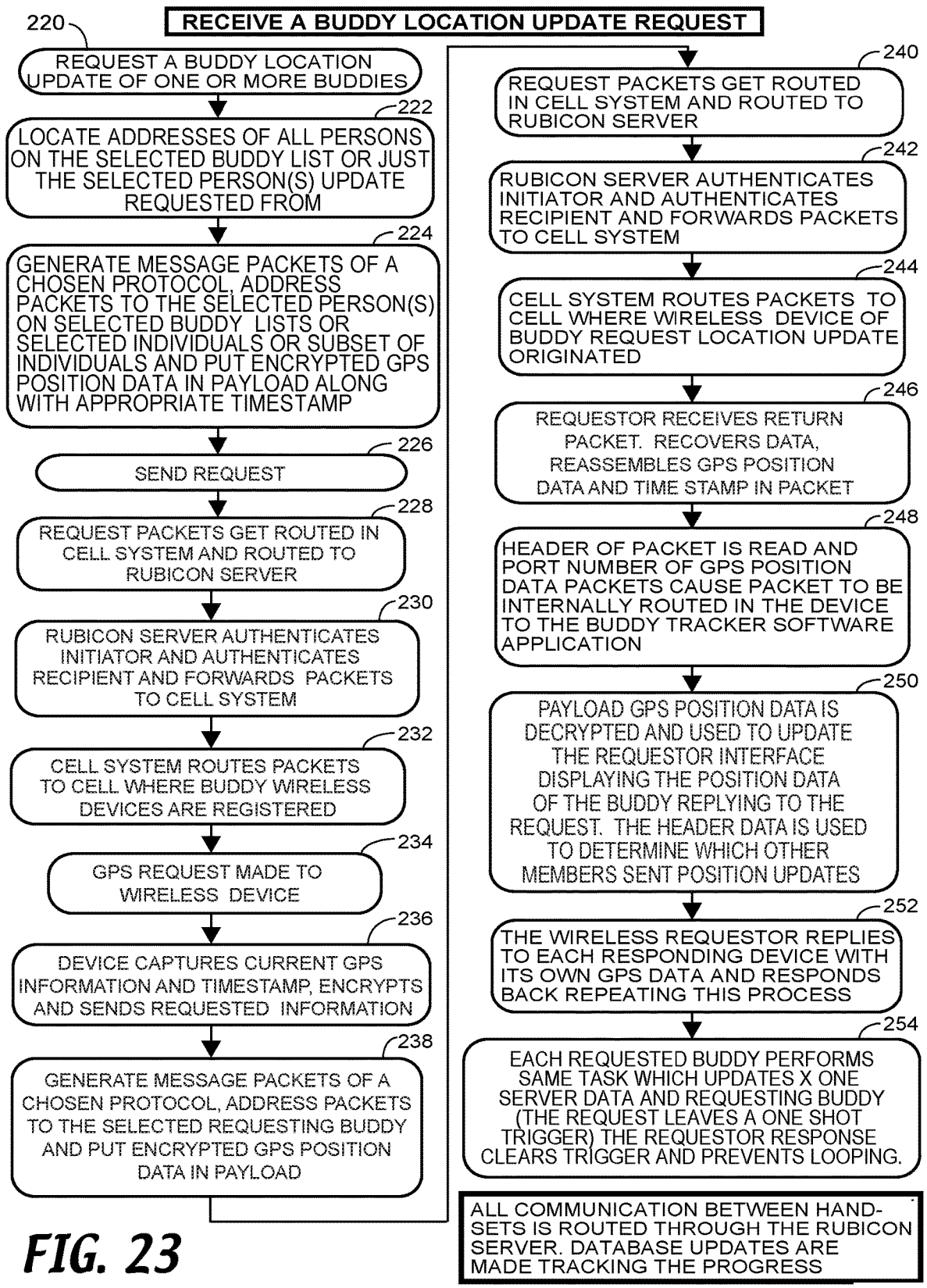
FIG. 23 is a flowchart of another embodiment of a process to receive buddy location update requests and process them.

In the preferred embodiment, the wireless devices in a group which has location tracking turned on periodically send their GPS position data to all the other members in the group. The process for each wireless device to send its position data to any other wireless device in the group is as shown in FIGS. 13A and 13B. Basically, these figures are a flow chart of the process of two or more cell phones exchanging encrypted GPS position data. FIG. 23, discussed below, is a flowchart of another embodiment of a process to receive and process Buddy location update requests. The process of FIGS. 13A and 13B starts at step 110 with a request for a position update. In the preferred embodiment, this happens when a user of a Buddy Tracker phone uses his phone to make a request for a location update. In other embodiments, location updates can be requested automatically and periodically by the Buddy Tracker software on a device that is reporting its position. In other embodiments, a position update can be automatically generated by a device which is reporting its position to other members of a group whenever the position of the device has changed from its last reported position by a programmable amount. The requested position update may be sent to everybody on a selected Buddy List or just a single person's wireless device. In some embodiments, the position update is sent to some subset of persons on a selected Buddy List. Step 112 represents the process of looking up the addresses for all people on the selected Buddy List, a watch list, or just a selected individual or a subset of individuals from a watch list, as the case may be. Some embodiments may be limited to position updates on entire Buddy Lists.

Step 114 represents the process of reading the GPS position data from the built in GPS receiver of the phone (or the GPS receiver of the navigation system) and encrypting the position data.

In step 116, cell phone 98 puts its encrypted GPS location data into a message according to the chosen communication protocol (assume short text message—SMS for short) and addresses the message packets to the one or more phones of the selected persons with which position information is to be shared.

In step 118, the SMS message packets are transmitted to tower 94 using whatever physical layer protocol the cellular system uses such as TDMA or CDMA. The header of the SMS packets contains data indicating the payload data is to be sent to the Buddy Watch software of a particular cell phone and not to the inbox of the phone's SMS software. The payload data of these packets is the encrypted GPS position data. The physical layer protocol typically involves the following steps. First, the packets are disassembled into groups of bits of some predetermined size called codewords the size of which depends upon the particular configuration of the forward error correction software. The codewords are then interleaved to help defeat burst errors. Each codeword can then be encoded with error detection and correction bits such as by using Reed Solomon encoding. The codewords are then broken down into groups of bits called constellation points. The number of bits in each group depends upon the type of modulation scheme in use. In some embodiments, the groups of bits are then further encoded in a Trellis encoder.

The encrypted GPS position data packets would be addressed such that they would be routed in the cellular system to all the other wireless devices using the Buddy Tracker software which requested a position update. This is done by routing the packets to the cell transceivers in the cells in which the wireless devices which require updates are currently registered, as represented by step 120. For example, if cell phone 100 in FIG. 12 is on the Watch list or is being automatically updated or has requested a position update manually, it will have transmitted a packet to transceiver 96 indicating it needs a position update and, when the wireless device entered cell 95, it will have exchanged packets with transceiver 96 to achieve synchronization with transceiver 96 and to register in cell 95. Each wireless device that is registered in a cell will have done this, and the transceivers in each cell will communicate with the central switching system 102 to indicate which wireless devices are registered in their cells. Therefore, the routers in central switching system 102 will know which wireless devices are registered in each cell and will know which wireless devices are to receive position updates. Step 120 represents the process of receiving the signals from each wireless device that are modulated with constellation points that contain the data of packets that contain GPS positions, recovering the data from the constellation points and doing error detection and correction and recovering the GPS position data packets. These packets are then routed to the central switching system which uses the destination addresses in the packets and its routing tables to route them to the transceivers in whatever cell or cells the wireless devices that require position updates are registered. There, the packets are disassembled, encoded with error correction and detection data, and assembled into symbols or constellation points in whatever type modulation (QAM, QPSK, etc.) is being used and transmitted to the wireless device. This happens for every wireless device on a watch list or which has requested a position update.

At each wireless device which receives the signals modulated with the constellation points bearing the GPS position data, the data of each packet is recovered and the packet is reassembled, as symbolized by step 122. The header data of the packet (the port number in the case of TCP/IP packets) causes the wireless device to pass the packet to the Buddy Tracker software which is monitoring a particular port, step 124. When a packet is passed to that port (or just the payload data thereof), the payload data is decrypted and the position data recovered, step 126. Step 126 also represents the process of reading the header data of the incoming packets and determining which other member of a buddy group sent the position update so that the position information for the proper member of the Buddy Group is displayed. The position data is then used to display the position of the other party in the group who sent the packet, and, if the user gives the "Mapit" command, the position data will be converted to a waypoint on a displayed map so as to graphically display the position of the wireless device which sent the packet.

Step 128 represents the process of the device which received the position update encrypting its own GPS position into short message or email packets addressed to the other members of a Buddy Watch group or to a single other wireless device. These packets are then sent to all the other wireless devices by the same process described in steps 116, 118, 120, 122 and 124 of FIGS. 13A and 13B, as represented by step 130.

FIG. 23 is a flowchart of another embodiment of a process to receive buddy location update requests and process them. Step 220 represents requesting a buddy location update. Addresses of all persons on the buddy list or just a selected buddy are located in step 222. Message packets are generated in 224 addressed to the selected Buddy List or individuals, and encrypted position data is put in them. A request is sent—226, and these packets get routed to the Rubicon server—228. The initiator and recipient are authenticated—230, and the packets are forwarded to the recipients via the cell system. The cell system forwards the packets to whatever cell each recipient is in—232. The packet arrives and causes a GPS position request to be made in each wireless device—234. The device captures its current GPS position, and encrypts it and packetizes the GPS position in the payload portion of a packet addressed to the Rubicon server with information as to the requestor in some embodiments. The packet is then sent with a timestamp to the Rubicon server for forwarding to the requesting Buddy—238 and 240. The Rubicon server authenticates the initiator and the recipient and forwards the packet to the initiator via the cell system—242. The cell system forwards the packet to the cell where the initiator recipient is located—244. The initiators cell phone receives the packet, and recovers the timestamp—246, and reads the packet header and port number of the GPS information and uses the port number to route the packet to the Buddy Tracker software—248. The Buddy Tracker application program on the initiator's cell phone receives and decrypts the GPS information from the packet, displays the position of the Buddy, and uses information in the header to determine which other Buddies sent position updates—250. The wireless device of the initiator responds to the position update of each Buddy by sending a reply packet with the encrypted position of the initiator—252. Each requested Buddy device updates the Rubicon server and the wireless device of the requesting buddy with its position—254.

Out of Coverage Update Response

In some embodiments, when a wireless device requests an update from another wireless device, and the other wireless device is out of cellular coverage, a timeout occurs. When a timeout occurs without receiving a position update, the wireless device expecting the update changes its display to yellow or some other color for the wireless device which is out of coverage. The Buddy Watch system only works when the phone is on and in a cellular coverage area.

Buddy Watch Modes

Figure 14A:
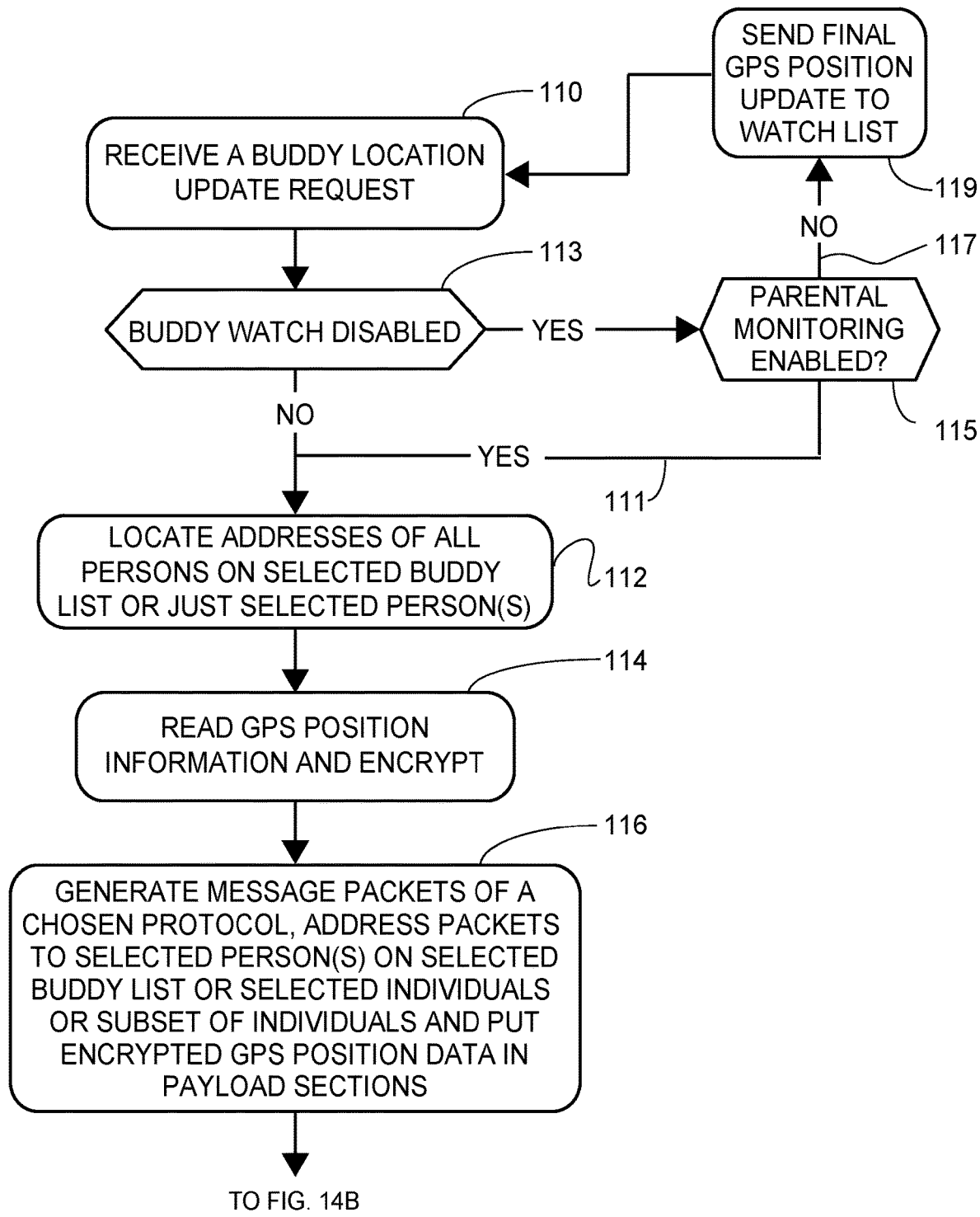
FIGS. 14A, 14B and 14C are collectively a flowchart of processing of an embodiment that implements several modes of operation.
Figure 14B:
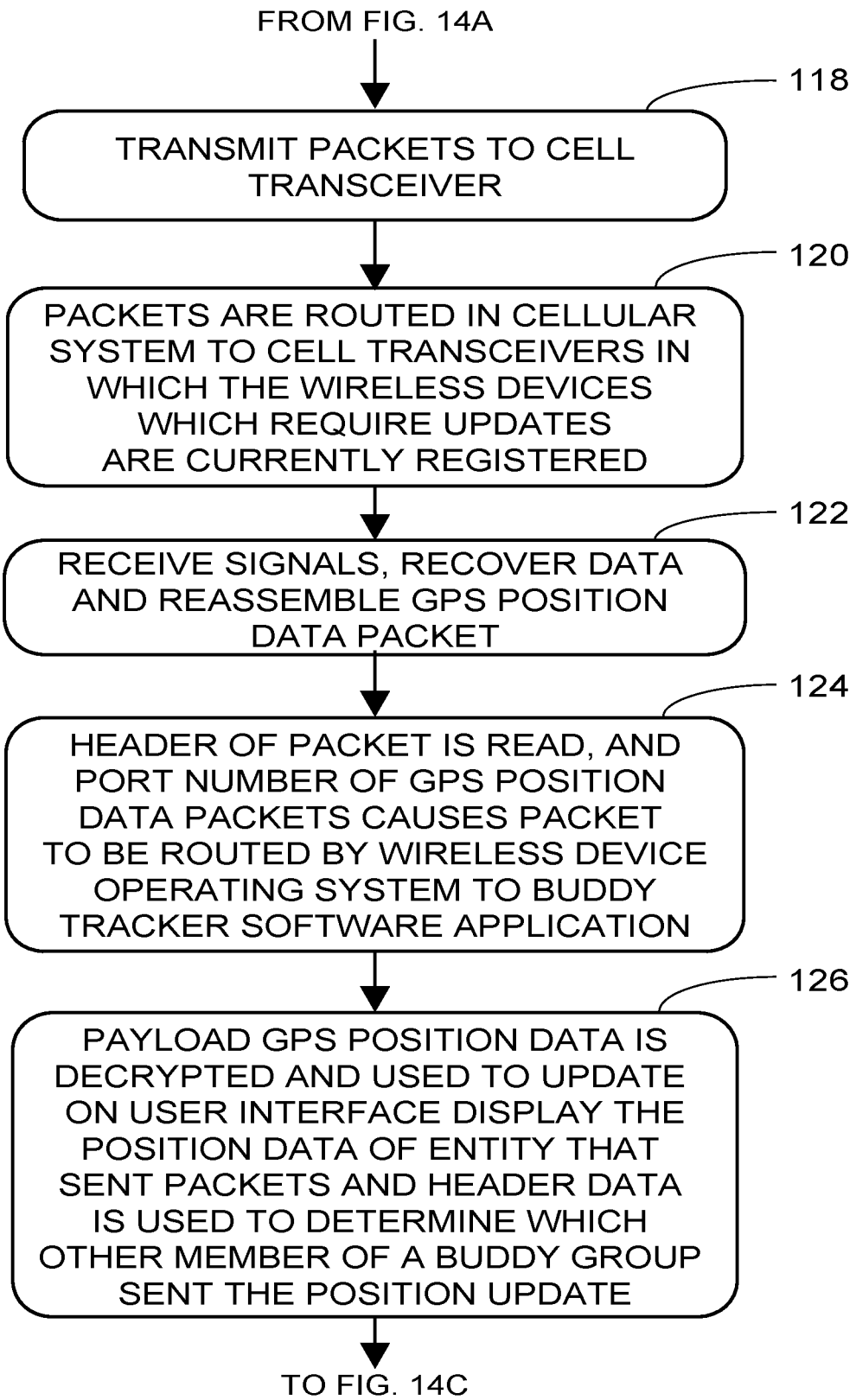
Figure 14C:
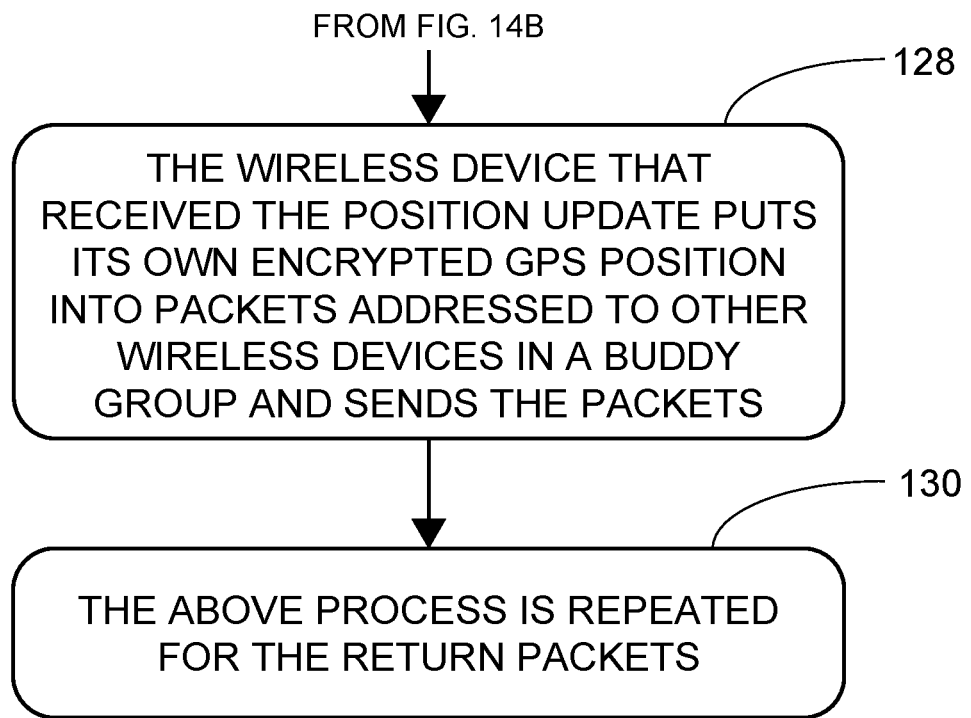

FIGS. 14A, 14B and 14C are collectively a flowchart of processing of an embodiment that implements the several modes described below. The steps that are numbered with like numbers to steps in FIGS. 13A and 13B represent the same functionality.

1) Disable:

The Buddy Watch application can be disabled by the user. When disabled, the wireless device does not share its GPS position data with any other wireless device so no other buddy can see your position. There is an exception for the parental monitoring function. When parental monitoring is turned on, as symbolized by line 111 in FIG. 14A, the wireless device always shares its GPS position and cannot be disabled. The disable functionality is represented by test 113 in FIG. 14A which determines when a position update is requested whether the Buddy Watch function has been turned off. If so, processing proceeds to test 115 which determines if parental monitoring is turned on. If not, processing proceeds back to step 110 along line 117 and GPS position sharing does not happen. If the Buddy Watch function has not been disabled, processing proceeds to step 112 to look up the addresses of the wireless devices to which the position update is to be sent. When the Buddy Watch application is disabled and it has been operating and parental monitoring is not turned on, a final position update is sent is sent to those wireless devices on the current Watch List (the wireless devices which are active and monitoring each other's positions).

2.

Enable: This is the normal mode of operation. Buddies can be added or deleted from the Watch List at any time. Any wireless device that is operating and on the Watch List can find the location of any other device on the Watch List by issuing a position update request. If a buddy is removed from a Buddy List, he or she is not able to receive position updates. Multiple lists can be joined to form a group.

3. Supervisor—Parental/Corporate Code:

In this mode, as long as the wireless device of the worker or child is on, the supervisor will be able to monitor position by GPS position updates. The worker or child will not be able to disable the Buddy Watch feature nor remove the parent or supervisor from the Watch List. Only the supervisor or parent will have the necessary password to remove himself from a Buddy List or watch list.

4. Buddy Lists:

This is the normal mode of operation. Buddies can be added or deleted from a list at any time. If a buddy is off a Buddy List, he cannot receive position updates from any other wireless device on the list. Multiple Buddy Lists can be joined into a group and entire groups may be enabled and disabled. Workgroup lists are lists of buddies which need to be aware of the location of their coworkers during working hours but not after. Buddy Lists or Buddy Groups are a means to have a single icon, folder or some similar graphic user interface (GUI) mechanism to represent a list of people and enables single commands to turn on or turn off tracking of a group of people. If a folder is used for each Buddy Group, a drop down list showing the specific names and locations of each person on the list can be displayed when the folder or icon representing the group is selected. If an icon is used, the Buddies would be grouped in and shown on the phone display. Groups receive a color on the GUI and the members of the group are connected by a translucent shaped outline encompassing all the points representing positions on the Mapit display. If the group is spread too far apart to be shown on a single Mapit display, then the shaped outline for the group is not shown and on the specific color coded Buddy positions that can be shown are shown. If the Mapit display is zoomed out, the translucent group outline returns when all members of the group can be shown on a single screen. Buddies that are in multiple groups are colored a non group color or the color of any of the displayed groups. If groups overlay and when Buddies that are in two active groups are shown, the translucent outline shall overlap as needed, and only cover Buddies that exist in both lists.

Figure 11:
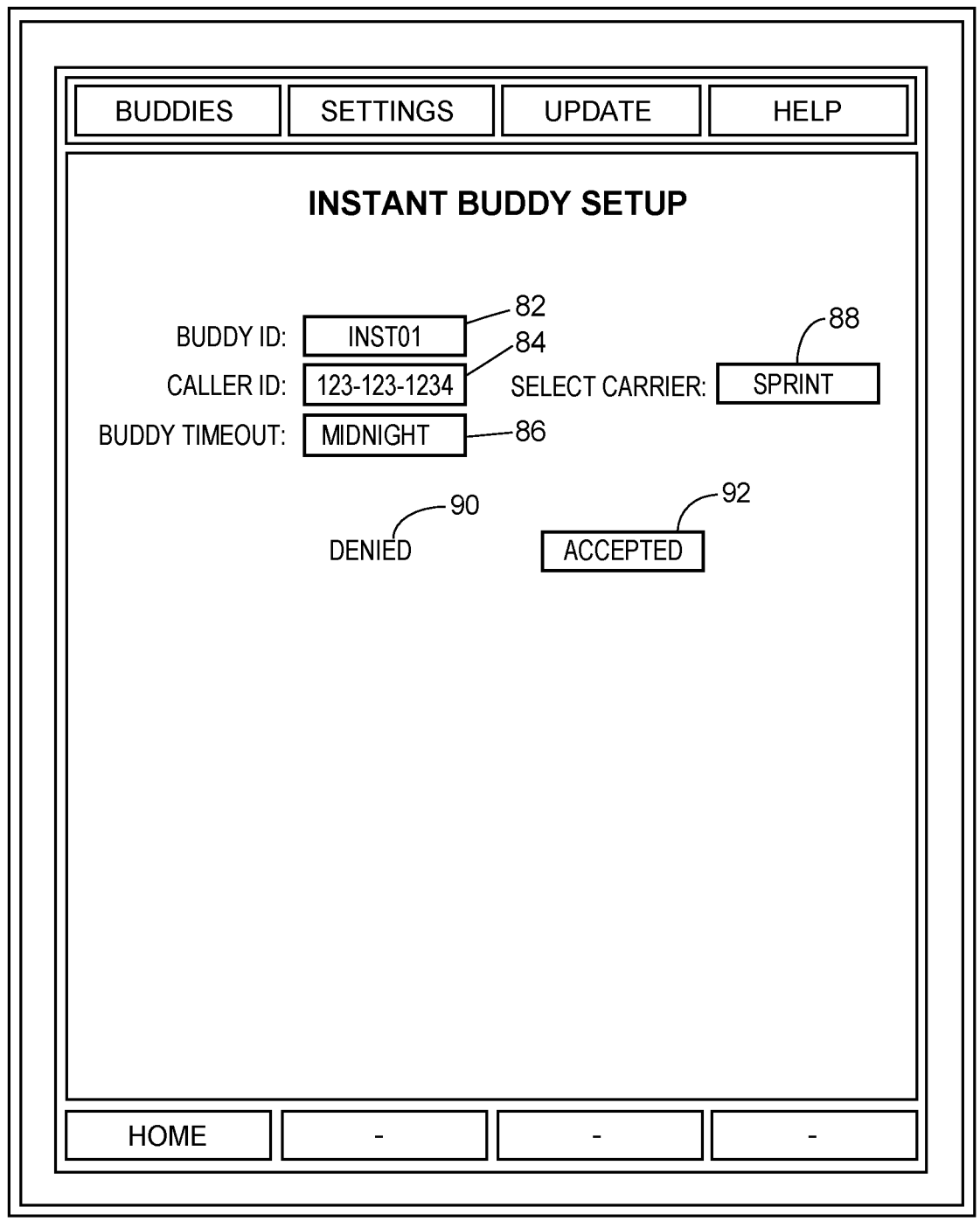
FIG. 11 is a screen shot of the display which appears on at least the instant buddy's phone after a stranded motorist, pilot or hiker has contacted 911 and entered a caller ID and carrier for a proposed instant buddy.
Figure 15:
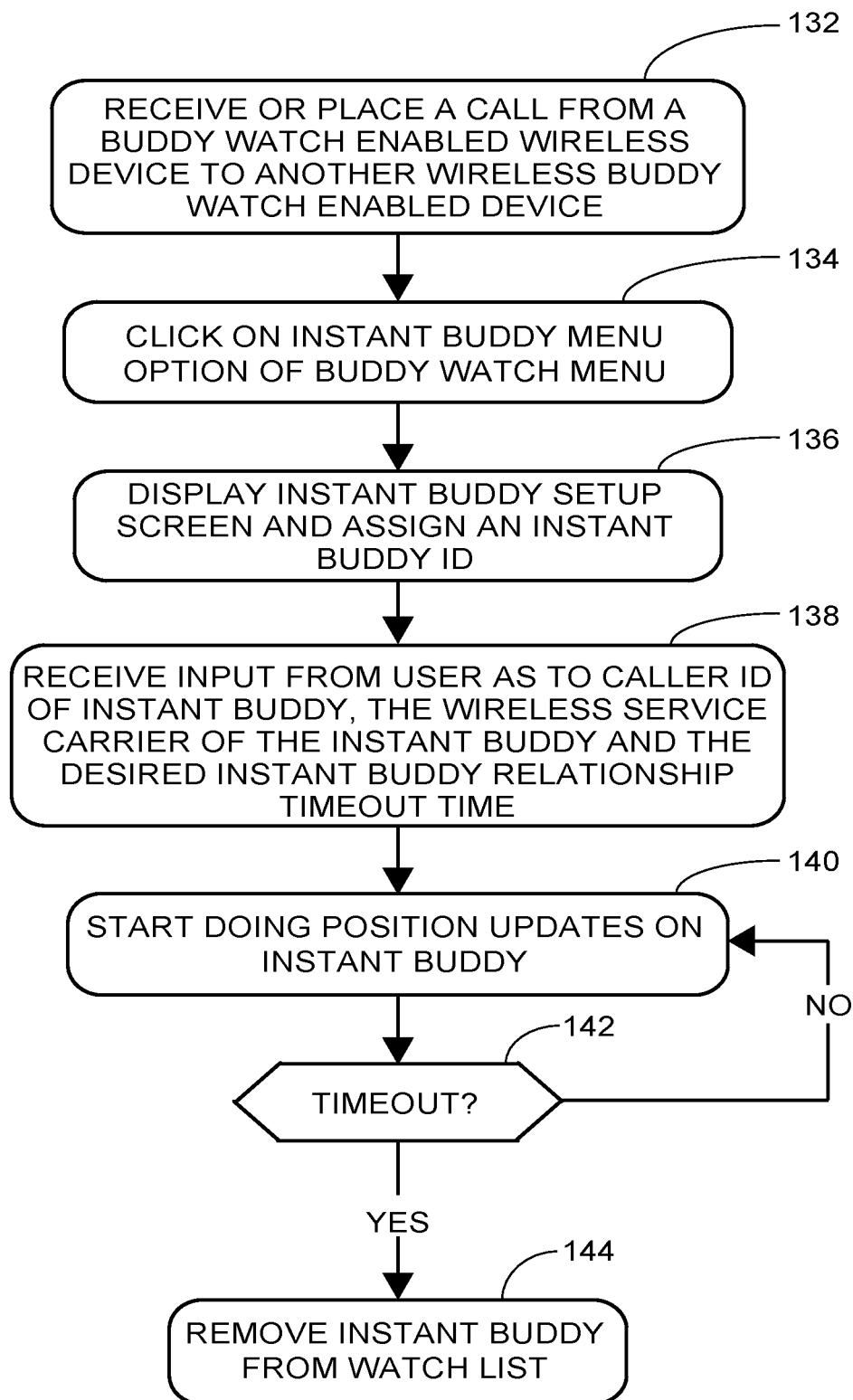
FIG. 15 is a flowchart of the process of establishing an Instant Buddy Relationship.

5. Instant Buddies:

Instant Buddies can be created when a call is placed between two cell phones, phone enabled PDAs or other wireless Buddy Watch enabled devices. FIG. 15 is a flowchart of the process of establishing an Instant Buddy Relationship. The first step is 132 where the wireless device places or receives a call from a Buddy Watch enabled wireless device to or from another Buddy Watch enabled wireless device. The two users such as a stranded motorist and a tow truck driver discuss the situation and decide to establish an Instant Buddy relationship. After the call is established, and the two agree to allow it, the two wireless device users can click on the Instant Buddy menu choice in the Buddy Watch menu, as symbolized by step 134. The wireless devices then each display an Instant Buddy Setup screen like that shown in FIG. 11 (step 136) and fill in the appropriate data (fields 84, 88 and 86) in step 138. Both users then indicate their acceptance (field 92 or deny the relationship (field 90), or in some embodiments, only the recipient of the call needs to accept or deny the relationship. Once the Instant Buddy relationship is accepted, the two wireless devices start exchanging position data (step 140). After 24 hours, or some other time set in the Instant Buddy preference menu (timeout checked in step 142), Instant Buddies are discarded (step 144). The Instant Buddy preference menu allows the time period for the Instant Buddy relationship to be set to something other than the default value of 24 hours.

Preferred Instant Buddy Setup Process

FIG. 16 is a block diagram of a typical cellular system coupled by a gateway and a Wide Area Network such as the internet to a Buddy Watch server to provide the infrastructure of the invention. The cellular system shown in FIG. 16 is typical and has the same structure and operation as the cellular system of FIG. 12. What is new is the connection between the central switching system and a Buddy Watch server 146 through gateway 148. The purpose of this will be made clear in the following discussion of the preferred Instant Buddy setup process.

Buddy Watch Server Functions

The Buddy Watch server's main function is to serve maps to the cell phones registered in the Buddy Watch system and implement GPS position data exchanges between itself and the phones on a buddy list to enable members of a buddy list to view the locations of other members of the list. In some embodiments, the Buddy Watch server also downloads application software as needed to phones registered in the system as the phones send packets to the Buddy Watch server indicating a particular command has been given which requires an application program on the phone which is not present.

In the preferred embodiment, the Buddy Watch server runs all the application programs on the server and just sends pages to be displayed on the phone to solicit the user to enter data needed to implement a function.

If the phones had as much memory as the Personal Digital Assistants, the application programs could be loaded and run on the phones themselves.

Other functions of the Buddy Watch server are: setup of user profiles, billing and database access and maintenance.

Purchase/Payment Activate Deactivate Key

The functions of the Buddy Watch server will be made clear in discussions which follow. But one of its functions will be to manage activate and deactivate codes. The Buddy Watch application will be a service which a cellular carrier offers on a subscription basis. When a subscriber buys a Buddy Watch enabled phone, he will be issued an activation code and the Buddy Watch server will also be given the activation code. This activation code will be kept in active status as long as the subscriber has paid for the service. Subsequent communications of packet data between the Buddy Watch server and the phone such as downstream position updates of positions of buddies on a Buddy List, receipt of phone position for use in updating other buddies on a Buddy List, etc. will only be enabled as long as the activation code is in active status. When the subscriber stops paying for the service, the activation code will be changed to a deactivation code status, and subsequent communication between the phone and the Buddy Watch server will be impossible. The Buddy Watch server implements this functionality by checking the activation code status each time before communication with a phone is carried out.

The Buddy Watch application is downloaded via the internet for subscribers who do not already have it on their phones. The customer receives an activate code to key into the phone, or an activation application on the Buddy Watch server receives confirmation of the purchase and automatically sends the activate code to the phone/Personal Digital Assistant and receives back a confirmation. Each month, payment for the service is required. Failure to make the payment results in an application receiving a request to deactivate the Buddy Watch application on the phone/PDA. A deactivate code is sent and a response is received back confirming the phone application has been deactivated. Further attempts to use the application are met with a simple display indicating the service subscription has expired.

The protocol to activate and deactivate the Buddy Watch application is secure in the preferred embodiment.

Figure 17A:
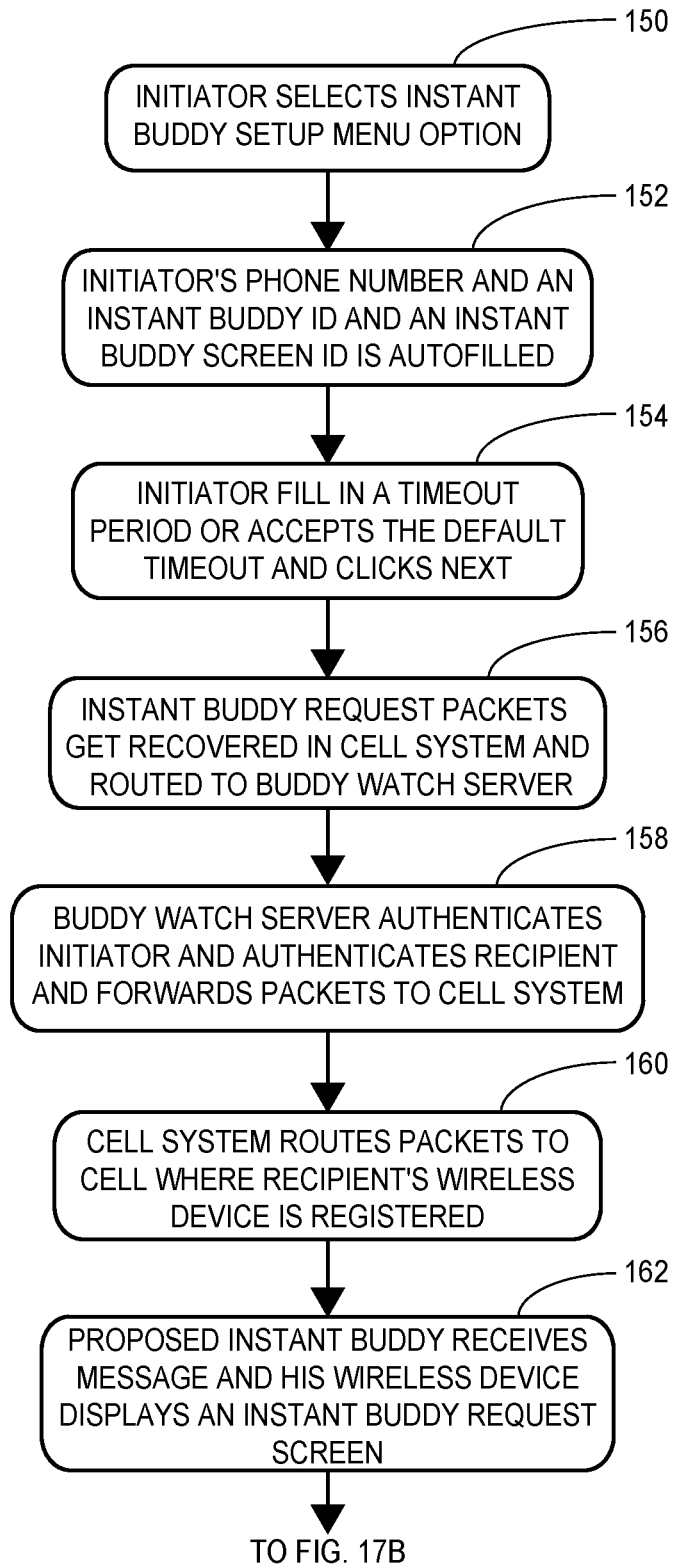
FIGS. 17A and B are a flowchart of the preferred Instant Buddy Setup process.
Figure 17B:
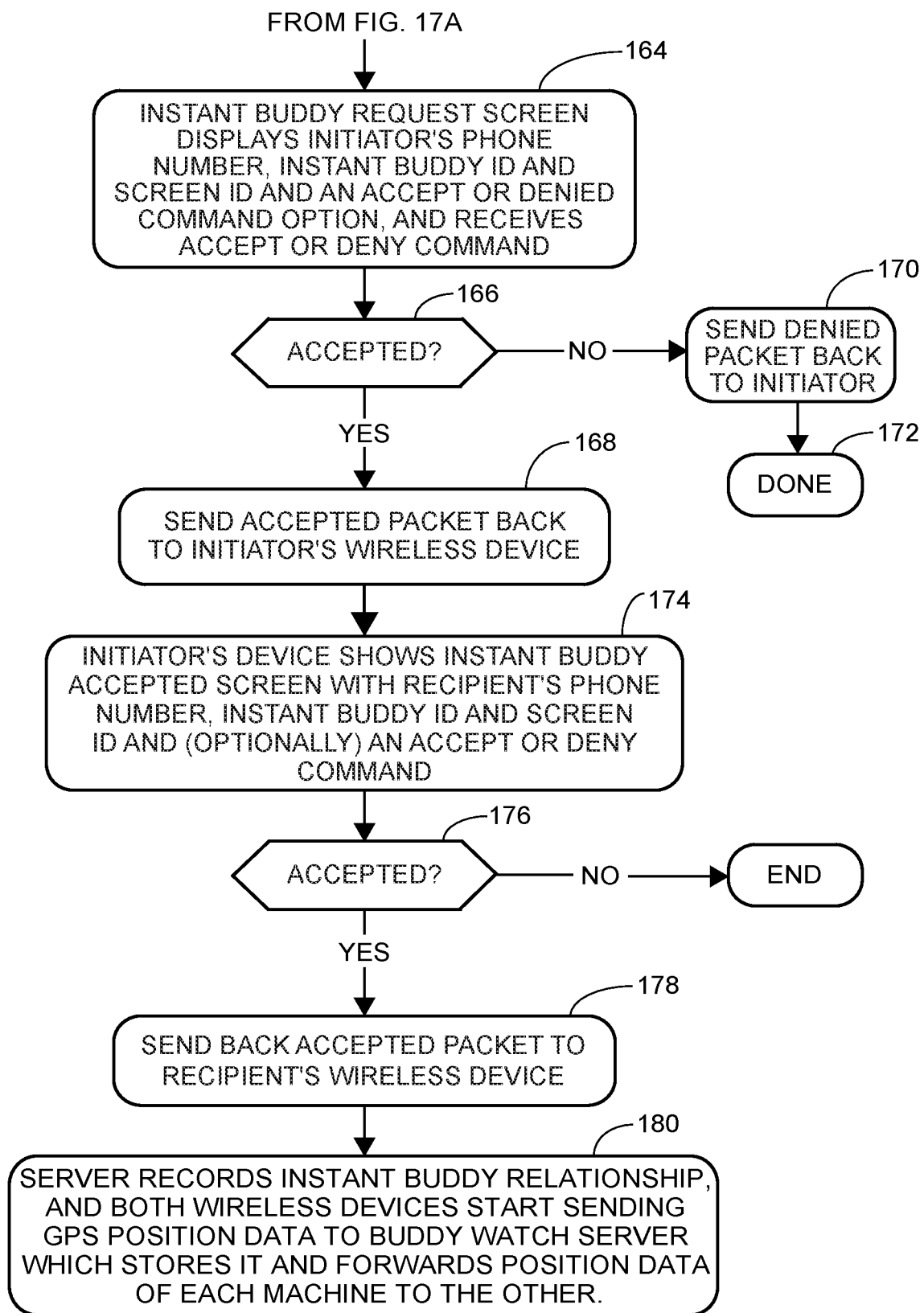
Figure 18:
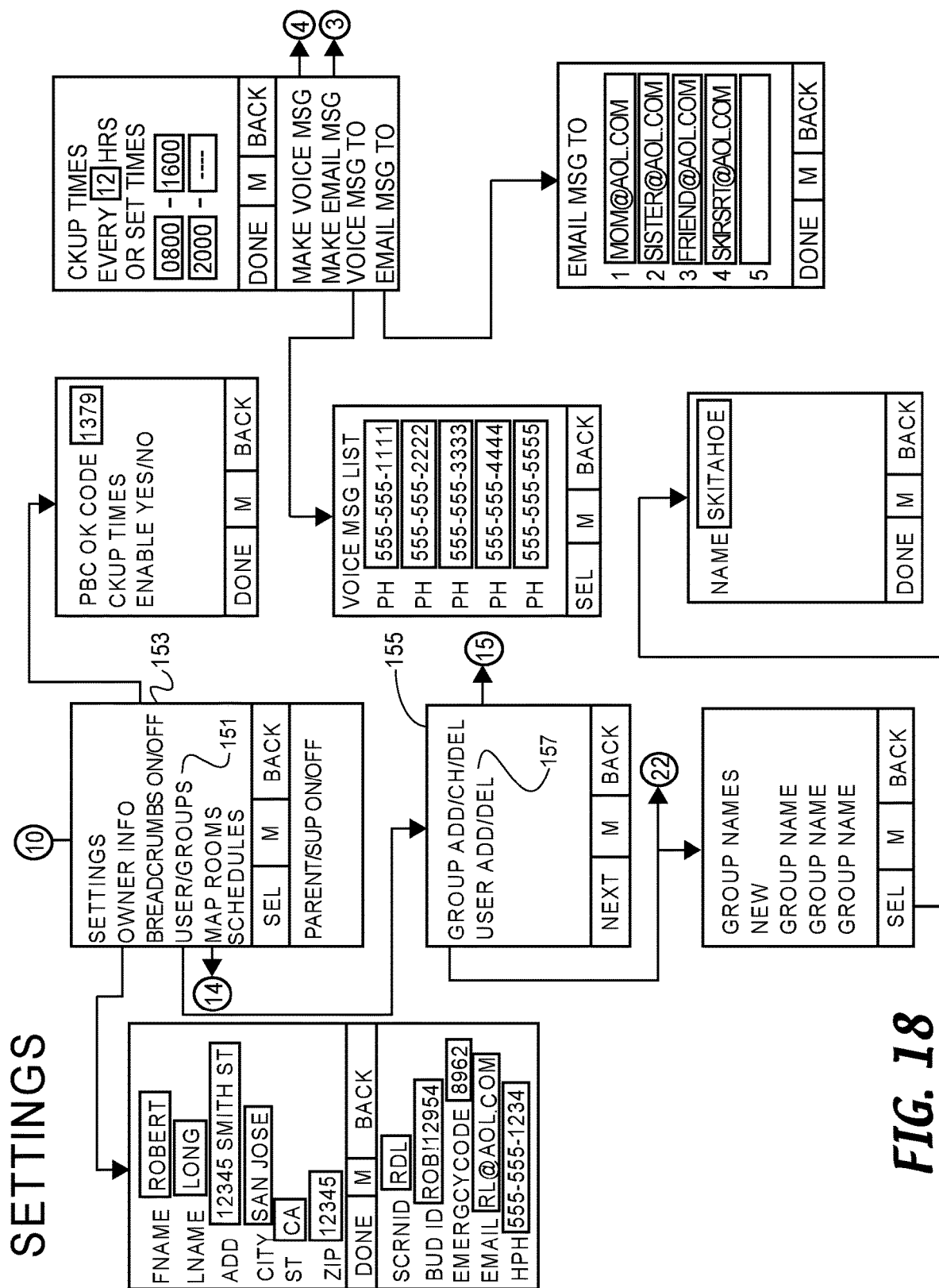
FIGS. 18 and 19 are diagrams of some of the user interface display screens involved in the Instant Buddy Setup process.
Figure 19:
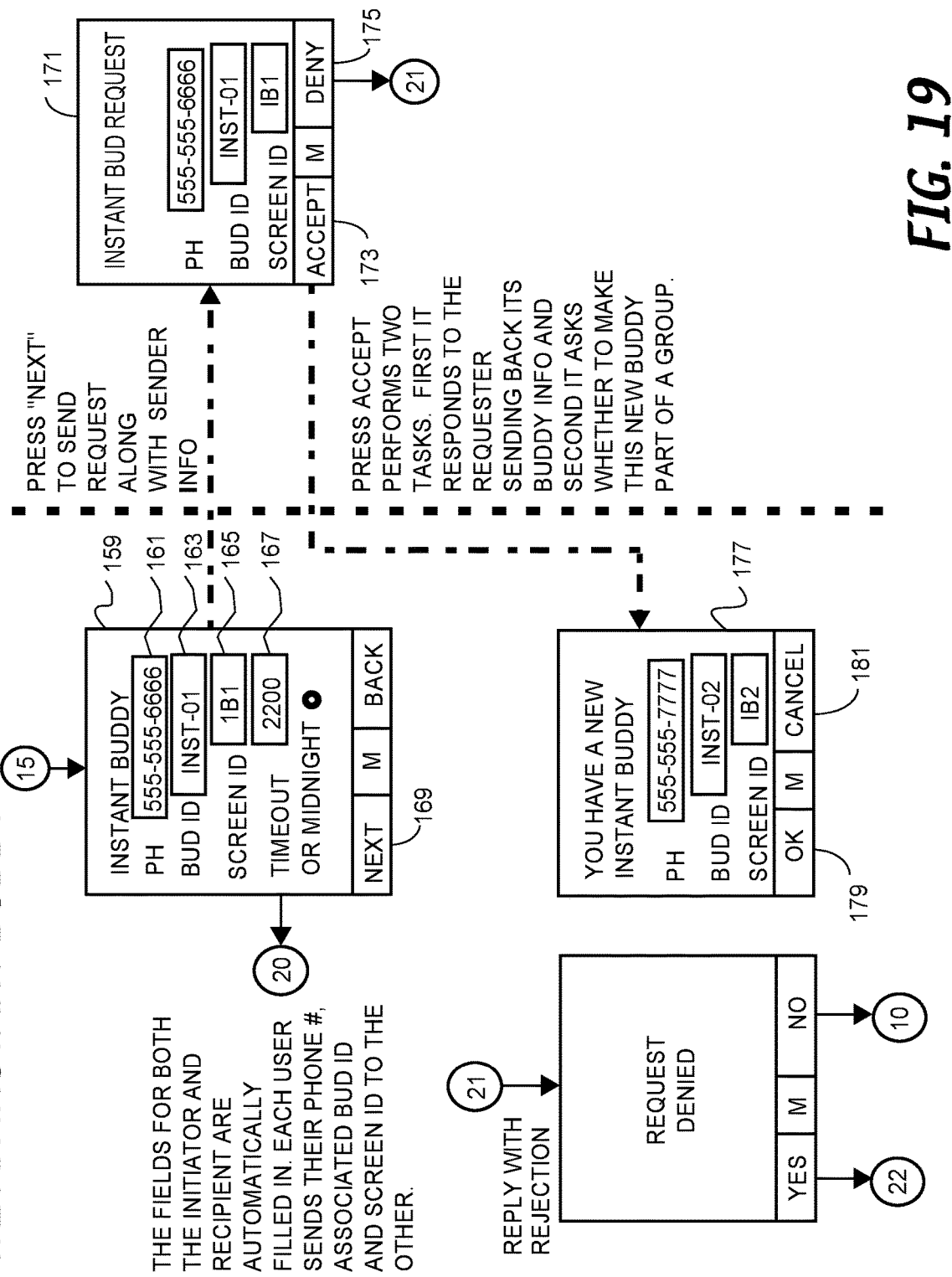

FIGS. 17A and B are a flowchart of one embodiment for an Instant Buddy Setup process. FIGS. 18 and 19 are diagrams of some of the user interface display screens involved in the Instant Buddy Setup process. All three figures will be referred to in the following discussion. In the preferred embodiment, the Instant Buddy relationship is set up in the following manner.

1) An initiator selects the Instant Buddy menu choice options in step 150. This is done by selecting menu option 151 of screen 153 in FIG. 18. This causes a transition to display screen 155 on the initiator's device where the user selects menu option 157. This causes a transition to screen 159 on FIG. 19 which is the Instant Buddy setup screen. This screen shows the initiator's phone number, Instant Buddy ID and Screen ID in auto filled fields 161, 163 and 165, respectively (step 152). There is also a timeout field 167 which the initiator can set to some time if the default time of midnight is not acceptable (step 154). After filling in the timeout value, the Initiator clicks Next in field 169.

2) Instant Buddy request packets are generated and sent to the cell transceiver of whatever cell the wireless device of the initiator is registered. These packets contain data which identifies the initiator and the recipient (proposed Instant Buddy) and are addressed to the IP address of the Buddy Watch server 146 in FIG. 16. The packets are recovered by the cell transceiver, sent to the central switching system 102 and routed from there to gateway 148 where they are routed over wide area network 147 to the Buddy Watch server (step 156).

3) Buddy Watch server authenticates the initiator and the recipient from data in the packet as a Buddy Watch subscribers. If either is not a Buddy Watch subscriber, the server blocks the transaction by not forwarding the packets to the recipient. Assuming both are subscribers, the server forwards the Instant Buddy request packets to the recipient's wireless device and these packets get routed in the cell system (step 160) via the gateway, central switching system and cell transceiver of the cell in which the recipient's wireless device is registered.

4) The proposed Instant Buddy's wireless device receives the packets and displays an Instant Buddy Request screen (step 164) like that shown at 171 in FIG. 19 (step 162). This screen shows the phone number, Instant Buddy ID and Screen ID of the Initiator so the recipient knows who has requested the Instant Buddy relationship. The recipient can either accept or deny the relationship using commands displayed at 173 and 175.

5) If the Instant Buddy relationship is accepted (step 166), processing proceeds to step 168 where an accepted packet is sent back to the initiator's wireless device. If the Instant Buddy relationship is denied, step 170 sends a denied packet back to the Initiator device and the process is over (step 172) save for a display on the Initiator device that the Instant Buddy relationship has been denied.

6) When the accepted packet arrives at the Initiator device, the device shows an Instant Buddy accepted screen as shown at 177 in FIG. 19 (step 174). This screen shows the phone number, Instant Buddy ID and Screen ID of the recipient and provides commands to accept or cancel the relationship at fields 179 and 181.

7) If the Initiator accepts the Instant Buddy relationship (step 176), step 178 occurs where an accepted packet is sent back to the Recipient through the Buddy Watch server.

8) The Buddy Watch server records the existence of the new Instant Buddy relationship (step 180), and both wireless devices start sending their GPS position data in packets addressed to the Buddy Watch server. The Buddy Watch server stores the position data from each wireless device and forwards the packets to the other device for updating of their displays. In the preferred embodiment, the Buddy Watch server pulls an appropriate map from the MapQuest server 149 in FIG. 16 based upon the GPS position data of the Initiator and sends that map and the GPS position data in packets addressed to the Recipient. The Buddy Watch server then pulls an appropriate map from the MapQuest server based upon the Recipient's position, and sends that map and the Recipient's GPS position to the Initiator. Each wireless device then displays the position of the other Instant Buddy on the map provided by the Buddy Watch server.

An alternative Instant Buddy setup process is described next:

1) A call from one wireless device to another is initiated;

2) After agreeing to establish an Instant Buddy relationship, the initiator clicks on the Instant Buddy menu option;

3) This causes an Instant Buddy Setup screen to be shown on the initiator's device which has a first field which is auto-filled with the initiator's phone number, a second field which is auto-filled with an Instant Buddy ID, and a third field which is auto-filled with a Screen ID for the Instant Buddy (this screen ID is a three digit number which will be displayed with the position of the Instant Buddy and is shorter than the Instant Buddy ID);

4) The initiator fills in a timeout period for the Instant Buddy relationship or accepts the default value of midnight and clicks a Next command;
5) The recipient's wireless device receives the instant buddy request and displays an Instant Buddy Request screen that shows the initiator's phone number, Instant Buddy ID and Screen ID and displays an accept or deny command;
6) The recipient either accepts or denies the Instant Buddy relationship;
7) If the recipient accepts the Instant Buddy relationship, this fact is communicated to the initiator's wireless device which then displays a screen which displays the recipient's phone number and the recipient's Instant Buddy ID and his or her Screen ID and displays an accept or deny command which the initiator can click on;
8) If the initiator selects the accept command, both wireless devices start exchanging GPS position data, but they do not if the initiator decides to deny the Instant Buddy relationship.

Figure 22:
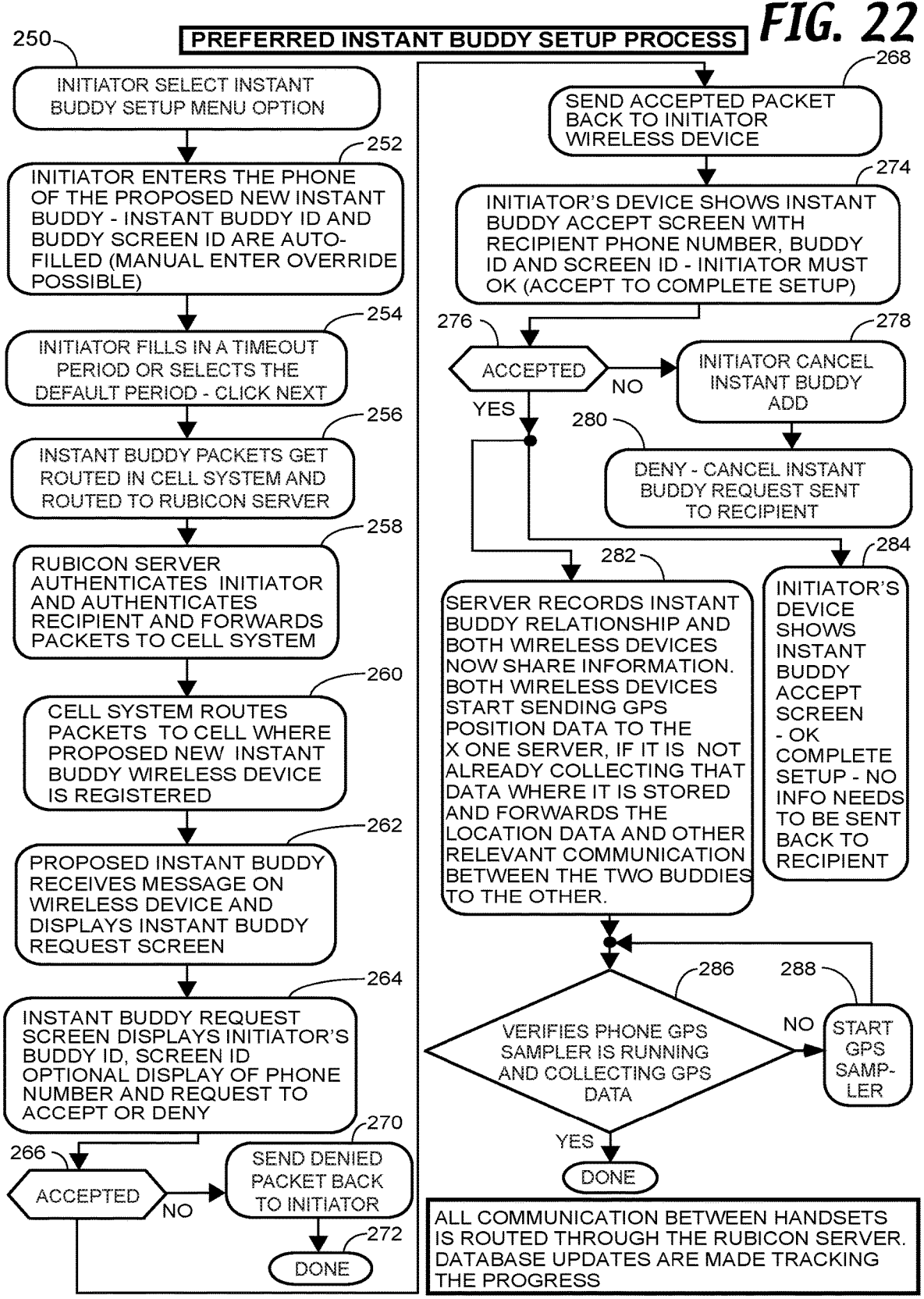
FIG. 22 is a flowchart of the preferred embodiment for the instant buddy setup process.

FIG. 22 is a flowchart of the preferred embodiment for the instant buddy setup process. The initiator selects the instant buddy setup process—250, and enters the phone of the proposed new instant buddy—252. The initiator fills in timeout period—254, and instant buddy packets get routed to the Rubicon (Buddy Watch) server through the cell system—256. Rubicon server authenticates the initiator and recipient and forwards packets to cell system—258. The cell system routes packets to the cell where the proposed new instant buddy is—260, and the proposed instant buddy receives a message on her wireless device and displays the instant buddy request screen—262. The instant buddy sees the initiator buddy ID, screen ID and, optionally, his phone number—264, and accepts or denies the relationship—266, 270, 272. If accepted, a packet is sent back to the initiator's wireless device—268, which causes the initiator's device to show an Instant Buddy accept screen with the recipient's phone number, buddy ID and screen ID which the initiator must OK to establish the relationship—274. Steps 276, 278 and 280 handle the acceptance or rejection. In 282, if accepted, the Rubicon server records the new instant buddy relationship and both wireless devices start sharing location information with the Rubicon (X One) server where it is stored and forwarded to the other Instant Buddy. In 284, the initiator's device shows the Instant Buddy Accept screen. Steps 286, 288 verify the phone is collecting GPS data using the GPS sampler program.

User Interface Displays for Buddy Lists

Figure 3:
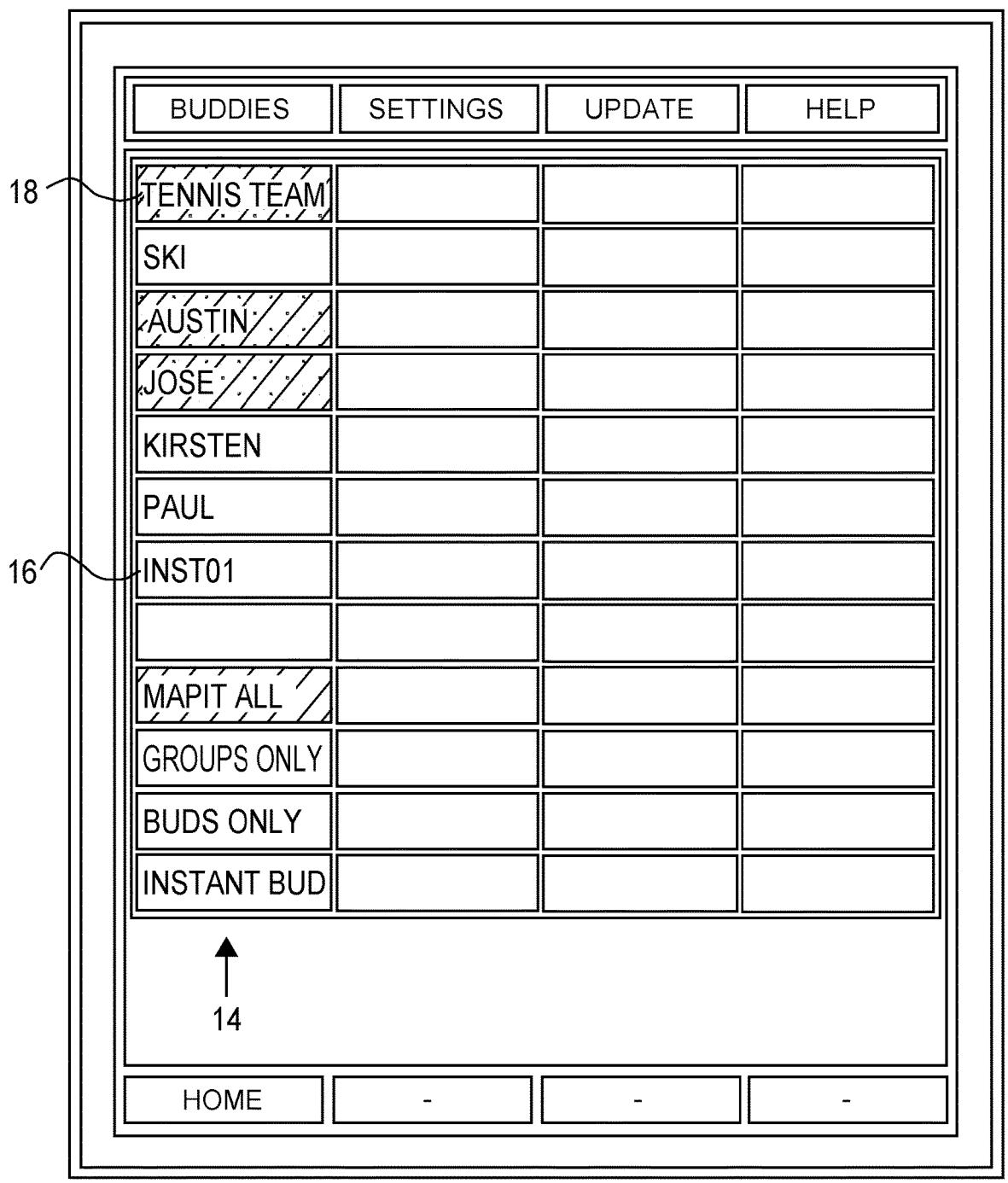
FIG. 3 represents a display in the user interface which shows individuals on the phone's Buddy List as well as a group of buddies which has been given the name Tennis Team.

FIG. 3 represents a display in the user interface which shows individuals on the phone's Buddy List as well as a group of buddies which has been given the name Tennis Team. In all the user interface screen shots in the figures of this patent application, a cross hatched area indicates an active status and is typically colored green on the phone display. For example, each cross hatched buddy in column 14 indicates that that buddy's location sharing is active and his position can be seen if the user clicks on that buddy using whatever navigation or pointing mechanism that is built into the cell phone user interface.

The Buddy Tracker software also has the ability to set up instant buddies with, for example, tow truck drivers. Display area 16 shows an instant buddy entry for an instant buddy named Inst01. For example, the user's car breaks down. The user calls a towing service, and finds out the tow truck driver has a cell phone with Buddy Tracker on it. The user dials the tow truck driver's cell phone and requests to be an instant buddy of the tow truck driver's phone. His phone is then set up as an instant buddy on the user's phone. After both phones are set up as instant buddies, each phone shows the location of the other phone on its moving map. This allows the tow truck driver to find the user tow truck customer and the user customer to know where the tow truck driver is.

Figure 4:
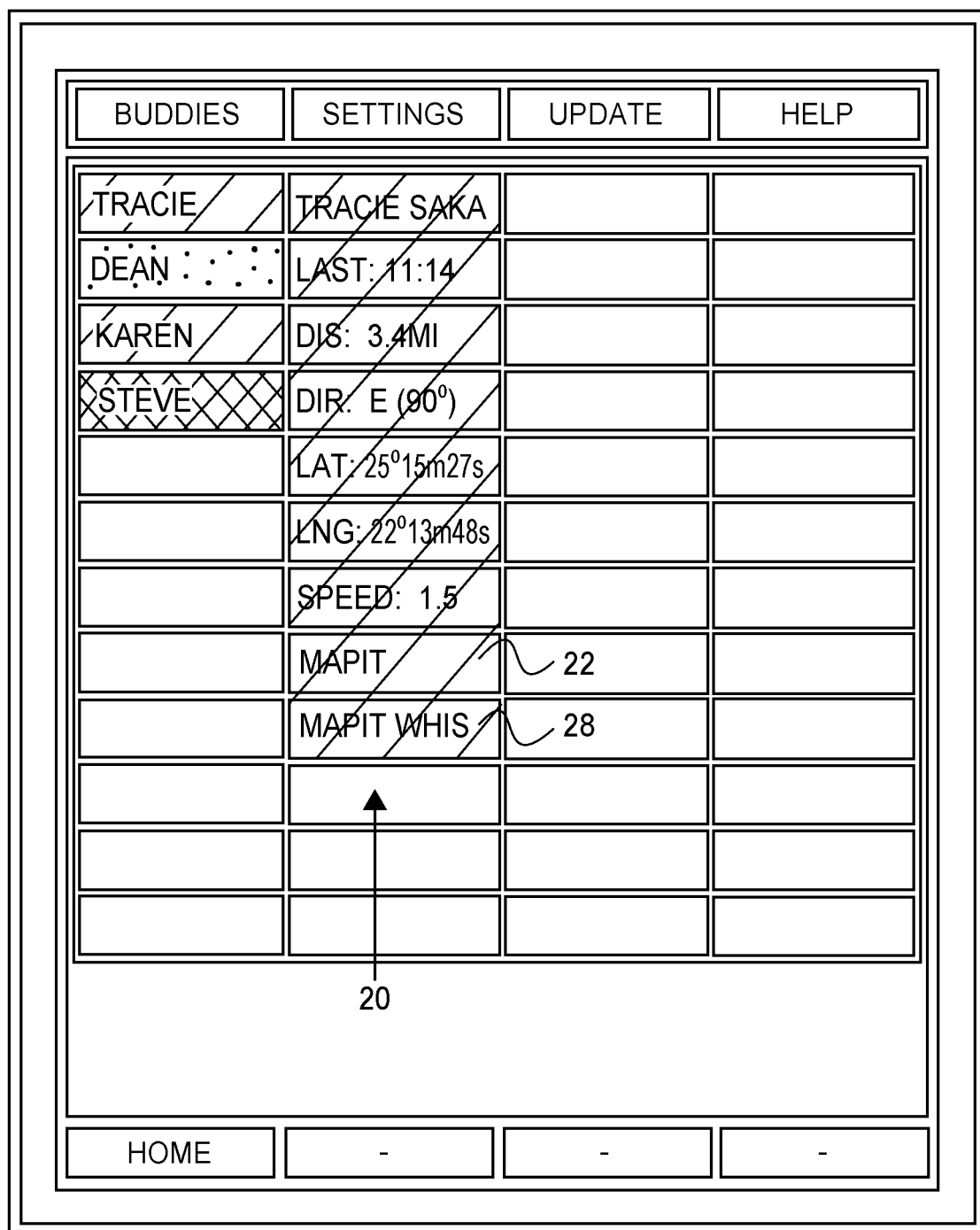
FIG. 4 is a user interface display showing the result when the tennis team Buddy List entry is selected and the information that is displayed when one of the members of the tennis team is selected for display of location information.

FIG. 4 shows another user interface display that results from selecting the tennis team entry 18 on the Buddy List of FIG. 4 and then clicking on the Tracie entry. When the Tracie entry is clicked, the information in column 20 appears showing her full name, position, the time of her last fix, her distance from the user and her speed. A green status (cross hatched) means a buddy has his phone on with location sharing turned on and the phone is within range. A yellow status for a buddy (stippled) means the buddy was active and had his location sharing turned on, but contact with him has been lost for one reason or another. A darker green status (double cross hatched), means the buddy is active and has his location sharing turned on but he is out of the immediate area that can easily be shown on the phone's map display. For example, suppose most of the tennis team group are in the Northern California area, but one member of the group is in Los Angeles. If the member in Los Angeles has his phone turned on with location sharing on, his entry in the tennis team list will be shown as dark green meaning his position cannot be mapped.

Figure 5:
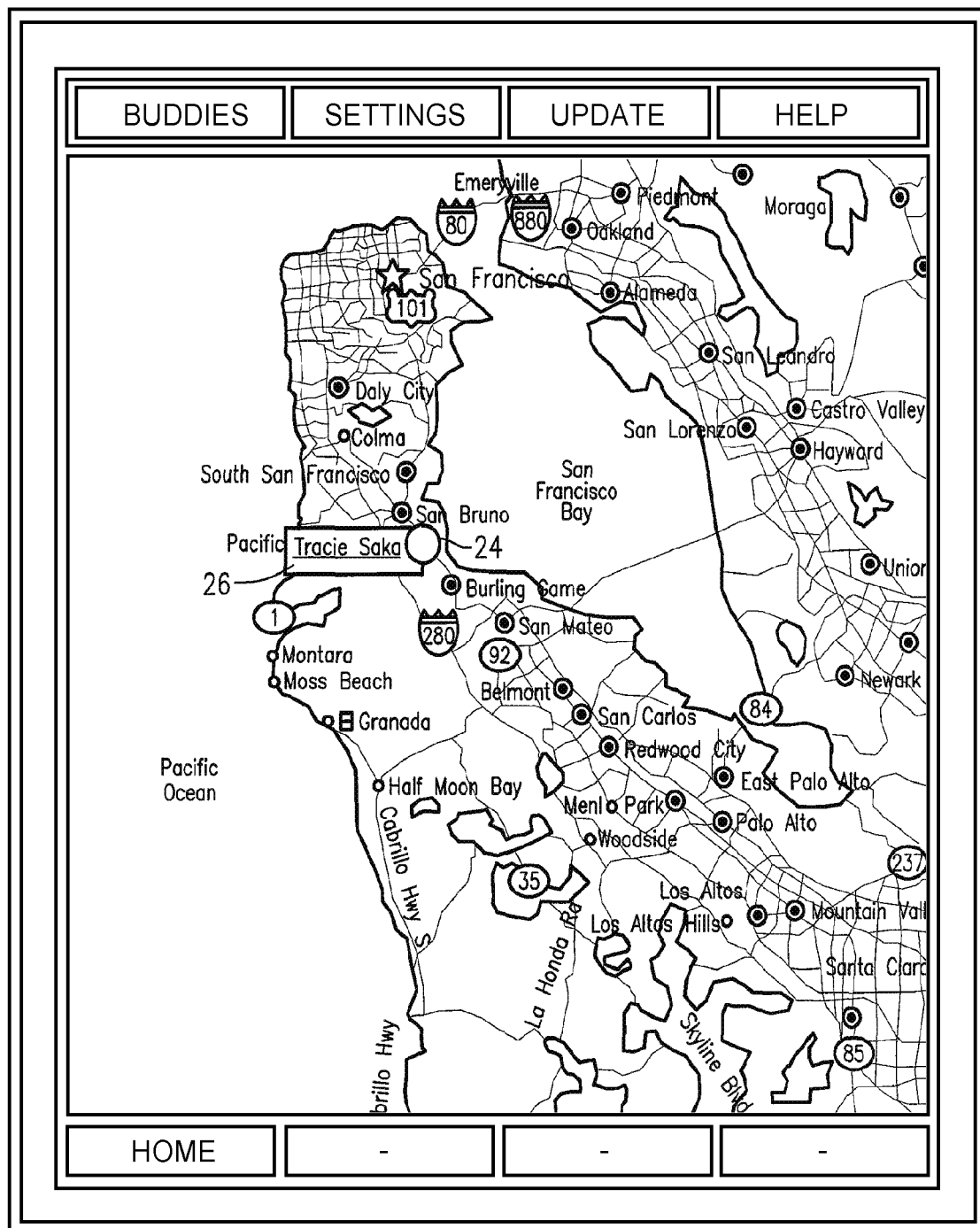
FIG. 5 is a user interface display showing a map rendering with the location of a selected member of the tennis teach group displayed thereon.

The Mapit function shown at 22 in FIG. 4 is a function that can be invoked to map the location of Tracie Saka on the phone's display. If Tracie is within range, and the Mapit function is clicked, a display such as the one shown in FIG. 5 is rendered on the phone's display showing the general area and showing Tracie's position at 24 with a text box 26 superimposed on the map with Tracie's name rendered therein.

Figure 6:
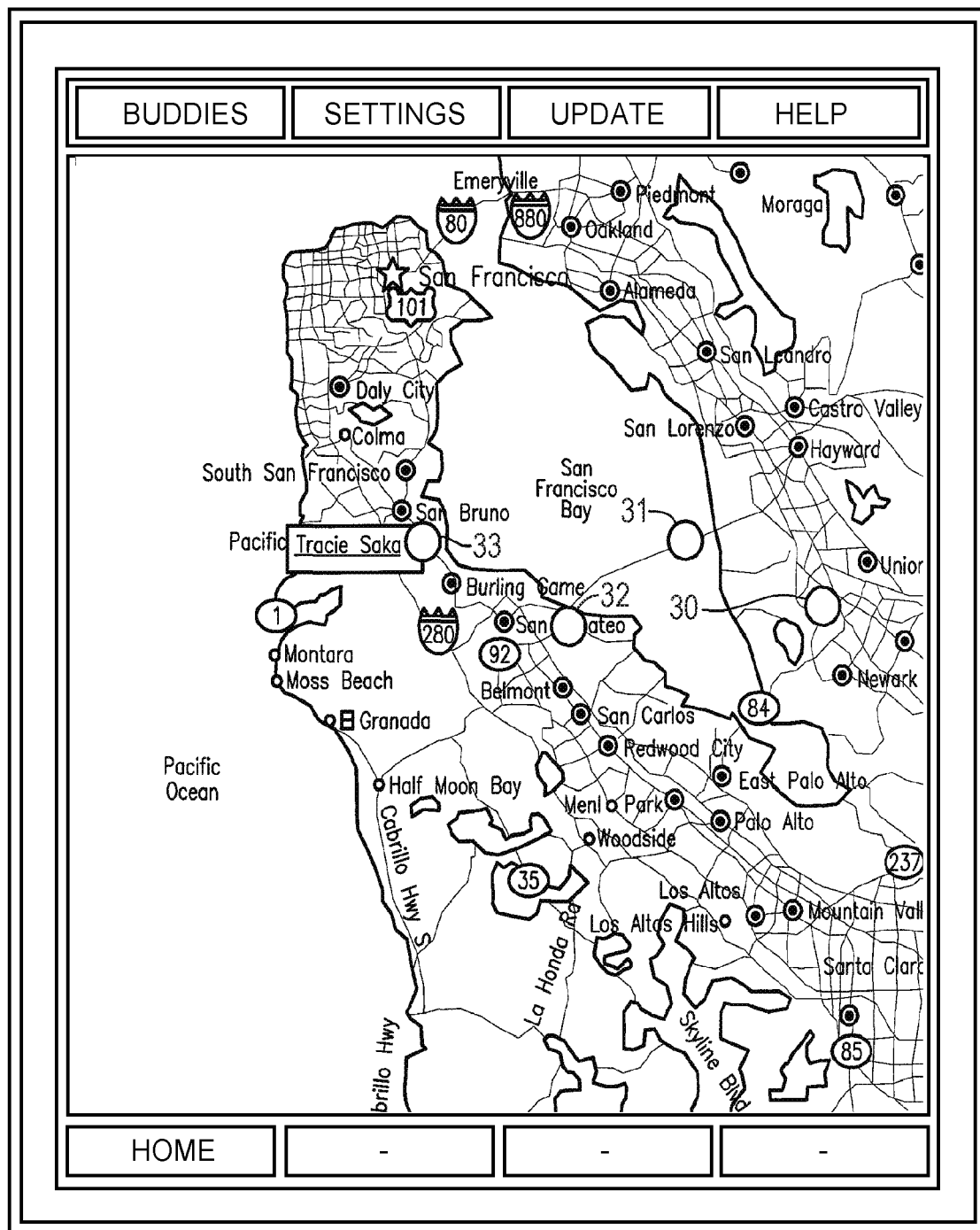
FIG. 6 is a user interface display showing a map rendering with the location history of a selected member of the tennis team rendered thereon.

FIG. 6 is a user interface display showing a map rendering with the location history of a selected member of the tennis team rendered thereon. This display is rendered when the Mapit with History function 28 in FIG. 4 is selected. This display shows the path Tracie took to get to her current location by way of waypoints 30, 31, 32 and 33. In some embodiments, when a user wishes to record a waypoint for their current position, a command can be given that causes the current position of the phone to be reported and saved as a waypoint on the Buddy Watch server 146 in FIG. 16.

In other embodiments, a particular position such as the phones current position or a position selected by moving crosshairs on a map display on a phone can be sent as a meeting place to all buddies on a Buddy List. When such a command is given and a Buddy List is selected, the position of the meeting place and the designated Buddy List is put into packets addressed to the Buddy Watch server 146 and transmitted thereto where the information is stored. The meeting position is then packetized in packets addressed to all the buddies of the designated Buddy List, and those packets are addressed to the phones of the buddies on the designated Buddy List and sent thereto.

Figure 7:
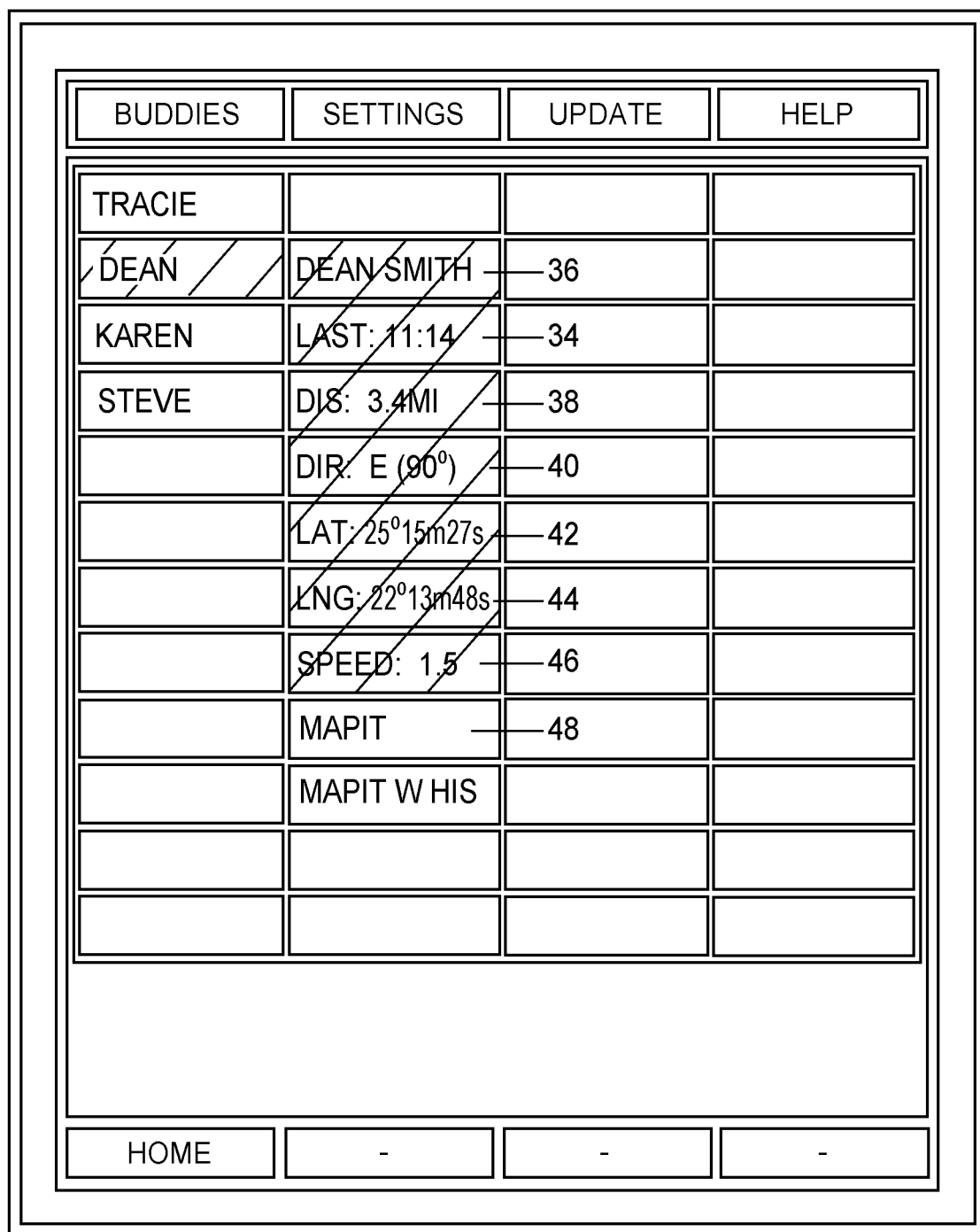
FIG. 7 is a screen shot of a display in a typical system employing the invention showing positions and status of members of a selected group.

Referring to FIG. 7, there is shown a display of a screen showing positions and status of members of a selected group. In this example, Tracie and Karen's positions are known and their name boxes in the left column are displayed in some color such as green indicating they are within cellular coverage and their positions are known. On the other hand, Dean's name box is shown in some other distinctive color such as yellow (represented by single cross hatch) to indicate contact with Dean has been lost. This happens when a user travels outside cellular coverage. Because Dean's name box is currently selected by the cursor, the settings column has the last known information about Dean also displayed in the distinctive color and represented by a single cross hatch. These boxes show Dean's last known position fix time (box 34), his full name (box 36), his last known distance (box 38), and his last known direction, latitude, longitude and speed (boxes 40, 42, 44 and 46, respectively).

Figure 8:
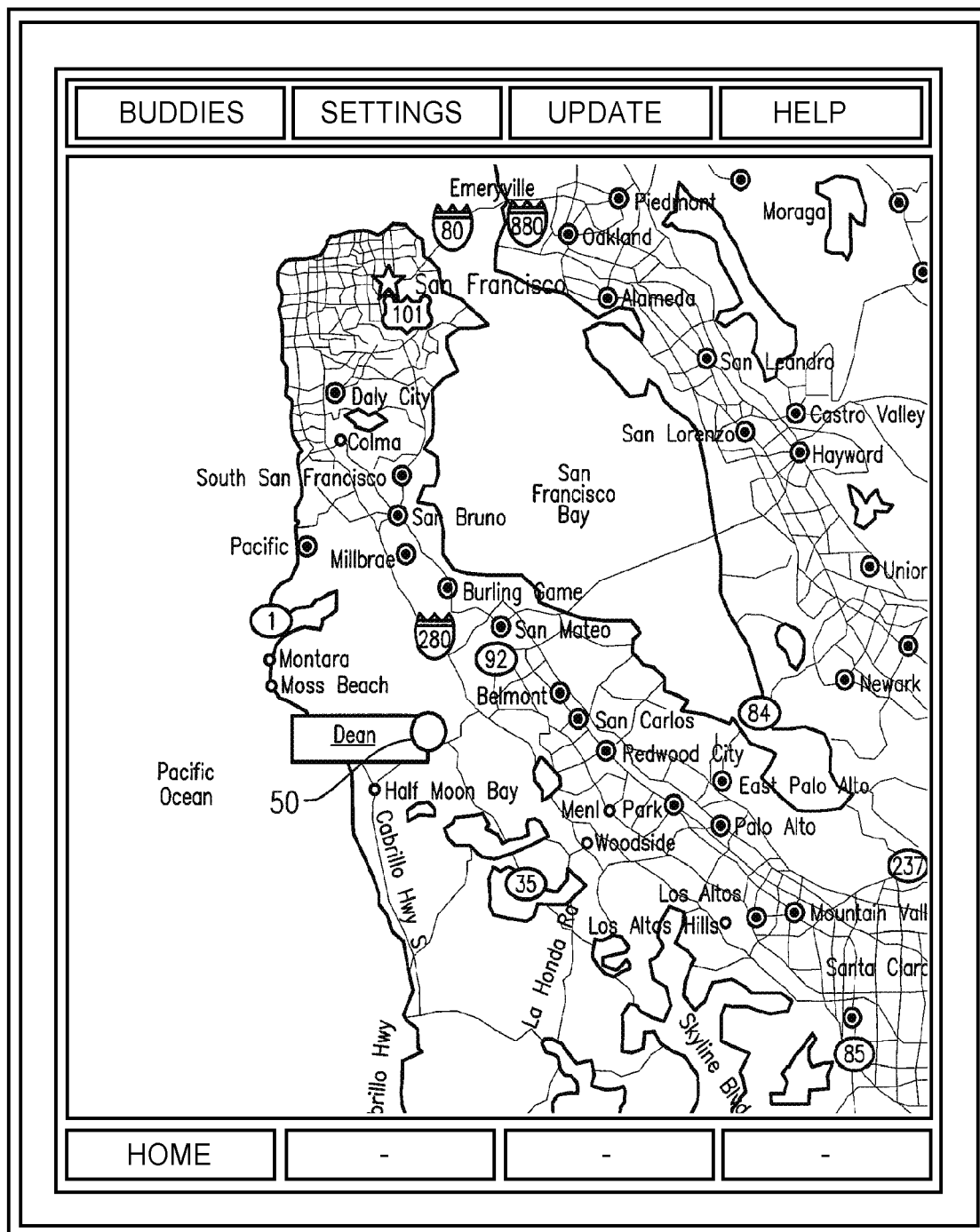
FIG. 8 is a screen display showing what is displayed when Dean is selected and the Mapit command in box 48 is given by double clicking on the box or by any other means.

FIG. 8 is a screen display showing what is displayed when Dean is selected and the Mapit command in box 48 is given by double clicking on the box or by any other means. When this Mapit command is given, Dean's last known position is displayed with a circle of a distinctive color (such as red), as illustrated at 50.

Instant Buddy Display with Mapit Position Mapping

An instant buddy relationship also allows the location of the motorist, lost or injured hiker or other user to appear on the tow truck or ambulance driver's cell phone Mapit display.

Figure 9:
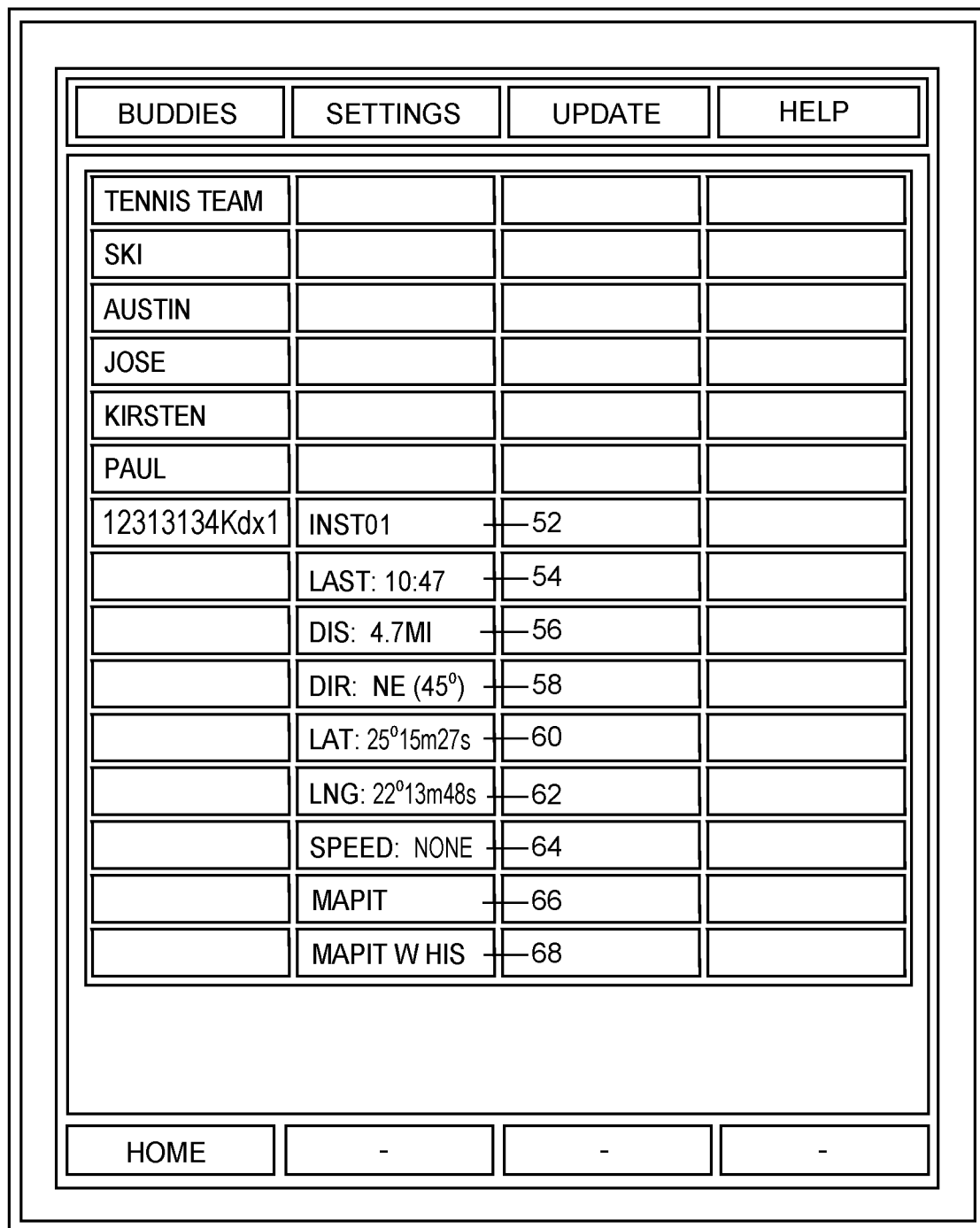
FIG. 9 is a screen shot of an instant buddy display after an instant buddy relationship has been set up.

FIG. 9 is an instant buddy display showing the instant buddy position. This display can be selected after an instant buddy relationship has been set up. This display shows the ID of the instant buddy in box 52, the time of the last position fix in box 54, the distance to the instant buddy in box 56. The direction to the instant buddy, latitude and longitude and speed of the instant buddy are shown in boxes 58, 60, 62 and 64, respectively. If the user selects the Mapit command in box 66 or the Mapit with history command in box 68, the phone display will change to a display like that shown in FIG. 8 or FIG. 6, respectively, with the current position of the instant buddy shown and the prior positions shown if the history option is selected.

Figure 10:
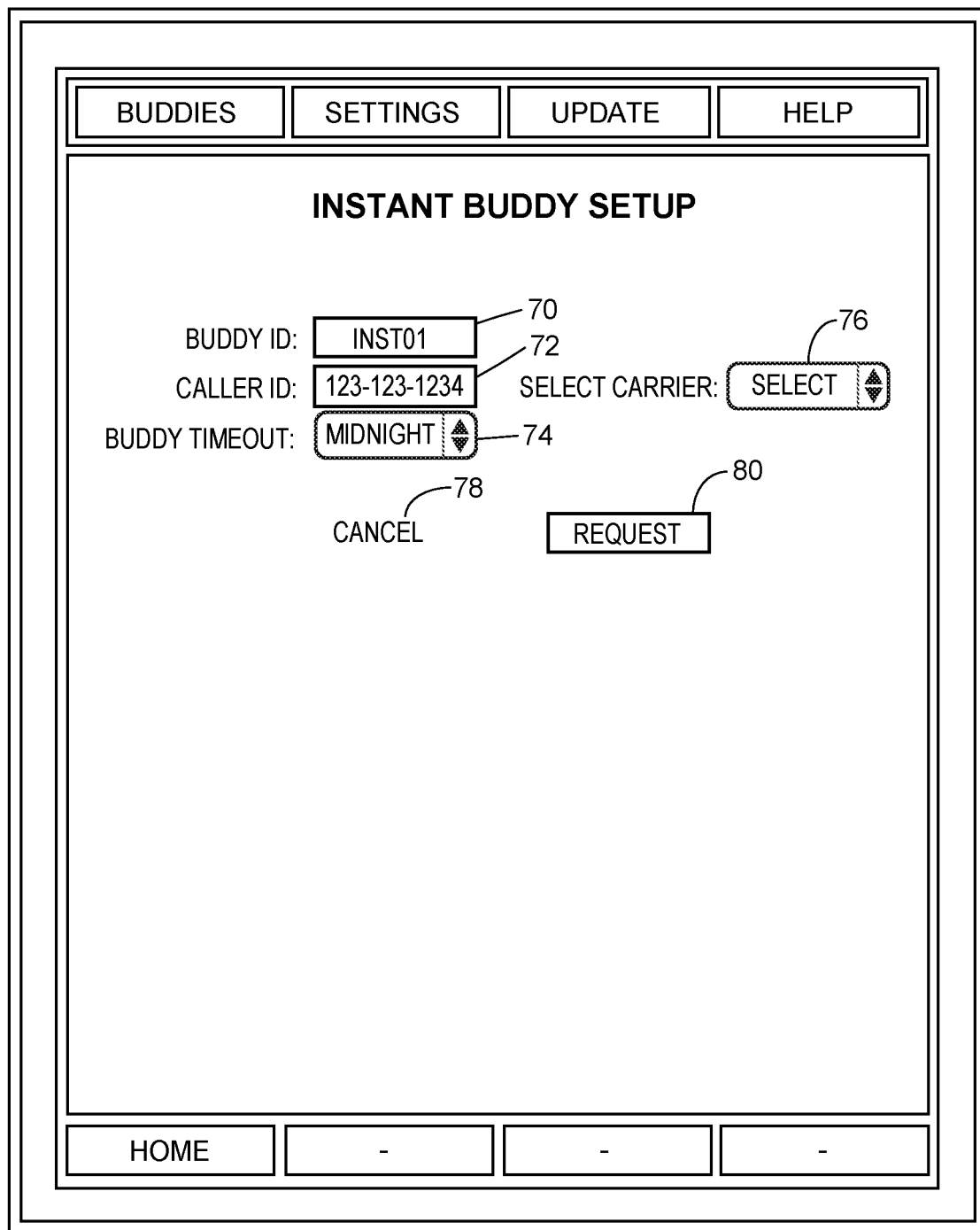
FIG. 10 is a screen shot of a typical display in a system employing the teachings of the invention to establish an instant buddy ID in box 70, and give the instant buddy a caller ID in box 72 (the instant buddy's caller ID or phone number is used by default).

Alternative Instant Buddy Setup Process: To set up an instant buddy relationship, the phone is given a command to display an instant buddy setup screen like that shown in FIG. 10. The display of FIG. 10 is used to establish an instant buddy ID in box 70, give the instant buddy a caller ID in box 72 (the instant buddy's caller ID or phone number is used by default). Box 74 is used to establish a timeout period at the end of which the instant buddy relationship is automatically terminated. The timeout period can be set to any interval in some embodiments, or to some selected interval from a drop down menu. Box 76 is used to establish the carrier the instant buddy is using. A cancel command is shown at 78 and a request command is shown at 80.

To start the instant buddy relationship, the request command is issued after the other boxes are filled in. Typically, a stranded motorist or hiker will call a tow truck or 911 and get the caller ID and carrier of the tow truck driver or rescuer. The stranded motorist or hiker will then enter this information in boxes 72 and 76. Box 70 shows an instant buddy ID which is automatically assigned by the system. After entering the information, the request command shown at 80 is selected. The screen of the rescuer's phone will then change to the display shown in FIG. 11. The information the requester filled in on the FIG. 10 screen will appear in boxes 82, 84, 86 and 88 on the stranded motorist or hiker's phone as well as on the instant buddy's phone (the tow truck or 911 rescuer). Commands for Denied and Accepted will also appear at 90 and 92 of the instant buddy's phone. If the instant buddy desires to accept the instant buddy relationship, he or she selects the accept command, and the tracking of the two instant buddies' positions will begin. Upon acceptance of the instant buddy relationship, each instant buddy's phone displays changes to the display shown in FIG. 9 from which the Mapit or Mapit with history command can be issued.

Corporate Supervision Setup Via Passcode

Corporations that wish to monitor the locations of their employees can use the system of the invention by using a corporate passcode. In this mode of operations, corporate employees are set up as a group with their supervisor as one member of the group. Each employee in the group can have his own buddies but he cannot delete the supervisor from the group. Only the supervisor can delete himself from the group of each employee's phone since only the supervisor has the passcode to change the group's members to delete himself. In one embodiment, the location information sharing is unidirectional from employees to supervisor but each employee can see the location of other employees on their phones but not the location of the supervisor. In this embodiment, the location sharing can be configured to be on only during working hours Monday to Friday. In other embodiments, the employees can see the locations of the supervisor as well as the locations of the other employees.

Timed Updates

The teachings of the invention contemplate doing position updates periodically at configurable intervals as well as a configuration option to do periodic updates as well as an update every x miles if a buddy in a group being monitored moves more than x miles between periodic updates. In some embodiments, the velocity at which a Buddy is moving or the amount of distance since the last update a Buddy has moved controls the frequency of the updates. Timed updates are handy for parents to monitor the positions of their children to make sure they do not move more than X miles from their home base. Position updates can be requested by a member of a Buddy List for position updates from the Buddy Watch server. The server receives positions reports from all the Buddy Watch phones registered with it and stores them and knows the Buddy Lists for each phone. When a request for a position update is received, positions of all the buddies on Buddy Lists of which that phone is a part will be transmitted as packets addressed to all the phones on all the Buddy Lists of which the requester is a part. In alternative embodiments, the position updates will be sent for all members of all Buddy Lists of which the requesting phone is a part, but will only be sent to the requesting phone to avoid excess network traffic. In other alternative embodiments, the requesting phone can designate a particular member of a particular Buddy List and request an update only for the position of the designated buddy. The position update will be sent only to the requesting phone.

Follow Me Mode

In some applications such as construction sites with large construction crews and one supervisor, it is useful for everybody working on the job to be able to find the supervisor but the supervisor does not care where anybody else is. In embodiments with this capability, the supervisor turns on the Follow Me mode, typically making a menu selection. This causes the supervisor's position to be reported to the Buddy Watch server on a regular basis in packets that have information in their headers or elsewhere which indicate they are Follow Me packets and which designates to which Buddy List this information is pertinent. The Buddy Watch server takes these position updates and packetizes them into packets addressed to each of the phones on the designated Buddy List and sends those packets to the Buddy List phones. Position updates from the phones on the Buddy List are not sent to the supervisor phone or any of the other phones on the Buddy List.

This Follow Me mode can also be done in a blind code mode. This means that the supervisor does not need to list everyone on his buddy list. This is an "open channel" mode. Any "follower" who wants to track the position of the supervisor only needs to list the supervisor's name and phone number on a buddy list of the "follower" phone. The supervisor enters a blind code in the Follow Me mode, and this code is published to all phones that have Buddy Watch software. This blind code entry and publication allows any follower to enter the blind code in a buddy list on the follower phone and thereafter to receive the supervisor's position reports. This entry of the blind code will give any follower the ability to receive position reports from the supervisor's phone, and the supervisor will not have to approve each buddy individually. This can be a great convenience since on some job sites, there may be hundreds or thousands of workers. The follower phone sends a packet to the Buddy Watch server telling it that the follower phone is in the Follow Me mode for the particular supervisor. This causes the Buddy Watch server to send position reports it receives from the supervisor phone to the follower phone, but the server does not send position reports from the follower phone to the supervisor phone. The follower phone does not send position reports to the Buddy Watch server when in the Follow Me mode. Disabling, removing or changing the blind code, stops Follow Me mode.

Buddies Only Mode

The Buddies only mode differs from the All On Follow Me mode and the Blind Code Buddies modes in that position reports are only received from Buddies on a specifically named Buddy List with specifically named Buddies. No blind code Buddies or Instant Buddy position reports can be received in this mode.

Waypoint Store Mode

This mode is useful for parents to monitor the travels of their children. In this mode, the child's phone periodically reports the child's position, and the parent can have the position reports sent to his phone (or computer in some embodiments). In some embodiments, position alert data can be configured to send an alarm signal to a parent if a child's position gets too close to a specified location or too far from the home location or some other location.

Request Update

This mode allows a specific user to request an update on the position of a specific Buddy. The requesting phone sends a request packet to the Buddy Watch server identifying itself and requesting a position update on a specified Buddy. The Buddy phone need not do anything other than do its normal operation of sending position updates to the Buddy Watch server. The update request causes the Buddy Watch server to provide a two-way update so that the requesting phone's location is sent by the Buddy Watch server to the Buddy phone and the Buddy phone's location is sent by the Buddy Watch server to the requesting phone. If the requester is part of a group, then the Buddy phone's location is sent to all phones in the group.

Timed Update

In this mode, periodic updates from the phone of a person such as a child or other person being cared for can be periodically sent to a list of parental or other supervisor destinations such as the parent's cell phone or email address. The sender phone may also be configured to send its location periodically to all others on a list. Updates on position can be every 15 minutes or some other configurable interval. In addition, each supervisorial user can request an update and the updates will be sent to every phone on the supervisorial list. If a phone on the list is not available, the update will indicate that no update is available, change the display to yellow and the status to unavailable but keep displaying the last way point.

Personal Bread Crumbs

This is an emergency feature which allows tracking down children or elderly people who are no longer responding to inquiries sent to their phone. This mode is useful for children who do not want to be watched but want a safety line to their friends and family in case something happens. A user who wishes to use this feature sets up their profile such that the Buddy Watch server checks in with them via their Buddy Watch enabled phone on a daily basis to determine if all is OK. The user must enter their secret code to confirm that all is OK. The phone prompts them to enter this code, and a certain number of prompts can be ignored before the system raises any alarms.

Figure 20A:
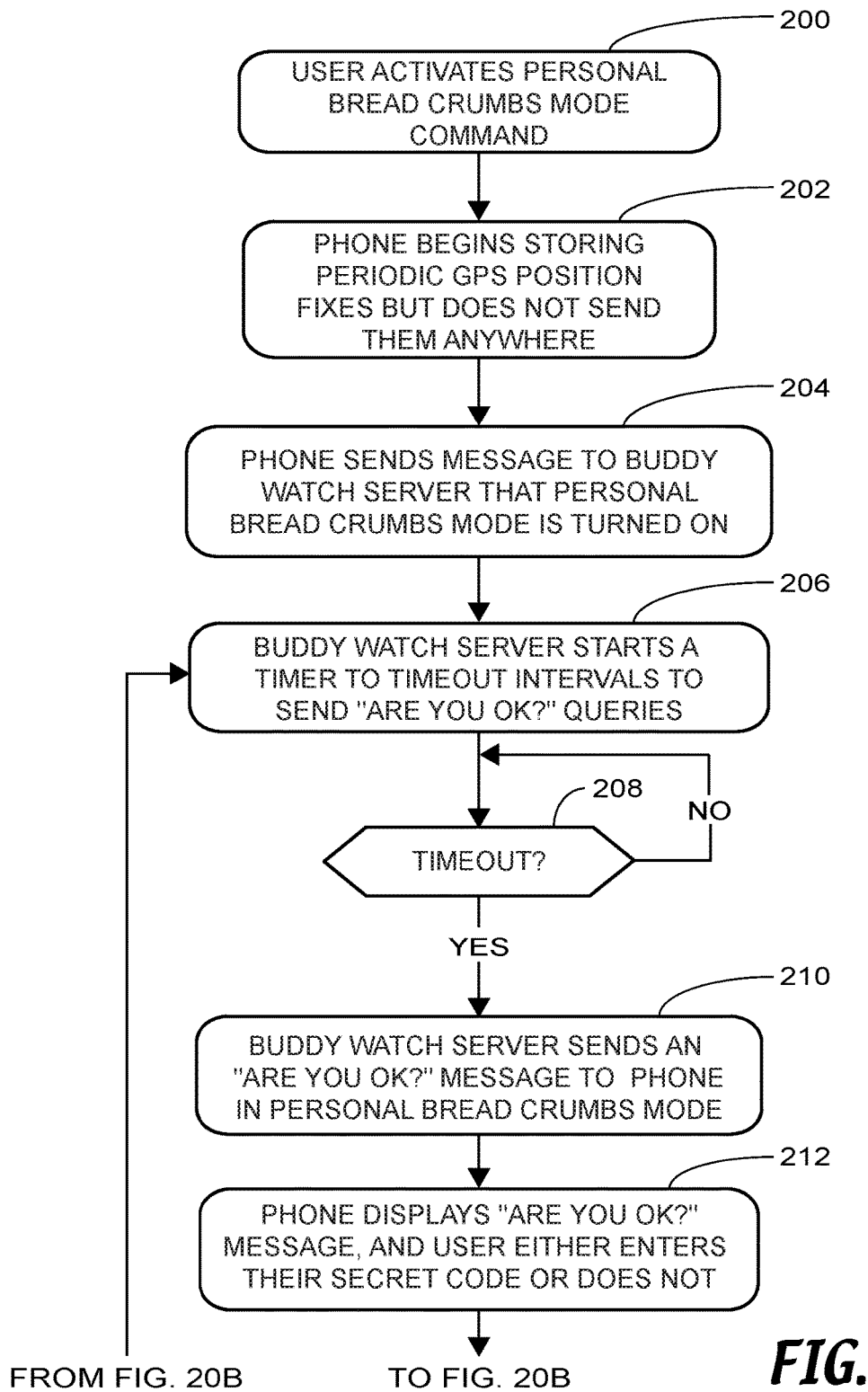
FIGS. 20A and B are a flowchart of the process of enabling the personal bread crumbs mode and how it works.
Figure 20B:
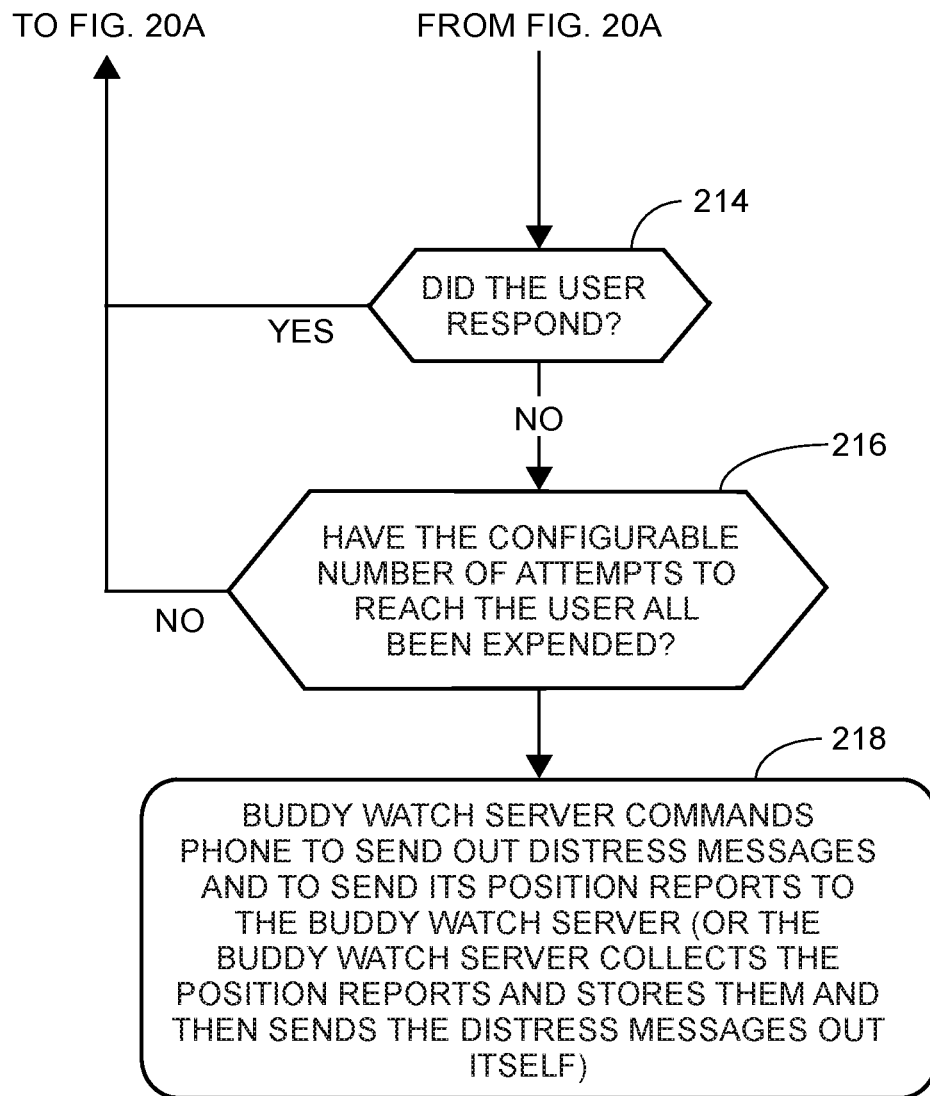

FIGS. 20A and B are a flowchart of one embodiment of the process of enabling the personal bread crumbs mode and how it works. Step 200 represents the process of enabling this mode. Typically, this is done by the user in selecting a menu command, but in some embodiments, it may be permanently configured to be on by the phone manufacturer. When this mode is enabled, the phone stores waypoints of the position of the holder of the phone periodically (step 202). The phone does not send the waypoints to anybody, but it does send data or a message to the Buddy Watch server that the personal bread crumbs feature has been enabled (step 204), so the Buddy Watch server starts a timer (step 206). The purpose of starting this timer is to establish intervals at the end of which an "Are you OK?" message will be sent to the phone which is in Personal Bread Crumbs™ mode.

Step 208 represents the process of monitoring the timer for a timeout event. This may take the form of a hardware or software interrupt. When a timeout occurs, the Buddy Watch server sends an inquiry to the phone inquiring if the user is OK (step 210). The phone then displays the "Are you OK?" message, and the user either enters his or her secret code to say they are OK or does not. If the user does not respond, processing proceeds back to step 206 to start the timer again as the user may simply be busy, have their phone off, be asleep, etc. However, after a configurable number of attempts to establish contact with no response, step 216 will conclude that the user may be in trouble and need rescue. In that case, processing is vectored by step 216 to step 218. In step 218, the phone is commanded by the Buddy Watch server to send distress messages out to predetermined phone numbers (five in the preferred embodiment) and/or email addresses. The voice mail message may indicate to check email for details. The email contains a content of a position report file that contains all the waypoints since the last OK was received. If there are no stored waypoints, at least one set of stored waypoints previously recorded are sent. The waypoints all provide latitude, longitude, date and time of recording.

The personal bread crumbs profile includes:
1) a list of emails to which messages should be sent;
2) a list of phone numbers to which the prerecorded voicemails are to be sent;
3) frequency of OK confirmation the user needs to agree to (default is daily at noon);
4) the text of an email to describe the emergency situation to readers which should include the mobile phone number, home phone number, work phone number, home address and other pertinent information; and
5) whether or not auto attachment of waypoints to emails is to be carried out.

In an alternative embodiment, step 218 represents the Buddy Watch server itself sending out the distress messages. In some embodiments, the distress messages are prerecorded voicemail messages which indicate the user may be in trouble and giving instructions to the recipient how to retrieve the position reports from the Buddy Watch server.

Step 218 also represents the process of the phone sending its GPS position waypoints to the Buddy Watch server. In some embodiments, the prerecorded voicemails are sent to predetermined phone numbers and the predetermined emails are sent to predetermined email addresses and include the GPS position reports in the text of the message. The email messages at least will include the personal breadcrumb position reports. These messages indicate to the recipients that there may be trouble and that they should start looking for the person who owns the phone.

Figure 21:
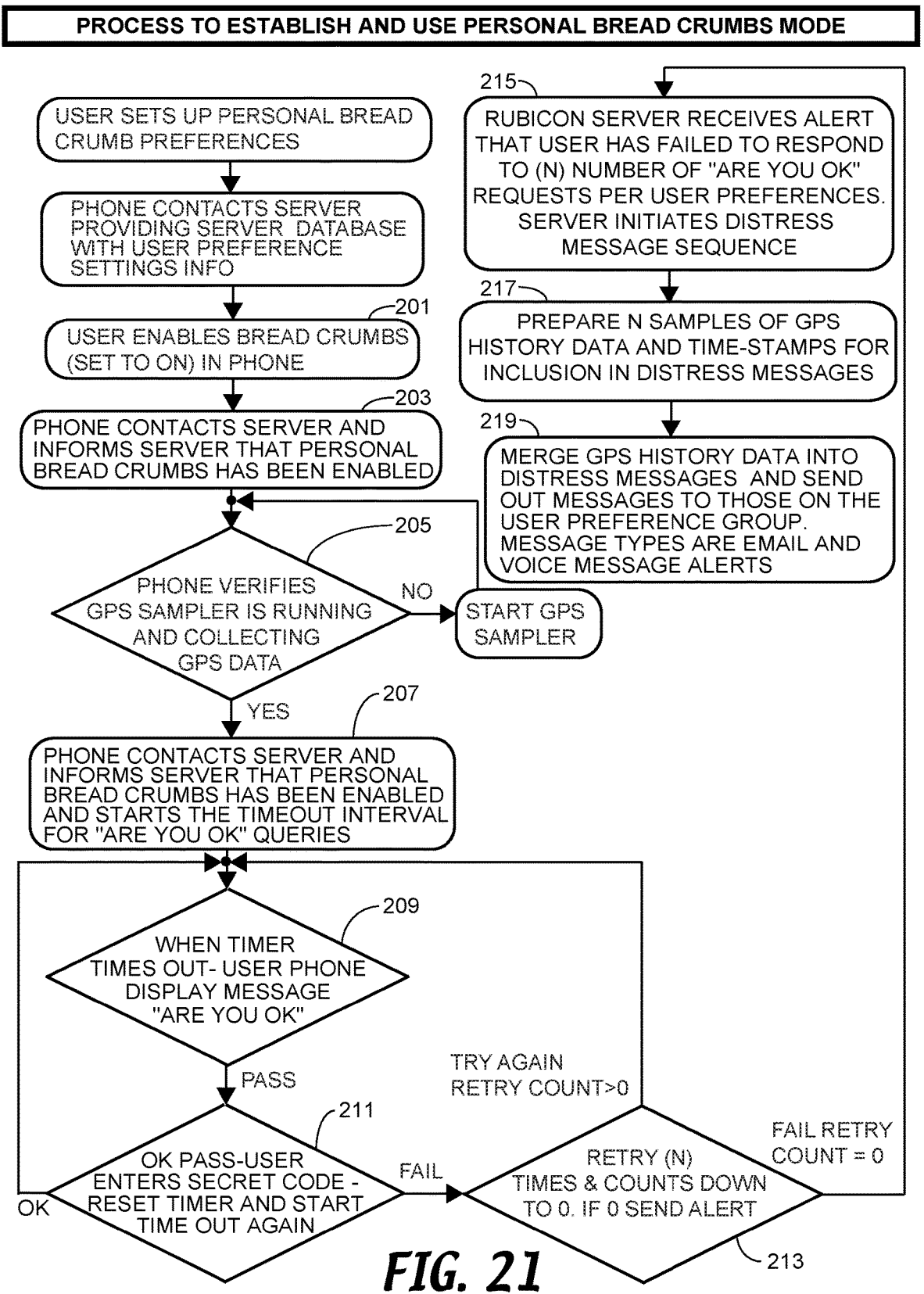
FIG. 21 is a flowchart of another embodiment of a process to establish and use the personal bread crumbs mode.

FIG. 21 is a flowchart of another embodiment of a process to establish and use personal bread crumbs mode. In step 201, the user enables the bread crumbs mode, and in step 203 the mobile phone contacts the Buddy Watch server (also called the Rubicon server herein) and informs it that personal bread crumbs mode is on. GPS sample data is collected (205) and the server is contacted to start the "Are you OK" timeout interval (207). Timeout causes the phone to display an "Are you OK" message (209). Steps 211 and 213 handle the situation where the user does not enter a secret code and retries. Step 215 represents the Rubicon server response if the user does not respond to the "Are you OK" message properly and timely, said response involving sending whatever distress messages are set up in the preferences file. GPS location samples and timestamps are included in the distress messages (217) and the messages are sent to the users listed in the preferences file (219).

Relational Database Compatibility

The Buddy Watch server is configured and programmed to be compatible with business applications where the customer may desire to find individuals based upon their capabilities, certifications or the equipment they are carrying. By making the Buddy Watch fields of the Buddy Watch database available for search and/or integration into other business databases, a company such as a service based organization can determine which individuals have the proper certification to work on a specific problem and/or who have the appropriate tools and where those individuals are located relative to a site to which the company wishes them to be dispatched. The Buddy Watch server is programmed to provide information about the subscribers and their locations in a format which is compatible with the other business database structures of customers who are interested in having this data. Each position update received by the Buddy Watch server then is exported and automatically updates the customer database. This can be done over the Internet or over a dedicated local area or wide area network.

Radar Inclusion

The radar inclusion mode is a mode which allows police departments or fire departments or any other emergency response type organizations to instantly expand their buddy lists to predetermined lists of all available personnel. This is useful when it is necessary to know the whereabouts of persons to assist in an emergency situation or other situation. This feature may be used by police or other groups where the formation of a group may vary throughout the day. This feature can be used in conjunction with standard groups. How this feature differs is that a user does not need to be identified and only when the user comes within the "radar" range or radius does the user get included within the radar inclusion group.

City, County, State or Federal law enforcement or other agencies can offer two capabilities with radar inclusion. The first capability is to send an alert with a fixed target or to add a moving target to any individuals or groups without any input from the field officers. The target could be a suspect on the move. The target affords all the officers a better view of what is going on. The second capability allows the agency using the radar inclusion feature to "light up" the positions of other individuals or groups of individuals on a Mapit display so that one or more officers/firemen responding to an emergency can see the positions of possible reinforcements relative to their position. This is useful when groups that normally do not work together such as perhaps the fire and police need to work together. Details about each Buddy which is lit up on the Mapit display can be sent to any other Buddy in need thereof by a command to the Buddy Watch server issued by the controlling personnel of the agency.

In the instant messaging protocol packets transmitted from a phone to the Buddy Watch server, there is a field that can be left blank or a prefix can be put in. An agency using radar inclusion can put a code in this field and then all Buddy Watch phones/PDAs operating in radar inclusion mode are sent these packets and retain the Buddy whose information is in the packets in a group. This new group can be retained for a user programmable time up to 24 hours beyond the radar inclusion Buddy display disappearing.

The Buddy Watch server determines if a matching radar code is in range of a user and is not currently part of their active buddy list. If not they are added if the radar inclusion mode is active.

Split Groups

When a member of a group specified by a Buddy in that group for Mapit display is outside the radius set up in a Group Map Size configuration entry, then that member is split from the group and will not appear on the map of the group. However, that member which has been split from the group will have an entry in a distinctive color such as dark green on the list of active users in the group. Changing the Group Map Size configuration entry to a larger size may allow the split member to be displayed. If the location of the split member must be viewed but the Group Map Size is not to be changed, clicking on the member of the group which has been split from the Buddy List will cause the Mapit display to change to the locale of the split member and display the member's location on the map so long as the split member's Buddy Watch status is active.

Power Off or Disable Buddy Tracker

When the phone is turned off or the Buddy Tracker application is disabled, a final transmission to the Buddy Watch server of the location of the Buddy is made. The Buddy Watch server distributes this location in packets addressed to all the members of the group of the Buddy who just went to inactive status.

Targets

The Buddy Tracker software allows targets to be designated to specify meeting points, sites of emergencies or service call locations. Law enforcement agencies can use this feature to silently redirect personnel to the site of a crime or emergency without broadcasting the location on the radio for persons using police scanners to hear. Each target can have a user defined label associated with it and a message, photo(s) or other document(s) can be attached to the target. All the data defining the target, any label associated therewith and any photos or other documents is packetized in packets identifying the data therein as target data or attachments to the target. These packets are received by the Buddy Watch server and re-packetized addressed to all members of a group or a radar inclusion group or specific Buddies.

A target can be specified by any member of a group or by a dispatcher of a law-enforcement or other agency. Targets can be specified using a web browser. The target is a forward looking waypoint. This can be useful if groups are to meet at a predefined location and the first to arrive may find this is either not the right location or for some reason the meeting point should be changed. The target can be moved, and then packets containing the data of the new target location are sent by the Buddy Watch server to all members of the group with an alert message indicating the target has moved. Targets can be moved simply by dragging and dropping the target to a new location on the display on the web browser which is logged into the Buddy Watch server and which has invoked the target specification command. Once the target has been initially set, moving it to a new location creates a waypoint history. Each target can have a description associated with it, and if the target has been moved, the history can be viewed.

Out of Coverage Operation

When devices are out of cellular coverage, some limited operations are still possible based on the device. For devices with a full GPS receiver, the user can set targets or force waypoints that are stored. Each device may differ based on the amount of available memory.

If a Buddy takes his phone into areas of intermittent coverage, it offers a means of some contact. Additionally, one may visit a site on a rural road or other location out of coverage. Setting a target or forcing a waypoint from a phone or desktop computer which is not located at the target provides the location, but does not provide any idea regarding what is at the location. A picture phone at the location can capture a picture of the location, and this picture be associated with the target to give other Buddies in the group some idea of what to expect when they get to a meeting point or target.

When a user wants to return to the site, the saved target can be recalled and sent to other Buddies in a group or individually designated so a return trip can be planned. This provides the ability to return to spots not located on roads or at intersections such as pastoral settings.

Local maps when out of coverage would not show up on the user's phone when the Mapit command is issued. This is because the map pixels are sent from the Buddy Watch server to the phone after being retrieved from a mapping server such as Yahoo maps. When the phone is out of coverage, the map pixel packets cannot reach the phone and it cannot render a map. However, if the phone has a GPS receiver, it can store the point the user indicated he would like to capture, and, later when the phone is back in coverage, it can send the GPS location to the Buddy Watch server in a Mapit command packet, and get the map pixels back from the Buddy Watch server along with any attachments.

Phones with limited memory will decrease the frequency of position updates so as to not exceed the memory capacity.

Attachments to Targets and Waypoints

Attachments such as photos can be appended to targets and waypoints even with travelling outside a coverage area. Once the phone is back in coverage, the attachment to a waypoint for example will be sent to the Buddy Watch server and can be distributed to other users. Documents created with phone apps or pictures captured by the phone's built in camera can be attached, and, if the phone has a USB port, pictures captured by a digital camera or camcorder can be imported and attached.

Encryption of Data

The Buddy Watch software application is disabled and encrypted when it is downloaded to prevent other unauthorized users from installing and using it. The Buddy Watch application program is decrypted and enabled when the access code is downloaded after a subscription is purchased since the decryption key is or is part of or is encoded into the access code.

Access Codes

Access codes to enable the Buddy Watch application are designed to incorporate the phone number or phone serial number as part of the encryption key so that the access code can only enable one phone. Large groups with many phones, can ask for and receive access codes that allow operation across a large number of phones.

Access codes are downloaded to the phone from the cell provider's server or emailed to the user when the user provides their name, phone number, phone serial number and a form of payment. The application may be downloaded to a MAC or PC, and then configured on the personal computer before being uploaded to the phone by a computer-to-phone USB connection.

Targets

A member of a buddy group can market a target on a Mapit display, and that target location can be shared to all the members of the group and show up on their Mapit displays so they all know where to meet. Marking targets is done using cursors on the Mapit display on the phone. The user then designates the buddy list to which the marked target is to be published. Packets are generated in the Buddy Watch application on the phone which include the GPS location, any name assigned to the target and the identification of the buddy list to which the location is to be published. These packets are sent to the Buddy Watch server which then extracts the data and packetizes it into packets addressed to all the phones on the designated buddy list. These packets are then sent to the buddies on the list and the location of the target is extracted and posted on a Mapit display.

User Waypoints

The users can mark particular waypoints as they travel using the Mapit displays on their phones, and pictures or memos can be attached to these waypoints. In one embodiment, this is done by sending a packet with the location marked by the user to the Buddy Watch server and in that packet giving an identifier or pointer that will be contained in other packets which record the memo or photo to be attached to the waypoint. The Buddy Watch server then extracts the data from these packets and stores the user waypoint location with a pointer to the file in which the memo or photo is stored.

SOS Support

Each user of Buddy Watch can define a profile of buddies to which an SOS alert is to be sent in the case of emergency. The SOS alert message includes location, time and phone number (caller ID) and a preset message for email or Instant Message service and a prerecorded voice message. This data is sent in packets addressed to the Buddy Watch server when the user gives a command to send the SOS message. The Buddy Watch server then receives the SOS message, determines who it is from, retrieves the SOS profile stored on the server for that user and generates packets for email and IM and sends them on the internet and generates packets containing the digitized voice message and addresses them to the phones listed in the SOS profile and sends those packets to the cellular system central switching system 102 in FIG. 16 via internet gateway 148.

The SOS message protocol can be carried out by the Buddy Watch server either on demand from the user, or automatically in conjunction with any 911 call made from a phone which has a stored SOS profile. The SOS support configuration file contains data which defines which way the phone will act, and the buddies receiving the SOS messages will be aware of whether an 911 call was made or not. The buddies are actually in a better condition to help the caller since they can see the caller's position on their Mapit displays, and they may be closer to the caller and be able to act quicker than the 911 support personnel.

The preferred embodiment causes the SOS messages to be sent when the user dials 911. A 411 dialed call will send the SOS messages to only active buddies whose phones are registered in the system and on with Buddy Watch activated.

The User Interface Genus

All species within the genus of user interfaces according to the teachings of the invention will display buddy lists and a list of buddies on each buddy list when that buddy list is selected. All species will display the specific information about a buddy when a particular buddy is selected including at least their current location and the time of the fix. All species will display a command or icon or menu choice that can be invoked to allow a user to turn off location sharing. All species will display commands, icons or menu choices to add, delete or edit buddy lists, or to add or delete or edit buddies.

Some species within this genus will also display one or more of the following items of information about individual buddies: speed, last contact, altitude or direction. Some species within the genus will provide icons, menu choices, etc. which a user can invoke to allow the user to select a map display with the location of a buddy displayed thereon. Some species within the genus will allow a user to give a command to request historical fixes which trace a path to the buddy's current position. Some species within the genus will allow instant buddy relationships to be set up to allow location sharing between a person in trouble and a rescuer.

The Server Genus

All servers programmed with Buddy Watch software will have functionality to:

1. either store map data for entire geographical areas that they serve or to obtain pertinent map data from another server such as a Mapquest™ server and pick the appropriate maplet that surrounds the positions of buddies to be displayed and serve the maplet data to Buddy Watch enabled phones;
2. pick the appropriate maplet for each buddy list or buddy based upon the center of gravity of the buddy positions of the buddies within the selected buddy list and exclude buddies which are out of the coverage area;
3. render buddy locations on maplets based upon GPS location data gathered from Buddy Watch applications running on GPS enabled cell phones and PDAs;
4. store user defined data that embodies each user's buddy lists and buddies and configuration data;
5. store at least some preference data that defines who can use the server, e.g. only those with a valid Buddy Watch user ID and password);
6. request and receive update and regularly scheduled GPS location data from users who have their Buddy Watch application turned on their phones or PDAs and to distribute location data and maplets to the phones and PDAs of the buddies on buddy lists who have their Buddy Watch capability turned on; and
7. turn Buddy Watch functionality on or off in terms of receiving location data from users who have indicated they want their Buddy Watch application turned off and turn off sharing location data of buddies who have turned off their Buddy Watch application.

Various species within this genus: can calculate the center of gravity of the best fit for the maximum number of buddies that are within the coverage of one maplet; determine the proper maplet size to send to the client phone or PDA based upon configuration data which defines the screen size of the device; send the same size maplet to all clients; allow each client to determine its own maplet size; send maplets with buddies color coded to show who is out of bounds and who is in lost contact status; implement a permissive buddy list wherein a person cannot be added to a buddy list until they consent; implement timed updates for GPS position and scheduled cutoff times for position sharing; store auxiliary information about each buddy such as phone numbers, etc.; offer the functionality to allow each user to specify the maplet size they receive or specify a maximum maplet size for a buddy list; offer the functionality to request updates whenever a programmable delta time or delta position difference over the last update occurs; offer a user preference to turn on or turn off GPS position updates; the ability to cross communicate with other carrier's cellular systems to send maplets to and receive location data from users on other systems; function to enable or disable the Buddy Watch application without disabling location sharing with parental or supervisor units; storing as a preference or configuration data SOS emails and voicemail messages which can be sent out to email addresses and/or phone numbers specified in a configuration data file on demand or automatically when a 911 call is made.

The Client Application Genus

The client Buddy Watch application and phone or PDA platform genus collectively provide the following functionality:

1. the programmed phone or PDA must be able to retrieve GPS position data directly or indirectly from a GPs receiver in the phone or PDA, and it should be able to wirelessly send the GPS position data to the Buddy Watch server either periodically or on demand from the server, but one or another, it must be able to exchange position information data with the server;
2. the phone or PDA must have a display large enough to display maplets and be able to download maplets from the Buddy Watch server;
3. it must have Java or similar software to exchange digital data with the Buddy Watch server using a wireless web application program;
4. it must be able to communicate with the phone's application programmatic interface and any application programmatic interface of the cell phone service provider to:
    be able to receive maplets from the Buddy Watch server with location data rendered thereon and display the maplets;
    send location data and receive downstream messages and requests from the Buddy Watch server.

An important species with this genus will be able to request software needed to execute commands given by the user from the Buddy Watch server, receive a download of the software requested, install it into random access memory and execute it to carry out the requested command. In other species, the software Apparatus and Process are to simplify Push to Talk walkie-talkie operations in cell phones.

Figure 31:
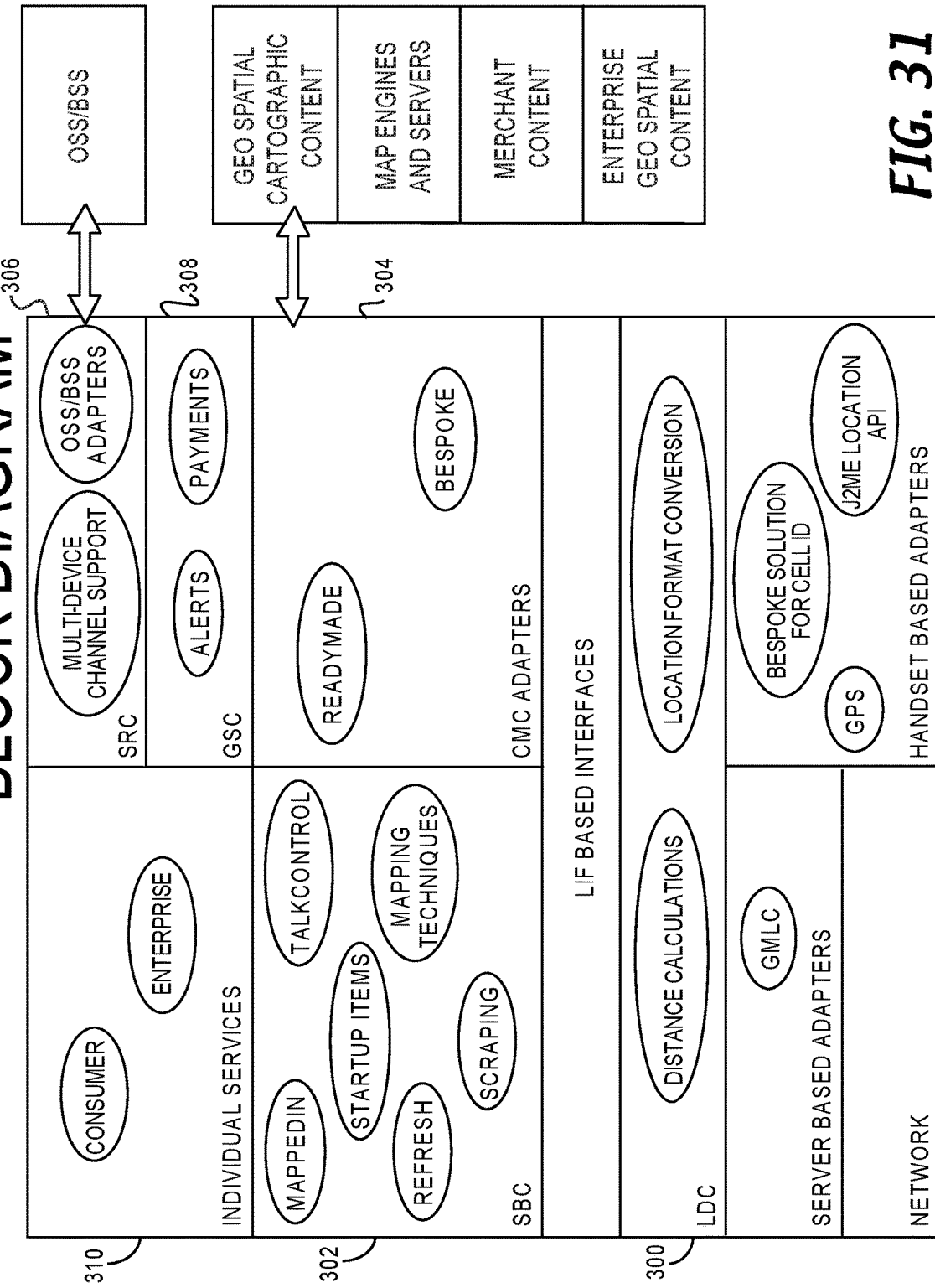
FIG. 31 is a block diagram of the system for TalkControl to simplify cell phone walkie-talkie operations.

FIG. 31 is a block diagram of the system for TalkControl to simplify cell phone walkie-talkie operations. Block 300 is a location determination component which functions to determine user locations. This can be done in the cell phones or the Rubicon server and provides a generic solution to extract location from GPS, J2ME location API or bespoke development for extracting Cell ID. If done on the server, the GMLC based solution us used. Block 300 also does distance calculations, location format conversion etc. LDG can expose a LIF based interface to location based services when applicable. This provides location determination flexibility as needed.

SBC component 302 functions to do buddy group/list management, mapping techniques, refresh based upon time or delta movement, geo coding, reverse geo coding, routing, etc.

CMC block 304 functions to provide local content to location based services. The content can be local maps or commercial/enterprise specific content. Multiple parties like commercial content providers, government establishments or enterprises will provide the content. This CMC component will provide a common API to extract content from multiple providers and provide the flexibility to choose any content provider based upon parameters such as accuracy, availability of content, rates, whether the content is the latest, etc.

The SRC block 306 is a software rendering component which provides multiple channel and device rendering, mobile application provisioning, service creation environment, OSS/BSS integration in both pre-paid and post paid modes, usage analysis reports and SNMP based system management software.

GSC block 308 provides alert and notification systems, personalization, payment integration etc.

Individual services block 310 provides tools and generic components to build individual applications in consumer and enterprise domains. Consumer services like child tracking, buddy location, location based advertisements for target user groups can be built. Enterprise services such as work force management, fleet tracking, emergency services, etc. can use the generic components.

Figure 32:
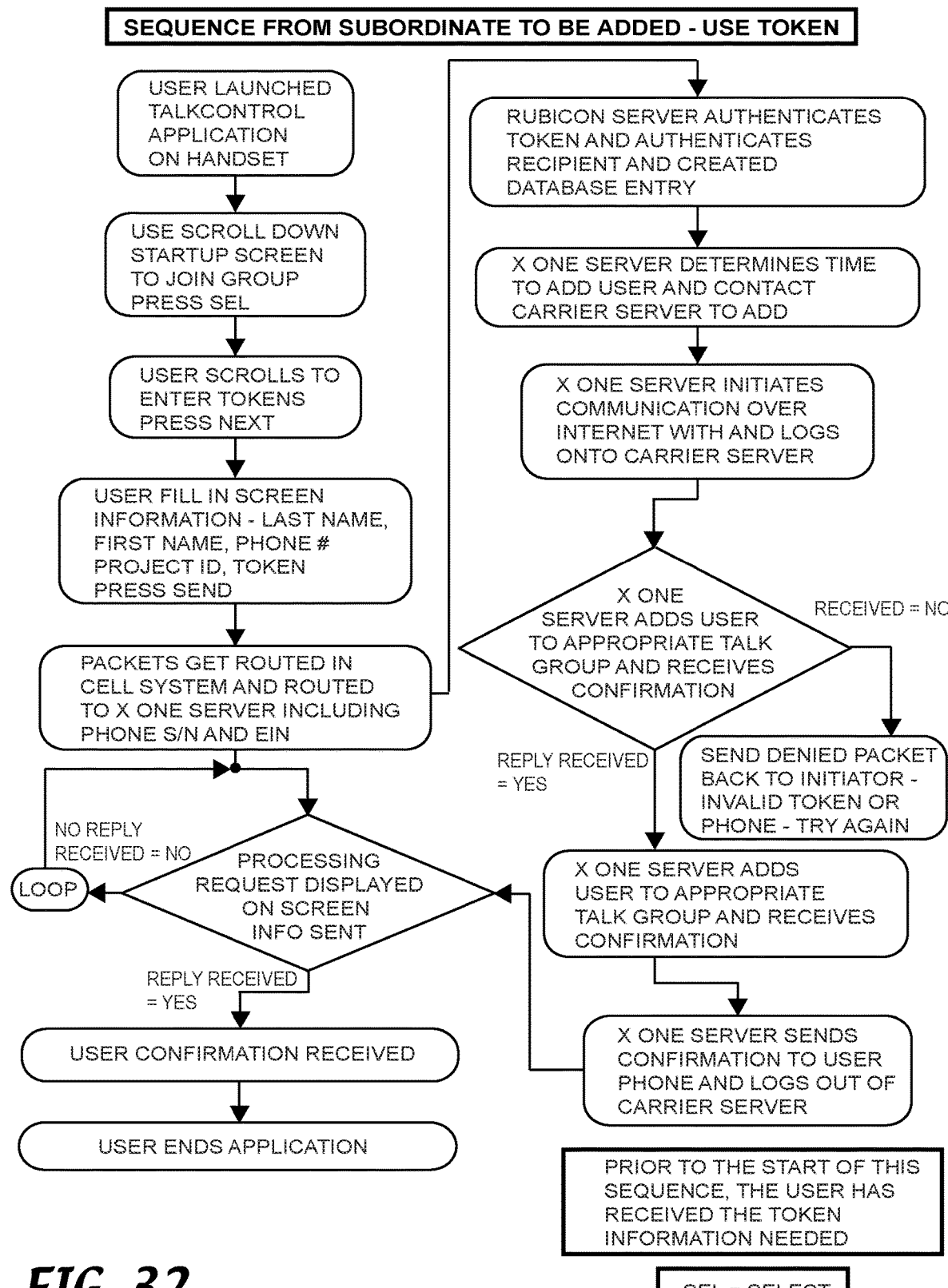
FIG. 32 is a flow diagram of a process a user of a walkie-talkie enabled phone can initiate to join a talk group to enable subsequent walkie-talkie operations.

FIG. 32 is a flow diagram of a process a user of a walkie-talkie enabled phone can initiate to join a talk group to enable subsequent walkie-talkie operations. This process greatly simplifies the process of signing up for walkie-talkie operations of a wireless carrier. A user who wishes to join a walkie-talkie talk group launches the TalkControl application, scrolls down to Join Group menu option, selects an Enter Tokens option, fills in her name, phone number, project ID, and Token and presses send. One or more packets are sent to the Rubicon server which authenticates the token and the recipient and creates a database entry. The Rubicon server then determines a time to add the user to the talk group and contacts a server of the wireless carrier to add a user. The Rubicon server logs onto the Carrier Server and adds the user to the appropriate talk group and receives a confirmation. The confirmation is sent to the user who initiated the process, and the Rubicon server logs out of the carrier server.

Figure 33:
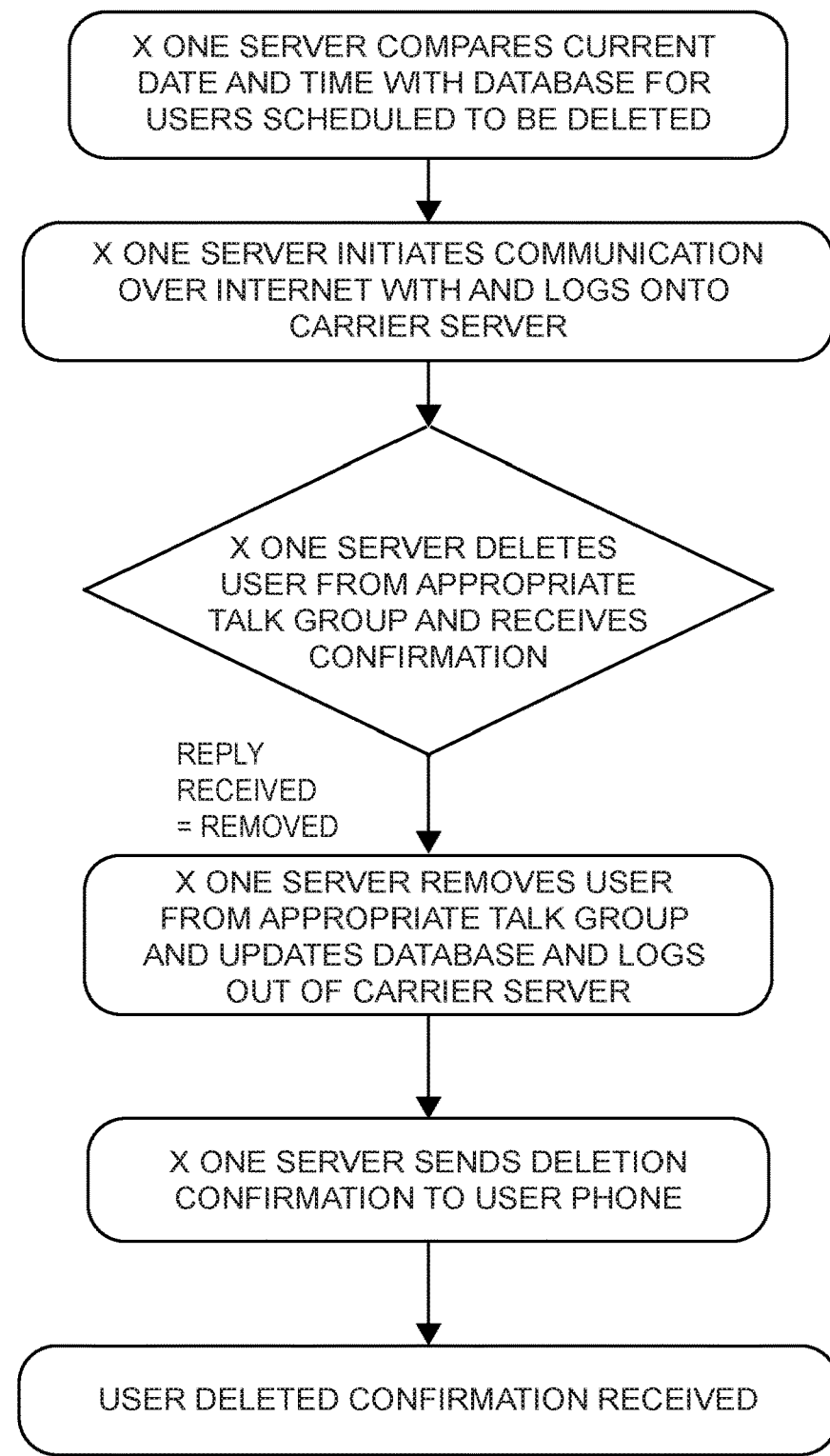
FIG. 33 is a flowchart of the process the Rubicon server carries out to automatically delete a user.

FIG. 33 is a flowchart of the process the Rubicon server carries out to automatically delete a user. Users in talk groups can be deleted automatically based upon a scheduled deletion time using this process. The Rubicon (X One) server compares the current date and time with a database for users scheduled to be deleted. If a user is to be deleted per schedule, the Rubicon server logs onto a carrier server and deletes the user from the appropriate talk group and receives confirmation. The Rubicon server then deletes the user from the talk group in its database and logs out of the carrier server. The Rubicon server then sends the deletion confirmation to the user phone.

Figure 34:
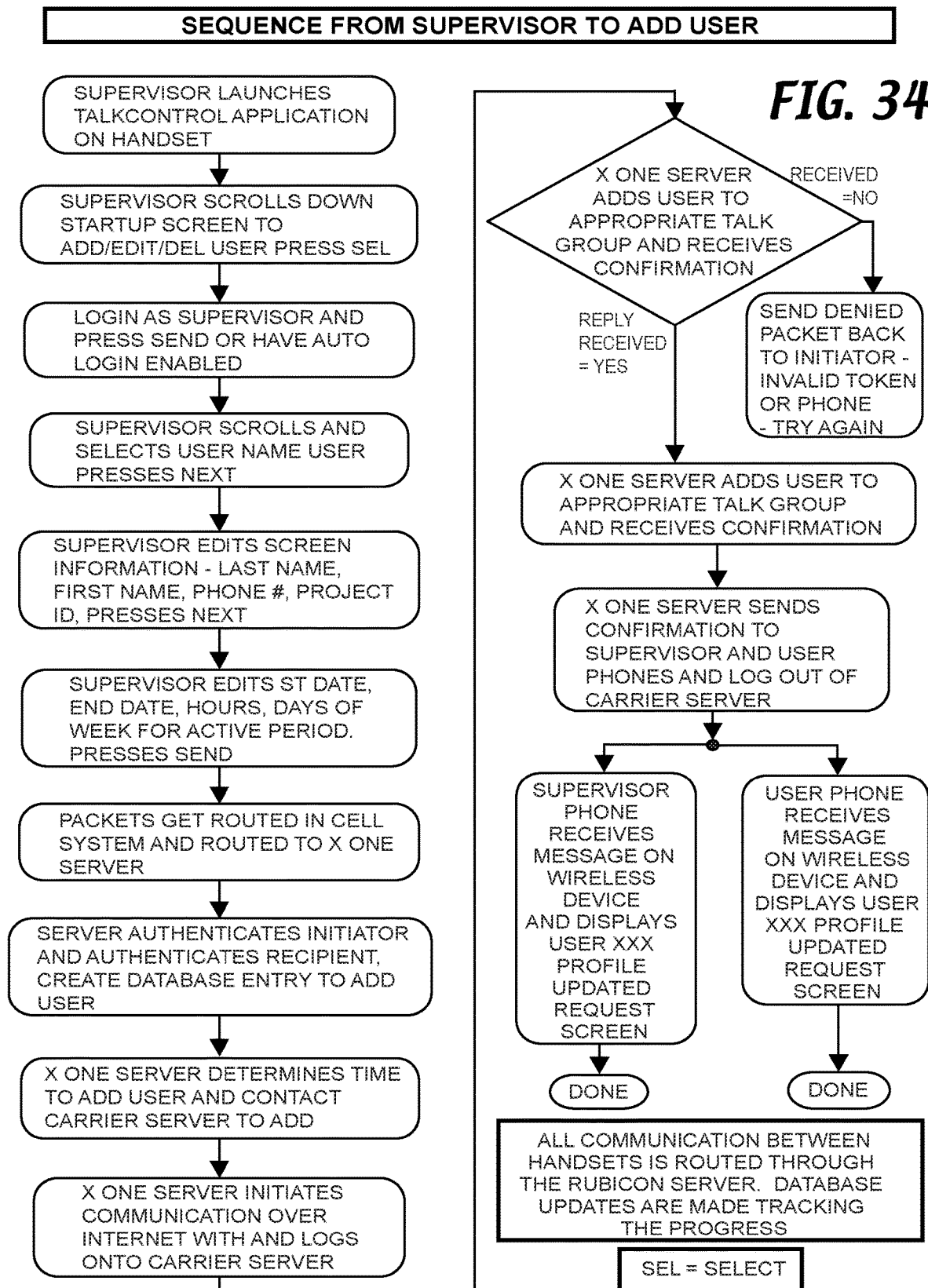
FIG. 34 is a flowchart of the process the Rubicon server carries out to allow a supervisor to add a user.

FIG. 34 is a flowchart of the process the Rubicon server carries out to allow a supervisor to add a user. The supervisor launches the TalkControl application program and scrolls down to the add/edit/delete user menu option and logs in as a supervisor and presses send. The supervisor then selects User Name and selects Next to take him to the user screen where the user's name, phone number, and project ID are entered. The supervisor then edits the start date, end date, hours, days of the week for the active period when the user being added will be part of the talk group so that walkie-talkie service can only be had during the specified times. One or more packets are then generated addressed to the Rubicon server and encapsulated in a cellular system packet and sent. These packets get routed to the Rubicon server which authenticates the initiator and recipient, creates a database entry for the user and contacts the Carrier server and logs on. The Rubicon server then adds the user to the appropriate talk group and receives confirmation. The Rubicon server then adds the user to the appropriate talk group and updates its database and receives the confirmation. The confirmation is sent to the supervisor who added the user and to the user phone which was added to the talk group.

FIG. 35 is a flowchart of the process for a supervisor to edit a user in a talk group. The supervisor launches the TalkControl application and scrolls down to add/edit/delete user and selects that option. The supervisor logs in as the supervisor and selects edit user and selects a user already in a talk group and edits data in fields for name, phone number, project ID of the user to be edited and presses next. Start date, end date, hours, days of the week are then changed as desired. From that point, the process is the same as adding a new user.

Figure 36:
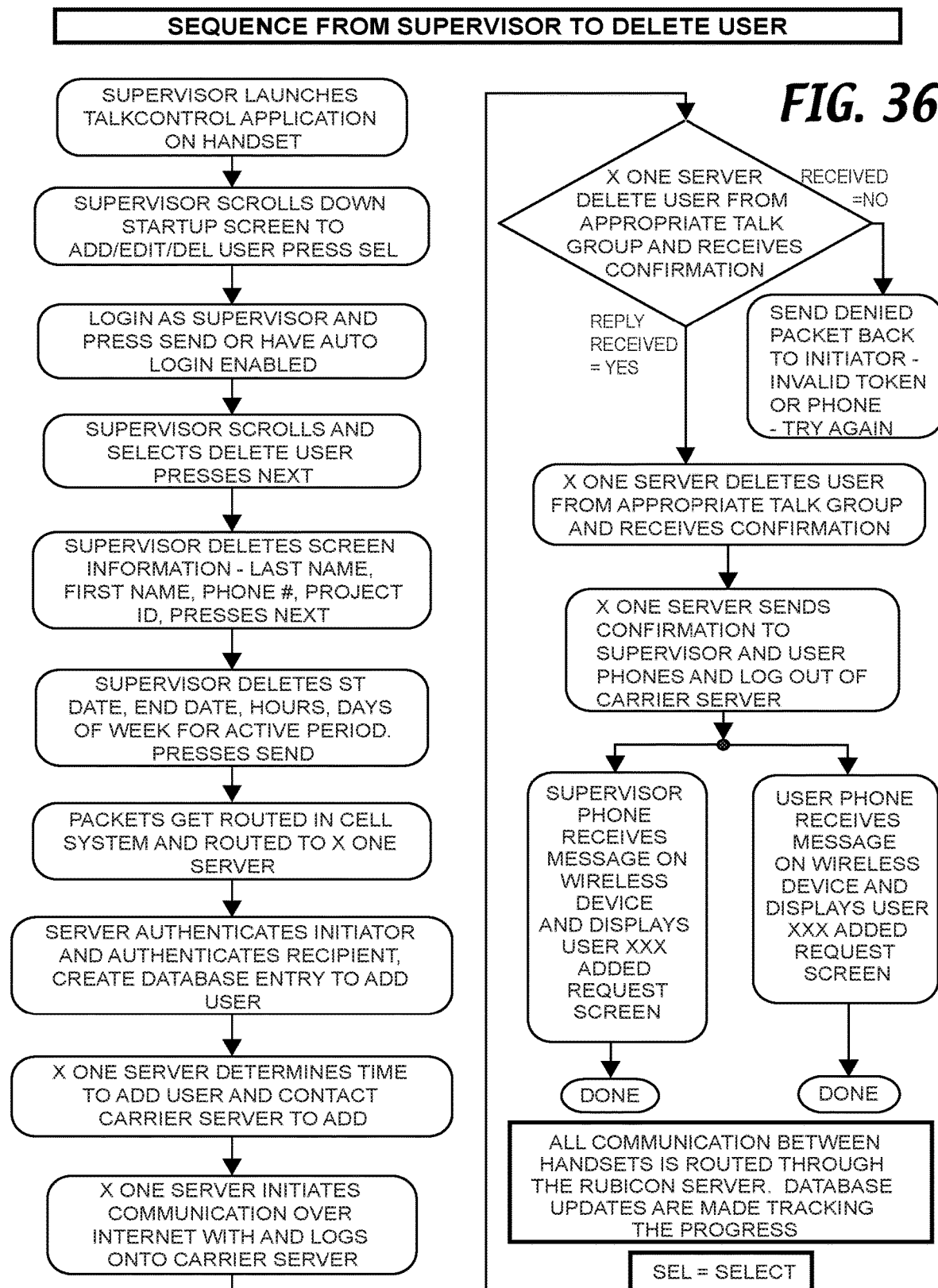
FIG. 36 is a flowchart of a process for a supervisor to delete a user from a talk group.

FIG. 36 is a flowchart of a process for a supervisor to delete a user from a talk group. The supervisor launches TalkControl and scrolls down to add/edit/delete user and selects that. She logs in as a supervisor and scrolls down to delete a user and deletes data in name, phone number, project ID, start date, end date, hours and days of week field and presses send. One or more packets get routed to the Rubicon servers which authenticates the initiator and recipient. The Rubicon server then logs onto the Carrier server and deletes the user from the appropriate talk group and receives a confirmation. The Rubicon server receives the confirmation and updates its database to delete the user from a talk group. Confirmation is then sent from the Rubicon server to the supervisor phone and the user's phone, and the Rubicon server then logs out of the carrier server.

Figure 37:
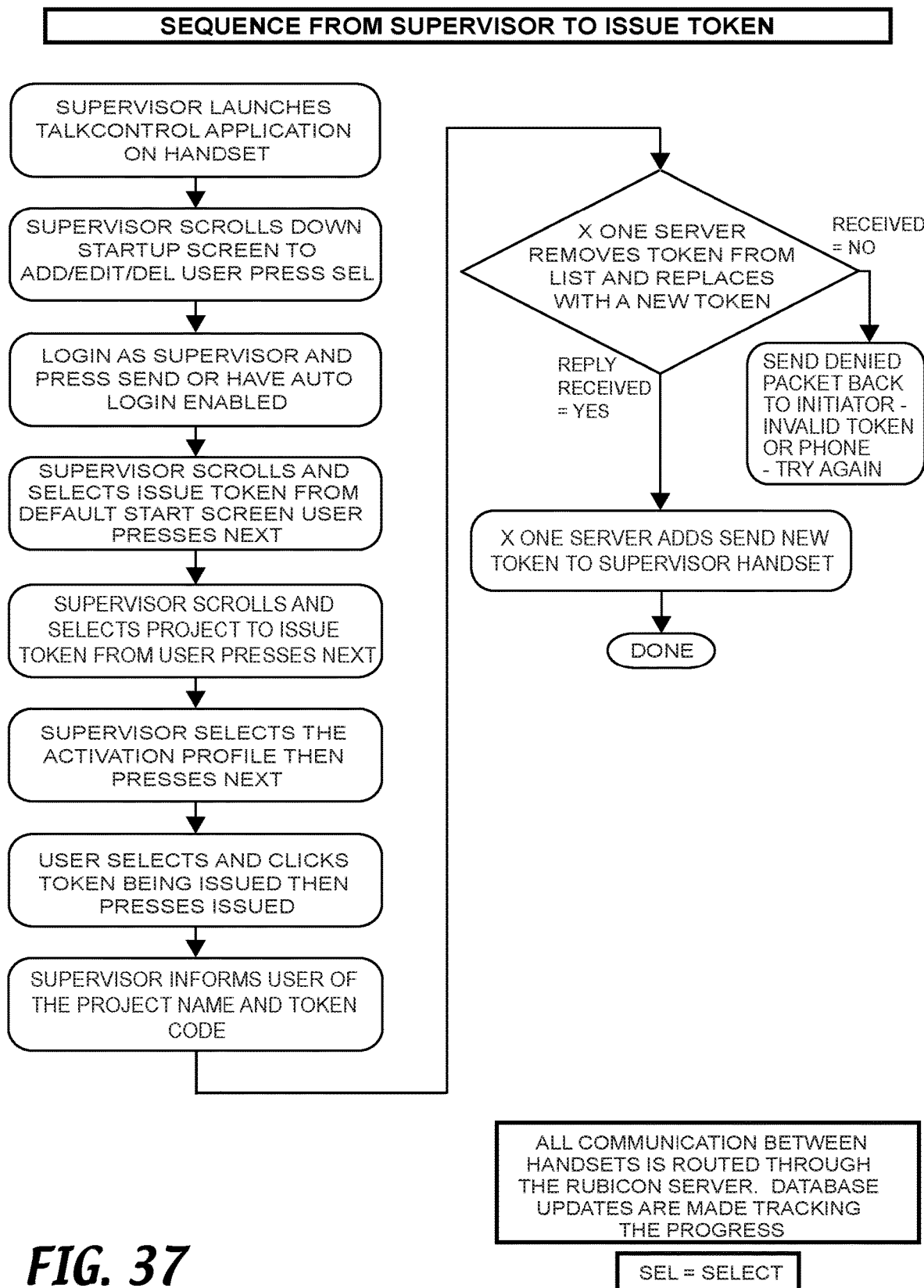
FIG. 37 is a flowchart of a process for a supervisor to issue a token.

FIG. 37 is a flowchart of a process for a supervisor to issue a token. The supervisor launches TalkControl and scrolls down to add/edit/delete a user. She logs in as a supervisor and scrolls down to issue token menu option and selects it. She then scrolls down to select project to issue token menu option and presses next. The user selects token being issued and presses issue. The supervisor then informs the user of the project name and the token code. Packets are sent to the Rubicon server which removes the token from the list and replaces it with a new token. The Rubicon server then sends a message to the supervisor's phone to add the message send new token to the supervisor's handset.

Figure 38:
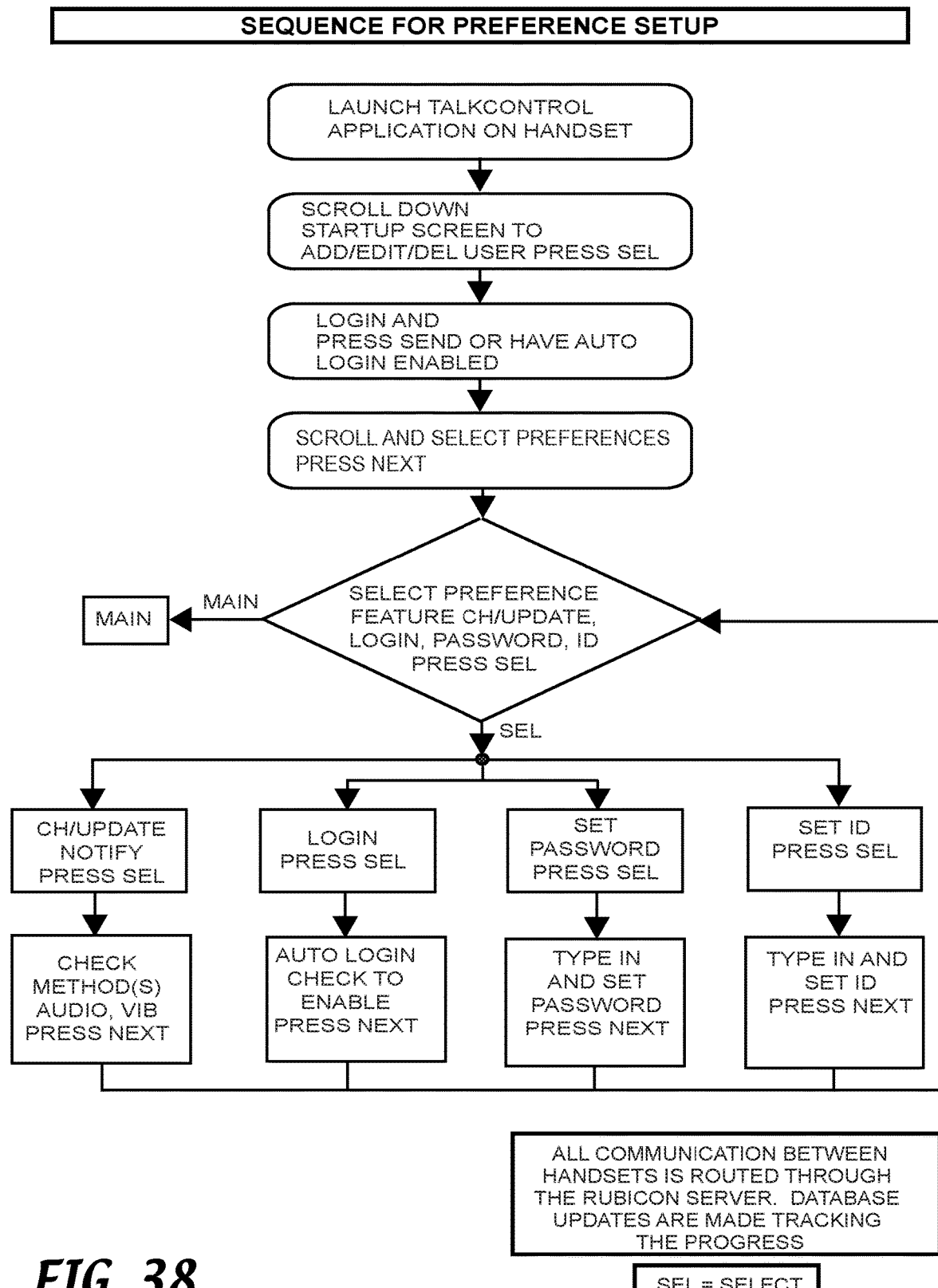
FIG. 38 is a flowchart for the process of setting up preferences.

FIG. 38 is a flowchart for the process of setting up preferences. The TalkControl application is launched on the handset and the user scrolls down to the add/edit/delete user option and presses select. The user logs in and presses send. The user then scrolls down to preferences and presses next. The user then selects the preference feature to be updated and presses select. This vectors processing to one of the four illustrated lines of processing to set the methods of notification as audio, vibrate or select auto login or set the new password or set a new ID. Processing then loops back to allow another preference to be selected and edited.

Figure 39:
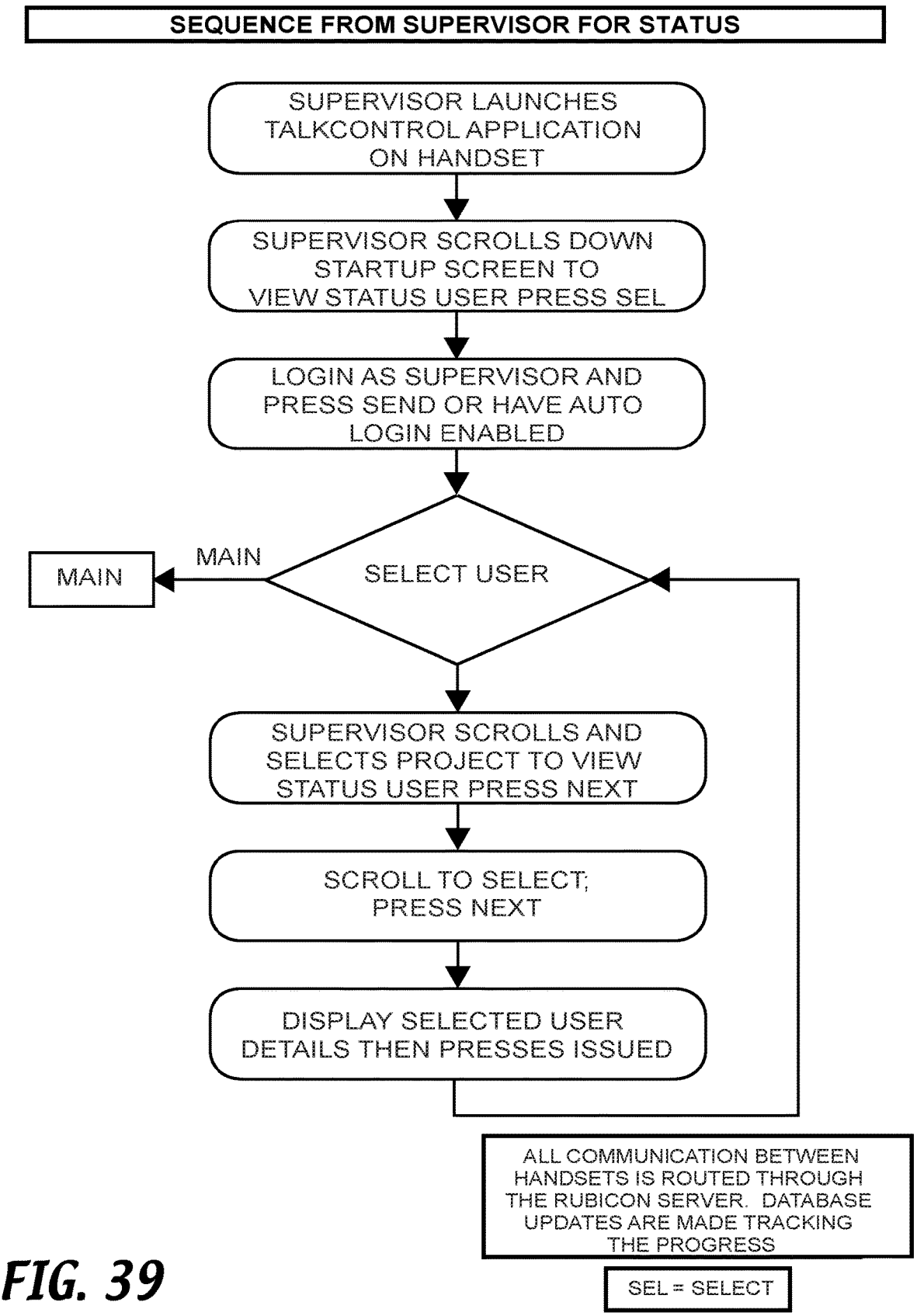
FIG. 39 is a flowchart of the process to allow a supervisor to request status.

FIG. 39 is a flowchart for the process to allow a supervisor to request status. The supervisor launches TalkControl and scrolls down to view status. She logs in as a supervisor and presses send and then selects a user. The supervisor then scrolls and selects project to view status and presses next and scrolls down to select the project and the user and views the user's details.

Figure 40:
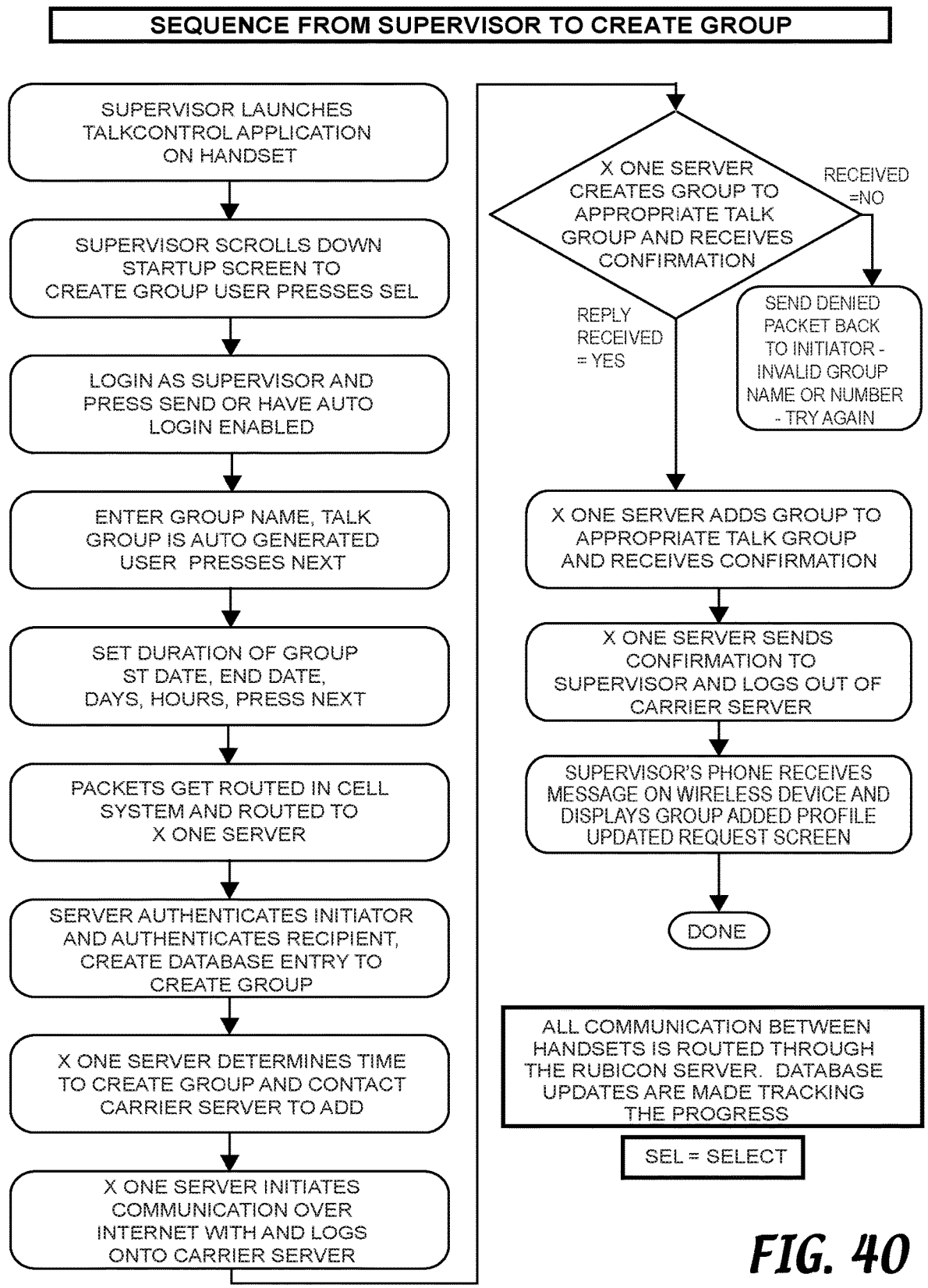
FIG. 40 is a process flowchart of the process for a supervisor to create a group.

FIG. 40 is a process flowchart of the process for a supervisor to create a group. The supervisor launches TalkControl application and scrolls down to create a group and presses select. She then logs in as supervisor and presses send and enters group name. A talk group is then automatically created. The supervisor sets the duration of the group, its start date, end date, days, hours and presses next. One or more packets addressed to the Rubicon server are then created and sent to the Rubicon server. The Rubicon server then authenticates the initiator and recipient and creates a database entry for a new group. The Rubicon server then contacts the carrier server and logs in and creates a talk group in the carrier server and receives a confirmation. The Rubicon server then adds the group to the appropriate talk group and receives confirmation. The confirmation is then sent from the Rubicon server to the supervisor and the Rubicon server logs out of the carrier server. The supervisor phone then receives a message on the wireless device displaying the group added profile updated request screen.

Although the invention has been disclosed in terms of the preferred and alternative embodiments disclosed herein, those skilled in the art will appreciate possible alternative embodiments and other modifications to the teachings disclosed herein which do not depart from the spirit and scope of the invention. All such alternative embodiments and other modifications are intended to be included within the scope of the claims appended hereto.

I claim:

1. An apparatus comprising instructions stored on non-transitory storage media, said instructions when executed to cause at least one processor of an internet-ready cell phone belonging to a user to:
   install a software application on the internet-ready cell phone of the user, following internet-based download of the software application to the internet-ready cell phone of the user;
   in connection with launch of the software application on the internet-ready cell phone of the user, and contingent upon verification of currently valid payment status, enable a mutual location tracking and position-mapping function of the software application on the internet-ready cell phone of the user; and
   as part of the mutual location tracking and position-mapping function,
      receive from a user interface of the internet-ready cell phone of the user, a user selection of an individual with whom position information will be exchanged,
      configure the internet-ready cell phone of the user so as to send updated GPS information of the user to an internet-ready cell phone of the selected individual and receive updated GPS information of the selected individual therefrom, wherein exchange of the updated GPS information of the selected individual is to be effectuated via a software application installed on the internet-ready cell phone of the selected individual,
      render a moving map on the internet-ready cell phone of the user, dependent on at least one map retrieved from a server, and dependent at least in part on the updated GPS information of the selected individual, so as to be displayed on the internet-ready cell phone of the user in a manner that encompasses updated position of the selected individual, and
      automatically terminate the exchange of the GPS information between the user and the selected individual upon occurrence of a predetermined event.

2. The apparatus of claim 1, wherein:
   the software application installed on the internet-ready cell phone of the user corresponds to a business application and is to be launched in connection with a request by the user for a desired service;
   the user is a customer of a business corresponding to the business application, and the user selection is to be drawn from among a set of individuals associated with the business, dependent on equipment of the selected individual, wherein the selected individual is to be a provider of the requested service;
   said instructions, when executed, are to send the updated GPS information of the user to the software application installed on the internet-ready cell phone of the selected individual in a manner that is encrypted; and
   the exchange of the updated GPS information of the individual and the updated GPS of the user are both to occur in the form of TCP/IP packets, via an IP address and port associated with the software application on the internet-ready cellphone of the user.

3. The apparatus of claim 2, wherein:
   said instructions, when executed, are to communicate with a server and store an activation code from the server on the internet-ready cell phone of the user, contingent on submission to the server of payment information associated with use of the software application on the internet-ready cell phone of the user; and
   upon launch, the software application on the internet-ready cell phone of the user is to check for validity of the activation code and is to enable the mutual location tracking and position-mapping function of the software application on the internet-ready cell phone of the user contingent on validity of the activation code.

4. The apparatus of claim 2, wherein said instructions are to establish the mutual tracking and position-mapping function on an ask-and-accept basis, such that the mutual tracking and position-mapping function is also contingent on an acceptance response from the selected individual.

5. The apparatus of claim 2, wherein the selected individual has an account and wherein said instructions are to establish the mutual tracking and position-mapping function continent upon verification of the account and upon verification of an equipment identification number (EIN) of the internet-ready cell phone of the selected individual, wherein exchange of TCP/IP packets with the internet-ready cell phone of the selected individual is to occur via an IP address and port associated with the software application on the internet-ready cell phone of the selected individual.

6. The apparatus of claim 1, wherein said instructions when executed are to render the moving map on the internet-ready cell phone of the user in a manner that conveys speed and direction of travel of the selected individual.

7. The apparatus of claim 1, wherein said instructions when executed are to render the moving map on the internet-ready cell phone of the user in a manner that displays position of last contact of the selected individual, pending receipt of updated GPS information of the selected individual.

8. The apparatus of claim 1, wherein said instructions when executed are to display a cursor to the user, via a visual display of the internet-ready cell phone of the user, and are to permit the user to define a proposed meeting point for the user and the selected individual by positioning of a cursor on the visual display of the internet-ready cell phone of the user.

9. The apparatus of claim 8, wherein the visual display comprises a touch screen and wherein said instructions when executed are to permit the user to define the proposed meeting point for the user and the selected individual by dragging and dropping of the cursor on the touch screen of the internet-ready cell phone of the user.

10. The apparatus of claim 1, wherein said instructions when executed are to cause the at least one processor to render the moving map on the internet-ready cell phone of the user in a manner that also depicts updated position of the user, wherein the moving map is automatically re-centered and resized in a manner dependent on each of the updated GPS information of the selected individual and GPS information of the user, so as to be displayed on the internet-ready cell phone of the user in a manner that encompasses updated position of both of the user and the selected individual.

11. The apparatus of claim 1, wherein said instructions when executed are to cause display of an option on a visual display of the internet-ready cell phone of the user for the user to send information associated with travel of the user to select at least one third party selected by the user from amongst a list of contacts presented on the visual display of the internet-ready cell phone of the user, and to cause the internet-ready cell phone of the user, upon exercise of said option, to transmit the information associated with the travel to the at least one third party.

12. The apparatus of claim 1, wherein said instructions when executed are to cause display of an option on a visual display of the internet-ready cell phone of the user to initiate voice communications directly with the selected individual and to cause the internet-ready cell phone of the user, upon selection of the option, to initiate said voice communications directly with the selected individual.

13. The apparatus of claim 1, wherein said instructions when executed are to cause display of an option on a visual display of the internet-ready cell phone of the user to initiate a text message for the selected individual and, in connection with exercise of said option, to cause the internet-ready cell phone of the user to directly send the text message to the selected individual.

14. The apparatus of claim 1, wherein the software application installed on the internet-ready cell phone of the user is to provide an application programming interface to extract commercial enterprise-specific content associated with multiple predetermined parties for presentation to the user, and wherein said instructions, when executed, are to cause the at least one processor to receive from the software application a choice from the user, entered via a user interface of the internet-ready cell phone of the user, the choice free to designate the commercial enterprise-specific content of any one of the multiple parties.

15. An apparatus comprising instructions stored on non-transitory storage media, said instructions when executed to cause at least one processor of an internet-ready cell phone belonging to a user to:
install a software application on the internet-ready cell phone of the user, following internet-based download of the software application to the internet-ready cell phone of the user;
in connection with launch of the software application on the internet-ready cell phone of the user, and contingent upon verification of currently valid payment status, enable a mutual location tracking and position-mapping function of the software application on the internet-ready cell phone of the user; and
as part of the mutual location tracking and position-mapping function,
receive from a user interface of the internet-ready cell phone of the user, a user selection of an individual with whom position information will be exchanged,
configure the internet-ready cell phone of the user so as to send updated GPS information of the user to an internet-ready cell phone of the selected individual and receive updated GPS information of the selected individual therefrom, wherein exchange of the updated GPS information of the selected individual is to be effectuated via a software application installed on the internet-ready cell phone of the selected individual,
render a moving map on the internet-ready cell phone of the user, dependent on at least one map retrieved from a server, and dependent at least in part on the updated GPS information of the selected individual, so as to be displayed on the internet-ready cell phone of the user in a manner that encompasses updated position of the selected individual, and
automatically terminate the exchange of the GPS information between the user and the selected individual upon occurrence of a predetermined event;
wherein
said instructions when executed are to cause the at least one processor to render the moving map on the internet-ready cell phone of the user in a manner that also depicts updated position of the user,
the software application installed on the internet-ready cell phone of the user corresponds to a business application and is to be launched in connection with a request by the user for a desired service, and
the user is a customer of a business corresponding to the business application, and the user selection is to be drawn from among a set of individuals associated with the business, dependent on equipment of the selected individual, wherein the selected individual is to be a provider of the requested service.

16. The apparatus of claim 15, wherein:
said instructions, when executed, are to send the updated GPS information of the user to the software application installed on the internet-ready cell phone of the selected individual in a manner that is encrypted; and
the exchange of the updated GPS information of the individual and the updated GPS of the user are both to occur in the form of TCP/IP packets, via an IP address and port associated with the software application on the internet-ready cellphone of the user.

17. The apparatus of claim 15, wherein:
said instructions, when executed, are to communicate with a server and store an activation code from the server on the internet-ready cell phone of the user, contingent on submission to the server of payment information associated with use of the software application on the internet-ready cell phone of the user; and
upon launch, the software application on the internet-ready cell phone of the user is to check for validity of the activation code and is to enable the mutual location tracking and position-mapping function of the software application on the internet-ready cell phone of the user contingent on validity of the activation code.

18. The apparatus of claim 15, wherein the selected individual has an account and wherein said instructions are to establish the mutual tracking and position-mapping function continent upon verification of the account and verification of an equipment identification number (EIN) of the internet-ready cell phone of the selected individual, wherein exchange of TCP/IP packets with the internet-ready cell phone of the selected individual is also to occur via an IP address and port associated with the software application on the internet-ready cell phone of the selected individual.

19. The apparatus of claim 15, wherein said instructions when executed are to render the moving map on the internet-ready cell phone of the user in a manner that conveys speed and direction of travel of the selected individual.

20. The apparatus of claim 15, wherein said instructions when executed are to render the moving map on the internet-ready cell phone of the user in a manner that displays position of last contact of the selected individual, pending receipt of updated GPS information of the selected individual.

21. The apparatus of claim 15, wherein said instructions when executed are to display a cursor to the user, via a visual display of the internet-ready cell phone of the user, and are to permit the user to define a proposed meeting point for the user and the selected individual by positioning of a cursor on the visual display of the internet-ready cell phone of the user.

22. The apparatus of claim 15, wherein the visual display comprises a touch screen and wherein said instructions when executed are to permit the user to define the proposed meeting point for the user and the selected individual by dragging and dropping of the cursor on the touch screen of the internet-ready cell phone of the user.

23. The apparatus of claim 15, wherein said instructions when executed are to cause the at least one processor to render the moving map in a manner that is automatically re-centered and resized in a manner dependent on each of the updated GPS information of the selected individual and GPS information of the user, so as to be displayed on the internet-ready cell phone of the user in a manner that encompasses updated position of both of the user and the selected individual.

24. The apparatus of claim 15, wherein said instructions when executed are to cause display of an option on a visual display of the internet-ready cell phone of the user for the user to send information associated with travel of the user to select at least one third party selected by the user from amongst a list of contacts presented on the visual display of the internet-ready cell phone of the user, and to cause the internet-ready cell phone of the user, upon exercise of said option, to transmit the information associated with the travel to the at least one third party.

25. The apparatus of claim 15, wherein said instructions when executed are to cause display of an option on a visual display of the internet-ready cell phone of the user to initiate voice communications directly with the selected individual and to cause the internet-ready cell phone of the user, upon selection of the option, to initiate said voice communications directly with the selected individual.

26. The apparatus of claim 15, wherein said instructions when executed are to cause display of an option on a visual display of the internet-ready cell phone of the user to initiate a text message for the selected individual and, in connection with exercise of said option, to cause the internet-ready cell phone of the user to directly send the text message to the selected individual.

27. The apparatus of claim 15, wherein the software application installed on the internet-ready cell phone of the user is to provide an application programming interface to extract commercial enterprise-specific content associated with multiple predetermined parties for presentation to the user, and wherein said instructions, when executed, are to cause the at least one processor to receive from the software application a choice from the user, entered via a user interface of the internet-ready cell phone of the user, the choice free to designate the commercial enterprise-specific content of any one of the multiple parties.

28. An apparatus comprising instructions stored on non-transitory storage media, said instructions when executed to cause at least one processor of an internet-ready cell phone belonging to a user to:
    install a software application on the internet-ready cell phone of the user, following internet-based download of the software application to the internet-ready cell phone of the user;
    in connection with launch of the software application on the internet-ready cell phone of the user, and contingent upon verification of currently valid payment status, enable a mutual location tracking and position-mapping function of the software application on the internet-ready cell phone of the user; and
    as part of the mutual location tracking and position-mapping function,
        receive from a user interface of the internet-ready cell phone of the user, a user selection of an individual with whom position information will be exchanged,
        configure the internet-ready cell phone of the user so as to send updated GPS information of the user to an internet-ready cell phone of the selected individual and receive updated GPS information of the selected individual therefrom, wherein exchange of the updated GPS information of the selected individual is to be effectuated via a software application installed on the internet-ready cell phone of the selected individual,
        render a moving map on the internet-ready cell phone of the user, dependent on at least one map retrieved from a server, and dependent at least in part on the updated GPS information of the selected individual, so as to be displayed on the internet-ready cell phone of the user in a manner that encompasses updated position of the selected individual, and
        automatically terminate the exchange of the GPS information between the user and the selected individual upon occurrence of a predetermined event;
    wherein further
        said instructions, when executed, are to communicate with a server and store an activation code from the server on the internet-ready cell phone of the user, contingent on submission to the server of payment information associated with use of the software application on the internet-ready cell phone of the user,
        upon launch, the software application on the internet-ready cell phone of the user is to check for validity of the activation code and is to enable the mutual location tracking and position-mapping function of the software application on the internet-ready cell phone of the user contingent on validity of the activation code, and
        said instructions when executed are to render the moving map on the internet-ready cell phone of the user in a manner that conveys direction of travel of the selected individual and path traveled.

* * * * *